US011616735B2

(12) United States Patent
Beshai

(10) Patent No.: US 11,616,735 B2
(45) Date of Patent: Mar. 28, 2023

(54) DEEP FUSING OF CLOS STAR NETWORKS TO FORM A GLOBAL CONTIGUOUS WEB

(71) Applicant: Maged E. Beshai, Maberly (CA)

(72) Inventor: Maged E. Beshai, Maberly (CA)

( * ) Notice: Subject to any disclaimer, the term of this patent is extended or adjusted under 35 U.S.C. 154(b) by 0 days.

(21) Appl. No.: 17/555,444

(22) Filed: Dec. 18, 2021

(65) Prior Publication Data

US 2022/0116339 A1 Apr. 14, 2022

Related U.S. Application Data

(63) Continuation-in-part of application No. 17/000,336, filed on Aug. 23, 2020, now Pat. No. 11,206,467.

(51) Int. Cl.
| H04B 10/00 | (2013.01) |
| H04L 49/1546 | (2022.01) |
| H04W 72/0453 | (2023.01) |
| H04L 5/00 | (2006.01) |

(52) U.S. Cl.
CPC ........ H04L 49/1546 (2013.01); H04L 5/0064 (2013.01); H04L 5/0098 (2013.01); H04W 72/0453 (2013.01)

(58) Field of Classification Search
CPC combination set(s) only.
See application file for complete search history.

(56) References Cited

U.S. PATENT DOCUMENTS

| 6,487,177 B1 * | 11/2002 | Weston-Dawkes | H04L 45/04 370/254 |
| 6,567,429 B1 * | 5/2003 | DeMartino | H04Q 11/0478 398/43 |
| 7,016,608 B1 * | 3/2006 | Ball | H04Q 11/0067 398/58 |
| 7,313,094 B2 * | 12/2007 | Oki | H04L 45/50 370/252 |
| 7,587,516 B2 * | 9/2009 | Bhanot | G06F 15/17381 370/395.31 |
| 7,613,187 B2 * | 11/2009 | Choi | H04Q 11/0067 398/58 |
| 8,107,458 B1 * | 1/2012 | Ranganathan | H04L 41/145 370/254 |
| 8,406,128 B1 * | 3/2013 | Brar | H04L 49/1515 370/229 |
| 8,428,457 B2 * | 4/2013 | Mizutani | H04Q 11/0067 398/43 |

(Continued)

*Primary Examiner* — Agustin Bello

(57) ABSTRACT

Access nodes of a large-scale network are arranged into a number of groups. The groups are arranged into a number of bands. Each distributor of a pool of distributors interconnects each access node of a selected group to at least one channel from each group of a selected band. A discipline of allocating the selected group and the selected band to a distributor ensures that each access node has: a number, approximately equal to half the number of groups, of parallel single-hop paths to each other access node of a same group; a number, approximately equal to half the number of bands, of parallel single-hop paths to each access node of a different group within a same band; and one single-hop path to each other access node of a different access band. To eliminate the need for cross connectors, geographically-spread distributors are arranged into geographically-spread constellations of collocated distributors.

20 Claims, 90 Drawing Sheets

(56) References Cited

U.S. PATENT DOCUMENTS

| | | | | |
|---|---|---|---|---|
| 8,972,603 | B1* | 3/2015 | Brandwine | H04L 69/14 370/399 |
| 9,407,576 | B1* | 8/2016 | Brar | H04L 49/15 |
| 9,571,421 | B1* | 2/2017 | Brar | H04L 49/15 |
| 10,412,472 | B2* | 9/2019 | Beshai | H04L 45/24 |
| 11,146,349 | B2* | 10/2021 | Shahriar | H04J 14/0284 |
| 2003/0020982 | A1* | 1/2003 | Rychlicki | H04J 14/0228 398/79 |
| 2003/0156536 | A1* | 8/2003 | Oki | H04L 45/70 370/254 |
| 2005/0002405 | A1* | 1/2005 | Gao | H04N 21/6405 375/E7.025 |
| 2005/0129400 | A1* | 6/2005 | Kim | H04J 14/0282 398/67 |
| 2006/0126996 | A1* | 6/2006 | Beshai | H04Q 11/0005 385/17 |
| 2007/0092252 | A1* | 4/2007 | Bouda | H04Q 11/0067 398/72 |
| 2007/0248009 | A1* | 10/2007 | Petersen | H04L 12/4633 370/412 |
| 2010/0239257 | A1* | 9/2010 | Grossman | H04J 14/0282 398/68 |
| 2010/0254703 | A1* | 10/2010 | Kirkpatrick | H04Q 11/0005 398/45 |
| 2011/0087799 | A1* | 4/2011 | Padhye | H04L 41/0896 398/43 |
| 2011/0228767 | A1* | 9/2011 | Singla | H04L 49/10 370/389 |
| 2012/0250574 | A1* | 10/2012 | Marr | H04L 41/12 370/254 |
| 2012/0257616 | A1* | 10/2012 | Beshai | H04Q 11/0005 370/352 |
| 2012/0257636 | A1* | 10/2012 | Beshai | H04Q 11/0005 370/401 |
| 2012/0257637 | A1* | 10/2012 | Beshai | H04J 14/0217 370/401 |
| 2012/0320753 | A1* | 12/2012 | Vasseur | H04L 45/24 370/237 |
| 2014/0160939 | A1* | 6/2014 | Arad | H04L 45/308 370/237 |
| 2014/0369184 | A1* | 12/2014 | Keesara | H04L 12/4662 370/221 |
| 2015/0236980 | A1* | 8/2015 | Brar | H04L 12/66 370/400 |
| 2015/0304046 | A1* | 10/2015 | Kramer | H04B 10/40 398/66 |
| 2018/0287818 | A1* | 10/2018 | Goel | H04Q 11/0066 |
| 2018/0288505 | A1* | 10/2018 | Sindhu | H04L 45/62 |
| 2018/0375760 | A1* | 12/2018 | Saavedra | H04L 12/4633 |
| 2019/0014397 | A1* | 1/2019 | Beshai | H04L 45/122 |
| 2020/0077166 | A1* | 3/2020 | Beshai | H04J 14/0284 |
| 2021/0067850 | A1* | 3/2021 | Beshai | H04Q 11/0005 |
| 2021/0235173 | A1* | 7/2021 | Sindhu | H04L 49/1523 |
| 2022/0116339 | A1* | 4/2022 | Beshai | H04L 49/1546 |

* cited by examiner

1300
Fused connectors $(u_{g,k}\ \&\ u_{k+1,g}) \rightarrow D(g, k+1)$
$0 \leq g < (\mu-1)$
$g < k < (\mu-1)$
$\mu = 5$

| Distributor 740 | Constituent Connectors 140 | Distributor 740 | Constituent Connectors 140 | Distributor 740 | Constituent Connectors 140 | Distributor 740 | Constituent Connectors 140 |
|---|---|---|---|---|---|---|---|
| D(0,4) | $u_{0,3}/u_{4,0}$ | D(1,4) | $u_{1,3}/u_{4,1}$ | D(2,4) | $u_{2,3}/u_{4,2}$ | D(3,4) | $u_{3,3}/u_{4,3}$ |
| D(0,3) | $u_{0,2}/u_{3,0}$ | D(1,3) | $u_{1,2}/u_{3,1}$ | D(2,3) | $u_{2,2}/u_{3,2}$ | | |
| D(0,2) | $u_{0,1}/u_{2,0}$ | D(1,2) | $u_{1,1}/u_{2,1}$ | | | | |
| D(0,1) | $u_{0,0}/u_{1,0}$ | | | | | | |

| Distributor | | | | | |
|---|---|---|---|---|---|
| S(2,0) | S(0,1) | S(3,2) | S(1,3) | S(4,4) | |
| P,0,2 | P,0,0 | P,0,3 | P,0,1 | P,0,4 | |
| P,1,2 | P,1,4 | P,1,1 | P,1,3 | P,1,0 | |
| P,2,2 | P,2,3 | P,2,4 | P,2,0 | P,2,1 | |
| P,3,2 | P,3,2 | P,3,2 | P,3,2 | P,3,2 | |
| P,4,2 | P,4,1 | P,4,0 | P,4,4 | P,4,3 | |
| R,0,0 | R,1,0 | R,2,0 | R,3,0 | R,4,0 | |
| R,0,1 | R,1,1 | R,2,1 | R,3,1 | R,4,1 | |
| R,0,2 | R,1,2 | R,2,2 | R,3,2 | R,4,2 | |
| R,0,3 | R,1,3 | R,2,3 | R,3,3 | R,4,3 | |
| R,0,4 | R,1,4 | R,2,4 | R,3,4 | R,4,4 | |

8200 Access nodes to which a selected access node (P,3,2) connects through constellation Θ(P,R) of FIG. 79

8210 Distributors within constellation

8220 Access nodes belonging to access-band P

0 ≤ P < R < Π

8225 Access nodes of access-band R

DEEP FUSING OF CLOS STAR NETWORKS TO FORM A GLOBAL CONTIGUOUS WEB

CROSS-REFERENCE TO RELATED APPLICATIONS

The present application is a continuation-in-part of U.S. patent application Ser. No. 17/000,336 filed on Aug. 23, 2020, entitled "Global Contiguous Web of Fused Three-Stage Networks", the specification of which is incorporated herein by reference in its entirety.

FIELD OF THE INVENTION

The invention is related to global data communication, data centers, cloud computing, and edge computing. In particular, the invention is concerned with a network having a large number of access nodes interconnected through distributors, which may be optical-based or electronic-based, and efficient distribution of payload data and control data.

BACKGROUND

A major challenge in the art of telecommunication-network design is the enablement of graceful network growth while maintaining structural simplicity, ease of control, and high performance. There is a need to explore methods and apparatus for meeting the challenge.

SUMMARY

In accordance with an aspect, the invention provides a contiguous network comprising a plurality of access nodes and a plurality of distributors. The plurality of distributors is arranged into a plurality of constellations. The plurality of access nodes is arranged into a plurality of groups.

Each group comprises a respective number of access nodes. The plurality of groups is arranged into a first number of bands, each band comprising a second number of groups.

Each pair of bands is connected to a respective constellation with one band, labeled a joined band, connecting in a first mode and one band, labeled a fusing band, connecting in a second mode. Each distributor of the respective constellation is coupled to: at least one access node of each group of the fusing band (second mode), and each access node of one group of the joined band (first mode). Each access node of the fusing band connects to:
- each access node of the joined band; and
- each access node of each other group of the fusing band.

Each band connects to at least one constellation in the second mode. Consequently, each access node of each band has multiple dual single-hop paths to each other access node within the same band and a dual single-hop path to each access node of each other band.

Each constellation connects directly to each access node of a pair of bands, to which the constellation connects, through a respective dual multichannel link each dual channel of which connecting to a respective distributor of the constellation. Consequently, the need for cross connectors between the plurality of access nodes and the plurality of distributors is eliminated. The respective dual multichannel link is coupled to:
- a spectral multiplexer and a spectral demultiplexer at an access node of the pair of bands connecting to the respective constellation; and
- a spectral demultiplexer and a spectral multiplexer at the respective constellation.

The spectral multiplexer at each access node combines $\Omega$ upstream channels emanating from electrical-to-optical converters coupled to $\Omega$ output ports of the access node into an upstream multichannel link directly routed to the respective constellation, where $\Omega$ denotes the number of groups per band (the second number). The spectral demultiplexer at the respective constellation separates the $\Omega$ upstream channels directing each channel to a respective distributor of the respective constellation.

The spectral multiplexer at the respective constellation combines $\Omega$ downstream channels emanating from $\Omega$ distributors of the respective constellation into a downstream multichannel link directly routed to a respective access node. The spectral demultiplexer at each access node separates the $\Omega$ downstream channels originating from the respective constellation, each downstream channel coupled to a respective optical-to-electrical converter coupled to an input port of the respective access node.

Within the fusing band of any pair of bands, an access node of index $\nu$ within a group of index $\gamma$ connects to a respective constellation, through $\Omega$ dual channels, to each of $\Omega$ distributors:

$$S(\rho, \chi), \rho = (\nu + \gamma \times \chi)_{modulo\,\Omega}, 0 \leq \chi < \Omega,$$
$$0 \leq \nu < M(\beta, \gamma), 0 \leq \gamma < \Omega, 0 \leq \beta < \Pi,$$

$\Pi$ being the number of bands (the first number), $\Pi > 4$, $\Omega$ being the second number, selected as a prime number, $\Omega > 2$, and $M(\beta,\gamma)$ denoting a number of access nodes within a group of index $\gamma$ of a band of index $\rho$.

Each constellation comprises $\Omega^2$ distributors arranged into a matrix of $\Omega$ rows and $\Omega$ columns, with individual distributors denoted $S(\rho,\chi)$, $0 \leq \rho < \Omega$, $0 \leq \chi < \Omega$. Individual bands of the number of bands, individual groups within each band, and individual access nodes within each group are indexed sequentially in steps of one, starting with zero. Each access node is identified according to an access-node index $\nu$, a group index $\gamma$, and a band index $\beta$.

Within the joined band of a pair of bands, an access node of index $\nu$ within a group of index $\gamma$ connects to the respective constellation, through $\Omega$ dual channels, to each of $\Omega$ distributors:

$$S(\rho, \gamma), 0 \leq \rho < \Omega, 0 \leq \nu < M(\beta, \gamma).$$

Based on the above connectivity pattern, a distributor $S(\rho,\chi)$, $0 \leq \rho < \Omega$, $0 \leq \chi < \Omega$, of the respective constellation connects to a dual channel to each of access nodes determined as:

$$(\beta, \gamma, \nu): \nu = (\rho - \gamma \times \chi + J \times \Omega)_{modulo\,\Omega} < M(\beta, \gamma),$$
$$0 \leq J < \lceil M(\beta, \gamma)/\Omega \rceil, 0 \leq \gamma < \Omega, \beta = P;$$
and
$$(\beta, \gamma, \nu): 0 \leq \nu < M(\beta, \gamma), \gamma = \chi, \beta = R,$$

where P and R denote indices of a pair of bands, $0 \leq P < R < \Pi$, with a band of index P connecting in the second mode.

Alternatively, a distributor $S(\rho,\chi)$, $0\leq\rho<\Omega$, $0\leq\chi<\Omega$, of the respective constellation, connects to a dual channel to each of access nodes determined as:

$$(\beta, \gamma, \nu): \ 0 \leq \nu < M(\beta, \gamma), \gamma = \chi, \beta = P;$$

and $$(\beta, \gamma, \nu): \ \nu = (\rho - \gamma \times \chi + J \times \Omega)_{modulo\,\Omega} < M(\beta, \gamma),$$

$$0 \leq J < \lceil M(\beta, \gamma)/\Omega \rceil, \ 0 \leq \gamma < \Omega, \ \beta = R,$$

where P and R denote indices of a pair of bands, $0 \leq P < R < \Pi$, with a band of index P connecting in the first mode.

Optionally, at least one distributor of the plurality of distributors comprises:
(I) an optical distributing mechanism having a plurality of input ports and a plurality of output ports;
(II) a distributor controller;
(III) a time indicator;
(IV) a plurality of optical splitters each connecting an upstream optical signal from an access node to a respective input port and an optical-to-electrical converter to detect a baseband signal;
(V) a plurality of time-alignment units each for detecting a cyclic identifier of each data segment of a respective baseband signal and communicating the cyclic identifier and a corresponding time indication, according to the time indicator, to the distributor controller to determine discrepancy between the corresponding time indication and a scheduled arrival time of the data segment;
(VI) a plurality of optical combiners each for inserting, during a respective control time slot, a value of the discrepancy into a respective downstream signal directed from a respective output port to a respective access node for adjusting transmission time to the at least one distributor accordingly.

Optionally, at least one distributor of the plurality of distributors comprises:
(i) an electronic distributing mechanism having a plurality of input ports and a plurality of output ports;
(ii) a distributor controller;
(iii) a time indicator;
(iv) a plurality of optical-to-electrical converters for detecting baseband signals from upstream optical signals received from an access node;
(v) a plurality of fanout units each connecting a baseband signal to an input buffer preceding a respective input port and to a time-alignment unit for detecting a cyclic identifier of each data segment of the baseband signal and communicating the cyclic identifier and a corresponding time indication, according to the time indicator, to the distributor controller to determine discrepancy between the corresponding time indication and a scheduled arrival time of the data segment;
(vi) a plurality of 2:1 temporal multiplexers each for inserting, during a respective control time slot, a value of the discrepancy into a respective downstream signal directed from a respective output port to a respective access node for adjusting transmission time to the at least one distributor accordingly.

The contiguous network further comprises a central processor executing instructions to:
(a) set the number of access nodes for each group of the plurality of groups as a target number, the plurality of access nodes then comprises a corresponding target of a total number of access nodes;
(b) generate a connectivity table as an allocation pattern of each access node of the plurality of access nodes to respective distributors of the plurality of distributors based on selection of a respective constellation;
(c) access a memory device storing data organized into a data structure defining current connectivity of access nodes to respective distributors, the current connectivity being initialized as no connectivity;
(d) assign new access-node identifiers to new access nodes from among the plurality of access nodes;
(e) determine connections from the new access nodes to respective distributors based on the connectivity table, current connectivity, and the new access-node identifiers; and (f) update the current connectivity of access nodes to respective distributors and store result in the memory device.

In accordance with another aspect, the invention provides a method of forming a contiguous network, The method comprises:
(A) arranging a plurality of access nodes into a number of groups, each group comprising a respective number of access nodes, further arranging the number of groups into a first number of bands, each band comprising a second number of groups;
(B) arranging a plurality of distributors into a plurality of constellations;
(C) connecting each pair of bands to a respective constellation, with one band, denoted joined band, connecting in a first mode and one band, denoted fusing band, connecting in a second mode;
(D) connecting each distributor of the respective constellation to at least one dual channel from each group of the fusing band (second mode), and a channel from each access node of a selected group of the joined band (first mode), so that each access node of the fusing band has a single-hop path to: each access node of the joined band; and each access node of each other group of the fusing band, wherein each band connects to at least one constellation in the second mode.

Consequently, each access node of each band has multiple parallel single-hop paths to each other access node of the same band, and one single-hop path to each other access node of each other band, where each single-hop path traverses only one distributor.

The method further comprises connecting the respective constellation directly to each access node of a respective pair of bands through a respective dual multichannel link each dual channel of which connecting to a respective distributor of the respective constellation, thereby eliminating the need for cross connectors between access nodes and distributors.

The method further comprises each distributor exchanging timing data with each subtending access node to time-align each subtending access node to the distributor.

Preferably, each band is connected in the second mode in a number, $\lambda$, of constellations determined as $\lambda = \lfloor (\Pi-1)/2 \rfloor$, $\Pi$ denoting the first number, $\Pi > 4$.

The method further comprises connecting each band in the second mode to a selected number, $k$, of constellations so that for $1 \leq k \leq \lfloor (\Pi-1)/2 \rfloor$:
a pair of bands $\{p$ and $(p+k)\}$, $0 \leq p < (\Pi-k)$, connects to a respective constellation with band p connecting in the second mode;
and
a pair of bands $(r, \Pi+r-k)$, $0 \leq r < k$, connects to a respective constellation with band r connecting in the first mode.

The bands are indexed sequentially between 0 and (Π−1).

The method further comprises an access node of index ν within a group of index γ, of a band connecting to a constellation in the second mode, connects, through Ω dual channels, to each of Ω distributors:

$$S(\rho, \chi), \rho = (\nu + \gamma \times \chi)_{modulo\Omega}, 0 \leq \chi < \Omega,$$
$$0 \leq \nu < M(\beta, \gamma), 0 \leq \gamma < \Omega, 0 \leq \beta < \Pi,$$

An access node of index ν within a group of index γ, of a band connecting to a constellation in the first mode, connects, through Ω dual channels, to each of Ω distributors:

$$S(\rho, \gamma), 0 \leq \rho < \Omega, 0 \leq \nu < M(\beta, \gamma).$$

Bands of the first number of bands, groups within each band, and access nodes within each group are indexed sequentially in steps of one, starting with zero. Each access node is identified according to an access-node index, an access-group index, and a band index. Π denotes the first number, Π>4, Ω denotes second number, selected as a prime number, Ω>2, and M(β,γ) denotes a number of access nodes within a group of index γ of a band of index β. Each constellation comprises $\Omega^2$ distributors arranged into a matrix of Ω rows and Ω columns, with individual distributors denoted S(ρ,χ), 0≤ρ<Ω, 0≤χ<Ω.

The method further comprises executing processes of:
(1) setting the respective number of access nodes as a predetermined target number, the plurality of access nodes then corresponds to a target total number of access nodes;
(2) generating a connectivity table as an allocation pattern of each access node of the plurality of access nodes to respective distributors of the plurality of distributors;
(3) accessing a memory device storing data organized into a data structure defining current connectivity of access nodes to respective distributors, the current connectivity being initialized as no connectivity;
(4) assigning new access-node identifiers to new access nodes from among the plurality of access nodes;
(5) determining connections from the new access nodes to respective distributors based on: the connectivity table; the current connectivity; and the new access-node identifiers; and
(6) updating the current connectivity of access nodes to respective distributors and storing result in the memory device.

The new access-node identifiers may be selected to reduce variance of a number of occupied ports of distributors of the plurality of distributors during network growth.

The method further comprises establishing a path from any access node of any group of any band to a destination access node of any other band as:
a single-hop path from the any access node to an intermediate access node of the any group; and
a single-hop path from the intermediate access node to the destination access node.

BRIEF DESCRIPTION OF THE DRAWINGS

Features and implementations will be further described with reference to the accompanying exemplary drawings, in which:

FIG. 13 illustrates a pattern of connector pairing where each connector-pair forms a distributor for a network of twelve access groups;

FIG. 80 illustrates connectivity pattern of distributors of an exemplary type-II second-order constellation where each access band comprises five access groups with the access groups having equal numbers of access nodes;

FIG. 82 tabulates access nodes to which the specific access node of FIG. 81 connects through respective single-hop paths;

FIG. 83 illustrates connectivity pattern of distributors of an exemplary fully populated type-I second-order constellation where each access band comprises five access groups with each access group having ten access nodes;

TERMINOLOGY

Figure 1:
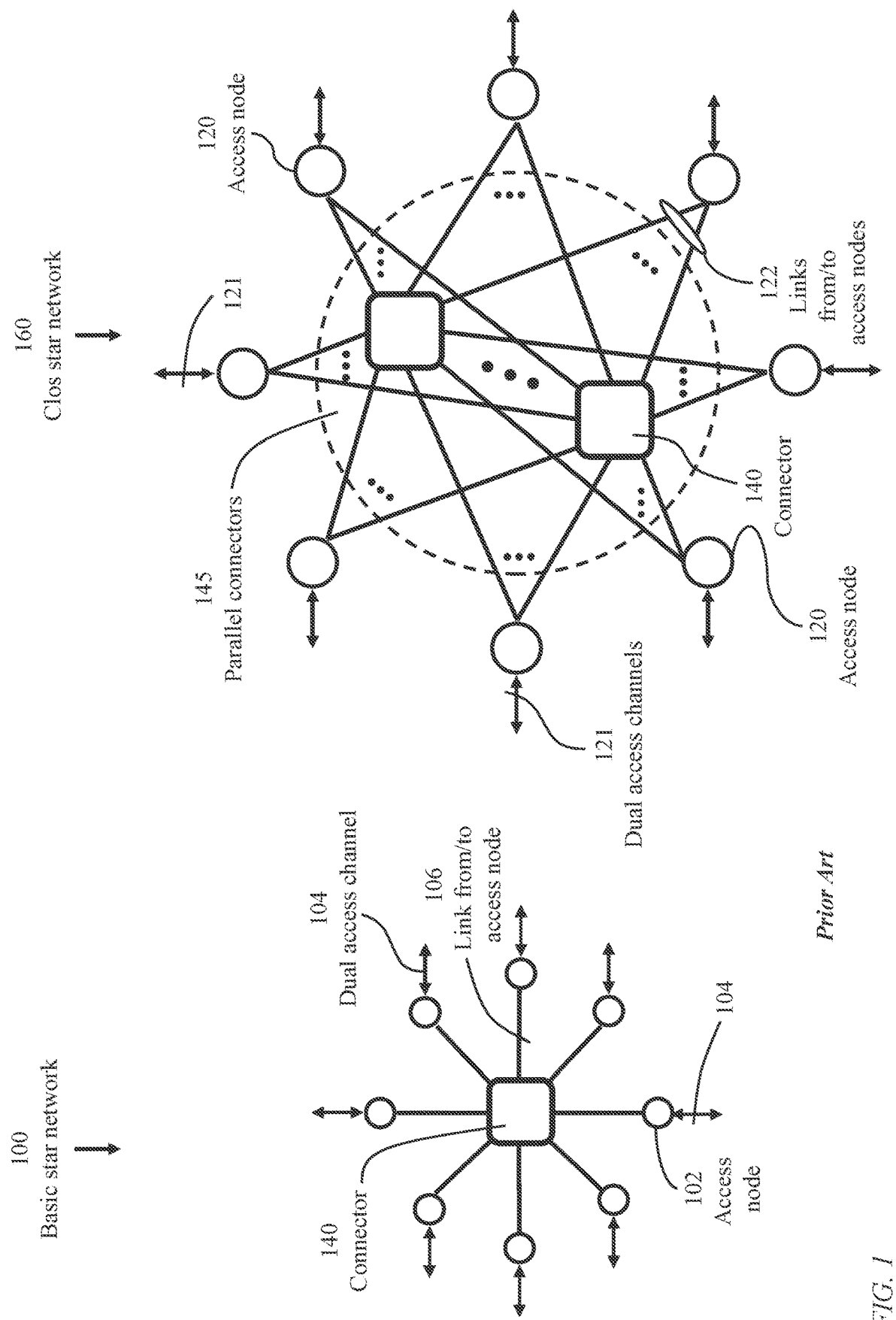
FIG. 1 illustrate conventional basic network structures.

Terms used in the present specification are defined below.

Access node: A switching device connecting to data sources and data sinks, and configured to transfer data from the data sources to another switching device and transfer data from another switching device to the data sinks is referenced as an access node or an edge node, each access node comprises a respective access controller.

Access group: An access group comprises a number of access nodes that connect to each distributor of a respective set of distributors. The number of access nodes per access group may vary from one access group to another. In order to simplify addressing of access nodes in a growing network, the number of access nodes per access group is limited to a predefined upper bound. An access group is also referenced as "group".

Access-group size: The number of access nodes of an access group is referenced as the access-group size.

Access band: The accesses nodes of the entire network are arranged into access groups. The access groups are arranged into a plurality of access bands, each access band comprising a predetermined number of access groups. An access band is also referenced as "band".

Switch: A switch comprises a switching mechanism for transferring data from a set of input ports to a set of output ports. In the switching system of the present application, a switch transfers data from one set of access nodes connecting to input ports of the switch to another set, or the same set, of access nodes connecting to output ports of the switch. A switch may use an electronic or a photonic switching mechanism.

Distributor: A device comprising a plurality of input ports and a plurality of output ports where any input port may transfer data to any output port is herein referenced as a distributor. The transfer of data may be selective or cyclic. A distributor configured to transfer data from any input port to selected output port is conventionally called a "switch, as defined above. A distributor configured to cyclically transfer data from each input port to each output port is conventionally called a "rotator". Thus, the term "distributor" refers to either a switch or a rotator. Certain architectural aspects of the contiguous network of the present invention are independent of the type of distributor. Each distributor comprises a respective distributor controller.

Dimension of an access node or a distributor: The number of dual ports of any switching, routing, or generally distributing, device used for receiving and transmitting content data defines a "dimension" of the device. A device may also support dual ports used for control purposes.

Connector: The term "connector" is used herein to refer to a distributor which connects to one access group.

Single-hop path: The term refers to a path from one access node to another traversing only one distributor.

Star network: The term refers to a network comprising a plurality of access nodes interconnected through a single connector, which may be a switch, a router, or a simple rotator. The plurality of access nodes is said to form an access group.

Clos Star network (CSN): A network comprising multiple independent connectors (switches, routers, rotators, or a mixture thereof) of equal dimensions (i.e., each having a same number of dual ports) interconnecting access nodes of an access group is said to form a Clos Star Network (CSN). Each access node has multiple parallel single-hop paths to each other access node of the access group, the number of single-hop paths being equal to the number of connectors. The connector dimension dictates the number of access nodes of the access group. For an electronic connector, the dimension may vary over a very wide range; 16 to 8192, for example. For a fast optical connector, the dimension would be limited to 128, or so, with the present state of the art.

Three-stage network: The terms "Clos star network" and "three-stage network" are used synonymously in the present application.

First-order distributor: A first-order distributor connects to access nodes belonging to two access groups Second-order distributor: A second-order distributor connects to access nodes of more than two access groups First-order Fusing of CSNs: Merging each connector of each CSN with one connector of each other CSN, of a plurality of CSNs, to share a common distributing mechanism of a respective distributor, is herein referenced as "first-order fusing". First-order fusing forms a contiguous network where each access node of each CSN has one single-hop path to each access node of each other CSN while still having a number of parallel single-hop paths, equal to the number of connectors per CSN, to neighboring access nodes of the same CSN. Thus, first-order-fusing of 120 CSNs, each CSN comprising 100 access nodes, for example, forms a network of 12000 access nodes where each access node of each CSN has 119 parallel single-hop paths to each other access node of the same CSN and one single-hop paths to each of the remaining 11900 access nodes.

Second-order Fusing of CSNs: Merging connectors of a plurality of CSNs to form a plurality of distributors, so that the dual ports of each distributor connect to all access nodes of only one CSN and selected access nodes from each of a predefined number of other CSNs, is herein referenced as "second-order fusing". Second-order fusing forms a contiguous network where each access node of each CSN has multiple parallel single-hop paths to each access node of a band of several access groups. For example, selected the predefined number of access groups of the band to be 24, second-order-fusing forms a network of 12000 access nodes where each access node of a community of 2400 access nodes has multiple parallel single-hop paths to each other access node of the community and one single-hop paths to each of the remaining 9600 access nodes of the network.

Deep fusing: Second-order fusing as defined above, or variants thereof, are referenced as "deep fusing"

Constellation of distributors: A number of distributors may be spatially collocated to enable direct communication with access nodes through wavelength-division-multiplexed (WDM) links avoiding the need for intermediate spectral routers.

First-order constellation: A constellation of distributors that are configured to perform first-order fusing is referenced as a "first-order constellation"

Second-order constellation: A constellation of distributors that are configured to perform second-order fusing is referenced as a "second-order constellation"

Type-I second-order fusing: Within a second-order constellation fusing a first access band and a second access band, type-I second-order fusing requires that each distributor of the constellation connect to at least one access node of each access group of the first access band and all access nodes of one access group of the second access band.

Type-II second-order fusing: Within a second-order constellation fusing a first access band and a second access band, type-II second-order fusing requires that each distributor of the constellation connect to at least one access node of each access group of the second access band and all access nodes of one access group of the first access band.

Distributor identifier: In the contiguous-network configurations described in the present application, a distributor connects to access nodes of different CSNs. The total number of CSNs, hence the total number of access groups, in the entire network is denoted "$\mu$", $\mu \gg 1$. The value of $\mu$ may vary between 20 and 2000, for example. The p access groups of the entire network are denoted $\{G_0, G_1, \ldots, G_{\mu-1}\}$.

A distributor connecting to access nodes of only two access groups, to realize first-order fusing of CSNs, may be identified according to the constituent access groups. Thus, a distributor connecting to access groups $G_x$ and $G_y$, $0 \le G_x < \mu$, $0 \le G_y < \mu$, may be identified as D(Gx, Gy).

With second-order fusing (deep fusing) of CSNs, a distributor connects to dual channels from multiple (more than two) access groups. Additionally, in both first-order fusing and second-order fusing, the network distributors are arranged into constellations. Thus, within a constellation, a distributor is preferably identified according to position within the constellation. A constellation connects to two access bands each band comprising a number, $\Omega$, of access groups and comprises $\Omega$ distributors arranged into a matrix of $\Omega$ rows and $\Omega$ columns. A distributor, within the constellation is preferable referenced as $S(\rho,\chi)$, $0 \le \rho < \Omega$, $0 \le \chi < \Omega$, $\rho$ denoting a row number and $\chi$ denoting a column number.

Fully populated constellation: A constellation connecting to a pair of access bands where each access group of the pair of access bands is fully populated, i.e., having a number of access nodes less than a predefined target value is referenced as a "fully-populated" constellation.

Partially populated constellation: A constellation connecting to a pair of access bands where any access group of the pair of access bands has a number of access nodes less than a predefined target value is a "partially-populated" constellation. The two access bands connecting to a population may include access groups that are provisioned at a small fraction of an envisaged target size then grow gradually, thus enabling graceful network growth without disturbing current network operations.

Contiguous network: A network supporting access nodes interconnected through distributors in which any access node may transfer data to any other access node through a path traversing only one distributor is herein referenced as a "contiguous network).

Global network: A network comprising a large number of nodes covering a wide geographical area is traditionally referenced as a global network.

Content port: A content port is a distributor port connecting to an access node. A dual content port comprises an input content port configured to receive content data (payload data) as well as control data from an access node and an output content port configured to transmit content data as well as control data to an access node.

Control port: A control port is a dual port, having an input side and an output side, configured to receive control data from a distributor controller and transmit control data to the distributor controller.

Spectral band: The term refers to a frequency band (bandwidth) occupied by a signal in a transmission medium, such as a fiber-optic link.

Dual channel: A dual channel comprises a channel from a first device to a second device and a channel from the second device to the first device. A channel may occupy a spectral band in a wavelength division multiplexed (WDM) link.

Dual port: A dual port comprises a sending port and a receiving port.

Link: A link is a transmission medium from a first node to a second node. A link contains at least one channel, each channel connecting a port of the first node to a port of the second node. A directional link may contain directional channels from ports of the first node to ports of the second node, or vice versa. A dual link comprises two directional links of opposite directions.

WDM link: A number of channels occupying different spectral bands of an electromagnetic transmission medium form a wavelength-division-multiplexed link (a WDM link).

Multichannel link: The term refers to a transmission link comprising multiple channels—a wavelength-division-multiplexed link (WDM link) carrying multiple spectral bands is a multichannel link.

Dual multichannel link: The term refers to a transmission link comprising multiple dual channels where a dual channel comprises two channels of opposite transmission directions. A dual multichannel link may comprise two physical links of opposite transmission directions.

Dimension of a distributor: The number of input ports and output ports, excluding ports used exclusively for control purposes, defines a "dimension" of a switch. The input ports and output ports of a switch handle payload data (content data) while a control inlet or a control outlet of a switch handle control data relevant to scheduling and timing.

Collocation: The term refers to spatial proximity of devices which may be interconnected using relatively short links, such as fiber links each carrying a single spectral band. In some implementations, the lengths of the (short) links may be selected to equalize propagation delays.

Spectral multiplexer: A spectral multiplexer combines spectral bands of separate input channels onto an output wavelength-division-multiplexed link (WDM link).

Spectral demultiplexer: A spectral demultiplexer directs individual spectral bands of an input WDM link to separate output channels.

Monitoring period: The time domain is organised into monitoring periods, each monitoring period comprising a predefined number of time slots. During each monitoring period, each input port of a distributor has access to a controller of the distributor during a respective reserved time slot for periodic verification of signal temporal alignment.

Scheduling period: A scheduling period comprises an integer multiple of monitoring periods.

Allocating a flow rate for a data stream may be based on allocating a number of time slots per scheduling period.

Control segment versus content segment: A data stream is preferably organized into segments including control segments and content segments. Each segment is transferred during a single time slot. A control segment is directed to a controller of a distributor while a content segment is directed to an output port of a distributor. The segments of a data stream are preferably indexed sequentially so that segments of a data stream transferred during a scheduling period of N time slots are indexed as sequentially as 0, 1, ..., (N−1).

Processor: The term "processor" as used in the specification of the present application, refers to a hardware processor, or an assembly of hardware processors, having at least one memory device.

Controller: The term "controller", as used in the specification of the present application, is a hardware entity comprising at least one processor and at least one memory device storing software instructions. Any controller type, such as a "access controller", "switch controller", or "global controller" is a hardware entity.

Software instructions: The term refers to processor-executable instructions which may be applied to cause a processor to perform specific functions.

Configuring a controller or a processor: The term refers to an action of installing appropriate software for a specific function.

Spectral router: A spectral router (also called "wavelength router") is a passive device connecting a number of input WDM links to a number of output WDM links where each output WDM link carries a spectral band from each input WDM link.

$\lfloor r \rfloor$: $\lfloor r \rfloor$ denotes the nearest integer lower than or equal to a real number "r"; $\lfloor q \rfloor = q$, if "q" is an integer. For example: $\lfloor 7/8 \rfloor = 0$, $\lfloor -7/8 \rfloor = -1$, $\lfloor 8/8 \rfloor = 1$, $\lfloor -8/8 \rfloor = -1$, $\lfloor 9/8 \rfloor = 1$, $\lfloor -9/8 \rfloor = -2$.

$\lceil r \rceil$: $\lceil r \rceil$ denotes the nearest integer higher than or equal to a real number "r"; $\lceil q \rceil = q$, if "q" is an integer Modulo operation: The operation J modulo K, herein denoted $J_{modulo\ K}$, where J is any integer and K is a positive integer is a remainder determined as:

$$J_{moduloK} = J - K \times \lfloor J/K \rfloor, \text{Thus}, 7_{modulo8} = 7,$$

$$(-7)_{modulo8} = \{-7 - (-1) \times 8\} = 1, 8_{modulo8} = 0,$$

$$(-8)_{modulo8} = 0, 9_{modulo8} = 1, \text{and } (-9)_{modulo8.} = 7.$$

Processor-executable instructions causing respective processors to route data through the switching system may be stored in a processor-readable media such as floppy disks, hard disks, optical disks, Flash ROMS, non-volatile ROM, and RAM. A variety of hardware processors, such as microprocessors, digital signal processors, and gate arrays, may be employed.

A reference numeral may individually or collectively refer to items of a same type. A reference numeral may further be indexed to distinguish individual items of a same type.

REFERENCE NUMERALS

A reference numeral may individually or collectively refer to items of a same type. A reference numeral may further be indexed to distinguish individual items of a same type.

100: Basic star network
102: Access node linked to a single distributor
104: Dual access channels coupled to an access-node 102
106: Dual link connecting an access node 104 to a connector
120: Access node linked to multiple connectors
121: Dual access channels coupled to an access-node 120
122: Dual links connecting an access node 120 to multiple connectors
140: Connector (switch, rotator, or core router)
145: Multiple connectors operating in parallel 160: Clos star network (composite star network)
200: Overview of a network
225: Plurality of access nodes
245: Plurality of connectors
275: Dual Wavelength-Division-Multiplexed (WDM) links between access nodes and cross connectors
280: Plurality of cross-connectors
285: Dual WDM links between cross-connectors and connectors
300: Overview of alternate network configurations
310: Schematic of a network employing cross-connectors
350: Schematic of a network configured to avoid use of cross-connectors
400: Grouping access nodes into access groups and connectors into connector sets
420: Access group of access nodes
460: Connector set
500: Spatially interleaved access groups
600: Independent three-stage networks each comprising an access group and a respective connector set
630: Dual WDM link connecting an access group and a respective connector set to form a three-stage network
700: Fused three-stage networks
740: Distributor combining two connectors of different connector sets
750: Distributor set
760: Dual WDM link connecting an access group and a respective distributor set to form a fused three-stage network
800: Globally distributed access nodes
900: Globally spread distributors
1000: Internal connectivity of independent three-stage networks
1030: Dual channels connecting access nodes to respective connectors
1100: Connectivity of independent three-stage networks (continued)
1200: Arrangement of fused connectors of different connector sets to form distributors
1220: Distributor index
1300: Fused connectors according to the arrangement of FIG. 12
1400: Connectors' association with distributors
1430: Dual channels connecting access nodes of an access group to distributors of a corresponding distributor set
1500: Mutually fused three-stage networks (continued)
1600: A set of distributors resulting from fusing twelve independent three-stage networks
1700: Plurality of access groups to be logically arranged into access bands
1800: Formation of access bands and respective connector clusters
1820: Access band
1840: Connector cluster
1900: Formation of an intra-band constellation and an inter-band constellation
1920: Intra-band constellation of fused connector sets
1925: Pairwise fusion of connectors within an intra-band constellation
1940: Inter-band constellation of fused connector sets
1945: Pairwise fusion of connectors within an inter-band constellation
2000: Exemplary arrangement of a plurality of connectors into complementing intra-band and inter-band constellations
2100: Form of an intra-band constellation and an inter-band constellation
2120: Intra-band constellation of distributors interconnecting access groups of an access band
2140: Inter-band constellation of distributors connecting access groups of an access band to access groups of another access band
2200: Complementing intra-band and inter-band constellations
2300: Detailed intra-band constellations
2400: Detailed inter-band constellation
2500: Arrangement of distributors of a global network into spatially distributed constellations
2600: Exemplary constellations of a large-scale network
2700: Connectivity of an access band to respective constellations
2720: Dual WDM link carrying multiple spectral bands to and from a respective intra-band constellation
2740: Multiple dual WDM links each carrying multiple spectral bands to and from a respective inter-band constellation
2800: Global network connectivity
2900: Access-group connectivity to respective constellations
3000: Geographically distributed constellations of collocated distributors
3025: A single constellation (intra-band or inter-band)
3100: First access node 120A connectivity to a first set of constellations
3120: Constellation to which first access-node 120A connects
3125: Constellation not connecting to first access-node 120A
3200: Second access-node 120B connectivity to a second set of constellations, the first set and second set intersection in a common constellation
3220: Constellation to which second access-node 120B connects
3225: Constellation not connecting to second access-node 120B
3300: Internal connectivity of inter-band constellation
3310: Dual WDM link from an access node of a first access band
3312: Spectral demultiplexer connecting to dual WDM link 3310
3314: Spectral multiplexer connecting to dual WDM link 3310
3316: Dual channels of dual WDM link 3310
3320: Dual WDM link from an access node of a second access band
3322: Spectral demultiplexer connecting to dual WDM link 3320
3324: Spectral multiplexer connecting to dual WDM link 3320
3326: Dual channels of dual WDM link 3320
3340: Access group connecting to first set of distributors
3350: Access group connecting to a second set of distributors
3360: Access group connecting to a third set of distributors
3370: Access group connecting to a fourth set of distributors intersecting said first, second, and third sets of distributors
3380: Access group connecting to a fifth set of distributors intersecting said first, second, and third sets of distributors
3390: Access group connecting to a sixth set of distributors intersecting said first, second, and third sets of distributors
3400: Internal connectivity of intra-band constellation
3410: Dual WDM link from an access node of a respective access group
3412: Spectral demultiplexer connecting to dual WDM link 3410

3414: Spectral multiplexer connecting to dual WDM link 3410

3416: Dual channels of dual WDM link 3410

3440: Access group connecting to dual WDM links from a first access group connecting to an intra-band constellation

3450: Access group connecting to dual WDM links from a middle access group connecting to the intra-band constellation

3460: Access group connecting to dual WDM links from a last access group connecting to the intra-band constellation

3500: Formation of constellations of distributors—example 1

3600: Formation of constellations of distributors—example 2

3700: Internal connectivity of a specific inter-band constellation

3761: Index of an access group connecting to a specific distributor

3762: Index of another access group connecting to the specific distributor

3800: Access-group connectivity to a first set of distributors of an inter-band constellation

3810: Dual WDM links from access nodes of an access group connecting to a column of distributors of the inter-band constellation

3840: Dual channels, one from/to each access node of an access group

3900: Access-group connectivity to a second set of distributors of the inter-band constellation

3910: Dual WDM links from access nodes of an access group connecting to the second set of distributors of the inter-band constellation

3940: Dual channels, one from/to each access node of an access group

4000: Internal connectivity of a specific intra-band constellation

4100: Internal connectivity of a large inter-band constellation

4200: Connectivity of an access group to relevant constellations

4250: A specific access group

4260: A WDM link from an access node of access group 4250

4280: Spectral demultiplexer

4290: Spectral multiplexer-demultiplexer

4300: Connectivity of a first access node to a second access node of the same access group and connectivity of the first access node to a third access node of a different access group

4310: A first three-stage network

4320: A second three-stage network

4400: A set of alternate paths within a constellation for a specific pair of access nodes

4412: A set of distributors within constellation 2140

4420: A channel from originating access node to a specific distributor connecting to destination access node

4430: An internal path through the specific distributor connecting the originating access node to the destination access node

4435: Internal paths through the specific distributor

4440: Internal paths through an intermediate distributor connecting to destination access node

4470: Channel from the specific distributor to the destination access node

4480: Channel from an intermediate distributor to destination access node

4500: A path of set 4400

4510: Dual port of the specific distributor connecting the originating access node to the destination access node

4520: Intermediate dual port of the specific distributor

4540: A channel from dual port 4510 to the intermediate dual port of the specific distributor

4550: Path from the specific distributor to an intermediate distributor through an intermediate access node

4552: Dual port of destination access node connecting to the specific distributor

4560: Dual port of the intermediate distributor

4568: Dual port of the intermediate distributor connecting to the destination access node

4570: Dual port of the specific distributor connecting to the destination access node

4572: Dual port of destination access node connecting to the intermediate distributor

4580: A dual channel between dual port 4552 and dual port 4570

4590: A dual channel between dual port 4572 and dual port 4568

4595: dual channel from destination access node to a destination device

4600: Another set of alternate paths within a constellation for a specific pair of access nodes

4612: A set of distributors within constellation 4410

4620: A channel from originating access node to a distributor connecting to destination access node

4630: Internal paths through an intermediate distributor

4640: Internal paths through a specific distributor connecting to destination access node

4700: Two paths of set 4600

4702: Dual channel from a device

4705: A dual channel between a dual port of originating access node and a dual port of a specific distributor D(1,9) connecting to destination access node

4708: Dual port of originating access node connecting to distributor D(1,8) starting a first alternate path

4709: Dual port of originating access node connecting to distributor D(1,11) starting a second alternate path

4710: Dual channel from dual port 4708 to a dual port of distributor D:1,8

4720: Dual channel from dual port 4709 to a dual port of distributor D:1,11

4750: Dual port of specific distributor D(1,9)

4760: Internal path through the specific distributor D(1,9)

4800: A set of alternate paths traversing two constellations for a specific pair of access nodes

4830: Internal paths through a distributor connecting to originating access node

4840: Internal paths through a distributor connecting to destination access node

4900: Two paths of set 4800 through a first distributor

4940: Dual port of the first distributor connecting to originating access node

4942: an intermediate dual port of the first distributor

4943: an alternate intermediate dual port of the first distributor

4950: a path through an intermediate access node from dual port 4942 to a second distributor connecting to destination access node

4951: a path through an intermediate access node from dual port 4943 to the second distributor

4960: dual port of the second distributor connecting to destination access node

5000: Two paths of set 4800 through a third distributor
5040: Dual port of the third distributor connecting to originating access node
5042: an intermediate dual port of the third distributor
5043: an alternate intermediate dual port of the third distributor
5050: a path through an intermediate access node from dual port 5042 to a fourth distributor connecting to destination access node
5051: a path through an intermediate access node from dual port 5043 to the fourth distributor
5060: dual port of the fourth distributor connecting to destination access node
5100: A first configuration of an optical distributor
5110: A set of upstream channels from access nodes of a first access group
5112: A set of upstream channels from access nodes of a second access group
5114: Optical splitter
5120: Optical-electrical converter
5122: A time-alignment unit for detecting origination-time indicator and inserting receipt time according to local time indication
5124: Control-data buffer (short buffer)
5130: Distributing mechanism
5131: Input port of distributing mechanism 5130
5132: Output port of distributing mechanism 5130
5135: Steering mechanism
5140: Distributor controller
5145: Time indicator
5150: Electrical-to-optical converter
5160: Temporal demultiplexer
5170: Optical combiner
5190: A set of downstream channels directed to the access nodes of the first access group
5192: A set of downstream channels directed to the access nodes of the second access group
5210: Input-port index
5220: Monitoring period comprising a plurality of content time slots and at least one control time slot
5230: A control data segment (control segment) communicated during a control time slot of the monitoring period
5240: A content data segment (content segment) communicated during a content time slot of the monitoring period
5400: A second configuration of a distributor
5420: Temporal multiplexer
5425: Optical-electrical converter
5440: Distributor controller
5500: A third configuration of a distributor
5530: Distributing mechanism
5531: Input port connecting to an input channel
5532: Output port connecting to an output channel
5533: Input port connecting to output of distributor controller 5540
5534: Output port connecting to input of distributor controller 5540
5540: Distributor controller
5550: Optical-electrical converter
5552: Electrical-optical converter
5600: Temporal-misalignment of upstream signals
5610: Designated organization of monitoring period 5220 for upstream signals originating from a specific access node connecting to input port of index 2 of distributing mechanism 5130 or 5530
5620: Organization of signal stream received from the specific access node
5630: Designated control time slot for the input port of index 2
5632: Misaligned control time slot
5640: Detected start time of a control time slot within a monitoring period
5660: Detected segment index during designated control time slot 5630
5700: A first configuration of an electronic distributor
5710: An optical-to-electrical converter
5711: A set of upstream channels from access nodes belonging to a first access band
5712: A set of upstream channels from access nodes belonging to a second access band
5714: 1:2 fanout unit
5720: Input buffer, preceding an input port 5731, for holding content data
5722: Unit for detecting upstream data segments from access nodes and inserting receipt times according to local time indication,
5725: Control-data buffer (short buffer)
5730: Electronic distributing mechanism
5731: Input port of distributing mechanism 5130
5732: Output port of distributing mechanism 5130
5735: Electronic steering mechanism
5740: Distributor controller
5745: Local time indicator at electronic distributor 5700
5760: Electronic temporal demultiplexer
5770: 2:1 electronic temporal multiplexer
5790: Electrical-to-optical converter
5791: A set of downstream channels directed to access nodes belonging to the first access band
5792: A set of downstream channels directed to access nodes belonging to the second access band
5800: Data received from access nodes during designated cyclic monitoring period and corresponding data transferred through electronic distributing mechanism 5730
5820: Designated start time of cyclic monitoring period 5220 (FIG. 52), which is also a requisite starting arrival time of a data during a cyclic monitoring period
5830: Designated start time of data transfer from input buffers 5720 to output ports 5732 through the electronic distributing mechanism 5730
5840: Cyclic time of data-segment reading from a respective input buffer 5720
5850: Cyclic time of data-segment writing in a respective input buffer 5720
5900: A second configuration of an electronic distributor
5920: Optical-to-electrical converter
5924: 1:2 fan-out unit
5926: Temporal multiplexer
5928: Input buffers
5931: Input ports
5932: Output ports
5935: Steering controller
5940: Distributor controller
5970: Temporal demultiplexer
5980: 2:1 temporal multiplexer
5985: Electrical-to-optical converter
6000: A third configuration of a distributor
6031: Input port
6032: Output port
6033: Input port connecting to output of distributor controller 6040
6034: Output port connecting to input of distributor controller 6040
6035: Steering controller
6040: Distributor controller 6100: Organization of access nodes into access groups
6120: An access node similar to access node 120
6122: Index of an access node within an access group
6130: Access groups
6132: Maximum number of access nodes within an access group 6130
6134: Indices of access groups within a network
6200: Organization of the access groups 6130 into access bands
6230: Index of an access group 6130 within an access band
6240: Access bands
6242: Index of an access band within a global network
6300: A first connectivity pattern of access groups to a plurality of distributors to form a contiguous network based on first-order fusing of Clos star networks
6320: A plurality of distributors 740 of a global network where each distributor connects to channels of two access groups of different access bands
6340: Dual multichannel links between an access group 6240 and respective selected distributors
6400: A second connectivity pattern of access groups to a plurality of distributors to form a contiguous network based on second-order fusing of Clos star networks
6420: A plurality of distributors of a global network where at least one distributor connects to channels of a single access group of one access band as well as channels of multiple access groups of other access bands
6440: Dual multichannel links between an access band 6240 and respective selected distributors
6500: Organization of a plurality of distributors of a network into first-order inter-band constellations 2140 as well as second-order inter-band constellations 6540 and 6545
6540: A type-I second-order constellation
6545: A type-II second-order constellation
6580: A distributor connecting to channels of multiple access groups of an access band P as well as channels of a single access group of an access band of index R, $0<P<<\Pi$
6590: A distributor connecting to channels of multiple access groups of an access band R as well as channels of a single access group of an access band of index P, $0 \leq P<R<\Pi$
6610: Dual channels between an access group of a first access band and a first-order distributor
6612: Dual channels between an access group of a second access band and a first-order distributor
6620: Dual channels between multiple access groups of the first access band and a type-I second-order distributor
6622: Dual channels between an access group of the second access band and the type-I second-order distributor
6630: Dual channels between an access group of the first access band and a type-II second-order distributor
6632: Dual channels between multiple access groups of the second access band and the type-II second-order distributor
6700: An example of organization of a plurality of distributors of a network into first-order inter-band constellations
6800: An example of organization of a plurality of distributors of a network, of an even number of access bands, into first-order and second-order inter-band constellations
6900: An example of organization of a plurality of distributors of a network, of an even number of access bands, into an upper bound of second-order inter-band constellations and a remainder of first-order constellations
7000: An example of organization of a plurality of distributors of a network, of an odd number of access bands, into second-order inter-band constellations 7100: Representations of a distributor within a constellation connecting two access bands
7101: Distributor representation indicating input ports and output ports connecting to access nodes of a first access band, and input ports and output ports connecting to access nodes of a second access band
7102: Distributor representation indicating dual ports connecting to access nodes of the first access band, and dual ports connecting to access nodes of the second access band
7110: Input ports receiving signals from access nodes of the first access band
7120: Output ports transmitting signals to access nodes of the first access band
7130: Dual ports, a dual port 7130 combines an input port 7110 and an output port 7120
7112: Input ports receiving signals from access nodes of the second access band
7122: Output ports transmitting signals to access nodes of the second access band
7140: Dual ports, a dual port 7140 combines an input port 7112 and an output port 7122
7150: Distributing mechanism
7161: Paths from input ports 7110 to output ports 7120 (intra-first-band paths)
7162: Paths from input ports 7112 to output ports 7122 (intra-second-band paths)
7163: Paths from input ports 7110 to output ports 7122 (inter-band paths)
7164: Paths from input ports 7112 to output ports 7120 (inter-band paths)
7200: Connectivity of distributors of an exemplary first-order constellation of three access groups per access band
7210: Dual channels between an access group of a first access band and a distributor
7220: Dual channels between an access group of a second access band and a distributor
7300: Connectivity pattern of distributors of an exemplary type-I second-order constellation of three access groups per access band
7310: Dual channels between multiple access groups of a first access band and a distributor
7400: Connectivity pattern of distributors of an exemplary partially populated type-I second-order constellation of three access groups per access band
7410: Dual channels between multiple partially populated access groups of a first access band and a distributor
7420: Dual channels between a partially populated access group of a second access band and a distributor
7500: Connectivity pattern of distributors of an exemplary type-II second-order constellation of three access groups per access band
7510: Dual channels between an access group of a first access band and a distributor
7520: Dual channels between multiple access groups of a second access band and a distributor
7600: Connectivity of distributors of a constellation coupled to a specified pair of access bands
7610: Set of dual access channels connecting different access groups of an access band to a distributor
7620: Dual channels from an access node
7700: Eliminating intra-band constellations using second-order inter-band constellations
7800: Connectivity of access nodes to distributors of an exemplary first-order constellation of five access groups per access band

7810: A set of dual ports of a column of distributors within a first-order constellation connecting to access nodes of a first access band

7820: A set of dual ports of a column of distributors within a first-order constellation connecting to access nodes of a second access band

7900: Connectivity pattern of access nodes to distributors of an exemplary type-I second-order constellation of five access groups per access band

7910: A set of dual ports of a column of distributors within a type-I second-order constellation connecting to access nodes of a first access band

7920: A set of dual ports of a column of distributors within a type-I second-order constellation connecting to access nodes of a second access band

8000: Connectivity pattern of access nodes to distributors of an exemplary type-II second-order constellation of five access groups per access band

8010: A set of dual ports of a column of distributors within a type-II second-order constellation connecting to access nodes of a first access band

8020: A set of dual ports of a column of distributors within a type-II second-order constellation connecting to access nodes of a second access band

8100: Intra-band paths from a specific access node to all other access nodes of the same access band, and inter-band paths to all access nodes of another access band

8200: Access nodes to which the specific access node connects through respective single-hop paths;

8210: Specific distributors within a constellation

8220: Set of access nodes belongs to access-band P

8225: Set of access nodes belongs to access-band R.

8300: Allocation pattern (generic connectivity table) of access nodes to distributors of an exemplary type-I second-order constellation of five access groups per access band and ten access nodes per access group

8310: A set of dual ports of a column of distributors within the constellation of FIG. 83 connecting to access nodes of a fusing band

8320: A set of dual ports of a column of distributors within the constellation of FIG. 83 connecting to access nodes of a joined band

8500: Connectivity of provisioned access nodes to distributors of a partially populated constellation derived from the allocation pattern of FIG. 83 and FIG. 84

8510: A set of activated dual ports of a column of distributors, connecting to access nodes of a fusing band, within the partially populated constellation of FIG. 85 and FIG. 86

8520: A set of activated dual ports of a column of distributors, connecting to access nodes of a joined band, within the partially populated constellation of FIG. 85 and FIG. 86

8700: A method of realizing gradual connectivity extension of a constellation

8710: A process of definition of a target (fully-configured) constellation configuration

8720: A process of generating a generic connectivity table as an allocation pattern to distributors of a target (fully-configured) constellation

8725: Data defining initial constellation connectivity

8730: A process of accessing a memory device storing data defining current (partial) constellation connectivity to access nodes

8740: A process of acquiring requisite new access-group sizes (number of access nodes for each access group of the two access bands coupled to the constellation)

8750: A process of determining connections from new access nodes to distributors based on the generic connectivity table (process 8720), the current constellation connectivity (process 8730) and requisite new access-group sizes (process 8740)

8760: Updating the data defining current constellation connectivity according to result of process 8750 and storing updated current connectivity data in said memory device

8800: Overview of a contiguous network based on first-order fusing of a large number, p, of Clos star networks;

8810: A dual single-hop path for any pair of access nodes belonging to different access groups;

8820: A set of parallel ($\mu-1$) dual single-hop paths for any pair of access nodes within any access group;

8830: A pool of disjoint distributors which are generally geographically distributed;

8900: Inter-band and inter-band connectivity within a contiguous network based on second-order fusing of a large number of Clos star networks

8910: A dual single-hop path for any pair of access nodes belonging to different access bands;

8920: Multiple dual single-hop paths for any pair of access nodes within an access band;

9000: Intra-band connectivity within a contiguous network based on second-order fusing of a large number of Clos star networks

9010: Multiple dual single-hop paths for any pair of access nodes belonging to different access groups within an access band

9020: Multiple dual single-hop paths for any pair of access nodes belonging to any access group within an access band

DETAILED DESCRIPTION

FIG. 1 illustrate conventional basic network structures. A Basic star network 100 comprises a plurality of access nodes 102 linked to a single connector 140 which may be configured as a switch, a router, or a rotator. Each access node 102 communicates with a respective set of data sources and sinks through respective dual channels 104, and communicates with connector 140 through a dual link 106 comprising at least one dual channel.

The maximum number of access nodes 102 equals the dimension (i.e., number of dual ports) of the connector 140. To increase the capacity of the network, a plurality 145 of connectors 140 of equal dimensions is employed to form a basic Clos star network 160 with each access node, referenced as 120, connecting to each connector 140 through a dual channel. The dimension of a connector 140 still determines the maximum number of access nodes of a basic Clos star network. However, the dimension of an access node 120 is increased. Each access node 120 connects to respective data sources and sinks through dual access channels 121 coupled to an access-node 120 and connects to each connector 140 through dual channels 122.

Figure 2:
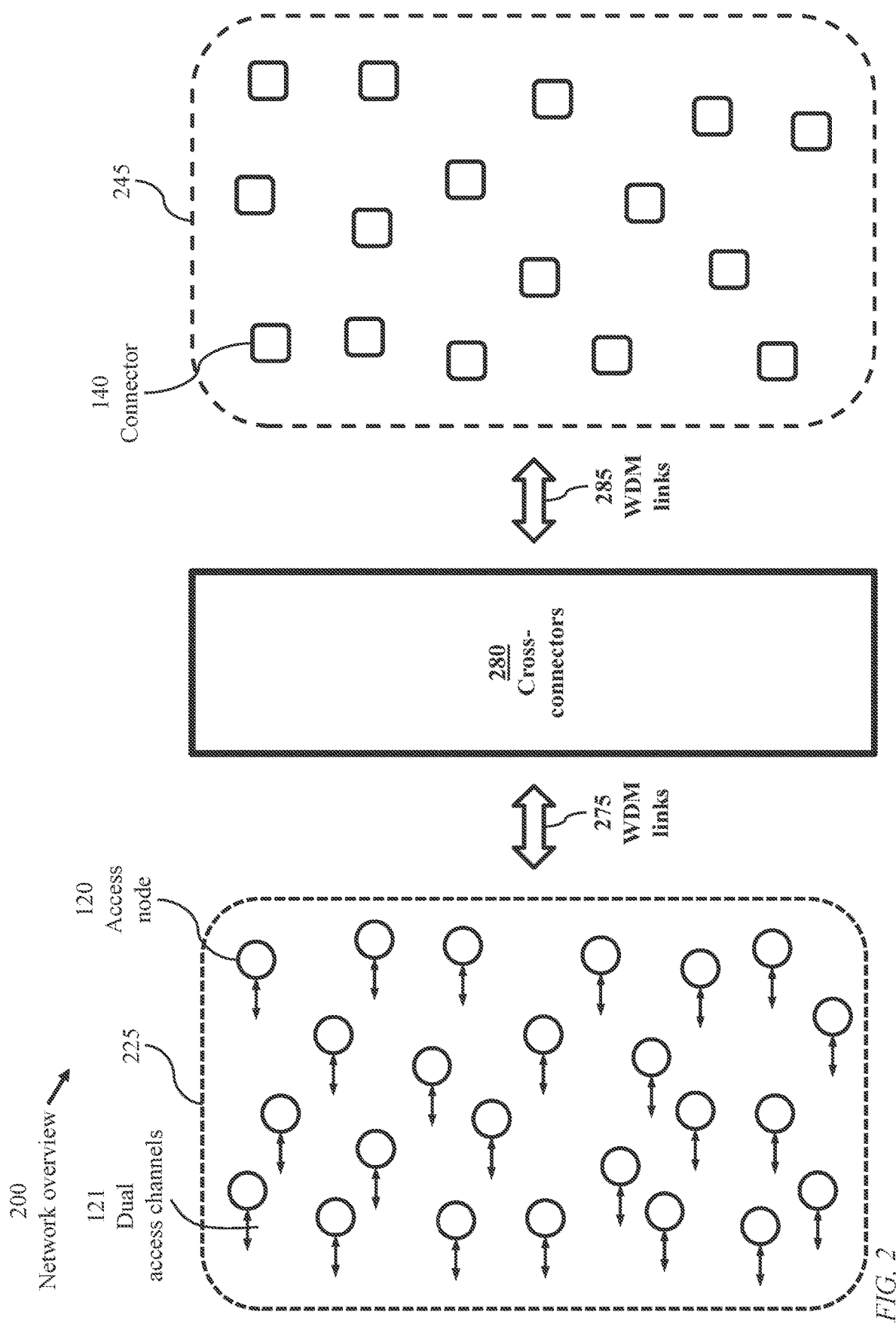
FIG. 2 illustrates a network of a plurality of access nodes exchanging signals through a plurality of connectors and a plurality of cross-connectors.

FIG. 2 illustrates a network 200 comprising a plurality 225 of access nodes 120 exchanging signals through a plurality 245 of connectors 140. Channels from each of the access nodes are routed to respective connectors 140 through respective cross-connectors of a plurality 280 of dual cross connectors. A connector 140 may be configured as a switch, a rotator, or a core router. A cross-connector switches entire spectral channels (spectral bands). The cross connectors are preferably optical spectral routers. Each access node 120 connects to at least one cross-connector through dual wavelength-division-multiplexed (WDM) links. Each connector 140 connects to at least one cross-connector through dual WDM links. The dual WDM links between the plurality 225 of access nodes and the plurality 280 of dual cross-connectors are collectively referenced as 275. The dual WDM links connecting the plurality 280 of dual cross-connectors to the plurality 245 of connectors are collectively referenced as 285.

An access node 120 may connect to respective data sources and data sinks through at least one dual access channel 121. However, an access node may not support external data sources or sink and may be used only for enabling internal paths through network 100. Optionally, an access node may support a global network controller (not illustrated).

Figure 3:
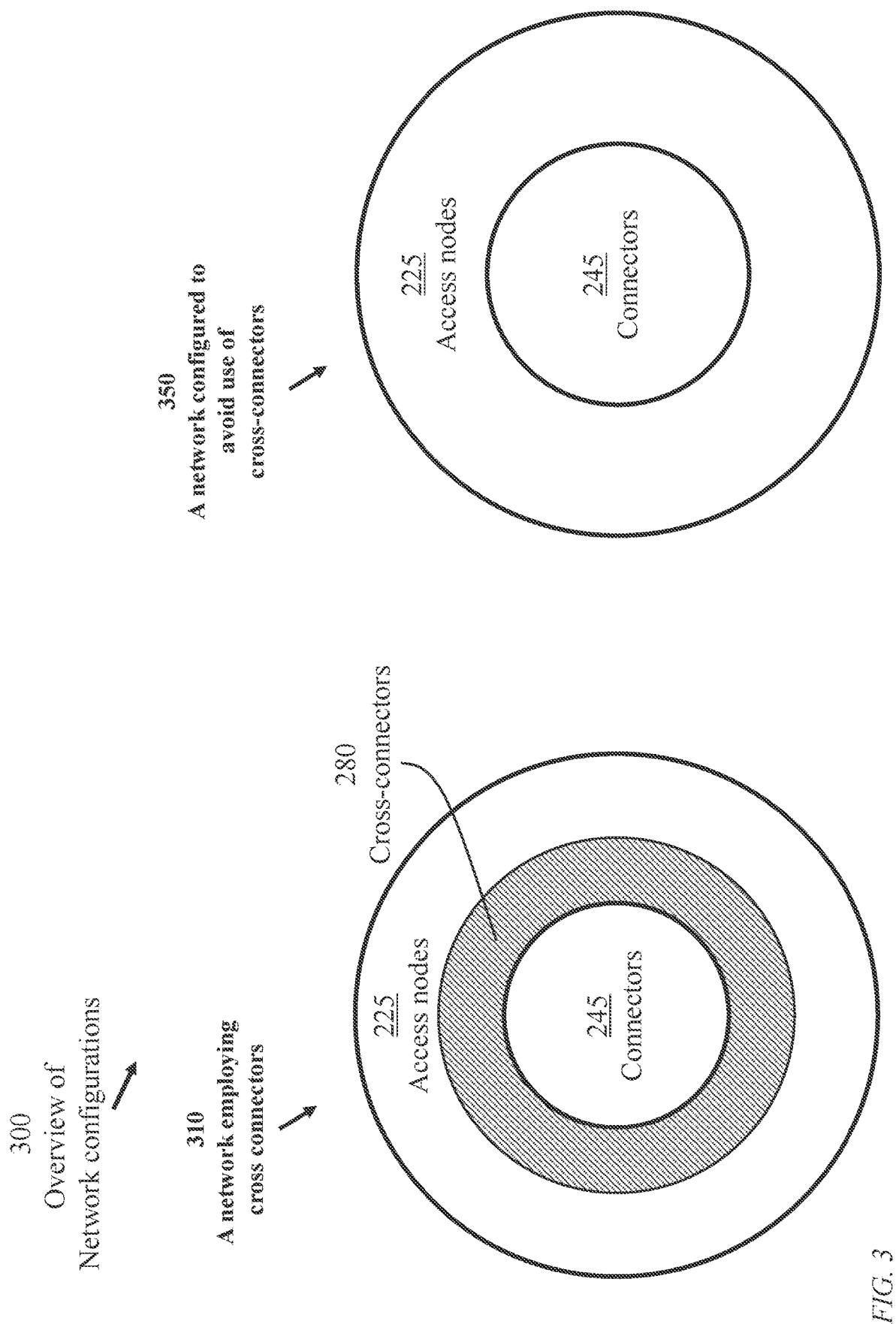
FIG. 3 is a schematic of a first network configuration where signals from a plurality of access nodes are transferred to a plurality of connectors through a layer of cross-connectors, and a second network configuration where signals are transferred from the plurality of access nodes to the plurality of connectors without use of intermediate cross-connectors.

FIG. 3 is a schematic 300 of alternate network configurations. A first network configuration 310 employs the plurality 280 of cross-connectors of FIG. 1. Signals between the plurality 225 of access nodes and the plurality 245 of connectors are transferred through the dual cross-connectors. A second network configuration 350 avoids use of any intermediate channel-switching stage (cross-connector stage) so that signals between the plurality of access nodes and the plurality of connectors are transferred without undergoing intermediate switching. FIGS. 18 to 29 illustrate a network organization, according to the present invention, which eliminates the need for cross-connectors.

Figure 4:
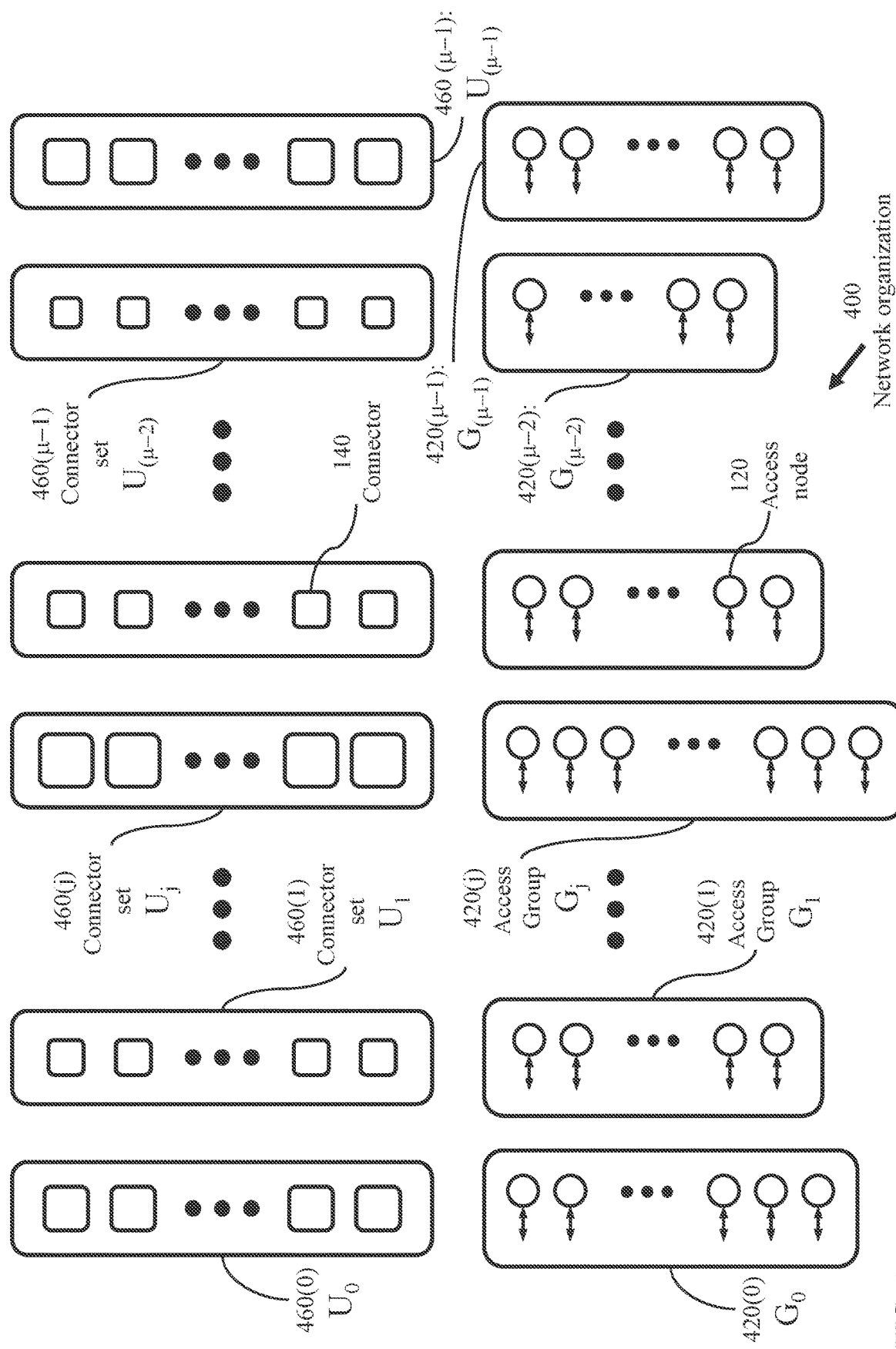
FIG. 4 illustrates a discipline of organizing the plurality of access nodes into access groups and organizing the plurality of connectors into connector sets, in accordance with an embodiment of the present invention.

FIG. 4 illustrates an arrangement 400 of the plurality 225 of access nodes into a number, $\mu$, of access groups 420 and the plurality 245 of connectors into $\mu$ connector sets 460, $\mu>1$. The access groups 420 are individually labeled as $G_0$, $G_1, \ldots, G_{N-1}$. A connector set 460 comprises $(\mu-1)$ connectors 140. The p connector sets 460 are individually labeled as $U_0, U_1, \ldots, U_{N-1}$. Each access group 420 connects to a respective connector set 460, with an access group labeled $G_j$ corresponding to a connector set $U_j$, $0 \leq j < \mu$. The dimension (number of ports) of a connector 140 of a connector set at least equals the number of access nodes of a corresponding access group. The access nodes of the plurality 225 of access nodes are generally geographically distributed. Arranging the access nodes 120 into access groups is done solely for facilitating routing and control. The access nodes of any access group are generally geographically distributed.

Figure 5:
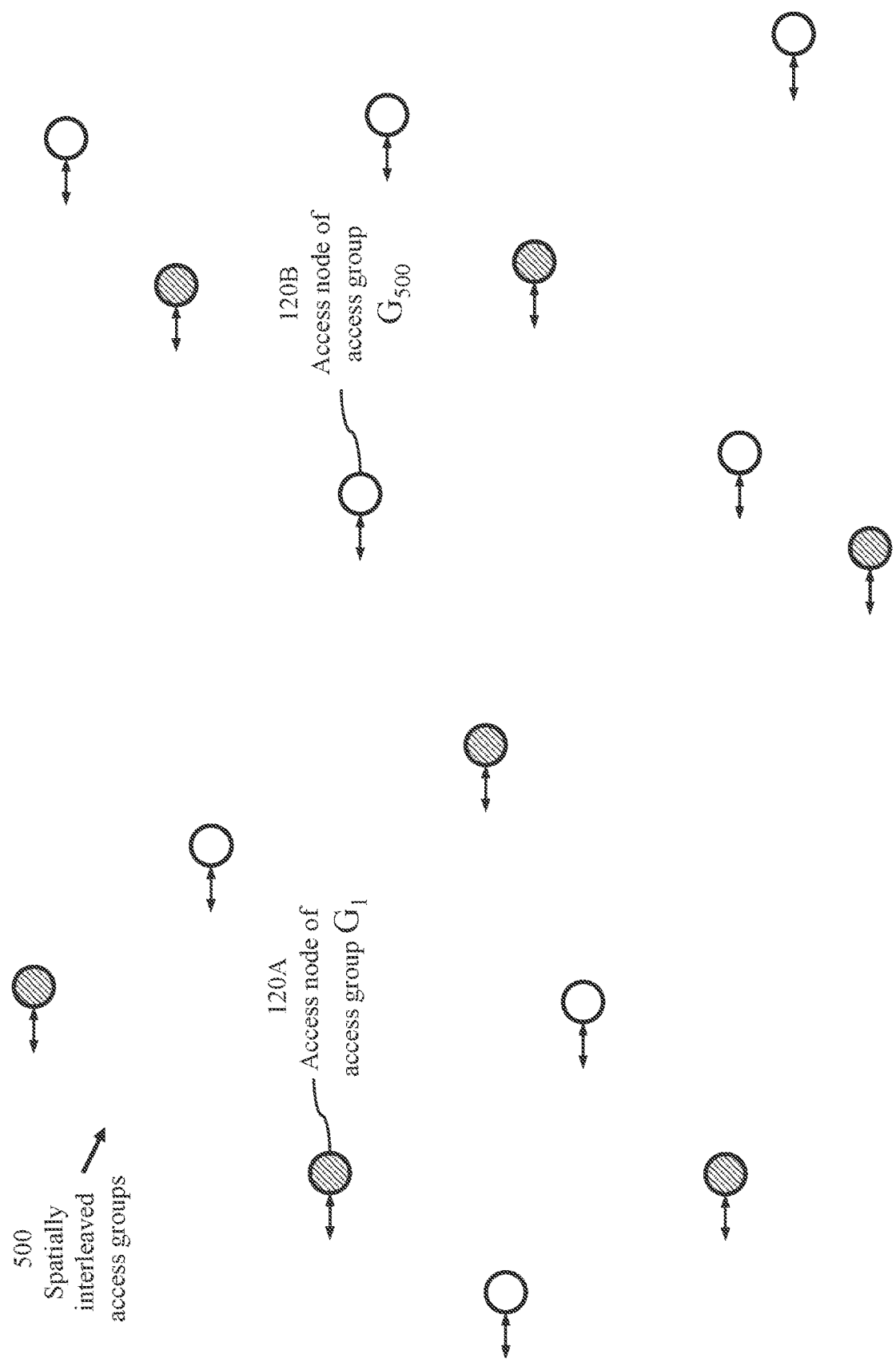
FIG. 5 illustrates an example of spatially interleaved access groups.

FIG. 5 illustrates an example 500 of spatially interleaved access groups 420. Nodes 120A of an access group 420, labelled $G_1$, and nodes 120B of an access group 420, labelled $G_{500}$, may be spread over a wide area.

Figure 6:
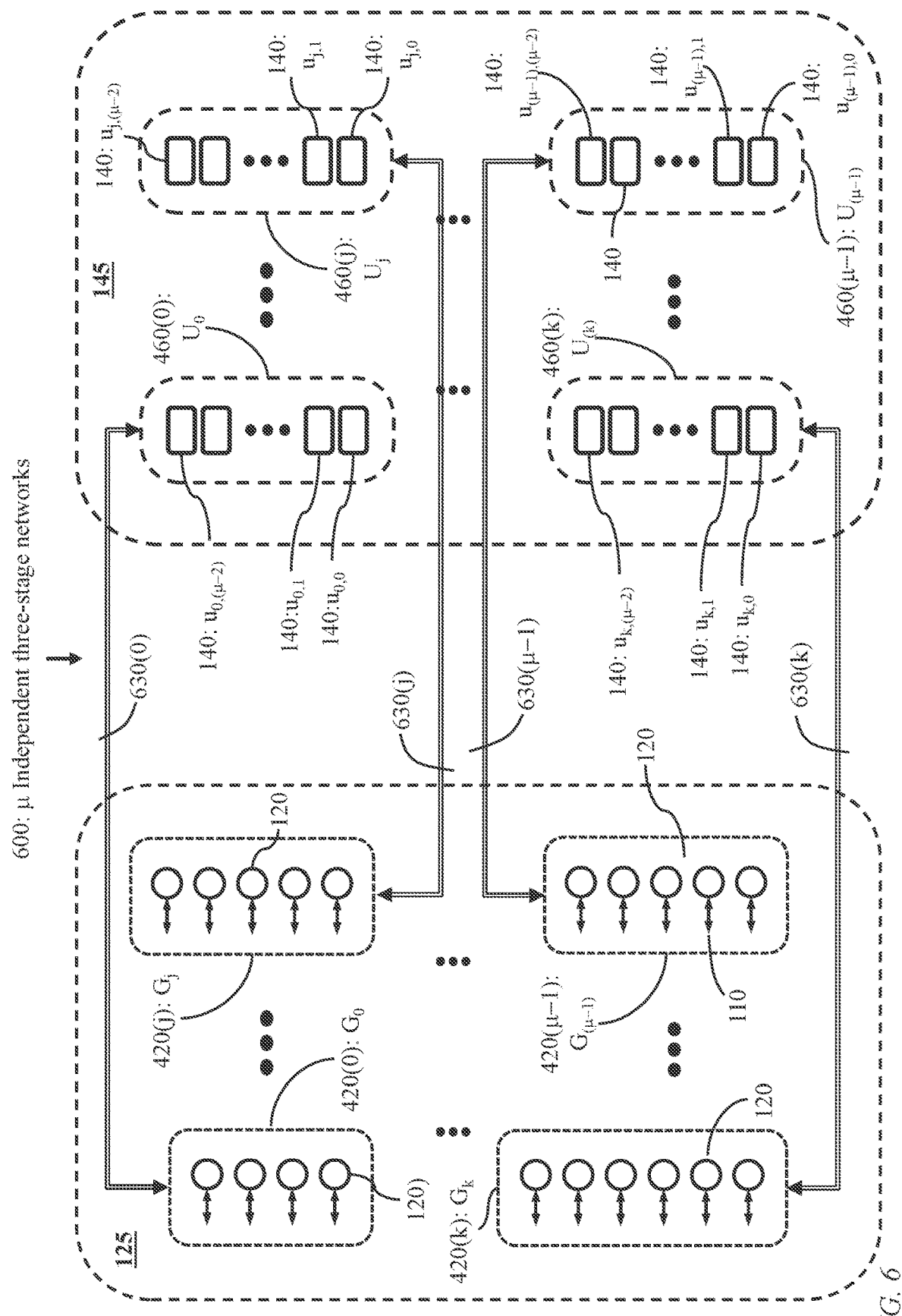
FIG. 6 illustrates connectivity of each access group to a corresponding connector set to form a plurality of independent three-stage networks, each three-stage network comprising an access group and a respective connector set.

FIG. 6 illustrates connectivity of each access group to a corresponding connector set to form a plurality 600 of $\mu$ independent three-stage networks, $\mu>1$, each three-stage network comprising an access group 420 and a respective connector set 460. The plurality 225 of access nodes 120 is organized into p access groups 420 and the plurality 245 of connectors 140 is organized into p connector sets 460 as illustrated in FIG. 4. Dual multi-channel links 630 connect the access groups 420 to corresponding connector sets 460 to form the plurality 600 of independent three-stage networks which comprises p three-stage networks. The number p of three-stage network may vary significantly depending on the intended coverage and capacity of the network. For a global network, the number of constituent three-stage networks may be several thousands.

Figure 7:
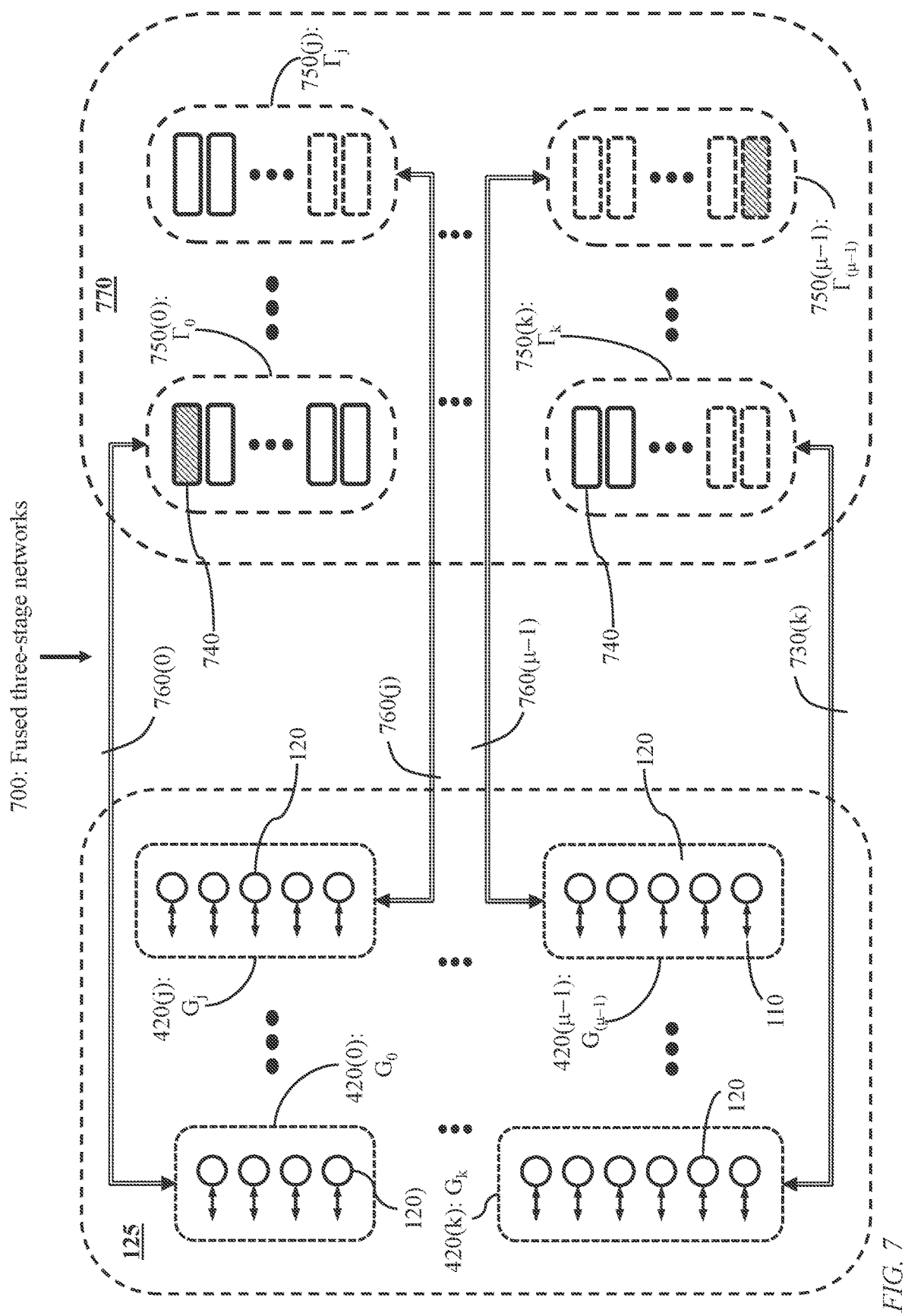
FIG. 7 illustrates a scheme of mutually fusing the three-stage networks of FIG. 6 to form a contiguous network of the plurality of access nodes interconnected through a plurality of distributors, in accordance with an embodiment of the present invention.

FIG. 7 illustrates a scheme 700 of mutually fusing the three-stage networks of FIG. 6 to form a contiguous network. Each of selected pairs of connectors 140 of different connector sets share a common distributing mechanism to form a distributor 740. A distributor 740 combines two connectors of different connector sets. Each connector 140 of any connector set 460 fuses with a connector of another connector set 460 so that each pair of connector sets 460 forms a distributor. Thus, creating a plurality 770 of distributor sets 750 which comprises p distributor sets 750. The distributor sets 750 are individually labeled as $\Gamma_0, \Gamma_1, \ldots, \Gamma_{\mu-1}$. Each distributor set 750 interconnects access nodes 120 of a respective access group, forming a respective three-stage network, and connects the access nodes of the respective access group to access nodes of each other access group. Dual multi-channel links 760 connect the access groups 420 to corresponding distributor sets 750 to form the plurality 700 of mutually-fused three-stage networks. The total number of connectors 140 of network 600 of FIG. 6 is $\mu \times (\mu-1)$. The total number of distributors 740 of the network 700 of FIG. 7 is $(\mu \times (\mu-1))/2$. A connector 140 may have a number of dual ports not exceeding a predetermined upper-bound m. A distributor 740 combining two connectors 140 has a number of dual ports equal to the total number of dual ports of the two constituent connectors.

Figure 8:
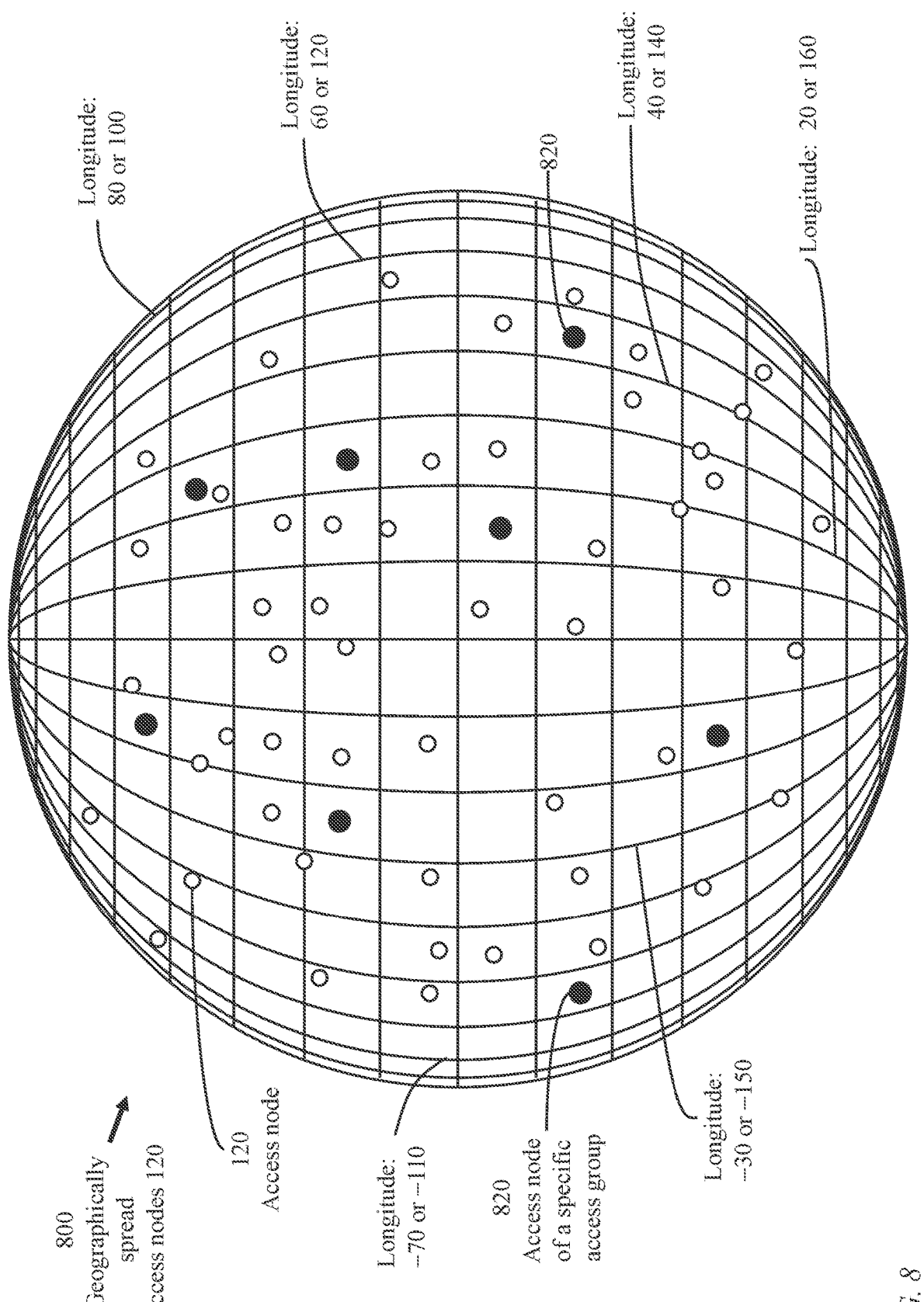
FIG. 8 illustrates a plurality of globally distributed access nodes.

FIG. 8 illustrates a plurality 800 of globally distributed access nodes 120. The access nodes of any access group 420 may be geographically spread. As illustrated, access nodes referenced as 820 which are spread over the planet, belong to one access group 420.

Figure 9:
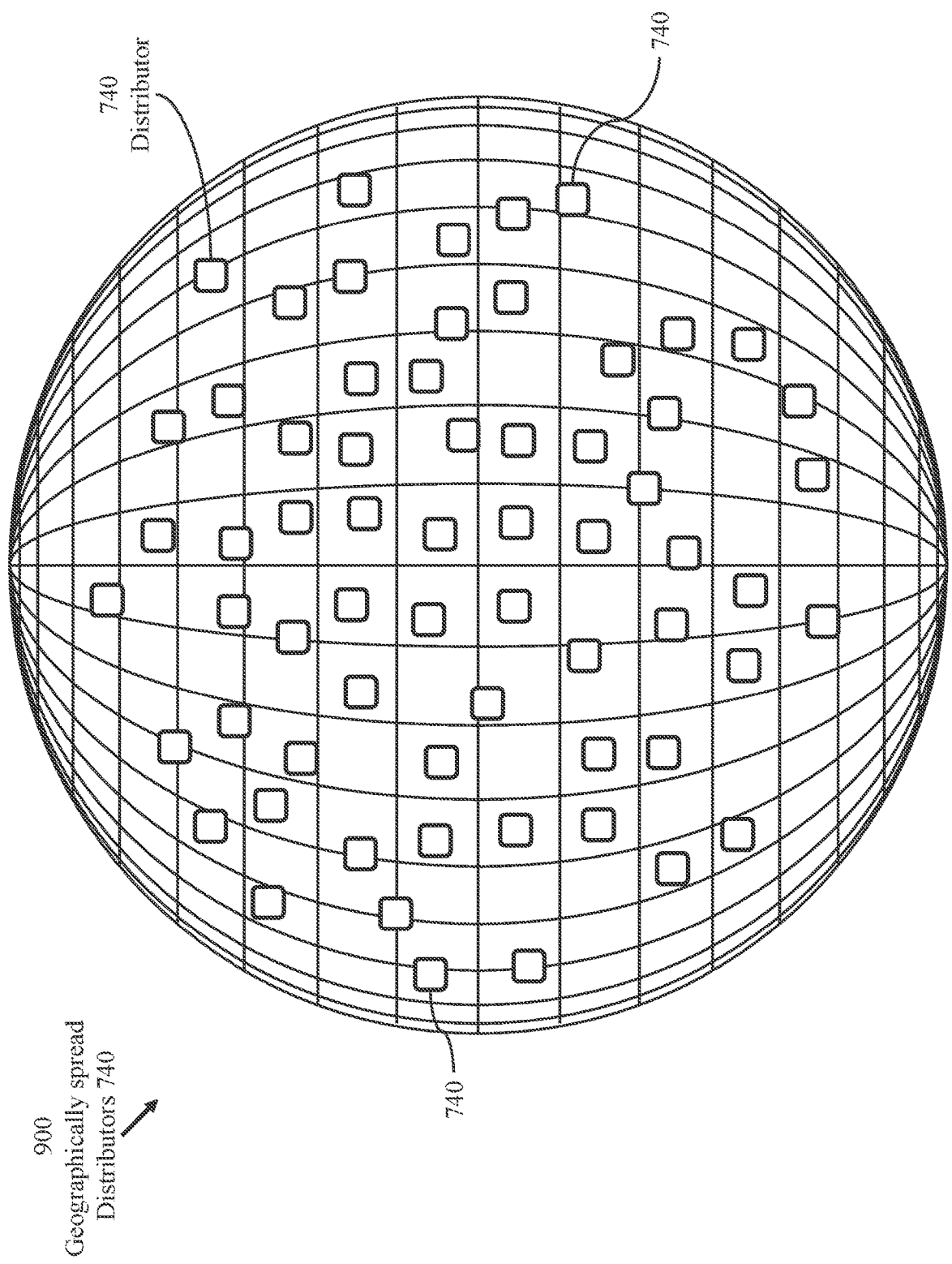
FIG. 9 illustrates a plurality of globally spread distributors.

FIG. 9 illustrates a plurality 900 of globally spread distributors 740. Each access node connects to $(\mu-1)$ distributors, p being a total number of access groups 420, which is the total number of mutually-fused three-stage networks illustrated in FIG. 7. With a large number of channels connecting the plurality 225 of access nodes 120 to the plurality of distributors 740, WDM links, each carrying multiple channels, are used to connect the plurality 225 of access nodes 120 to the plurality of distributors 740 either through cross-connectors or directly, as illustrated in FIG. 2. Direct connection of the access nodes 120 to the distributors 740 through WDM links requires appropriate grouping of distributors 740 into constellations of collocated distributors as will be described below with reference to FIGS. 18 to 29.

Figure 10:
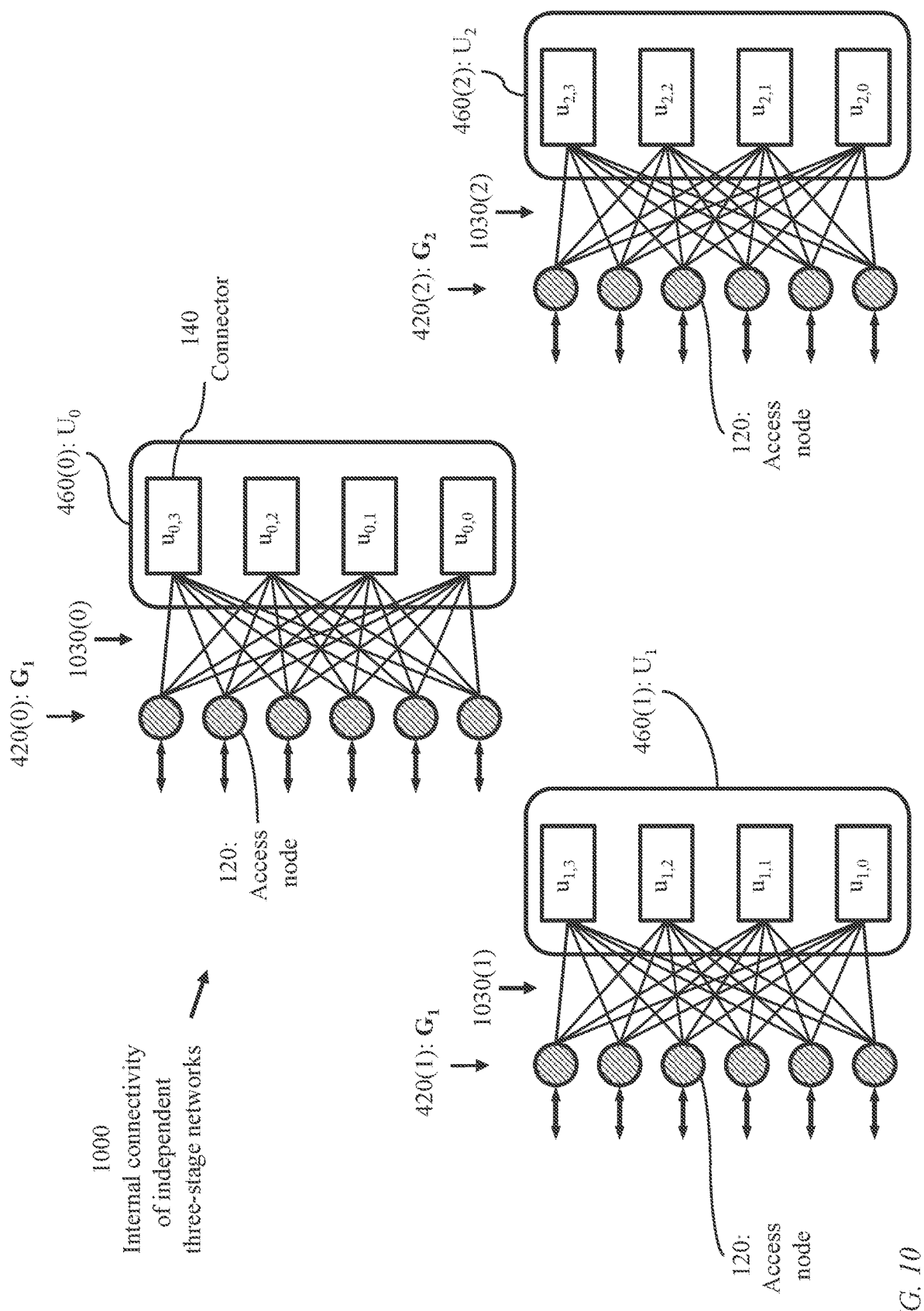
FIG. 10 illustrates internal connectivity of three-stage networks of the plurality of independent three-stage networks of FIG. 6.

FIG. 10 illustrates internal connectivity 1000 of three-stage networks of the plurality of independent three-stage networks of FIG. 6. Each access node 120 of an independent three-stage network connects to $(\mu-1)$ dual channels 1030, each leading to a respective connector 140 of a respective connector set 460.

Figure 11:
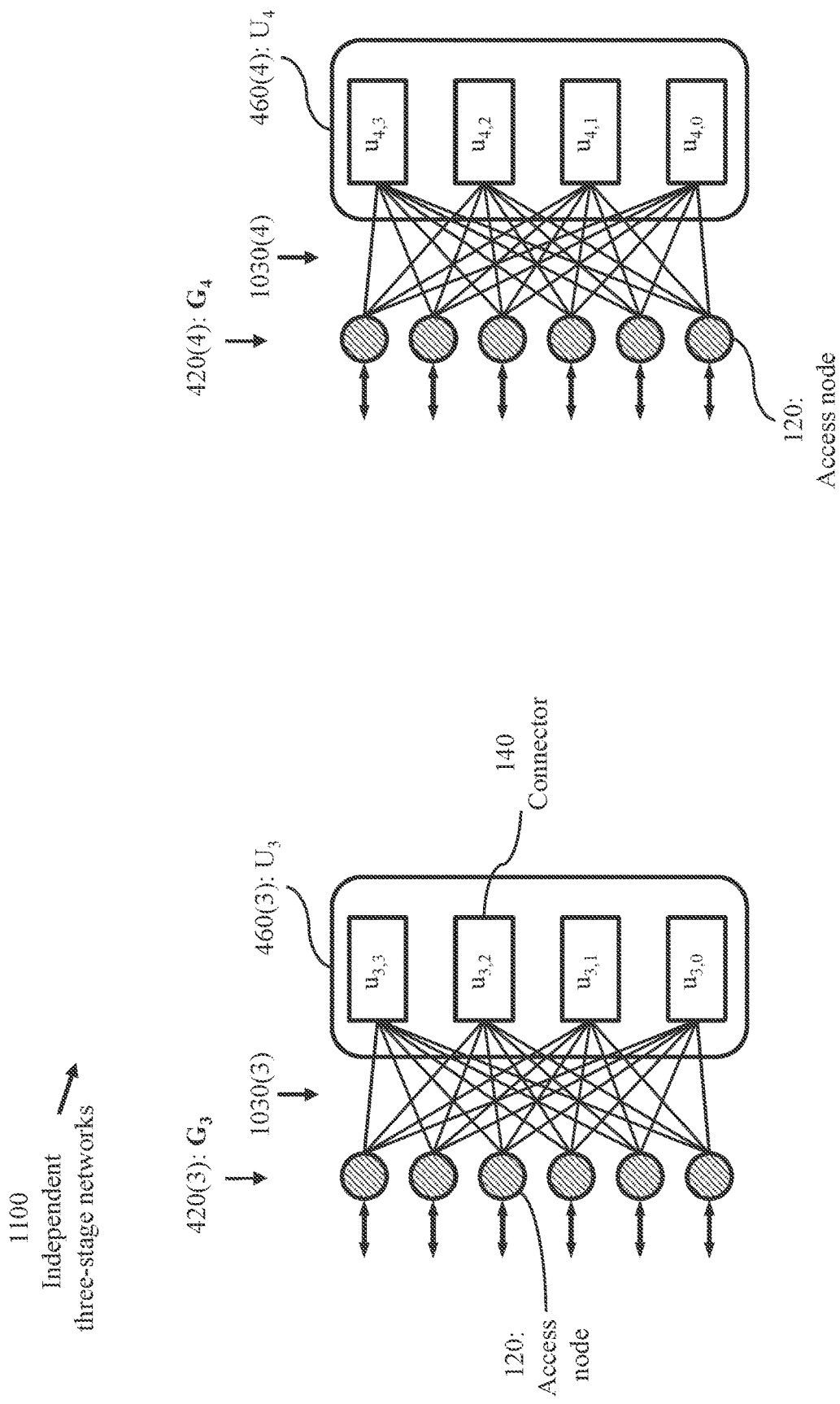
FIG. 11 illustrates internal connectivity of remaining three-stage networks of the plurality of independent three-stage networks.

FIG. 11 illustrates internal connectivity 1100 of remaining three-stage networks of the plurality of independent three-stage networks with $\mu=5$.

Figure 12:
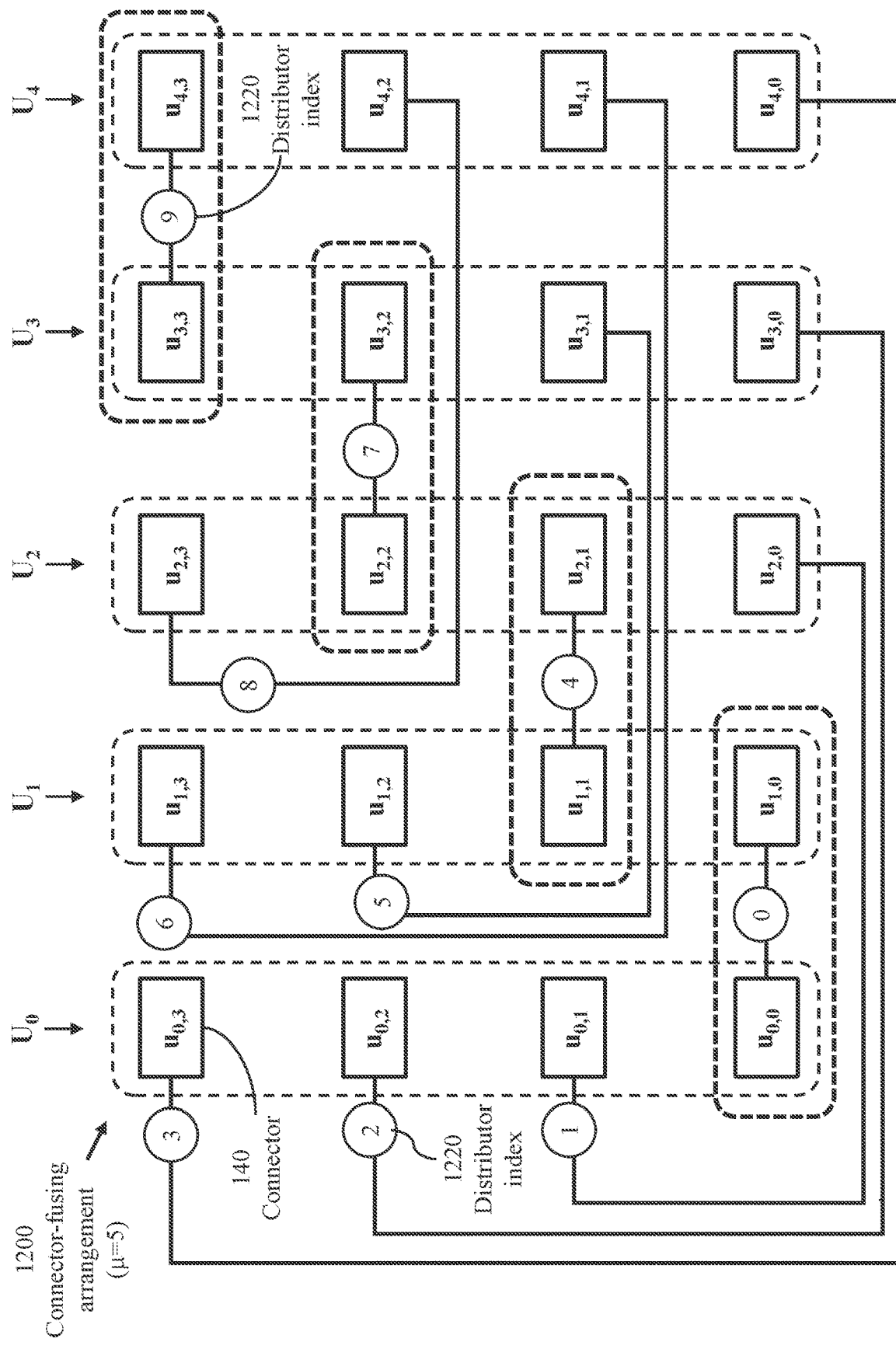
FIG. 12 illustrates a scheme of fusing independent three-stage networks to form a contiguous network, in accordance with an embodiment of the present invention.

FIG. 12 illustrates a scheme 1200 of fusing independent three-stage networks to form a contiguous network. Each of the $\mu$ connector sets 460 comprises $(\mu-1)$ connectors 140. The connector sets are indexed as 0 to $(\mu-1)$. The connectors 140 of a connector set 460 of index j are labelled $u_{j,k}$, $0 \leq j < \mu$, $0 \leq k < (\mu-1)$. FIG. 12 illustrates five access groups ($\mu=5$). To create a contiguous network, each connector 140 of each connector set 460 fuses with only one connector of each other connector set. Several fusing patterns may be formed to produce distributors each fusing two three-stage networks. The number of distributors thus produced is $(\mu \times (\mu-1))/2$. With $\mu=5$, the number of distributors is 10, indexed in FIG. 12 as 0, 1, ..., 9 (reference 1220). According to the fusing pattern of FIG. 12, a connector $u_{j,k}$ fuses with a connector $u_{(k+1),j}$, $0 \leq j < (\mu-1)$, $j \leq k < (\mu-1)$ to form a distributor D(j, k+1). Connector pair $\{u_{0,0}, u_{1,0}\}$ forms a first distributor of index 0, connector pair {$u_{1,2}$, $u_{3,1}$} forms a distributor of index 5, and connector pair {$u_{3,3}$, $u_{4,3}$} forms a distributor of index 9.

FIG. 13 illustrates a pattern 1300 of connector pairing where each connector-pair forms a distributor for a network of five access groups ($\mu=5$). Each of pair of $\mu \times (\mu-1)$ connectors fuse to form a respective distributor. Each of the independent three-stage networks of FIG. 6 comprises a connector set 460 interconnecting access nodes 120 of a respective access group 420. Each connector 140 of a connector set 460(j) has a dual channel to each access node of access group 420(j), $0 \le j < \mu$. Thus, a distributor replacing a connector of a first independent three-stage network and a connector of a second independent three stage network interconnects the access group of the first three-stage network and the access-group of the second three-stage network.

According to the fusing scheme of FIG. 12, a connector $u_{j,k}$, which belongs to connector set 460(j), fuses with a connector $u_{(k+1),j}$, which belongs to connector set 460(k+1), $0 \le j < \mu$, $0 \le k < (\mu-1)$, to form a distributor D(j, k+1) which interconnects access group 420(j) and access group 420(k+1). Any distributor which replaces connectors 140 of any pair of three stage networks interconnects all access nodes of the two three-stage networks.

Figure 14:
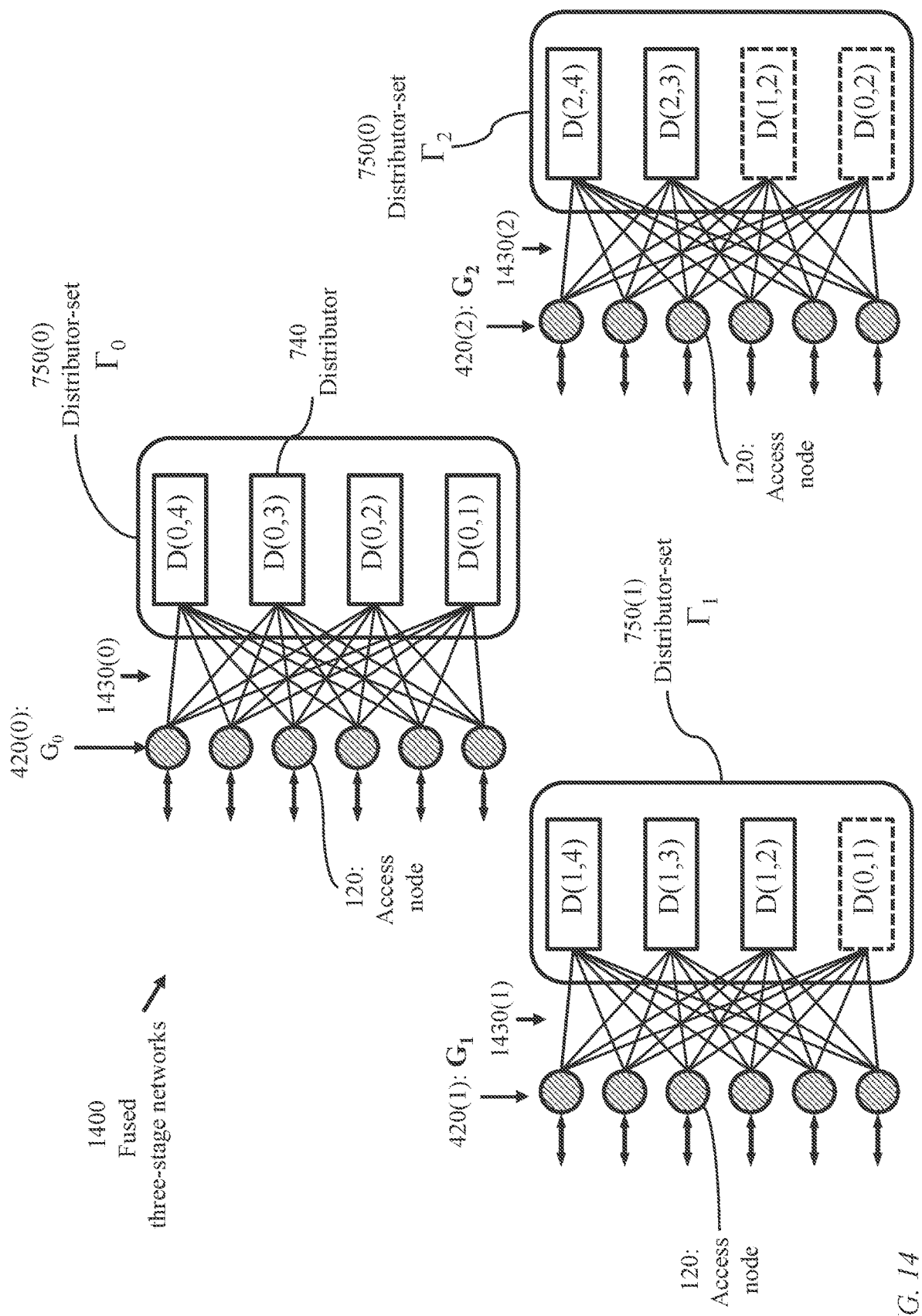
FIG. 14 illustrates internal connectivity of three of five mutually fused three-stage networks produced according to the fusing scheme of FIG. 12.

FIG. 14 illustrates internal connectivity 1400 of three of five mutually fused three-stage networks produced according to the fusing scheme of FIG. 12. Each access node of a fused three-stage network connects to ($\mu-1$) dual channels 1430, each leading to a respective distributor 740 of a respective distributor set 750.

Figure 15:
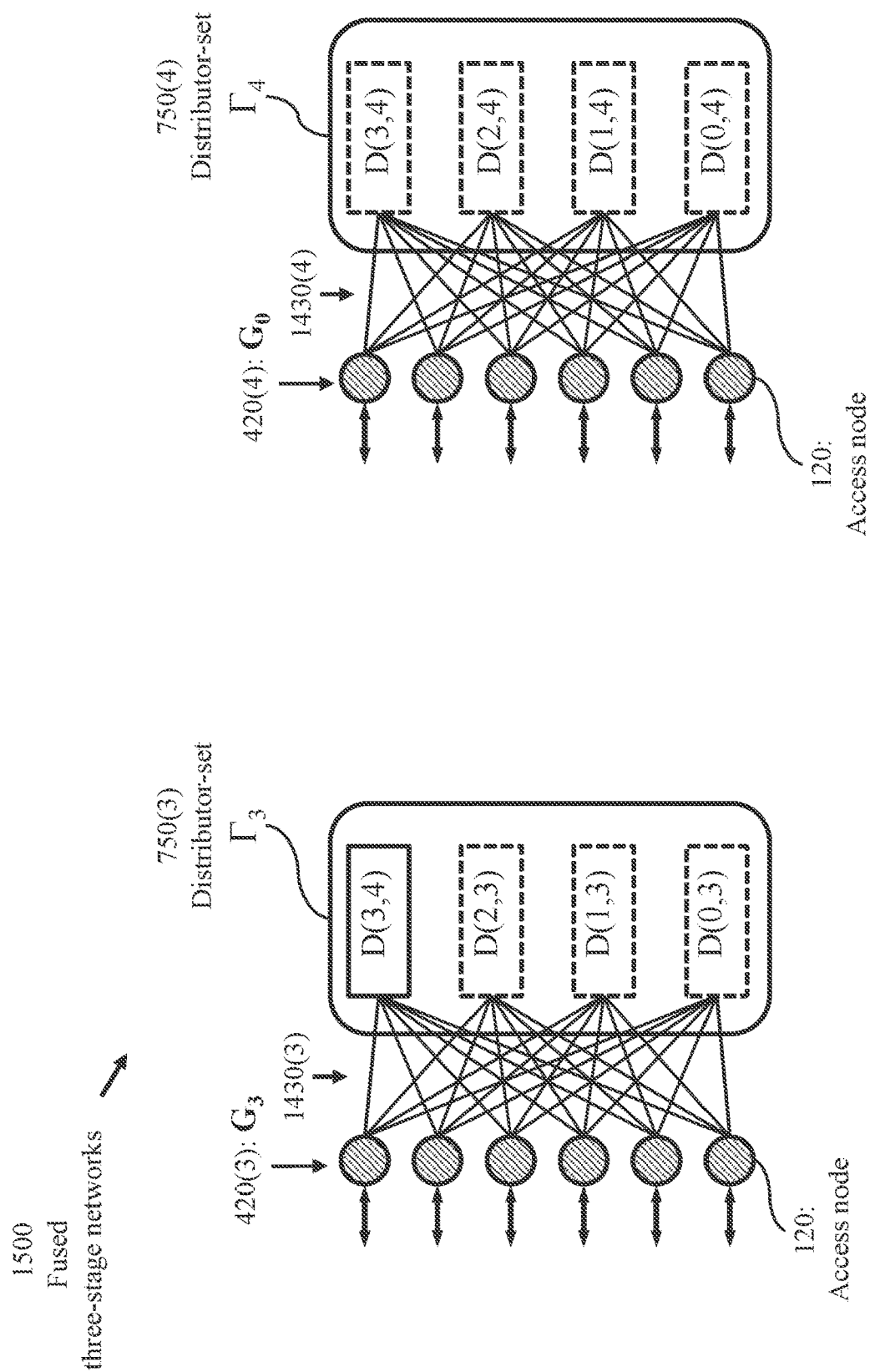
FIG. 15 illustrates internal connectivity of remaining fused networks produced according to the fusing scheme of FIG. 12.

FIG. 15 illustrates internal connectivity 1500 of remaining fused networks produced according to the fusing scheme of FIG. 12.

Figure 16:
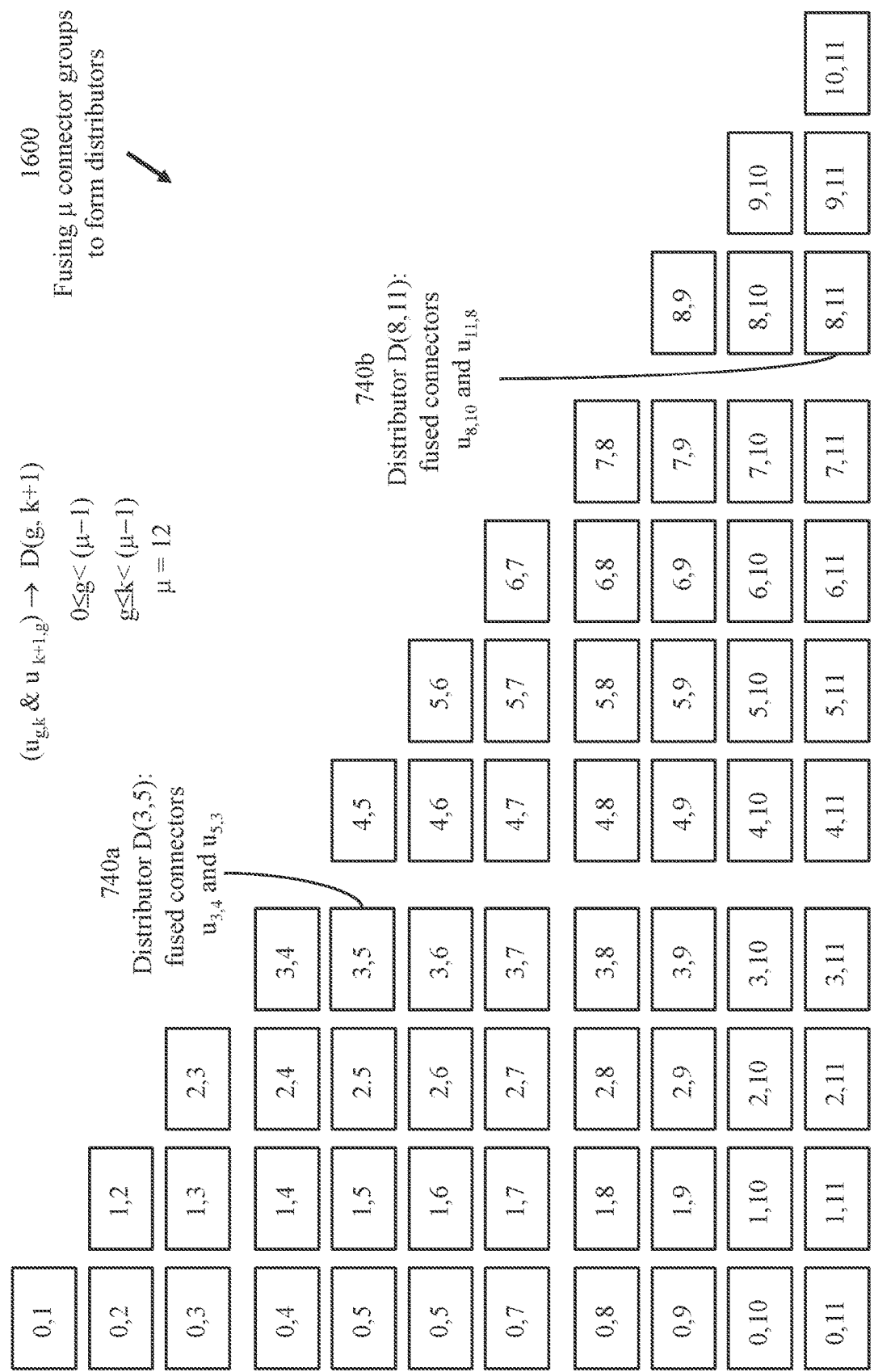
FIG. 16 illustrates a set of distributors formed according to the fusing scheme of FIG. 12 for a network of twelve access groups.

FIG. 16 illustrates a set 1600 of distributors 740 formed according to the fusing scheme of FIG. 12 for a network of twelve access groups. A connector 140 of connector set 460(3) and a connector 140 of connector set 460(5) fuse to form distributor 740a which interconnects all access nodes 120 of access groups 420(3) and 420(5). Likewise, a connector 140 of connector set 460(8) and a connector 140 of connector set 460(11) fuse to form distributor 740b which interconnects all access nodes 120 of access groups 420(8) and 420(11).

The set 1600 of distributors represents twelve mutually fused three-stage networks. Table-I below explicitly identifies the individual fused three-stage networks, which are indexed as 0 to 11. Each column of the table lists 12 distributors 740 identifying indices of access groups 420 connecting to each distributor. The access groups are indexed as 0 to 11. Each pair of three-stage networks has one common distributor. For example, the three-stage networks of indices 5 and 11 (columns 5 and 7 of the table) have a common distributor D(5,11)

TABLE-I

Figure 36:
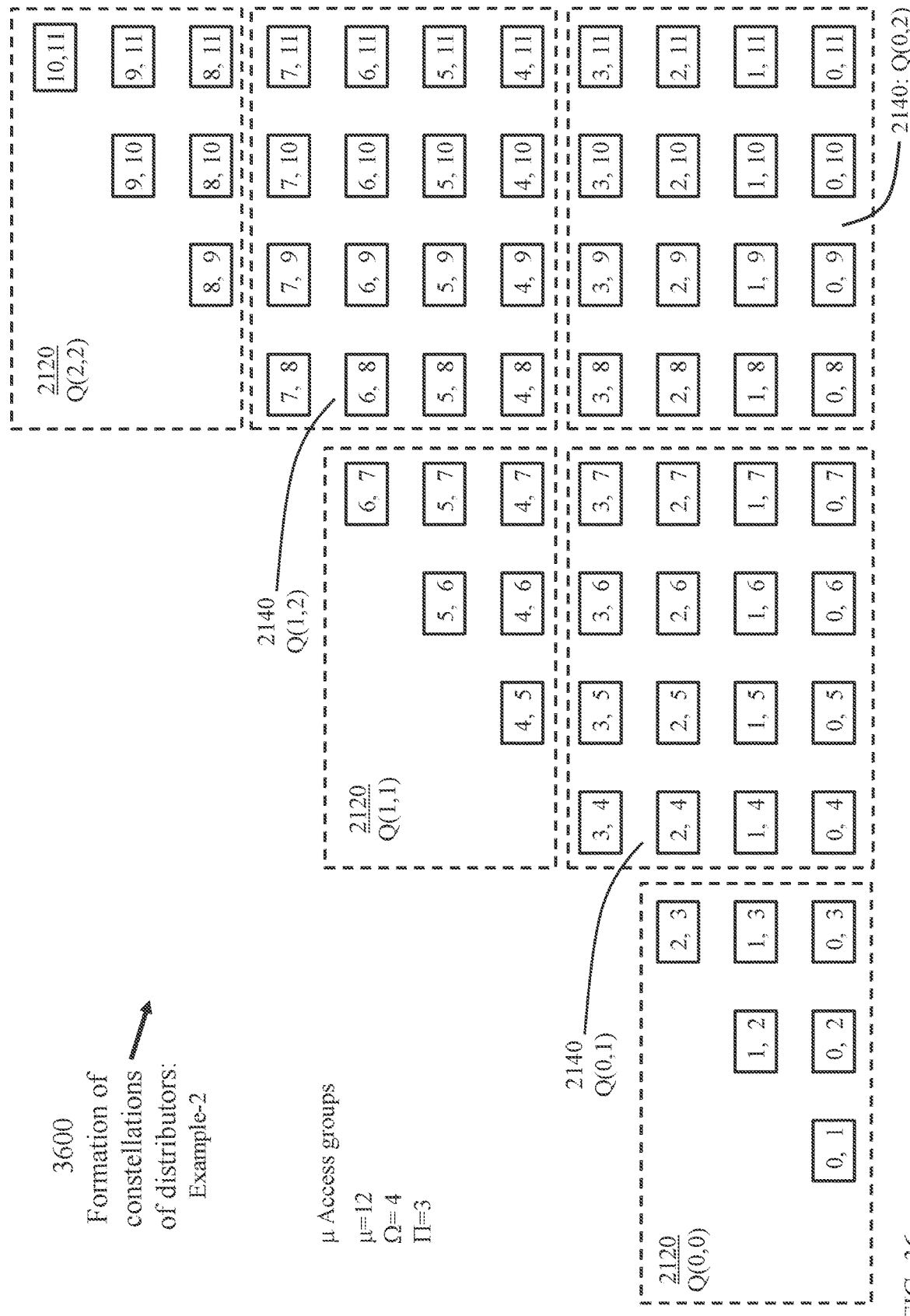
FIG. 36 illustrates a second example of constellations of distributors for a network comprising 12 access groups arranged into three access bands.

Identifiers of distributors of each constituent three-stage network of the global network of FIG. 36
Index of constituent three-stage network

| 0 | 1 | 2 | 3 | 4 | 5 | 6 | 7 | 8 | 9 | 10 | 11 |
|---|---|---|---|---|---|---|---|---|---|----|----|
| 0, 1 | 0, 1 | 0, 2 | 0, 3 | 0, 4 | 0, 5 | 0, 6 | 0, 7 | 0, 8 | 0, 9 | 0, 10 | 0, 11 |
| 0, 2 | 1, 2 | 1, 2 | 1, 3 | 1, 4 | 1, 5 | 1, 6 | 1, 7 | 1, 8 | 1, 9 | 1, 10 | 1, 11 |
| 0, 3 | 1, 3 | 2, 3 | 2, 3 | 2, 4 | 2, 5 | 2, 6 | 2, 7 | 2, 8 | 2, 9 | 2, 10 | 2, 11 |
| 0, 4 | 1, 4 | 2, 4 | 3, 4 | 3, 4 | 3, 5 | 3, 6 | 3, 7 | 3, 8 | 3, 9 | 3, 10 | 3, 11 |
| 0, 5 | 1, 5 | 2, 5 | 3, 5 | 4, 5 | 4, 5 | 4, 6 | 4, 7 | 4, 8 | 4, 9 | 4, 10 | 4, 11 |
| 0, 6 | 1, 6 | 2, 6 | 3, 6 | 4, 6 | 5, 6 | 5, 6 | 5, 7 | 5, 8 | 5, 9 | 5, 10 | 5, 11 |
| 0, 7 | 1, 7 | 2, 7 | 3, 7 | 4, 7 | 5, 7 | 6, 7 | 6, 7 | 6, 8 | 6, 9 | 6, 10 | 6, 11 |
| 0, 8 | 1, 8 | 2, 8 | 3, 8 | 4, 8 | 5, 8 | 6, 8 | 7, 8 | 7, 8 | 7, 9 | 7, 10 | 7, 11 |
| 0, 9 | 1, 9 | 2, 9 | 3, 9 | 4, 9 | 5, 9 | 6, 9 | 7, 9 | 8, 9 | 8, 9 | 8, 10 | 8, 11 |
| 0, 10 | 1, 10 | 2, 10 | 3, 10 | 4, 10 | 5, 10 | 6, 10 | 7, 10 | 8, 10 | 9, 10 | 9, 10 | 9, 11 |
| 0, 11 | 1, 11 | 2, 11 | 3, 11 | 4, 11 | 5, 11 | 6, 11 | 7, 11 | 8, 11 | 9, 11 | 10, 11 | 10, 11 |

Figure 17:
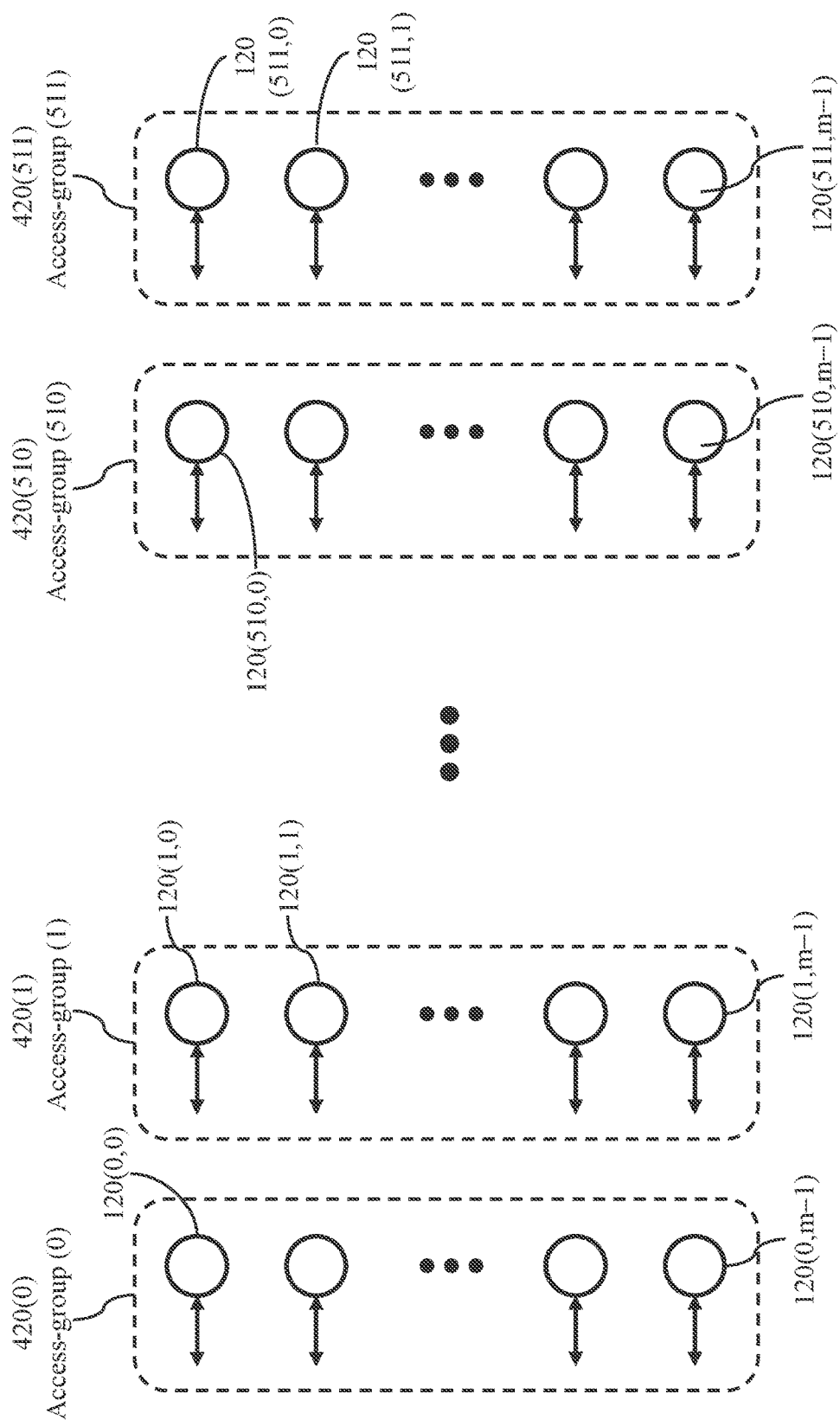
FIG. 17 illustrates a plurality of access groups to be logically arranged into access bands, in accordance with an embodiment of the present invention.

FIG. 17 illustrates a plurality 1700 of access groups 420 to be logically arranged into access bands; the total number of access groups being 512 ($\rho=512$) indexed as 0 to 511. An access group 420 may be provisioned to contain an arbitrary number of access nodes 120, with more access nodes added as the need arises, up to a predetermined upper bound m. The illustrated access nodes of FIG. 17 are fully provisioned access groups.

Figure 18:
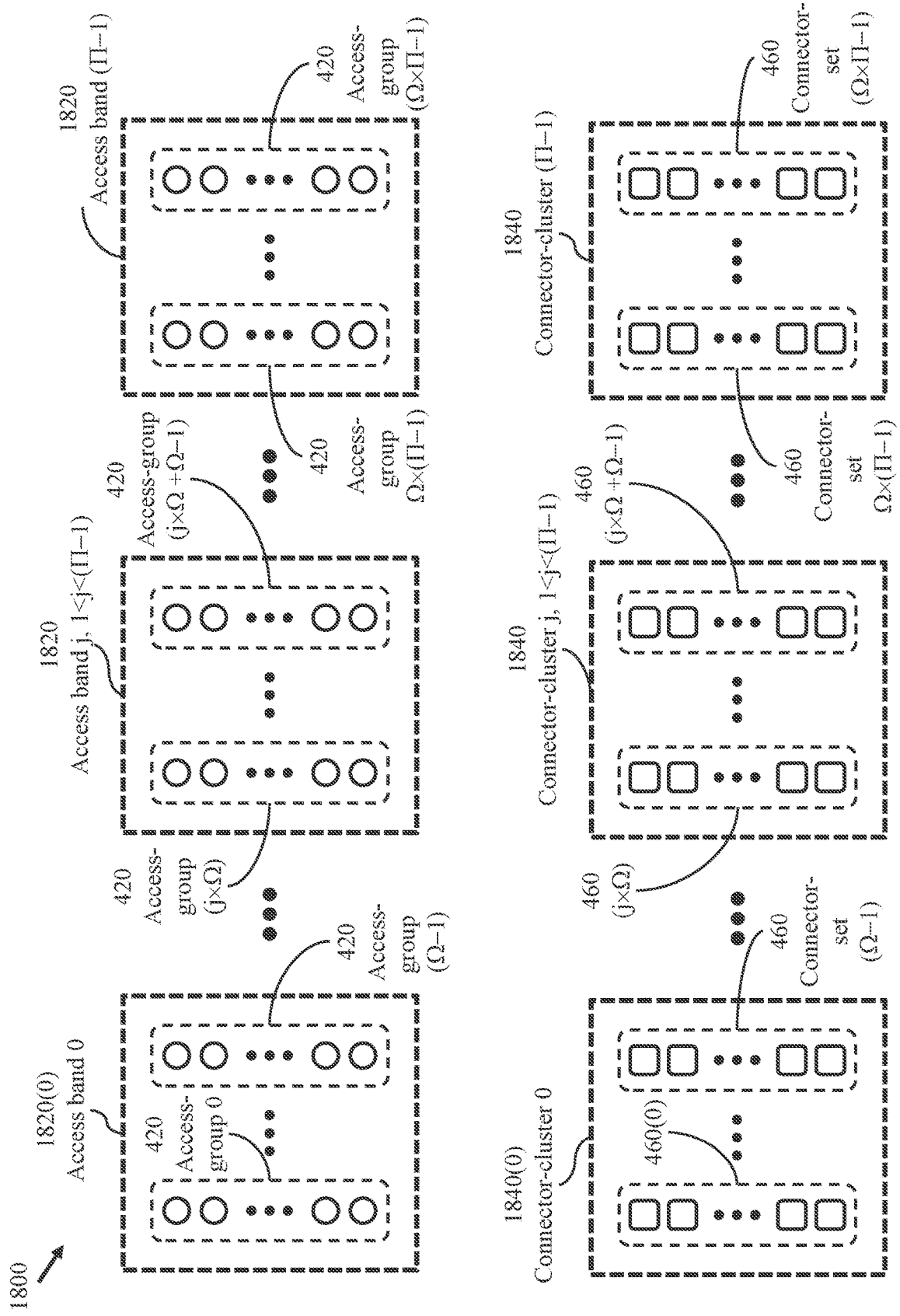
FIG. 18 illustrates a plurality of access bands each containing a number of access groups, not exceeding a predefined limit, and a plurality of corresponding connector clusters, in accordance with an embodiment of the present invention.

FIG. 18 illustrates a plurality 1800 of access bands 1820 and corresponding connector clusters 1840. Each access band 1820 contains a number of access groups 420 not exceeding a predefined limit $\Omega$, $\Omega > 1$. Each connector cluster 1840 contains $\Omega$ connector sets 460. The number, $\Pi$, of access bands and the predefined limit $\Omega$ are selected so that $\Pi \times M > t$. Given a specified number, $\mu$, of access groups and a specified number, $\Pi$, of access bands, $\Pi > 1$, $\mu \ge (2 \times \Pi)$, $\Omega$ is determined as $\Omega = \lceil \mu / \Pi \rceil$.

The access-bands are individually indexed as 0 to ($\Pi-1$). A first access-band 1820(0) may comprise access-groups 420 of indices 0 to ($\Omega-1$). An intermediate access-band of index j, $0 \le j < \Pi$, may comprise access groups 420 of indices $j \times \Omega$ to ($j \times \Omega + \Omega - 1$). The last access-band of index ($\Pi-1$) may comprise access groups of indices $\Omega \times (\Pi-1)$ to ($\Omega \times \Pi - 1$). The connector clusters are likewise indexed as illustrated in FIG. 18.

Figure 19:
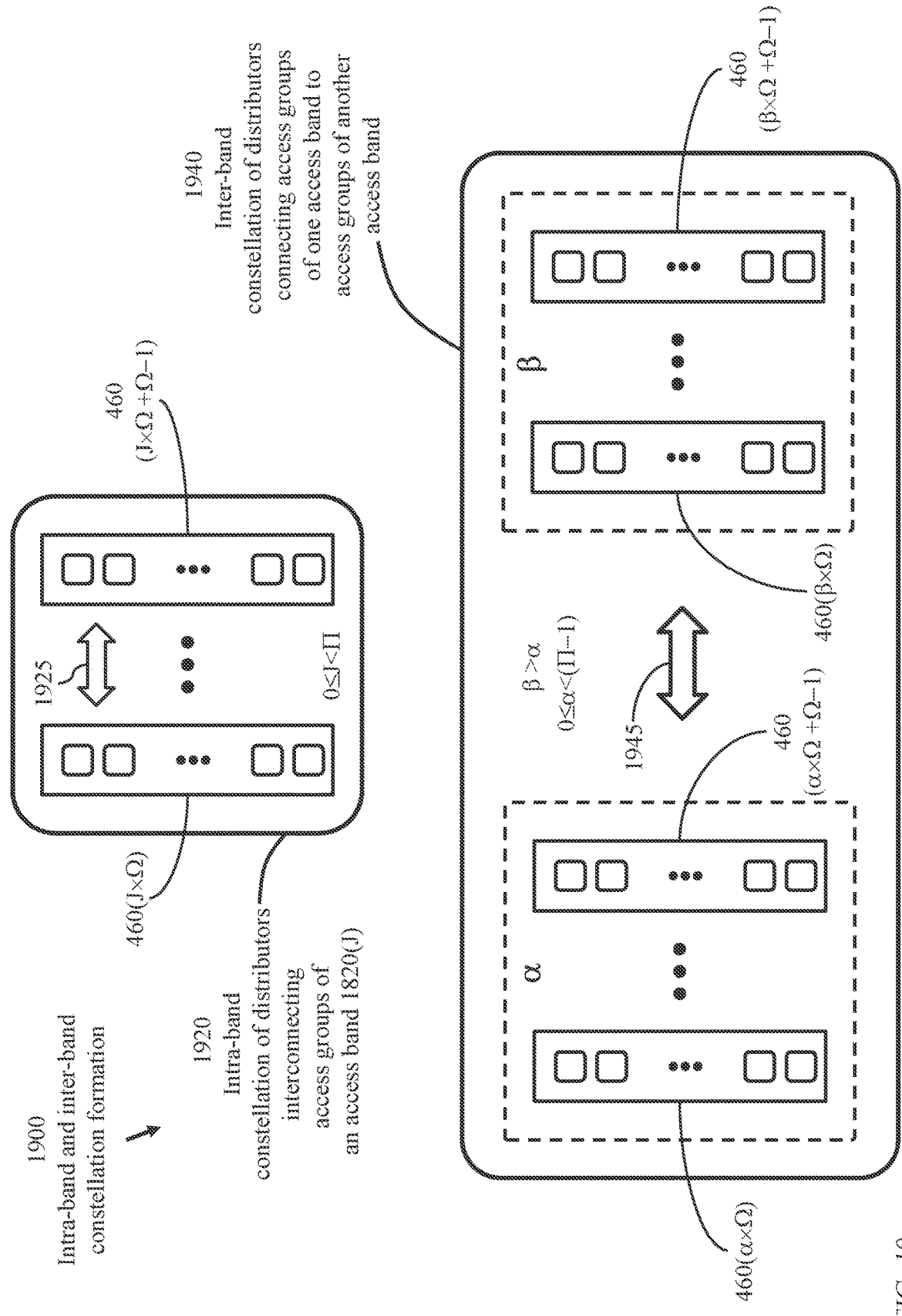
FIG. 19 illustrates formation of an intra-band constellation and an inter-band constellation as fused connector-sets, in accordance with an embodiment of the present invention.
Figure 33:
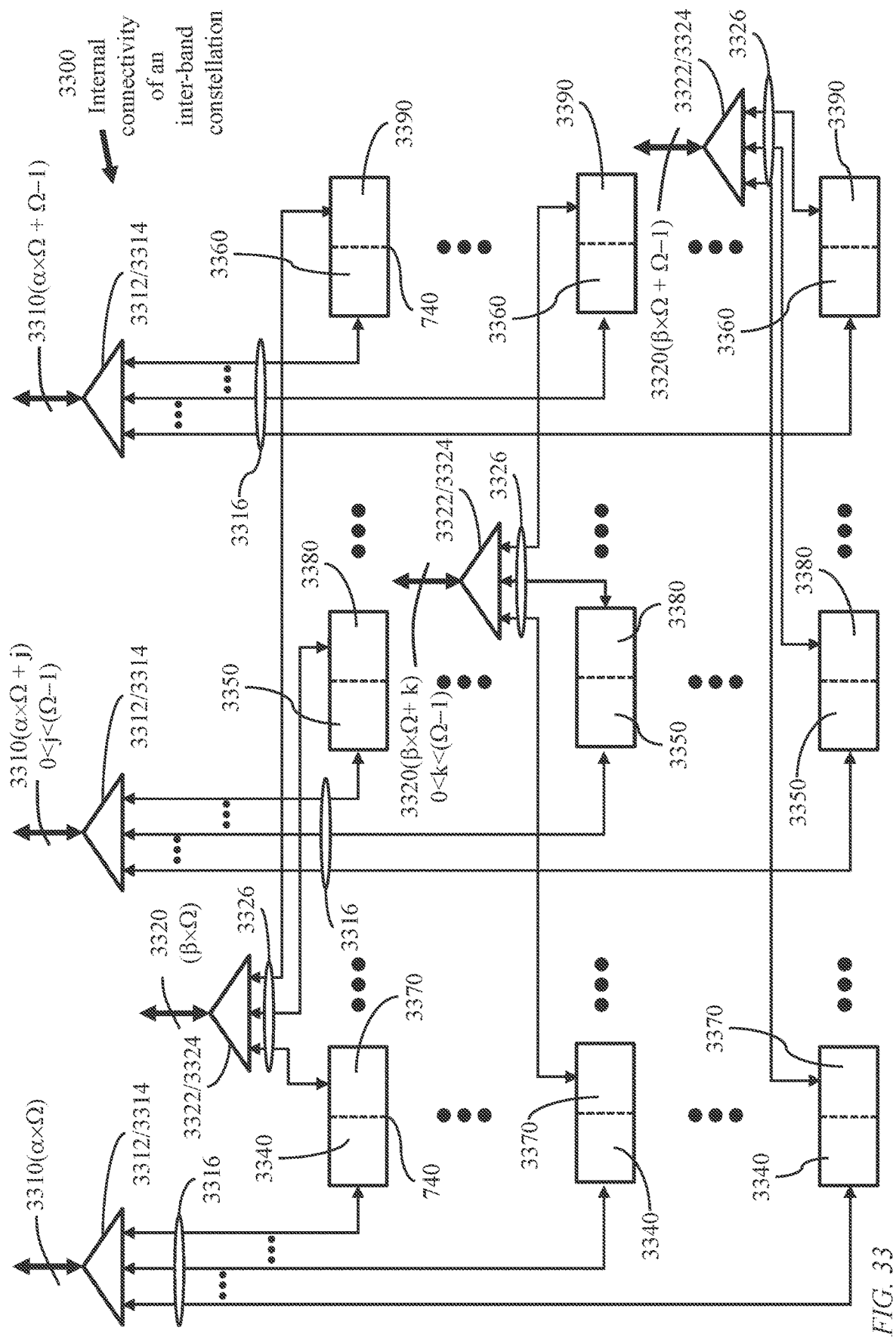
FIG. 33 illustrates internal connectivity of an inter-band constellation, in accordance with an embodiment of the present invention.
Figure 37:
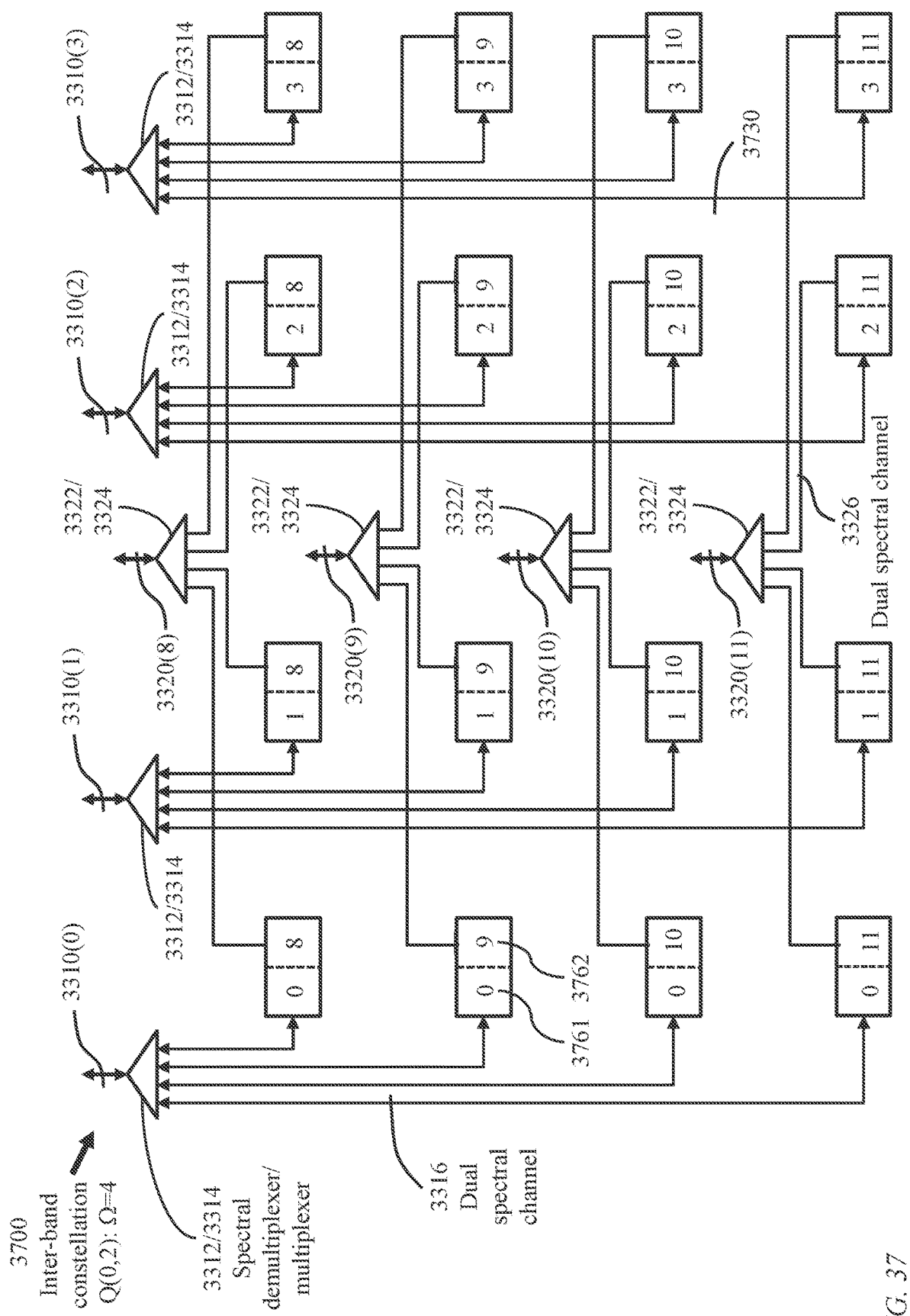
FIG. 37 illustrates internal connectivity of a specific inter-band constellation, in accordance with an embodiment of the present invention.
Figure 41:
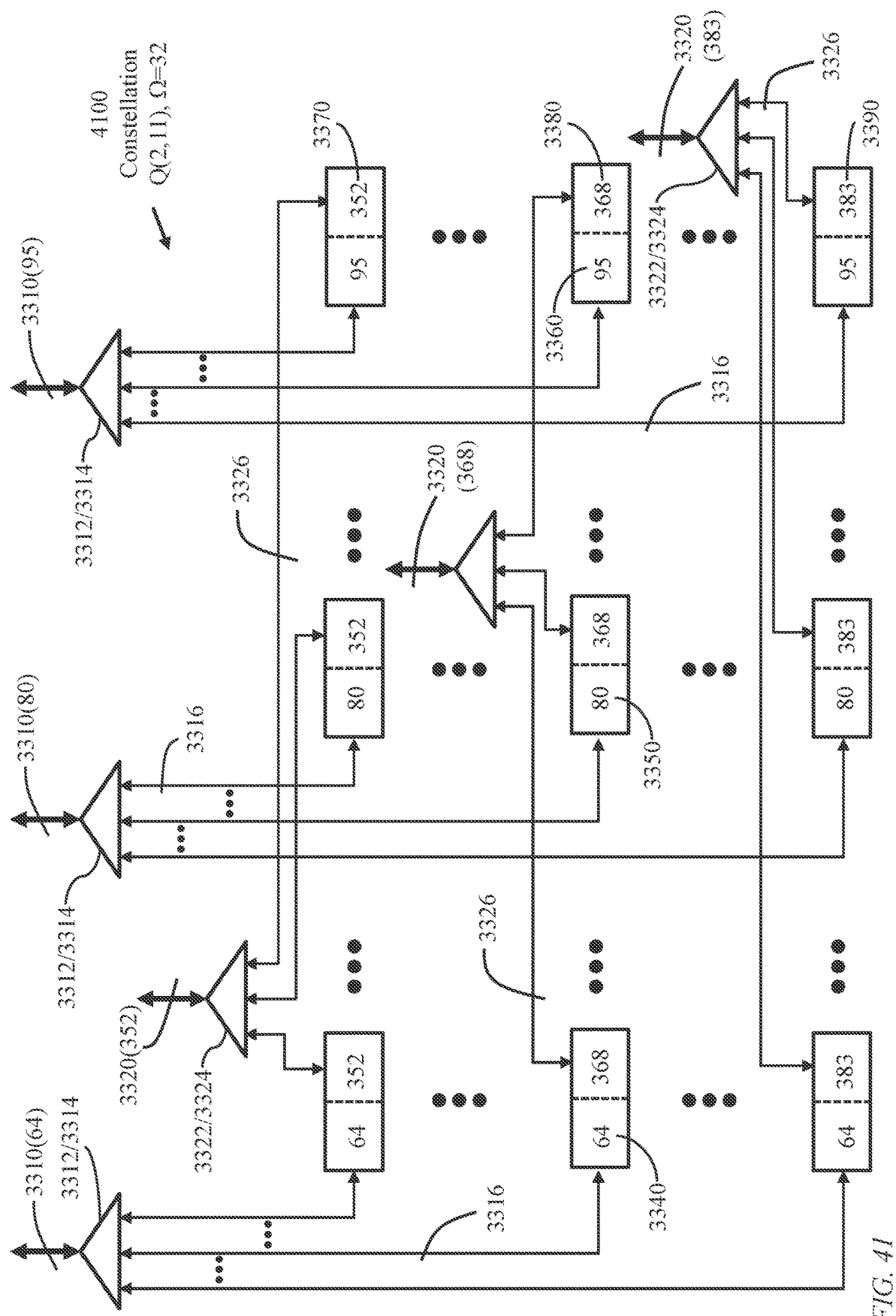
FIG. 41 illustrates internal connectivity of a large-scale inter-band constellation in accordance with an embodiment of the present invention.

FIG. 19 illustrates formation 1900 of an intra-band constellation and an inter-band constellation. An intra-band constellation 1920 comprises mutually fused connector sets 460 of a connector cluster. Pairwise fusion 1925 of connectors of different connector sets 460, where each connector 140 of each connector set 460 is fused with a respective connector of another connector set 460, forms ($\Omega \times (\Omega-1))/2$ distributors of the intra-band constellation. An inter-band constellation 1940 comprises connector sets of a connector cluster fused to connector-sets of another connector cluster. Pairwise fusion 1945 of connectors of a first connector cluster, corresponding to a first access band, to connectors of a second connector cluster, corresponding to a second access band, forms $\Omega^2$ distributors within the inter-band constellation. Each connector 140 of each connector set 460 of the first band is fused with a respective connector 140 of a connector set 460 of the second connector cluster to form a distributor so that each access group of the first access band connects to each access group of the second access band through a respective distributor as illustrated in FIGS. 33, 37, and 41.

Figure 20:
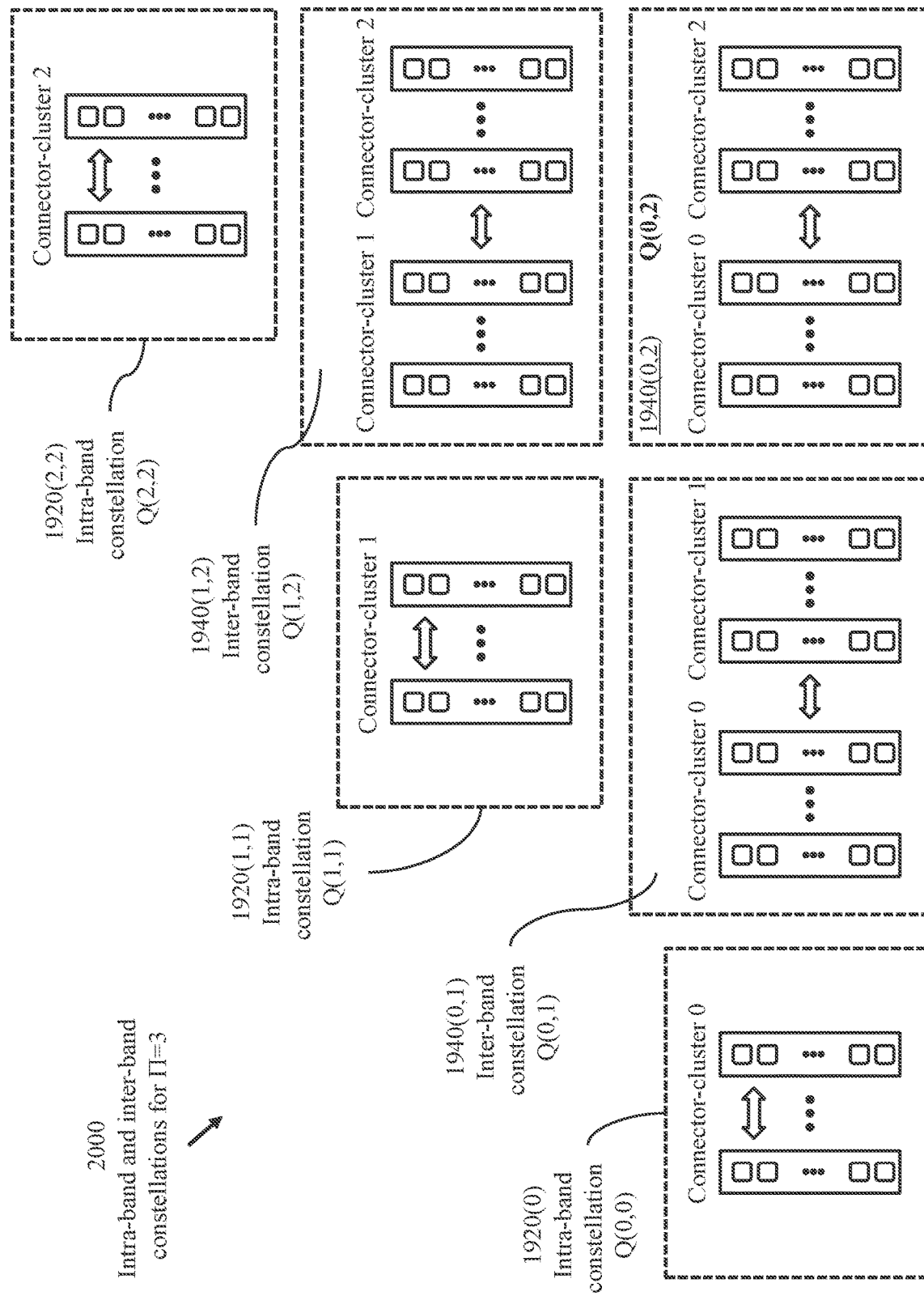
FIG. 20 illustrates an exemplary arrangement of complementing intra-band and inter-band constellations of a contiguous network, in accordance with an embodiment of the present invention.

FIG. 20 illustrates an exemplary arrangement 2000 of complementing intra-band and inter-band constellations of a contiguous network. With Π access bands, Π>1, the network comprises H intra-band constellations 1920 and (Π×(Π−1)/2 inter-band constellations 1940. Each access group 420 connects to (Ω−1) distributors within a respective intra-band constellation 1920 and to Q distributors within each of respective (Π−1) inter-band constellations. Noting that (Ω−1)+Ω×(Π−1)=(μ−1), each access group connects to (μ−1) distributors forming a respective three-stage network where each access node of the access group has (μ−1) paths, each traversing only one distributor, to each other access node of the access group. Each pair of access groups connects to a respective distributor, thus providing a path from each access node of each access group to each access node of each other access group traversing only one distributor.

Figure 21:
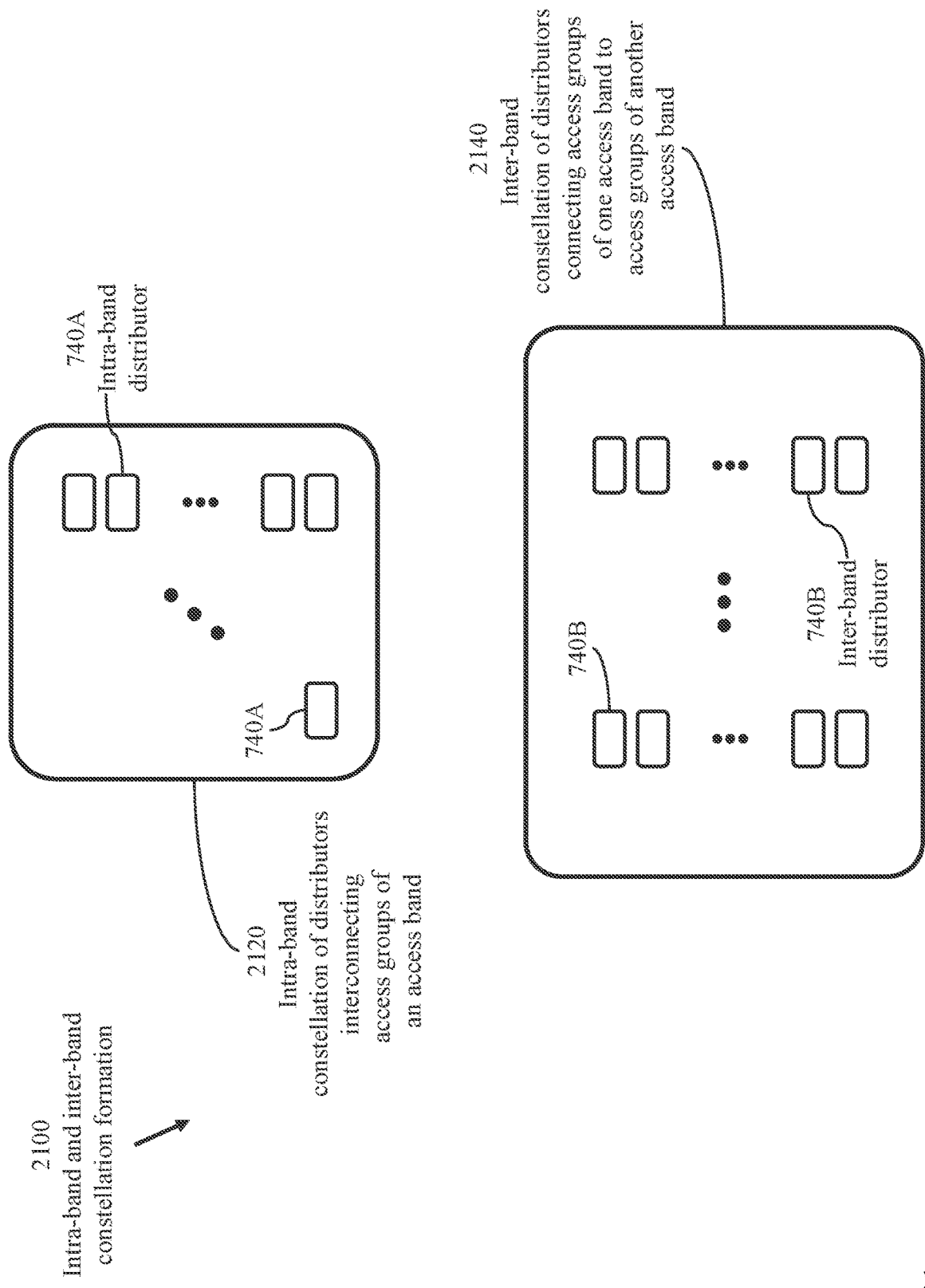
FIG. 21 illustrates constituent distributors of the intra-band constellation and the inter-band constellation of FIG. 19.

FIG. 21 illustrates the form 2100 of the constellations of distributors. Mutual fusion of the connector sets 460 of the intra-band constellation 1920 forms (Ω×(Ω−1))/2 intra-band distributors 740A each connecting to a respective pair of access groups 420 of a same access band. A distributor within an intra-band constellation of distributors is referenced as an intra-band distributor. An intra-band constellation 2120 of intra-band distributors comprises (Ω×(Ω−1))/2 intra-band distributors.

An inter-band constellation 1940 comprises distributors connecting access-groups of an access-band to access-groups of another access-band. Fusion of each connector set 460 of the first access-band to each connector set 460 of the second access-band forms Ω² inter-band distributors 740B each connecting to a respective pair of access groups 420 of different access bands. A distributor within an inter-band constellation of distributors is referenced as an inter-band distributor. An inter-band constellation 2140 of inter-band distributors comprises Ω² inter-band distributors.

Figure 22:
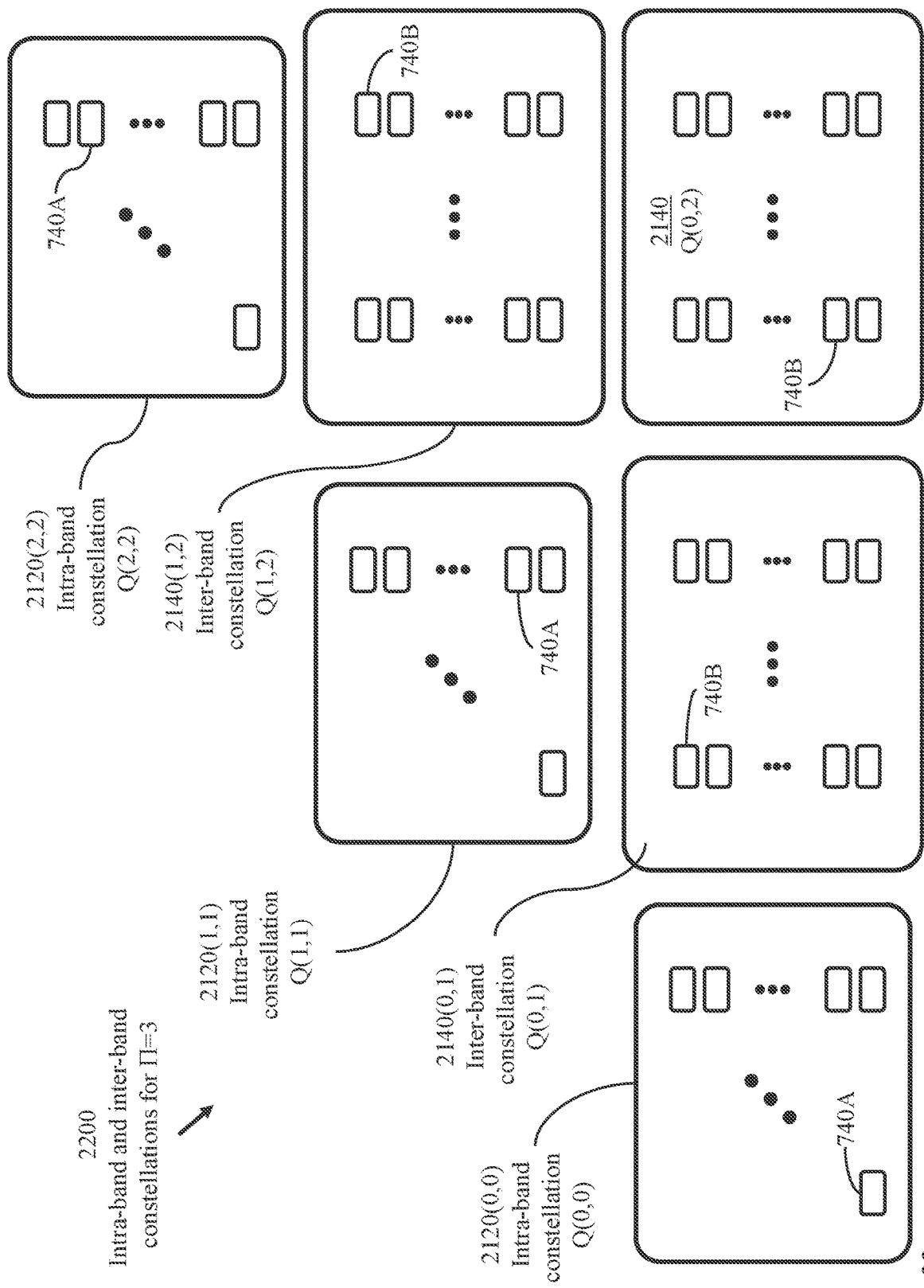
FIG. 22 is a representation of complementing intra-band and inter-band constellations of a contiguous network indicating constituent distributors of each formed constellation.

FIG. 22 is a representation 2200 of complementing intra-band constellations 2120 and inter-band constellations 2140 of a contiguous network, for Π=3, indicating constituent intra-band distributors 740A and inter-band distributors 740B.

Figure 23:
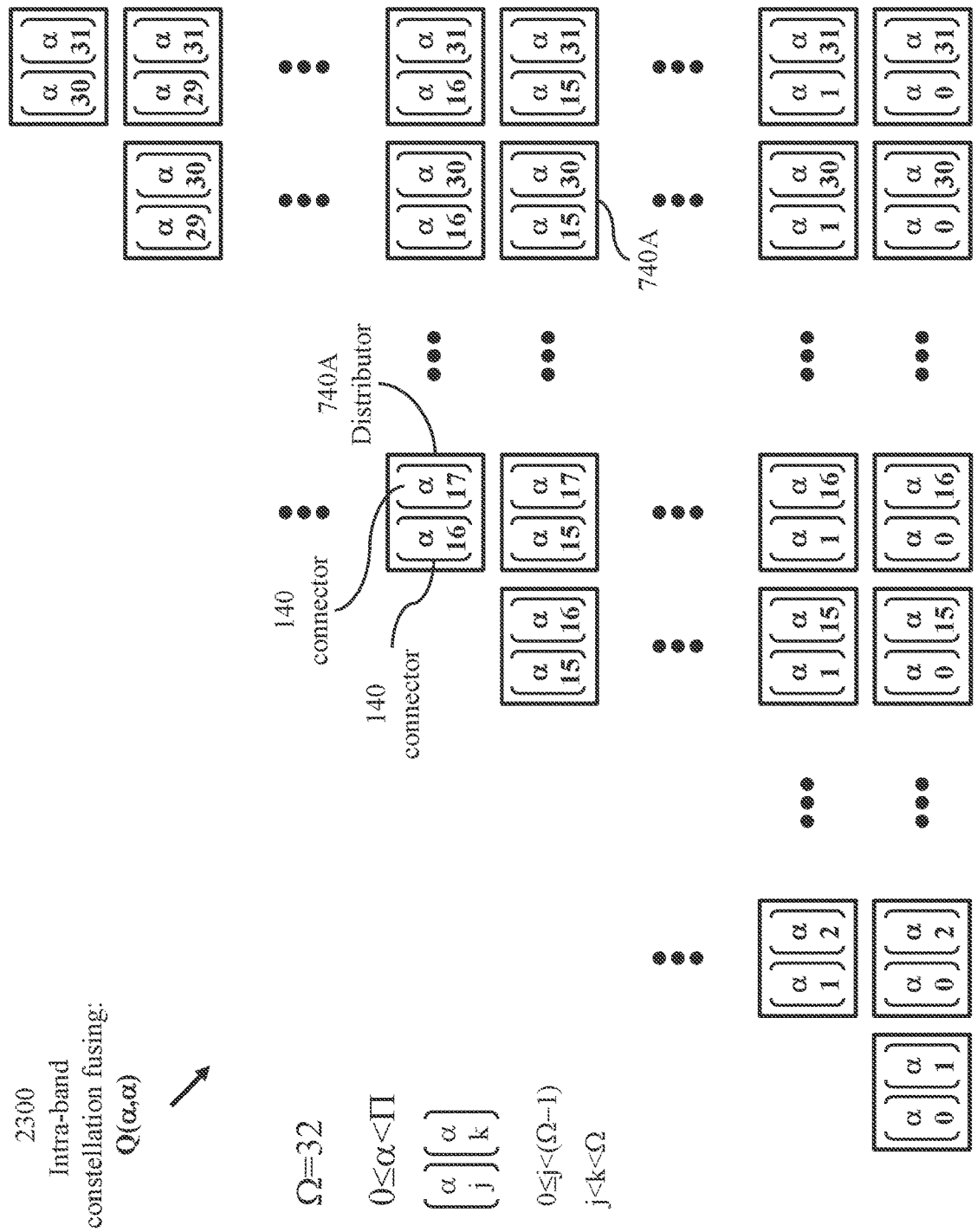
FIG. 23 details a configuration of an intra-band constellation.

FIG. 23 details a configuration 2300 of an intra-band constellation 2120 for a case of Ω=32. The constellation comprises (Ω×(Ω−1))/2 distributors 740A each connecting to a respective pair of access groups. An intra-band constellation Q(α,α), 0≤α<Π, comprises distributors 740A connecting to access-group pairs of indices {(α×Ω+j), (α×Ω+k)} for all integers j and k in the range 0≤j<(Ω−1) and j<k≤Ω. For Ω=32 and α=0, the indices of the access-group pairs are {j,k}, 0≤j<31 and j<k<32. For Ω=32 and α=15, the indices of the access-group pairs are {j,k}, 480≤j<511 and 480<k<512. The notation [α j] [α k] in FIG. 23 denotes an intra-band distributor fusing a connector set of index (α×Ω+j) and a connector set of index (α×Ω+k).

Figure 24:
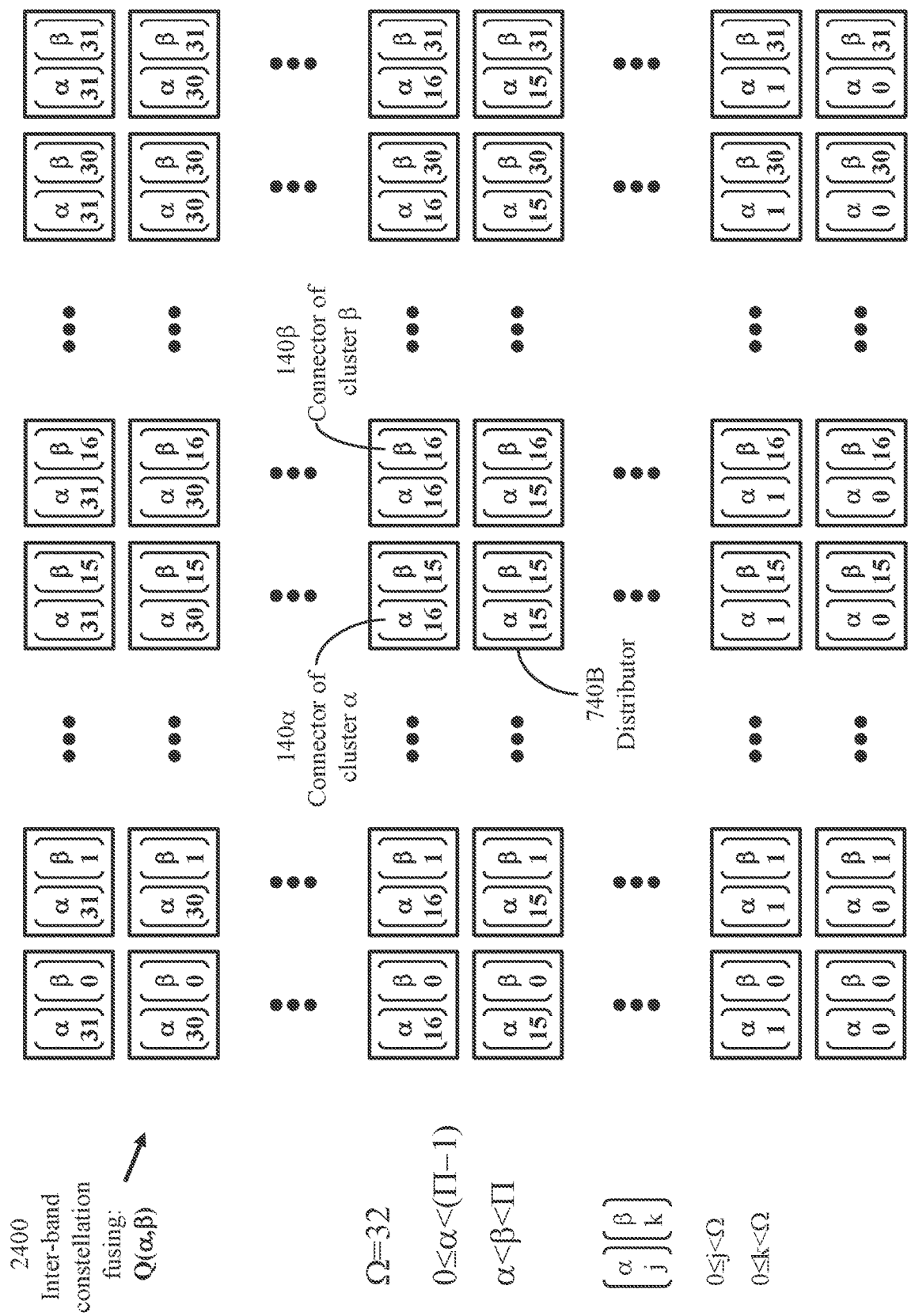
FIG. 24 details a configuration of an inter-band constellation.

FIG. 24 details a configuration 2400 of an inter-band constellation 2140 for the case of Ω=32. The constellation comprises Ω² distributors 740B each connecting to a respective pair of access groups. An inter-band constellation Q(α, β), 0≤α<(Π−1), α<β<Π, comprises distributors 740B connecting to access-group pairs of indices {(α×Ω+j), (β×Ω+k)} for all integers j and k in the range 0≤j<Ω and 0≤k<Ω. For Ω=32, α=0, β=1, the indices of the access-group pairs are {j,k}, 0≤j<32 and 32≤k<64. For Ω=32, α=14, and β=15,
the indices of the access-group pairs are {j,k}, 448≤j<480 and 480≤k<512. The notation [α j] [β k] in FIG. 24 denotes an inter-band distributor fusing a connector set of index (α×Ω+j), belonging to connector-cluster α, and a connector set of index (β×Ω+k), belonging to connector-cluster β.

Figure 25:
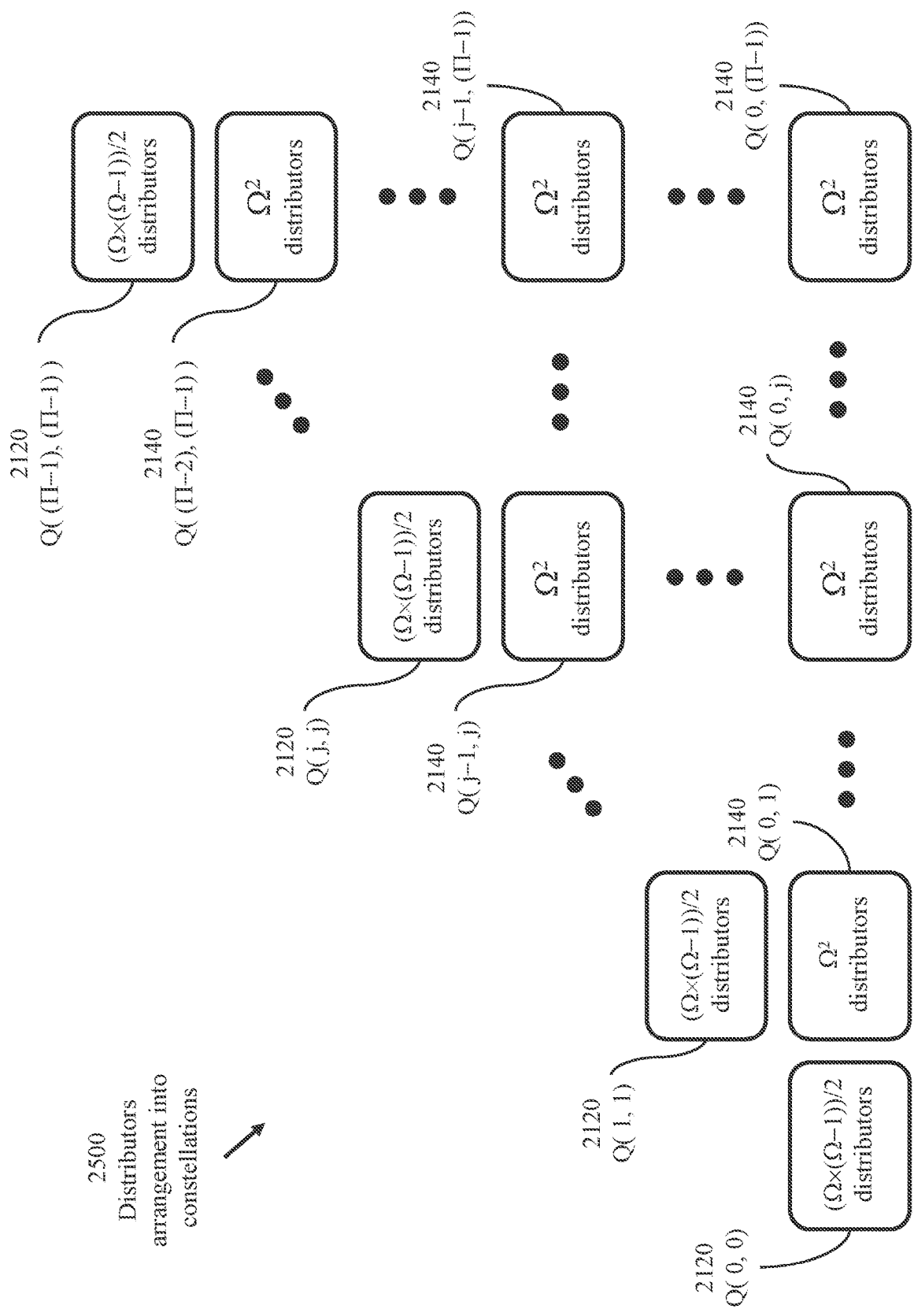
FIG. 25 illustrates arrangement of distributors of a large-scale network into spatially distributed constellations, in accordance with an embodiment of the present invention.

FIG. 25 illustrates arrangement 2500 of distributors of a large-scale network into spatially distributed constellations comprising H intra-band constellations Q(α,α), 0≤α<Π, (reference 2120) and ((Π×(Π−1))/2 inter-band constellations Q(α,β), 0≤α<((Π−1), α<β<Π (reference 2140). Each intra-band constellation 2120 comprises at most (Ω×(Ω−1))/2 distributors and each inter-band constellation 2140 comprises at most Ω² distributors.

Figure 26:
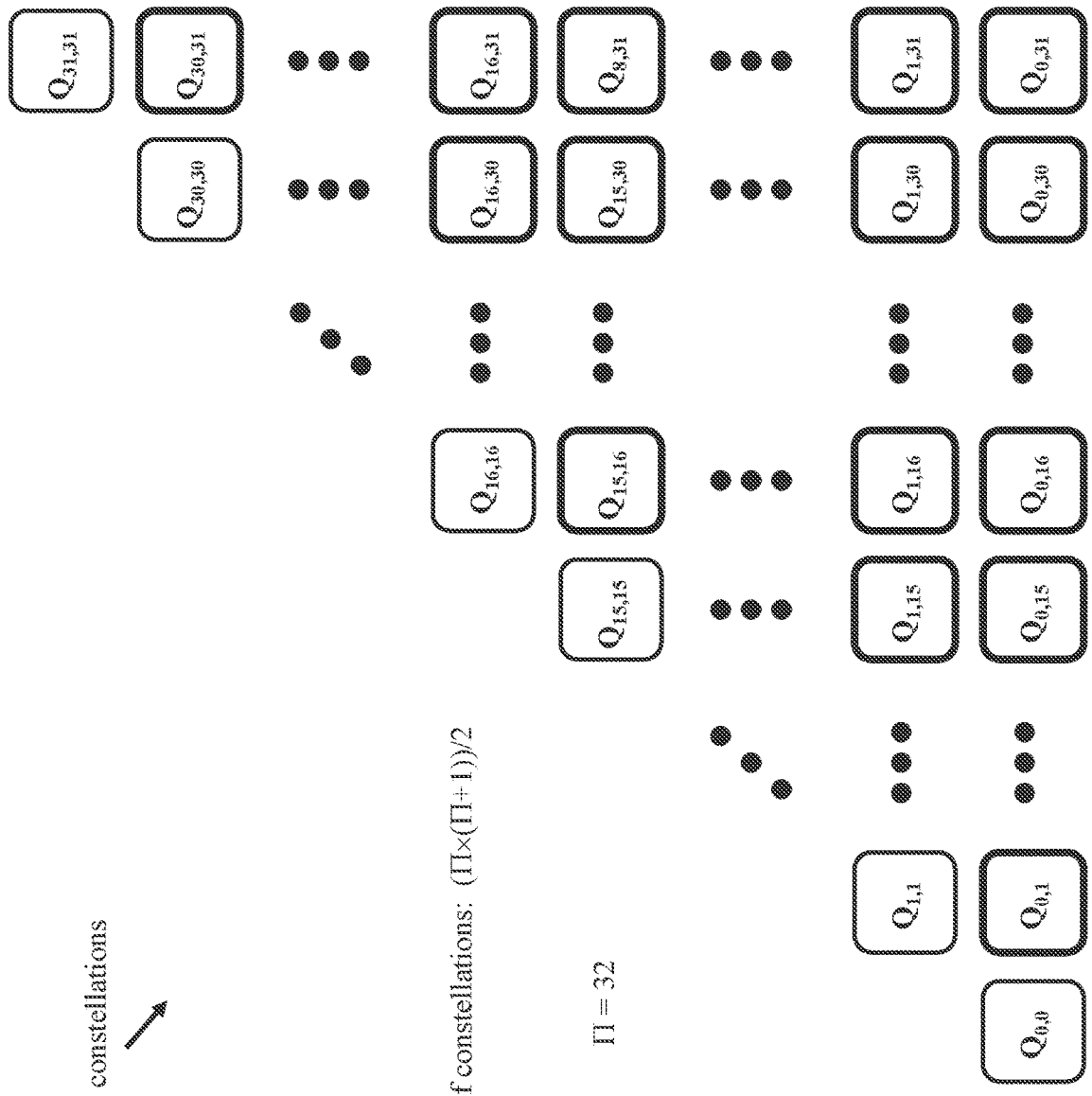
FIG. 26 further illustrates the constellations of FIG. 25.

FIG. 26 illustrates a plurality 2600 of constellations of distributors interconnecting 32 access groups.

Figure 27:
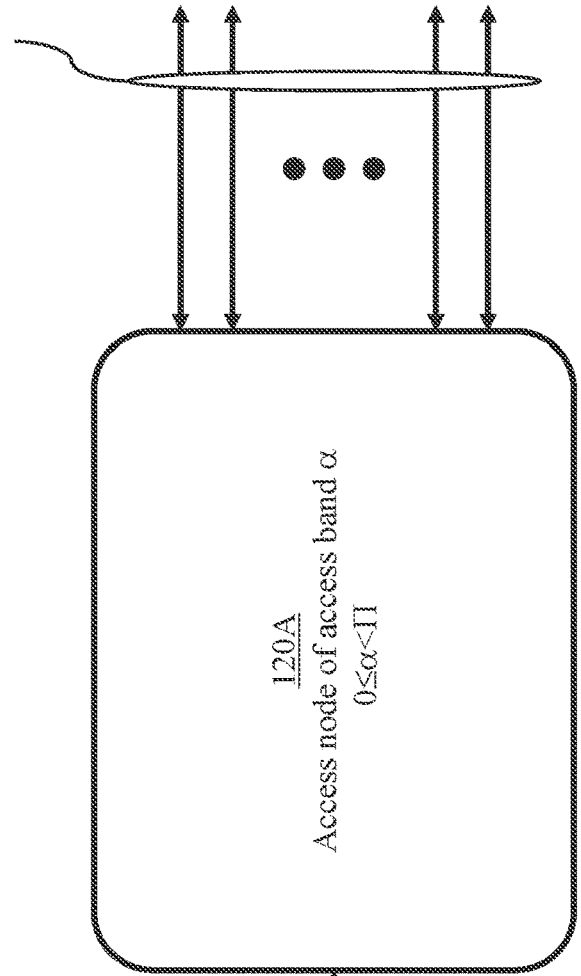
FIG. 27 illustrates connectivity of an access node of a specific access-band to a respective intra-band constellation and a respective set of inter-band constellations, in accordance with an embodiment of the present invention.

FIG. 27 illustrates connectivity 2700 of an access node of a specific access-band 1820 to a respective intra-band constellation 2120 and a respective set of inter-band constellations 2140. Each access node 120 connects to an intra-band constellation 2120 and (Π−1) inter-band constellations 2140.

An access node 120 of an access group 420 belonging to an access band of index α, 0≤α<Π, connects to an intra-band constellation 2120, denoted Q(α, α), through a dual WDM link 2720 carrying (Ω−1) spectral bands (spectral channels) and connects to each of (Π−1) inter-band constellations 2140 through a respective dual WDM link 2740 carrying Q spectral channels. The (Π−1) inter-band constellations are determined as:

$$Q(j, \alpha), 0 \leq j \leq \alpha, \text{ for } 0 \leq \alpha < \Pi, \text{ and}$$

$$Q(\alpha, k), \alpha < k < \Pi, \text{ for } 0 \leq \alpha < (\Pi - 1).$$

Referring to FIG. 26, with Π=32, an access node 120 of an access group 420 belonging to access band of index 0, i.e., α=0, connects to constellations:

Q(j,α), 0≤j≤α, which is Q(0,0), and

Q(α,k), α<k<Π, which are {Q(0,1), Q(0,2), . . . , Q(0, 31)}.

An access node 120 of an access group 420 belonging to access band of index 16, i.e., α=16, connects to constellations:

Q(j,α), 0≤j≤α, which are {Q(0,16), Q(1,16), . . . , Q(16, 16)}, and

Q(α,k), α<k<Π, which are {Q(16,17), Q(16,18), . . . , Q(16,31).

An access node 120 of an access group 420 belonging to access band of index 31, i.e., α=31, connects to constellations:

Q(j,α), 0≤j≤α, which are {Q(0,31), Q(1,31), . . . , Q(31, 31)}.

Since α does not meet the requirement 0≤α<(Π−1), Q(j, α), 0≤j≤α, covers all relevant constellations for the access band of index 31.

Figure 28:
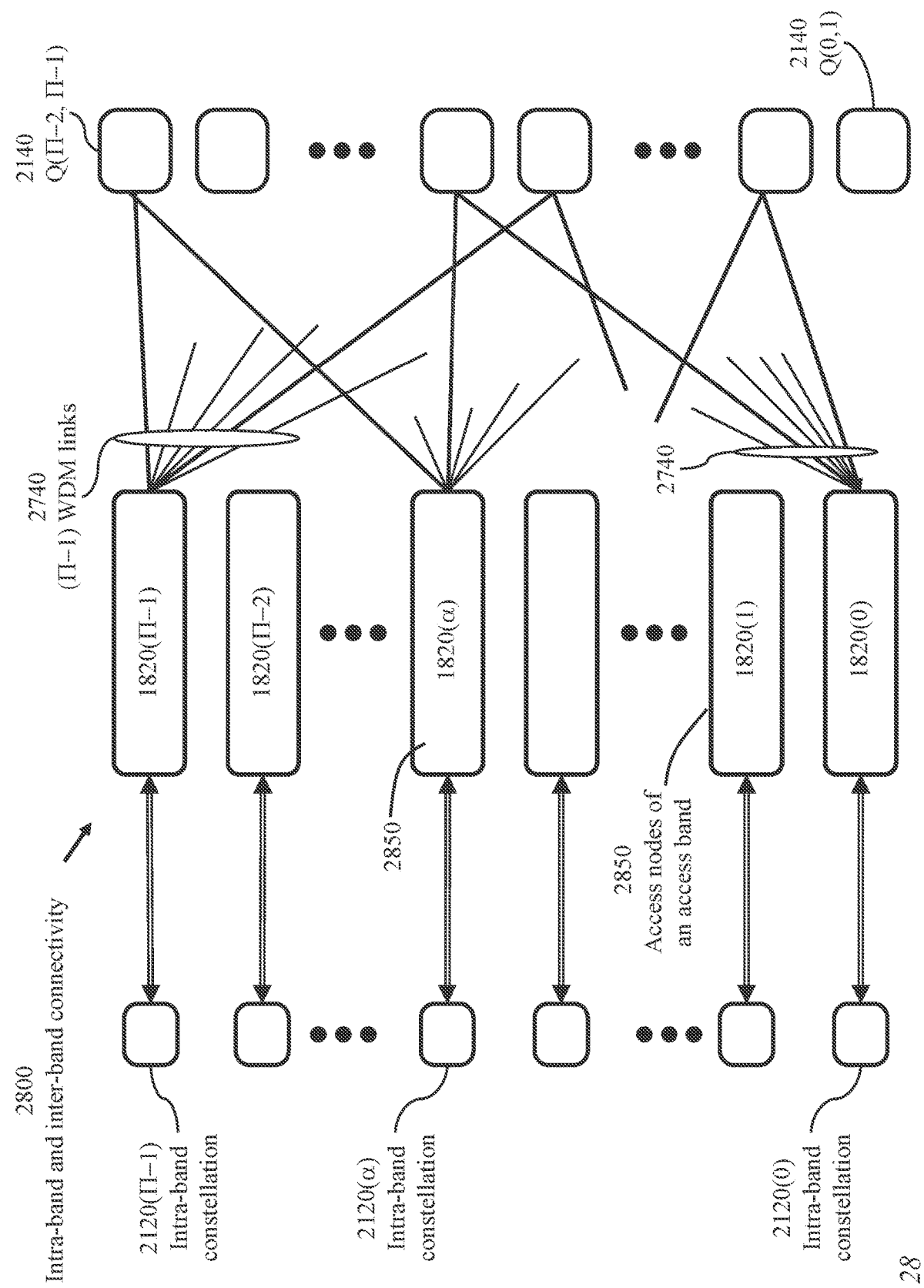
FIG. 28 illustrates global network connectivity of all access bands to intra-band constellations and inter-band constellations, in accordance with an embodiment of the present invention.

FIG. 28 illustrates global network connectivity 2800 of all access bands 1820 to intra-band constellations 2120 and inter-band constellations 2140. The access bands 1820 are individually identified as 1820(0) to 1820(Π−1). As described above, the network comprises μ access groups 420 and corresponding μ connector sets 460. The access groups are organized into Π access bands 1820 and the connector sets are organized into Π corresponding connector clusters 1840. Each connector set 460 is fused with each other connector set so that each pair of connector sets 460 has one common distributor. Distributors combining connectors of a same connector set form an intra-band constellation. Distributors combining connectors of a pair of different connector clusters form an inter-band constellation as illustrated in FIG. 21. Thus, mutual fusing of the μ connector sets 460 produces Π intra-band constellations 2120 and $(\Omega\times(\Omega-1))/2$ inter-band constellations 2140.

As illustrated in FIG. 28, each access node 120 of an access band 1820 has one dual WDM link 2720 carrying $(\Omega-1)$ dual channels to an intra-band constellation and $(\Pi-1)$ dual WDM links 2740, each carrying $\Omega$ dual channels to a respective inter-band constellation.

Figure 29:
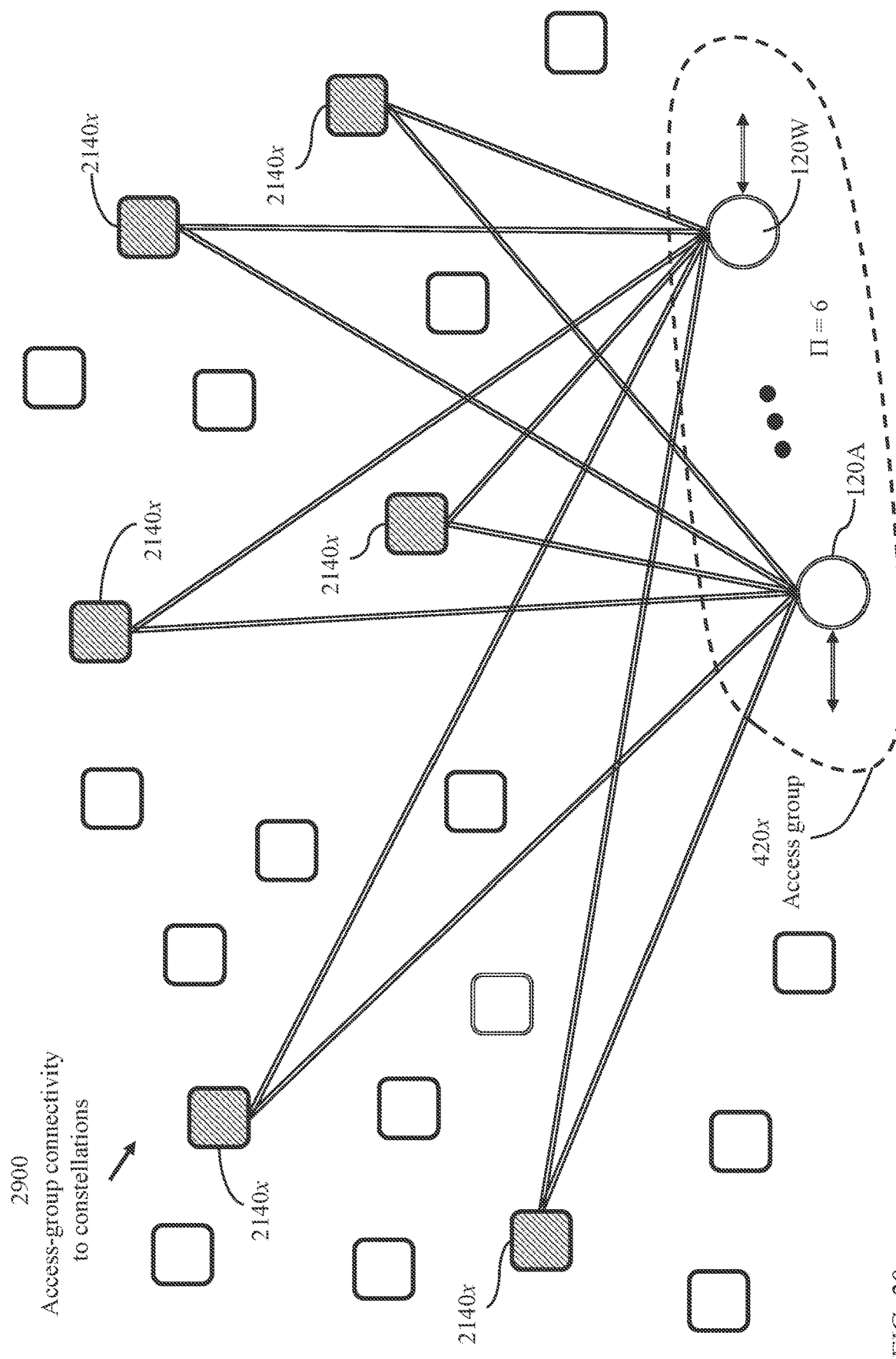
FIG. 29 illustrates connectivity of an access group to a respective set of constellations, in accordance with an embodiment of the present invention.

FIG. 29 illustrates connectivity 2900 of an access group 420x, comprising a number of access nodes 120 (120A, ..., 120W), to a respective set of constellations of a network. An access group 420 of index x, $0 \le x \le \mu$, belongs to an access band 1820 of index α, $\alpha = \lfloor x/\Omega \rfloor$. The constellations to which each access node of the access group connects are determined as described in FIG. 27. The network comprises Π intra-band constellations 2120 and $(\Pi\times(\Pi-1))/2$ inter-band constellations 2140. In the example of FIG. 29, Π=6. Hence, the network comprises 6 intra-band constellations 2120 and 15 inter-band constellations 2140.

Each access node of the access group connects to the same six constellations. One of the six constellations is an intra-band constellation 2120x and the remaining five constellations are inter-band constellations 2140x. Each access node of the access group 420x connects to the intra-band constellation 2120x through a dual WDM link carrying $(\Omega-1)$ dual channels and connects to each of the five inter-band constellations 2140x through a dual WDM link carrying $\Omega$ dual channels. Detailed connectivity of a dual WDM link to distributors of a constellation is illustrated in FIGS. 33 to 41.

Figure 30:
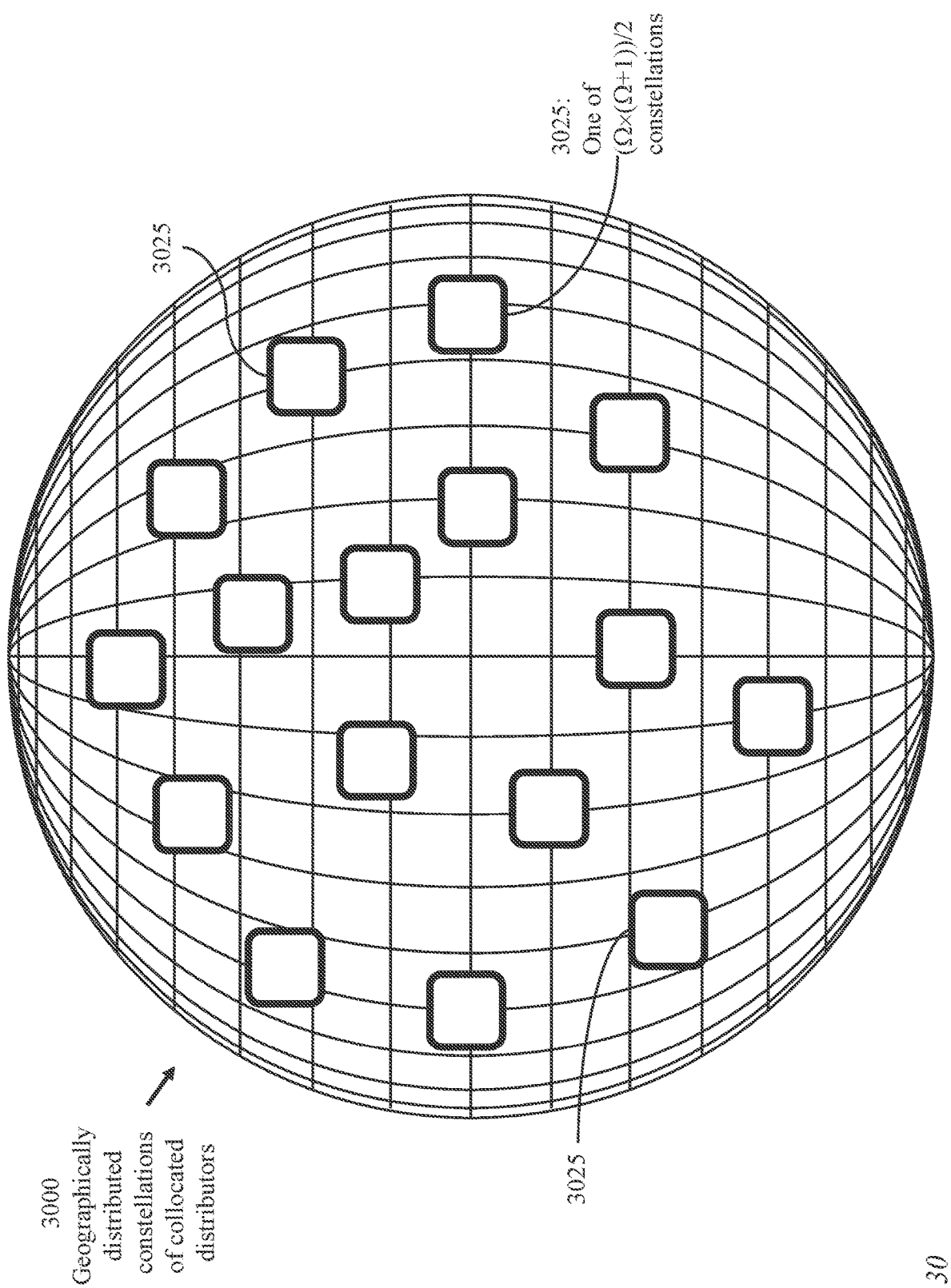
FIG. 30 illustrates a plurality of geographically distributed constellations of collocated distributors, in accordance with an embodiment of the present invention.

FIG. 30 illustrates a plurality 3000 of geographically distributed constellations of collocated distributors 3025. A constellation 3025 may be an intra-band constellation 2120 or an inter-band constellation 2140. Arrangement of the distributors into constellations 3025 is preferable to individual placement of the distributors. The distributors of a constellation are collocated.

In a network of global coverage, the access nodes 120 are naturally spread as illustrated in FIG. 8 for proximity to respective data sources and sinks. As illustrated in FIG. 9, the distributors may be geographically spread over a wide area. In order to exploit WDM economy, a layer of spectral routers (also known as optical cross-connectors) may be interposed between the access nodes and the distributors. However, arranging the distributors into constellations as described above eliminates the need for a layer of cross connectors.

Figure 31:
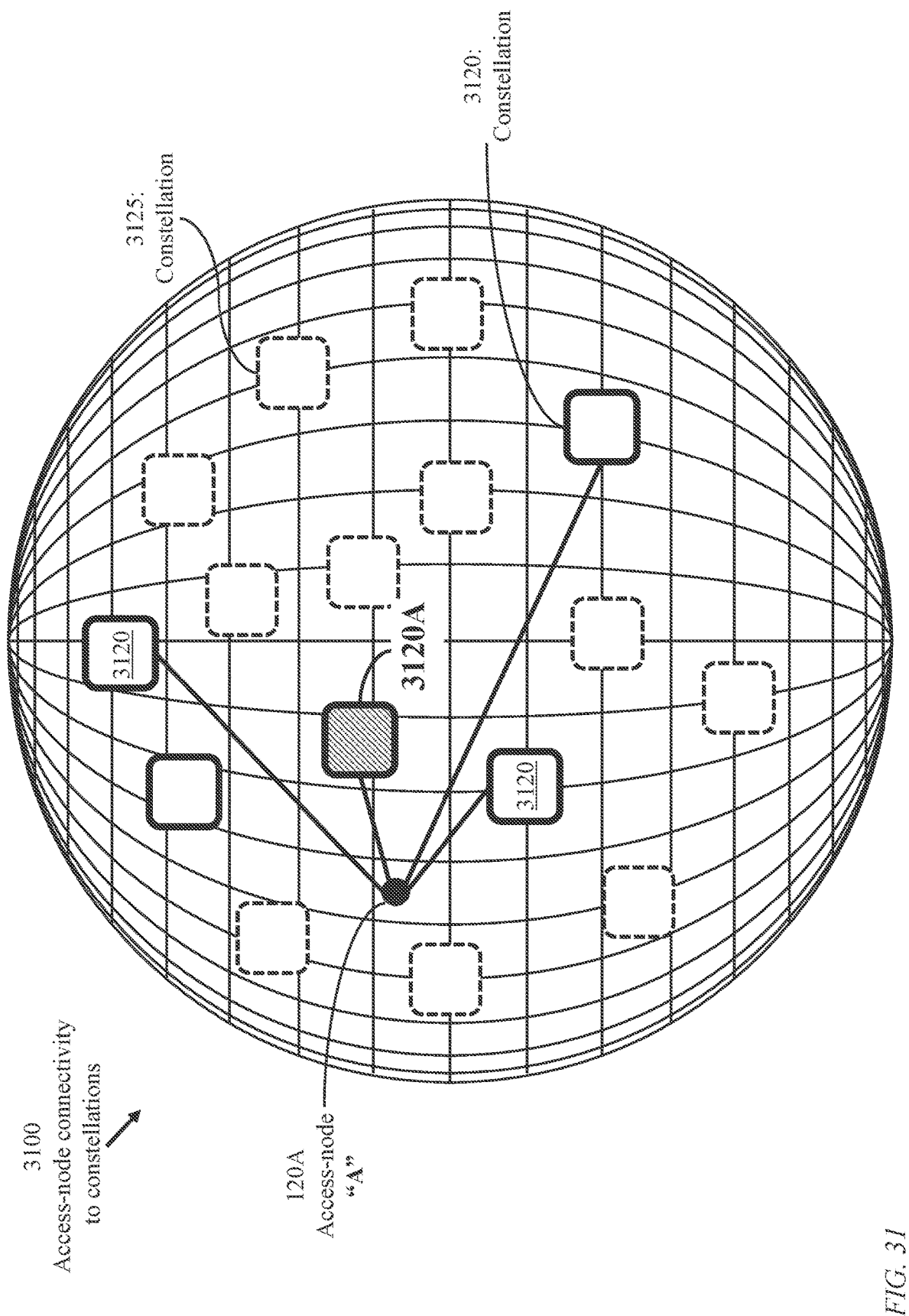
FIG. 31 illustrates connectivity of a first access node, belonging to a first access band, to a first set of constellations of which four constellations are indicated, in accordance with an embodiment of the present invention.

FIG. 31 illustrates connectivity 3100 of a first access node 120A, belonging to a first access band, to a first set of constellations 3120 of which four constellations 3120 are indicated. The remaining constellations 3125 connect to access nodes of other access bands.

Figure 32:
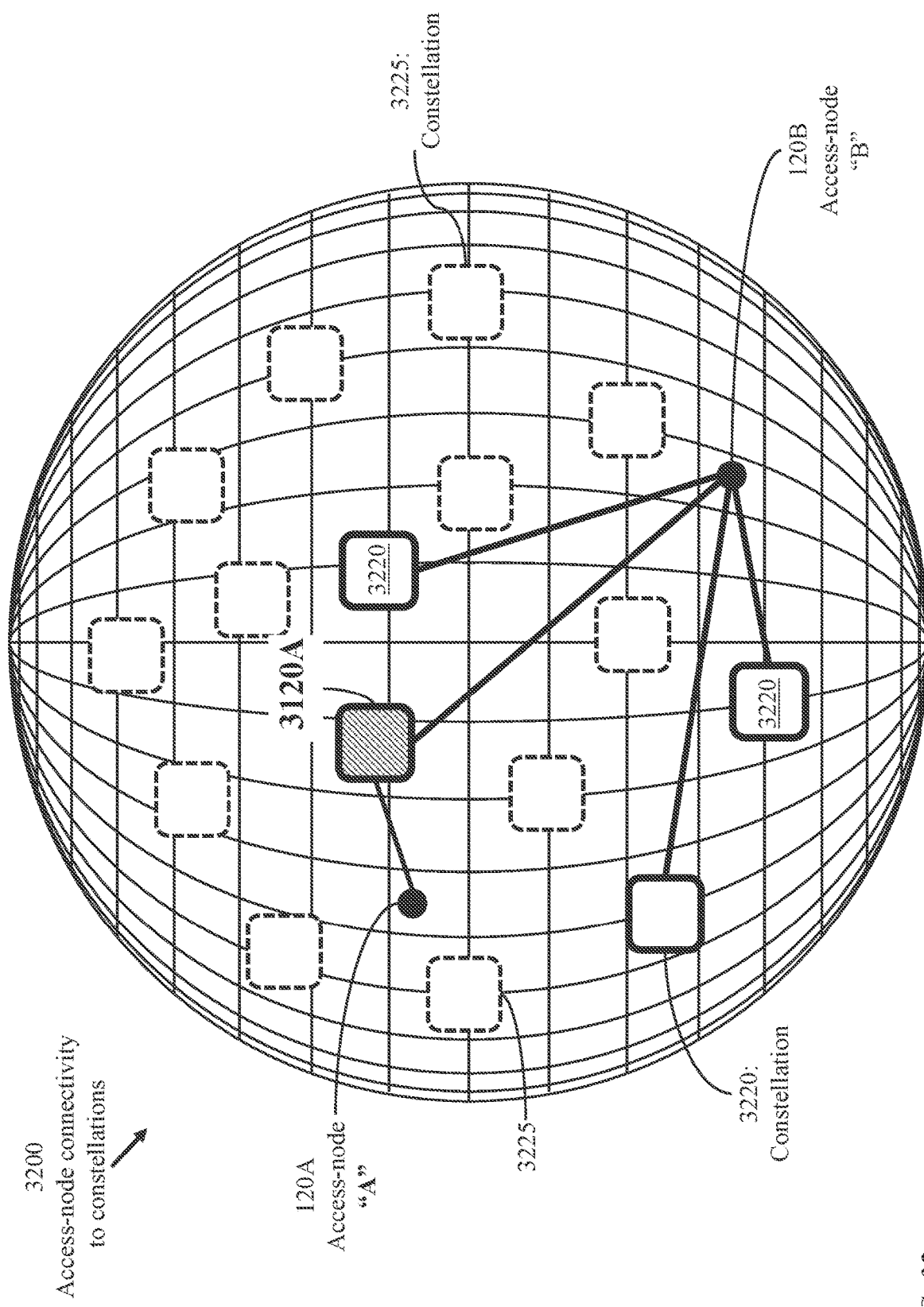
FIG. 32 illustrates connectivity of a second access node, belonging to a second access band, to a second set of constellations of which four constellations are indicated, with the first set of constellations and the second set of constellations having one common constellation, in accordance with an embodiment of the present invention.

FIG. 32 illustrates connectivity 3200 of a second access node 120B, belonging to a second access band, to a second set of constellations 3220 of which four constellations 3220 are indicated. The remaining constellations 3225 connect to access nodes of other access bands. The first set of constellations 3120 and the second set of constellations 3220 intersect in one constellation 3120A. Thus, each access node 120 of the first access band has a path to each access node 120 of the second access band traversing only one distributor of the common constellation 3120A.

As described above, each pair of access groups 420 connects to a common distributor 740. Consequently, each pair of access groups 420 connects to a common constellation and each pair of access nodes 120 belonging to different access groups 420 connects to a common constellation. Access node 120A of FIG. 31 has a dual WDM link to constellation 3120A and access node 120B of FIG. 32 has a dual WDM link to constellation 3120A.

As illustrated in FIG. 27, each access node 120 connects to an intra-band constellation through a respective dual WDM link 2720 carrying $(\Omega-1)$ dual spectral channels and connects to each of $(\Pi-1)$ inter-band constellations through a respective dual WDM link 2740 carrying $\Omega$ dual channels.

FIG. 33 illustrates internal connectivity 3300 of an inter-band constellation 2140. An inter-band constellation 2140 connects each access node 120 of an access band 1820 of index α, denoted 1820(α), to each access node of an access band 1820 of index β, denoted 1820(β), $0 \le \alpha < (\Pi-1)$, $\alpha < \beta < \Pi$, through a respective distributor 740. An access band comprises $\Omega$ access groups 420 each comprising a respective number of access nodes 120 which are generally geographically distributed. The inter-band constellation connects each access node 120 of each access group 420 of index x, $\alpha\times\Omega \le x \le (\alpha\times\Omega+\Omega-1)$, to each access node 120 of each access group of index y, $\beta\times\Omega \le y \le \beta\times\Omega+\Omega-1$. A distributor connecting to an access group 420 of index x and an access group 420 of index y is herein referenced as D(x,y).

Each access node 120 of access band 1820(α) connects to a respective dual WDM link 3310 carrying $\Omega$ dual spectral channels 3316 which connects to a respective spectral demultiplexer 3312 and a spectral multiplexer 3314. A dual WDM link 3310 connecting an access node 120 of an access group 420 of index x, $\alpha\times\Omega \le x \le (\alpha\times\Omega+\Omega-1)$, is referenced as 1310(x). A spectral demultiplexer connecting to dual WDM link 3310(x) is referenced as 3312(x). A spectral multiplexer connecting to dual WDM link 3310(x) is referenced as 3314(x).

Each access node 120 of access band 1820(β) connects to a respective dual WDM link 3320 carrying $\Omega$ dual spectral channels 3326 which connects to a respective spectral demultiplexer 3322 and a spectral multiplexer 3324. A dual WDM link 3320 connecting an access node 120 of an access group 420 of index γ, $\beta\times\Omega \le y \le (\beta\times\Omega+\Omega-1)$, is referenced as 3320(y). A spectral demultiplexer connecting to dual WDM link 3320(y) is referenced as 3312(y). A spectral multiplexer connecting to dual WDM link 3320(y) is referenced as 3314(y).

A spectral demultiplexer 3312(x) separates incoming channels of a WDM link 1310(x) into Q channels (upstream channels od dual channels 3316) each directed to a distributor of a respective set of distributors. Each of the $\Omega$ channels of an access node of access group of index x, $\alpha\times\Omega \le x \le (\alpha\times\Omega+\Omega-1)$, connects to a respective distributor D(x, y), $\beta\times\Omega \le y \le (\beta\times\Omega+\Omega-1)$. The spectral multiplexer 3314(x) combines $\Omega$ channels directed to an access node of the access group of index x, from distributors D(x, y), $\beta\times\Omega \le y \le (\beta\times\Omega+\Omega-1)$ to be transferred through WDM link 3310(x) to the access node.

Likewise, a spectral demultiplexer 3322(y) separates incoming channels of a WDM link 3320(y) into Q channels each directed to a distributor of a respective set of distributors. Each of the Q channels of an access node of access group of index y, $\beta\times\Omega \le y \le (\beta\times\Omega+\Omega-1)$, connects to a respective distributor D(x, y), $\alpha\times\Omega \le x \le (\alpha\times\Omega+\Omega-1)$. The spectral multiplexer 3324(y) combines $\Omega$ channels directed to an access node of the access group of index y from distributors D(x, y), $\alpha\times\Omega \le x \le (\alpha\times\Omega+\Omega-1)$ to be transferred through WDM link 3320(y) to the access node.

Figure 34:
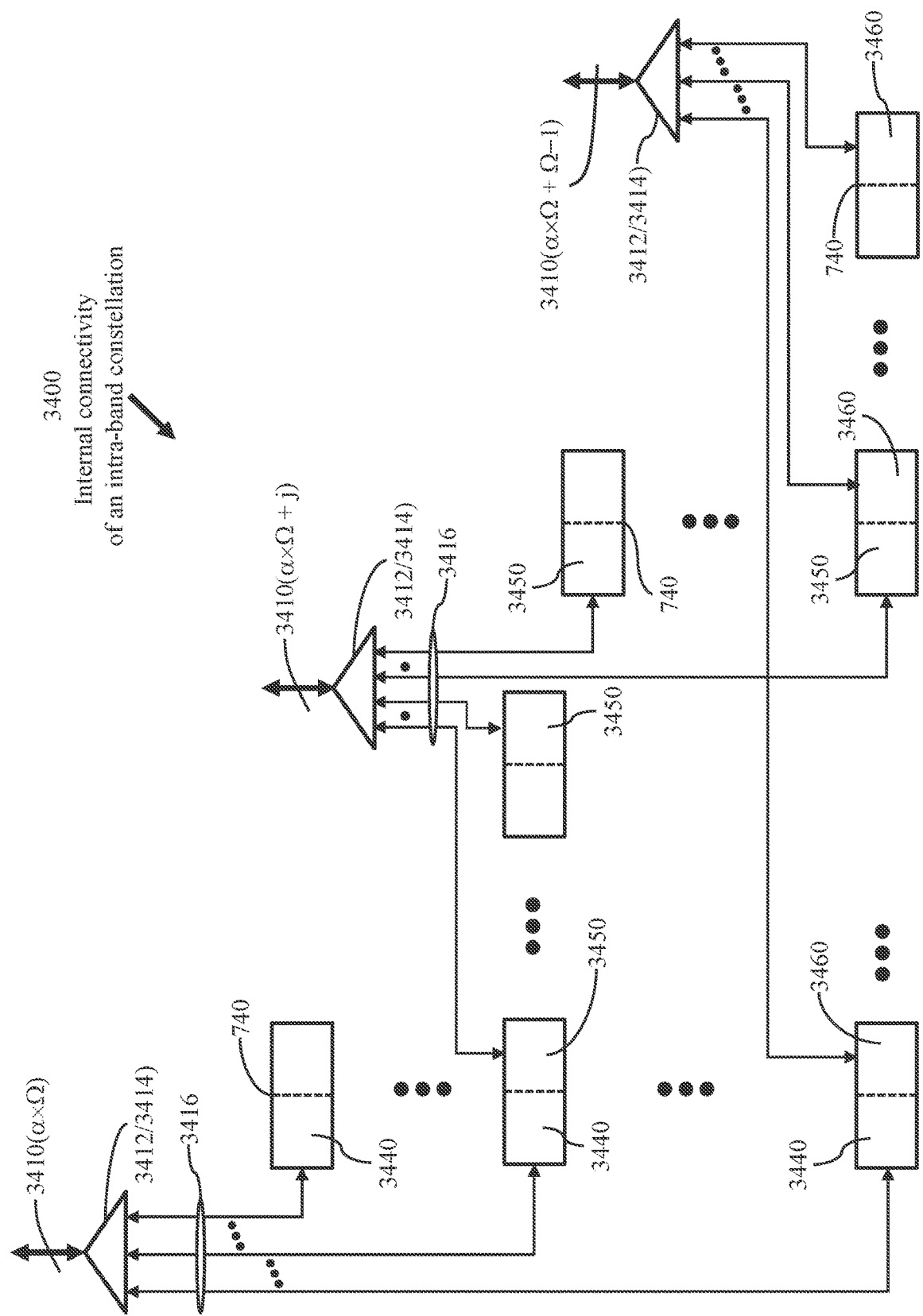
FIG. 34 illustrates internal connectivity of an intra-band constellation, in accordance with an embodiment of the present invention.

FIG. 34 illustrates an internal connectivity 3400 of an intra-band constellation 2120. An intra-band constellation 2120 connects each access node 120 of an access group of an access band to each access node 120 of each other access group of the same access band through a respective distributor 740. Each access node 120 of access band 1820(a), 0≤α<Π, connects to an intra-band constellation through a respective dual WDM link 3410 carrying (Ω−1) dual spectral channels which connects to a respective spectral demultiplexer 3412 and a spectral multiplexer 3414. A dual WDM link 3410 connecting an access node 120 of an access group 420 of index x, α×Ω≤x≤(α×Q+Ω−1), is referenced as 3410(x). A spectral demultiplexer connecting to dual WDM link 3410(x) is referenced as 3412(x). A spectral multiplexer connecting to dual WDM link 3410(x) is referenced as 3414(x). Access groups 420 of indices α×Ω, (α×Ω+j), and (α×Ω+Ω−1), identified as 3440, 3450, and 3460, respectively, connect to respective distributors 740 as indicated.

As described above, an intra-band constellation Q(α,α), 0≤α<Π, comprises distributors 740 connecting to access-group pairs of indices (j, k) for all integers j and k in the range α×Ω≤j<(α×Ω+Ω−1) and j<k<(α×Ω+Ω).

A spectral demultiplexer 3412(x) separates incoming channels of a WDM link 3410(x) into (Ω−1) channels each directed to a distributor of a respective set of distributors. Each of the (Ω−1) channels of an access node of access group of index x, α×Ω≤x≤(α×Ω+Ω−1), connects to one of distributors:

$$D(r, x), \alpha \times \Omega \le r < x, \text{ for } x \ne \alpha \times \Omega, \text{ and}$$

$$D(x, y), x < y \le (\alpha \times \Omega + \Omega - 1), \text{ for } x \ne (\alpha \times \Omega + \Omega - 1).$$

The spectral multiplexer 3414(x) combines (Ω−1) channels directed to an access node of the access group of index x, from the same distributors D(r, y) and D(x, y), to be transferred through WDM link 3410(x) to the access node.

Figure 35:
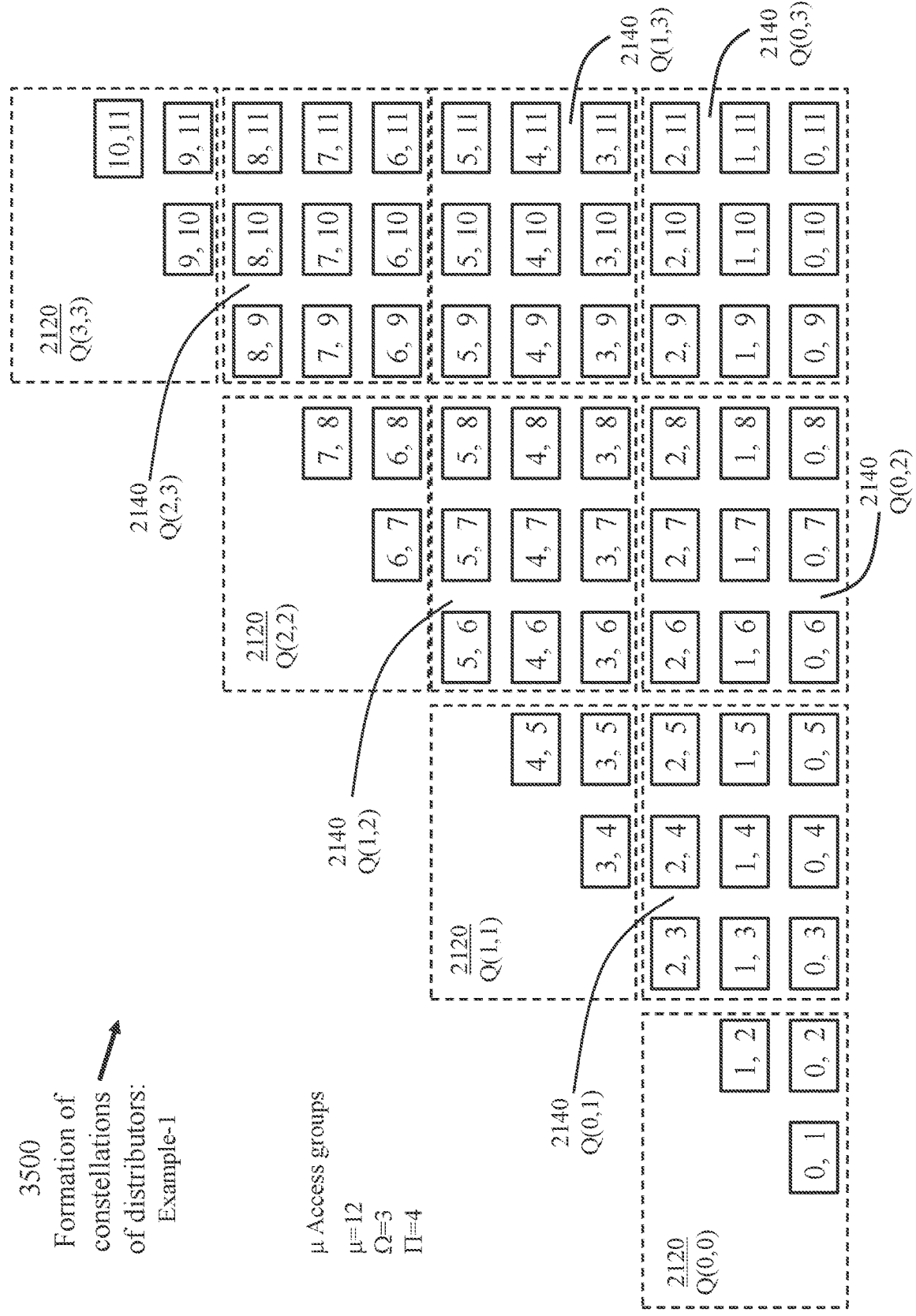
FIG. 35 illustrates a first example of constellations of distributors for a network comprising 12 access groups arranged into four access bands.

FIG. 35 illustrates a first example 3500 of constellations of distributors for a network comprising 12 access groups (μ=12) arranged into four access bands (Π=4). Indices of access-groups connecting to each distributor are indicted. The network comprises H intra-band constellations 2120, each comprises (Ω×(Ω−1))/2 distributors, and (Π×(Π−1))/2 inter-band constellations, each comprising Ω² distributors. The intra band distributors are labeled Q(0,0), Q(1,1), Q(2, 2), and Q(3,3). The inter-band distributors are labeled Q(0, 1), Q(0,2), Q(0,3), Q(1,2), Q(1,3), and Q(2,3). A distributor connecting to a first access group 420, comprising $m_1$ access nodes 120, and a second access group 420, comprising $m_2$ access nodes 120, comprises a distributing mechanism supporting at least ($m_1+m_2$) dual ports.

FIG. 36 illustrates a second example 3600 of constellations of distributors for a network comprising 12 access groups (μ=12) arranged into three access bands (Π=3). The network comprises three intra-band constellations 2120, labeled Q(0,0), Q(1,1), and Q(2,2), and three inter-band constellations 2140 labeled Q(0,1), Q(0,2), and Q(1,2).

FIG. 37 illustrates internal connectivity 3700 of the inter-band constellation of FIG. 33, with Ω=4, Π=3, α=0, and β=2. The inter-band constellation connects each access node 120 of an access band 1820(0), to each access node of access band 1820(2). With Ω=4, the constellation connects each access node 120 of each access group 420 of index x, 0≤x≤3, to each access node 120 of each access group of index y, 8≤y≤Π. Each access node 120 of access band 1820(0) connects to a respective dual WDM link 3310, carrying four dual spectral channels, which connects to a respective spectral demultiplexer 3312 and a spectral multiplexer 3314.

A spectral demultiplexer 3312(x), 0≤x≤3, separates incoming channels of a WDM link 3310(x) into four channels each directed to one of distributors D(x,8), D(x,9), D(x,10), and D(x,11). The spectral multiplexer 3314(x) combines four channels from distributors D(x,8), D(x,9), D(x,10), and D(x,11) to be transferred through WDM link 3310(x) to the access node.

Likewise, a spectral demultiplexer 3322(y), 8≤y≤11, separates incoming channels of a WDM link 3320(y) into four channels each directed to one of distributors D(0,y), D(1,y), D(2,y), and D(3,y). A spectral multiplexer 3324(y) combines four channels from distributors D(0,y), D(1,y), D(2,y), and D(3,y) to be transferred through WDM link 3320(y) to the access node.

For each value of x, 0≤x≤3, the illustrated spectral demultiplexer 3312(x), is one of $m_x$, $m_x$>1, spectral demultiplexers and the spectral multiplexer 3314(x) is one of $m_z$ spectral multiplexers connecting to $m_z$ access nodes 120 of an access group 420 of index x of the access band of index 0.

Figure 38:
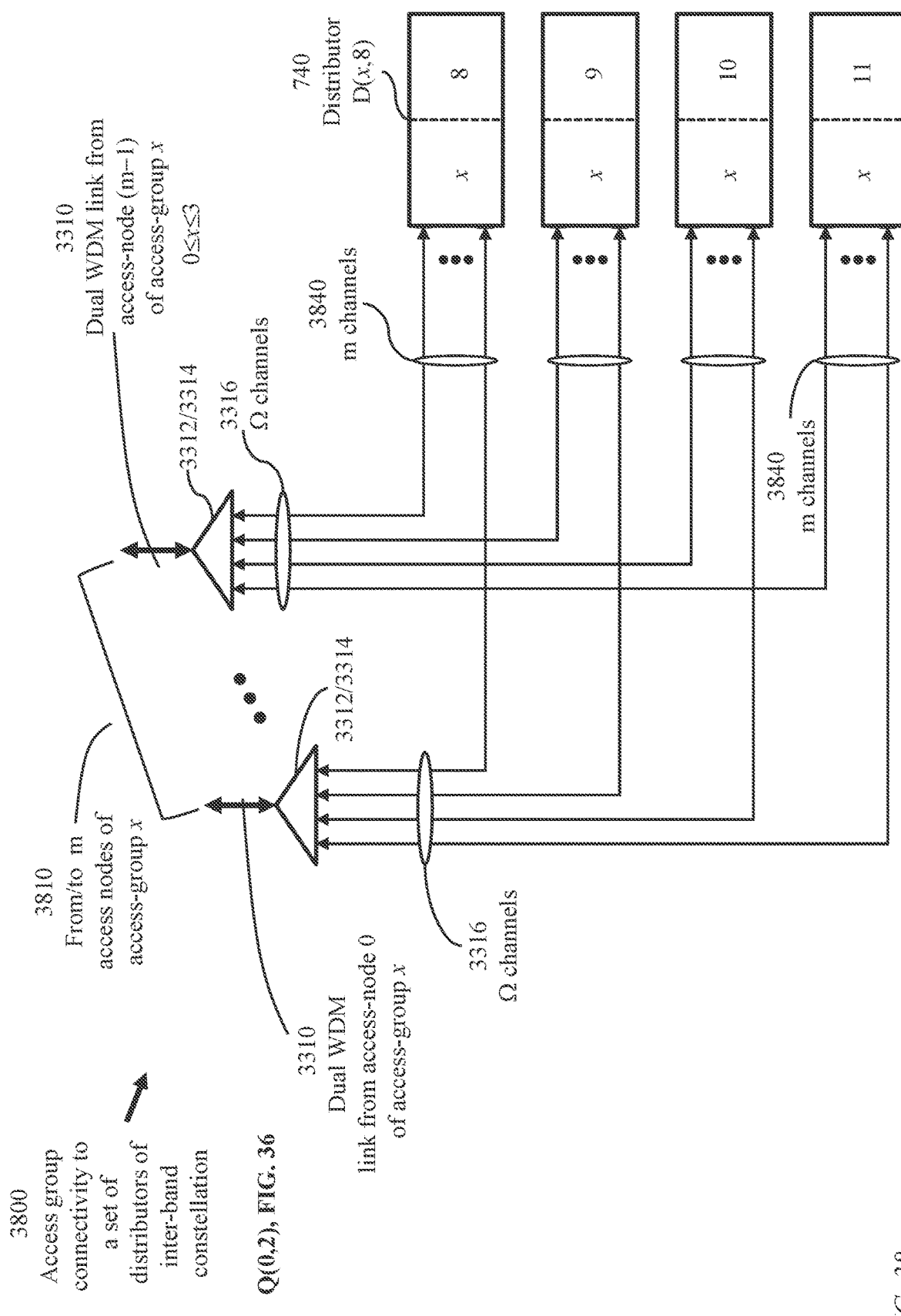
FIG. 38 illustrates connectivity of an access group of a first access band to respective distributors of the inter-band constellation of FIG. 37.

FIG. 38 illustrates access-group connectivity 3800 of an access-group of a first access band to distributors of an inter-band constellation Q(0,2), with Ω=4 (FIG. 36). Each dual WDM link of a set 3810 of m dual WDM links 3310 from access nodes 120 of an access group 420 of the first access band carries Ω dual channels. Each dual link 3310 connects to a spectral demultiplexer 3312 which separates the Ω upstream channels and directs each upstream channel to one of Ω distributors 740 individually identified as D(x,8), D(x,9), D(x,10), and D(x,11), 0≤x<4. Each spectral multiplexer 3314 combines channels from distributors D(x, 8), D(x,9), D(x,10), and D(x,11), 0≤x<4, to form a WDM signal to be transmitted to a respective access node of the access group of the first access band. Thus, each of distributors D(x,8), D(x,9), D(x,10), and D(x,11) connects to m dual channels 3840, one dual channel from/to each of the access nodes of the access group.

Figure 39:
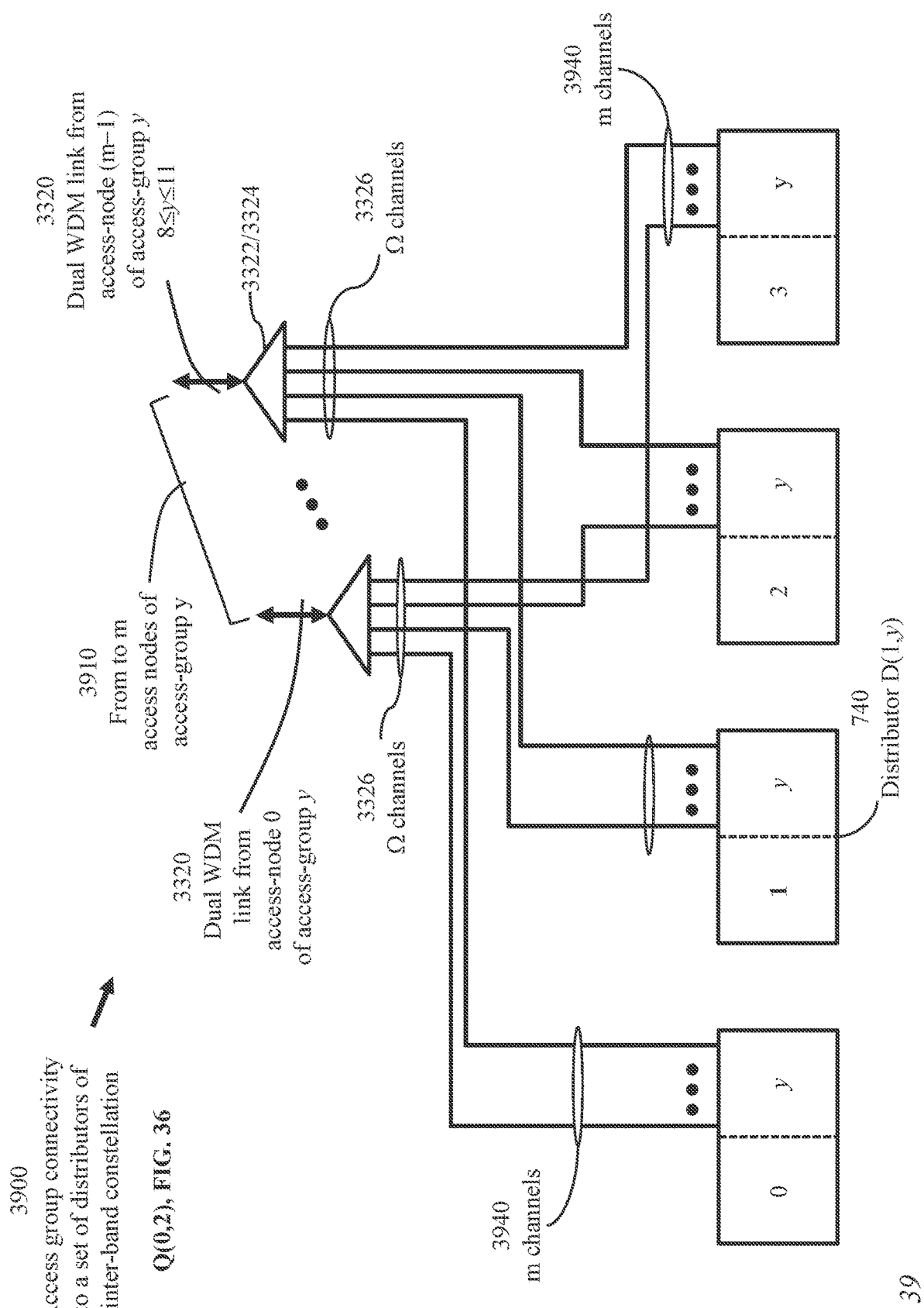
FIG. 39 illustrates connectivity of an access group of a second access band to respective distributors of the inter-band constellation of FIG. 37.

FIG. 39 illustrates access-group connectivity 3900 of an access-group of a second access band to distributors of the inter-band constellation Q(0,2), with Ω=4 (FIG. 36). Each dual WDM link of a set 3910 of m dual WDM links 3320 from access nodes 120 of an access group 420 of the second access band carries Ω dual channels. Each dual link 3320 connects to a spectral demultiplexer 3322 which separates the Ω upstream channels and directs each upstream channel to one of Ω distributors 740 individually identified as D(0,y), D(1,y), D(2,y), and D(3,y), 8≤y<12. Each spectral multiplexer 3324 combines channels from distributors D(0, y), D(1,y), D(2,y), and D(3,y), 8≤y<12, to form a WDM signal to be transmitted to a respective access node of the access group of the second access band. Thus, each of distributors D(0,y), D(0,y), D(0,y), and D(0,y), connects to m dual channels 3940, one dual channel from/to each of the access nodes of the access group.

Figure 40:
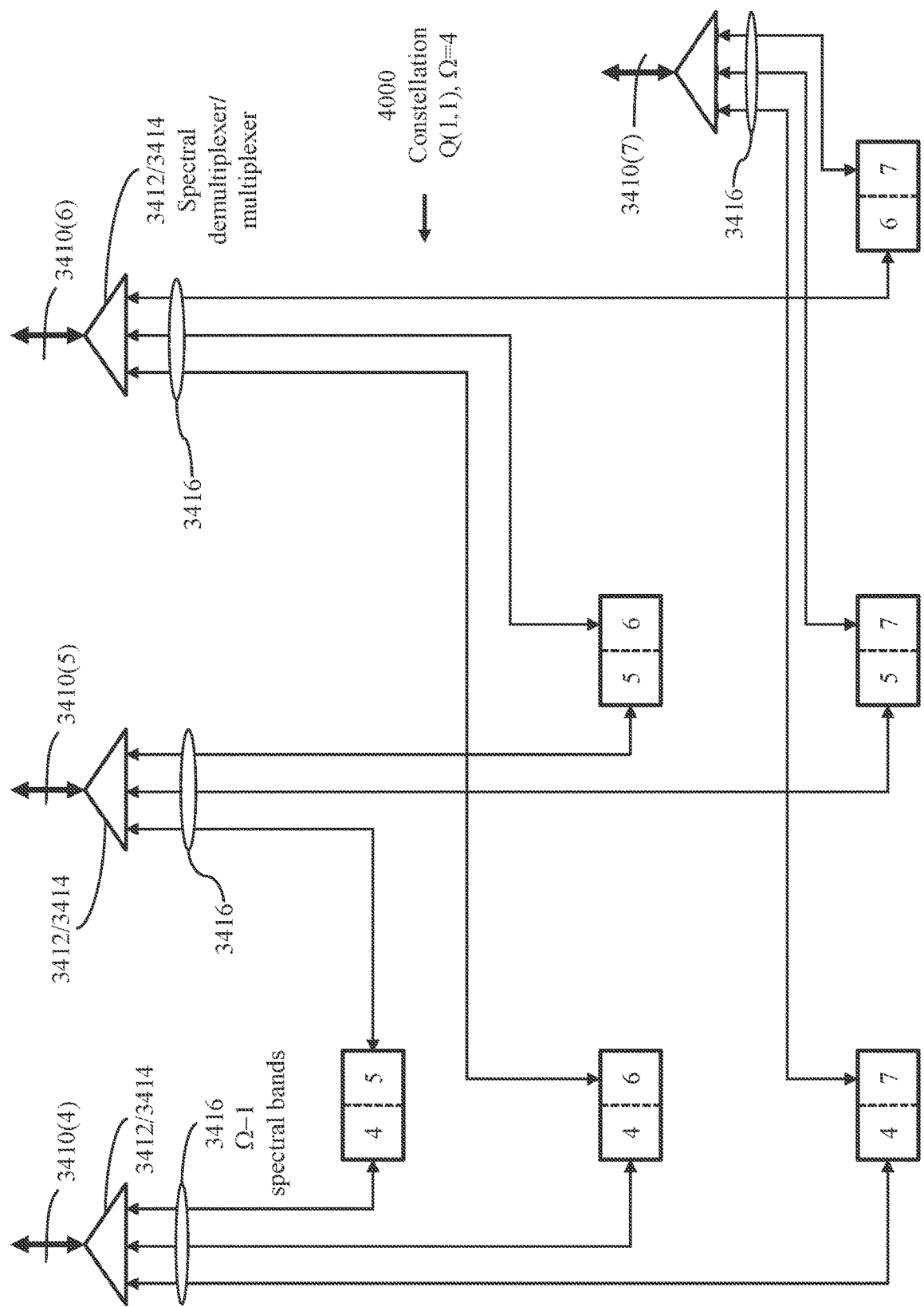
FIG. 40 illustrates internal connectivity of a specific intra-band constellation, in accordance with an embodiment of the present invention.

FIG. 40 illustrates internal connectivity 4000 of intra-band constellation for Ω=4, Π=3, and α=1 (Q(1,1), FIG. 36). The intra-band constellation connects each access node 120 of each access group 420 of access band 1820(1) to each access node 120 of each other access group 420 of the same access band.

Each access node 120 of access band 1820(1) connects to an intra-band constellation through a respective dual WDM link 3410 carrying (Ω−1) dual spectral channels which connects to a respective spectral demultiplexer 3412 and a respective spectral multiplexer 3414. Intra-band constellation Q(1,1) comprises distributors D(x,y) for all integers x and y in the range 4≤x<7 and x<y<8.

A spectral demultiplexer 3412(x) separates incoming channels of a WDM link 3410(x) into (Ω−1) channels each directed to a distributor of a respective set of distributors. Each of the (Ω−1) channels of an access node of access group of index x, α×Ω≤x≤(α×Ω+Ω−1), connects to one of distributors:

$$D(r, x), \alpha \times \Omega \le r < x, \text{ for } x \ne \alpha \times \Omega, \text{ and}$$

$$D(x, y), x < y \le (\alpha \times \Omega + \Omega - 1), \text{ for } x \ne (\alpha \times \Omega + \Omega - 1).$$

A spectral multiplexer 3414(x) combines (Ω−1) channels directed to an access node of the access group of index x, from the same distributors D(r, x) and D(x, y), to be transferred through WDM link 3410(x) to the access node.

For x=4, 4<y≤7, each of (Ω−1) channels 3416 connects to one of distributors D(4,5), D(4,6), and D(4,7).

For x=5, 5<y≤7, each of (Ω−1) channels 3416 connects to one of distributors D(4,5), D(4,6), and D(4,7).

For x=6, 6<y≤7, each of (Ω−1) channels 3416 connects to one of distributors D(4,6), D(5,6), and D(6,7).

For x=7, each of (Ω−1) channels 3416 connects to one of distributors D(4,7), D(5,7), and D(6,7).

FIG. 41 illustrates internal connectivity 4100 of a large-scale inter-band constellation 2140, Q(2,11), Ω=32, Π>11. The inter-band constellation 2140 connects each access node 120 of a first access band of index 2 (α=2) to each access node of a second access band of index 11 (β=11) through a respective distributor 740. The inter-band constellation connects each access node 120 of each access group of index x, 64≤x≤95, to each access node 120 of each access group of index γ, 352≤y≤383.

A spectral demultiplexer 3312(x), 64≤x≤95, separates incoming channels of a WDM link from an access node of the first access band into Ω channels each directed to a distributor of a respective set of distributors. Each of the Ω channels of an access node of access group of index x connects to a respective distributor D(x, y), 352≤y≤383.

The spectral multiplexer 3314(x) combines Ω channels directed to an access node, of the access band of index 2, from distributors of a respective set of distributors to be transferred through a WDM link 3310 directed to the access node.

Likewise, a spectral demultiplexer 3322(y) separates incoming channels from an access node of the second access band into Ω channels each directed to a distributor of a respective set of distributors. Each of the Ω channels of an access node of access group of index y, 352≤y≤383, connects to a respective distributor D(x, y), 64 5×5 95. The spectral multiplexer 3324(y) combines Ω channels directed to an access node, of the access band of index 11, from distributors of a respective set of distributors to be transferred through a WDM link 3320 directed to the access node.

Figure 42:
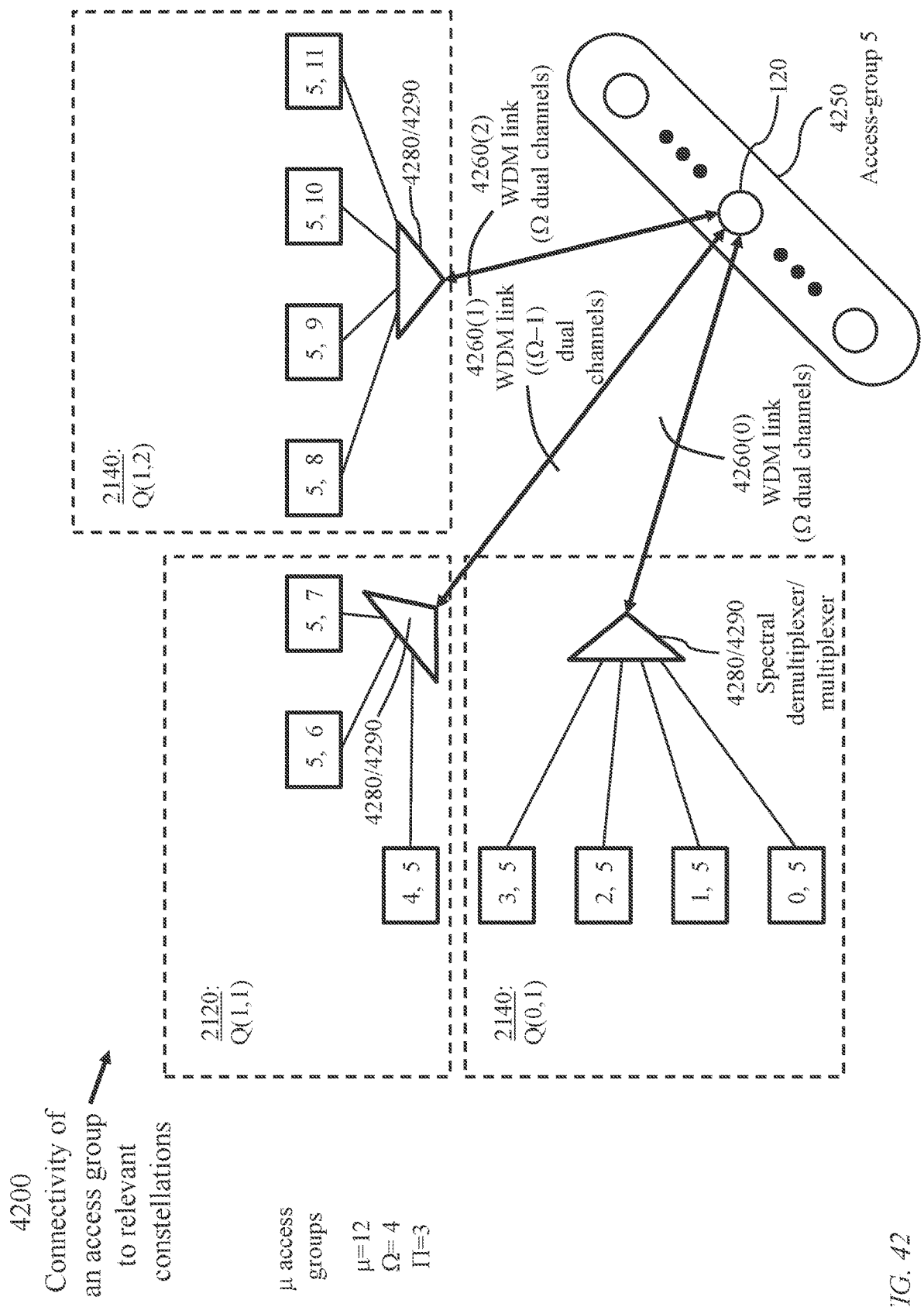
FIG. 42 illustrates connectivity of an access group to relevant constellations, in accordance with an embodiment of the present invention.

FIG. 42 details connectivity 4200 of an access group to relevant constellations of the network of FIG. 36 which comprises 12 access groups 420 (μ=12) arranged into three access bands (Π=3), each access band comprising four access groups 420 (Ω=4). As indicated in FIG. 36, access group 420(5) connects to (μ−1) distributors D(0,5), D(1,5), D(2,5), D(3,5), D(4,5), D(5,6), D(5,7), D(5,8), D(5,9), D(5,10), and D(5,11) which span three constellations: 2140 labeled Q(0,1), 2120 labeled Q(1,1), and 2140 labeled Q(1,2). Each access node 120 of access group 420(5) connects to each of the (μ−1) distributors. The illustrated access node 120x has Π dual WDM links 4260(0), 4260(1), and 4260(2) to the three constellations. Each of dual WDM links 4260(0) and 4260(2) connecting to inter-band constellations 2140 labeled Q(0,1) and Q(1,2) carries Ω dual channels. Dual WDM link 4260(1) to intra-band constellation 2120 labeled Q(1,1) carries (Ω−1) dual spectral channels.

Spectral demultiplexer 4280 of constellation Q(0,1) separates the Ω upstream spectral channels of dual WDM link 4260(0) and directs each channel to an input port of one of distributors D(0,5), D(1,5), D(2,5), and D(3,5). Spectral multiplexer 4290 of constellation Q(0,1) combines the Ω downstream spectral channels, each emanating from an output port of one of distributors D(0,5), D(1,5), D(2,5), and D(3,5), into the dual WDM link 4260(0).

Likewise, spectral demultiplexer 4280 of constellation Q(1,1) separates the (Ω−1) upstream spectral channels of dual WDM link 4260(1) and directs each channel to an input port of one of distributors D(4,5), D(5,6), and D(5,7). Spectral multiplexer 4290 of constellation Q(1,1) combines the (Ω−1) downstream spectral channels, each emanating from an output port of one of distributors D(4,5), D(5,6), and D(5,7), into the dual WDM link 4260(1). Spectral demultiplexer 4280 of constellation Q(1,2) separates the Ω upstream spectral channels of dual WDM link 4260(2) and directs each channel to an input port of one of distributors D(5,8), D(5,9), D(5,10), and D(5,11). Spectral multiplexer 4290 of constellation Q(1,2) combines the Ω downstream spectral channels, each emanating from an output port of one of distributors D(5,8), D(5,9), D(5,10), and D(5,11), into the dual WDM link 4260(2).

Figure 43:
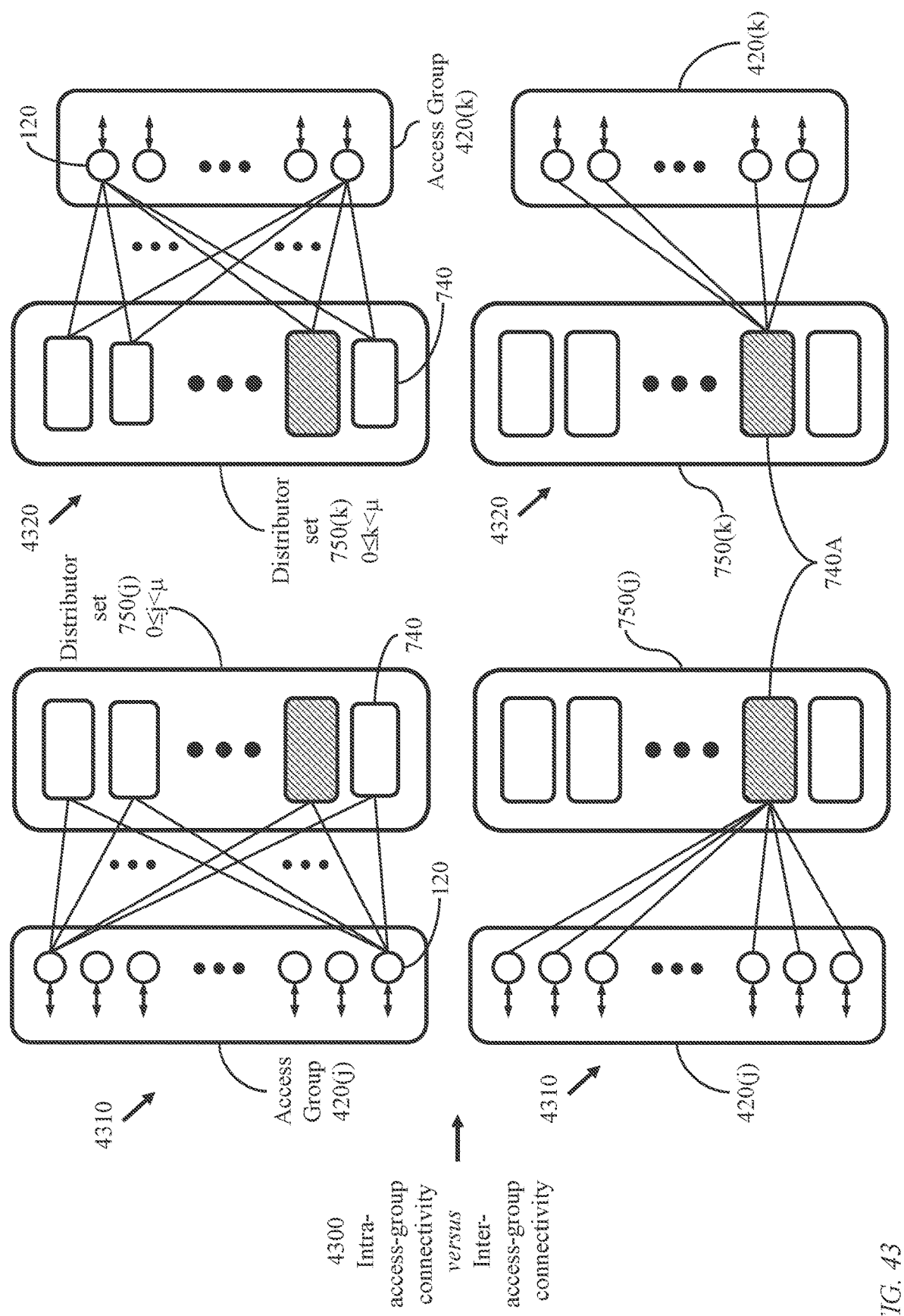
FIG. 43 illustrates multiple paths, each traversing a single distributor, from a first access node to a second access node of the same access group and a path, traversing a single distributor, from the first access node to a third access node of a different access group, in accordance with an embodiment of the present invention.

FIG. 43 illustrates paths 4300 through a pair of fused three-stage networks. A first three-stage network 4310 comprises an access group 420(j) of access nodes interconnecting through a distributor set 750(j), 0≤j<μ. A second three-stage network 4320 comprises an access group 420(k) of access nodes interconnecting through a distributor set 750(k), 0≤k<μ, j≠k. The two networks 4310 and 4320 have a common distributor 740A. Any access node 120 of access group 420(j) may transfer data to any other access node 120 of access group 420(j) through any of (μ−1) distributors of distributor set 750(j). Likewise, any access node 120 of access group 420(k) may transfer data to any other access node 120 of access group 420(k) through any of (μ−1) distributors of distributor set 750(k). Any access node 120 of access group 420(j) may transfer data to any access node of access group 420(k), and vice versa, through the common distributor 740A. Since each pair of distributor sets 750 of the entire network has a respective common distributor (Table-I, above), each access node of the network has a path to each other access node traversing a respective single distributor.

Figure 44:
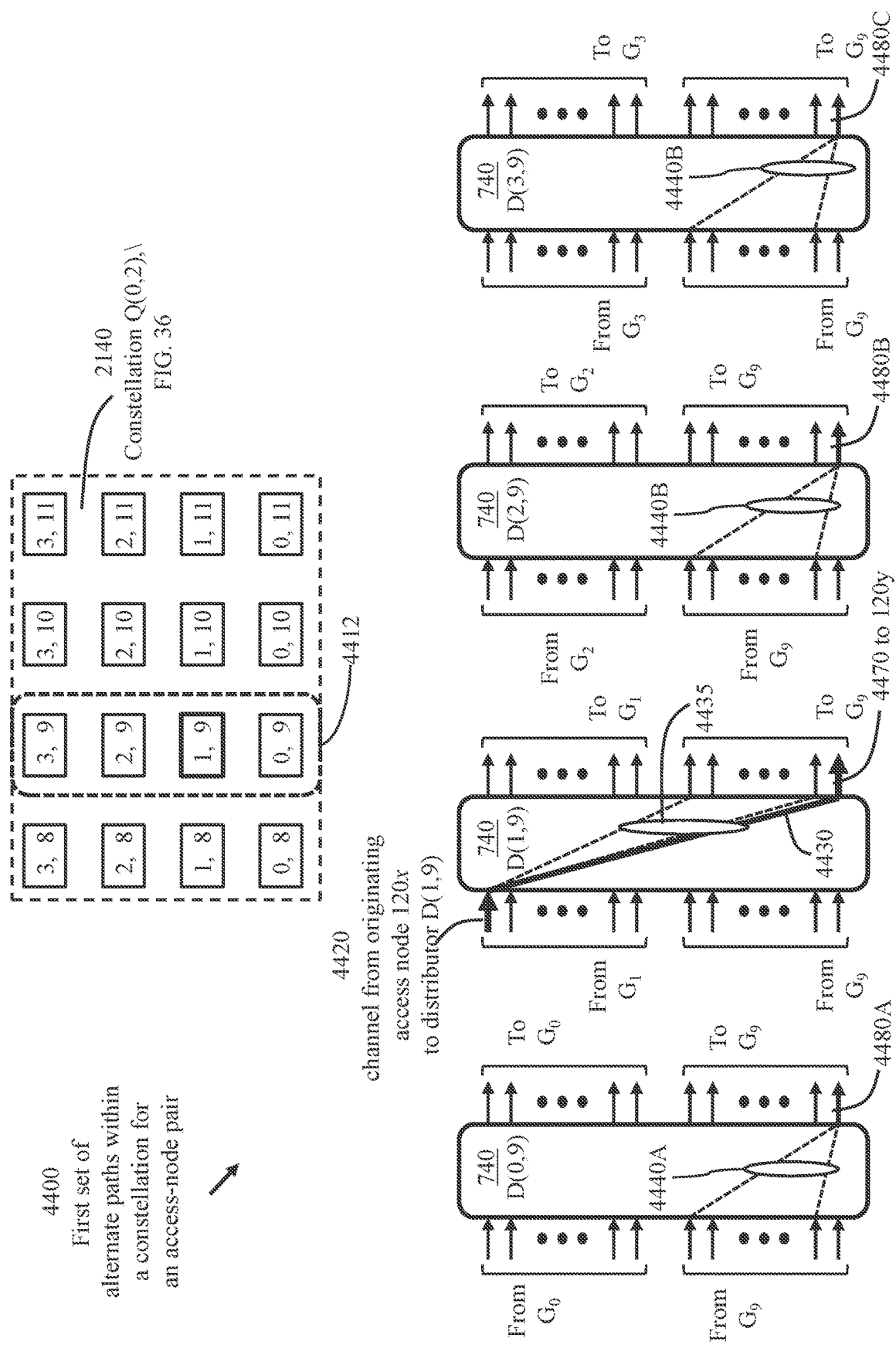
FIG. 44 illustrates a set of alternate paths within an inter-band constellation for a specific pair of access nodes, in accordance with an embodiment of the present invention.

FIG. 44 illustrates a set 4400 of alternate paths for a specific pair of access nodes within an inter-band constellation 2140. Constellation 2140, Q(0,2) of the arrangement of constellations of FIG. 36, connects to access band 1820(0), which contains access groups 420 of indices 0, 1, 2, and 3, and access band 1820(2), which contains access groups 420 of indices 8, 9, 10, and 11. Each distributor within constellation Q(0,2) connects to an access group 420 of access band 1820(0) and an access group of access band 1820(2). Distributor D(1,9) connects to $m_1$ dual channels, each connecting to a respective access node of access group 420(1), denoted $G_1$, and $m_j$ dual channels, each connecting to a respective access node of access group 420(9), denoted $G_9$, $m_j$ being the number of access nodes of an access group 420 of index j; $m_j > 1$, $0 \le j < \mu$. Distributor D(1,9) provides a path from any access node 120 of access groups $G_1$ and $G_9$ to any access node 120 of access groups $G_1$ and $G_9$. As illustrated, an access node 120x of access group $G_1$ connects to an access node 120y of access group $G_9$ traversing distributor D(1,9). Networkwide, each access node of any access group has a path to each access node of each other access group traversing only one distributor. Each access node has ($\mu-1$) parallel paths, each traversing one distributor, to each other access node within a same access group.

Figure 45:
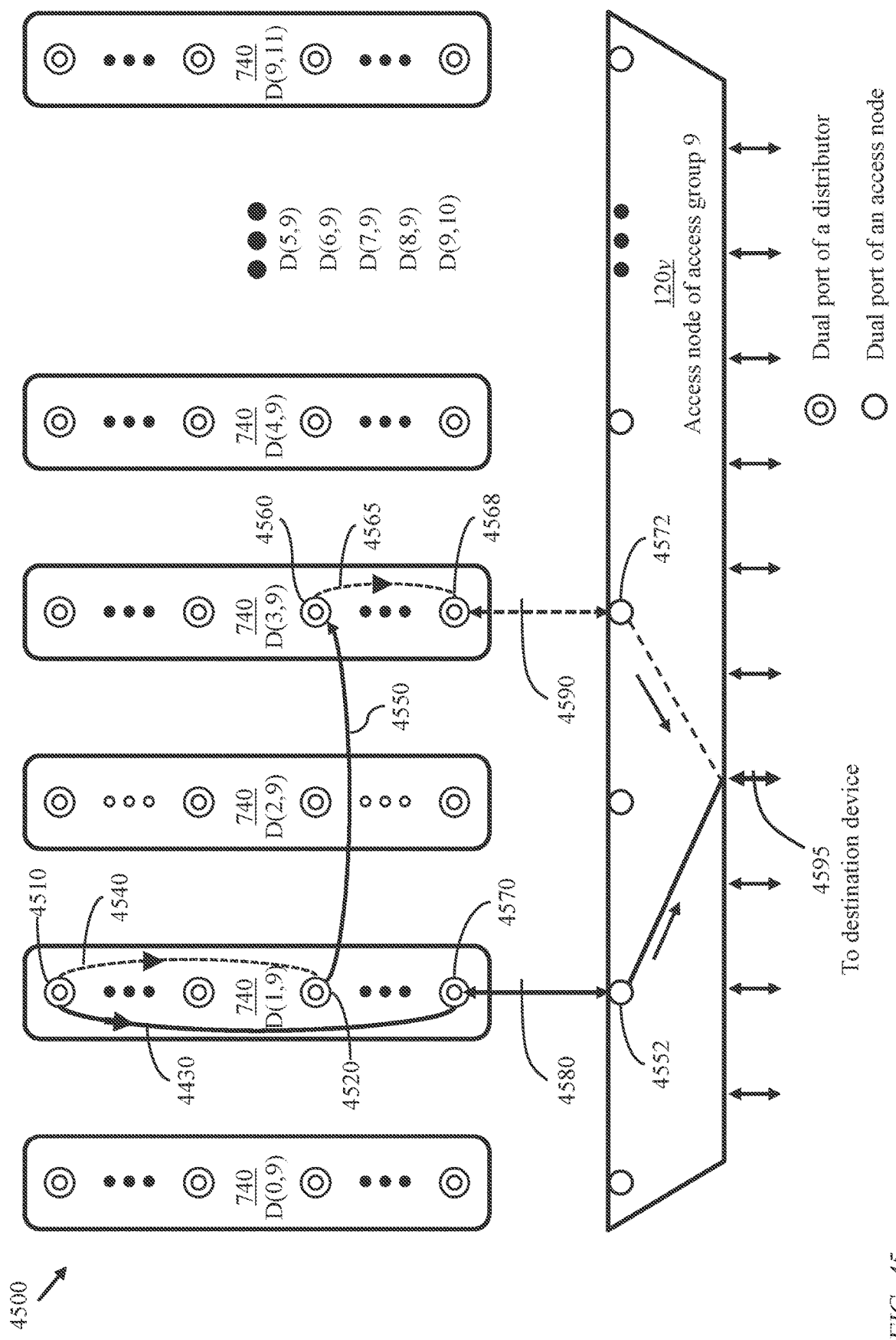
FIG. 45 details a path of the set of alternate paths of FIG. 44.
Figure 46:
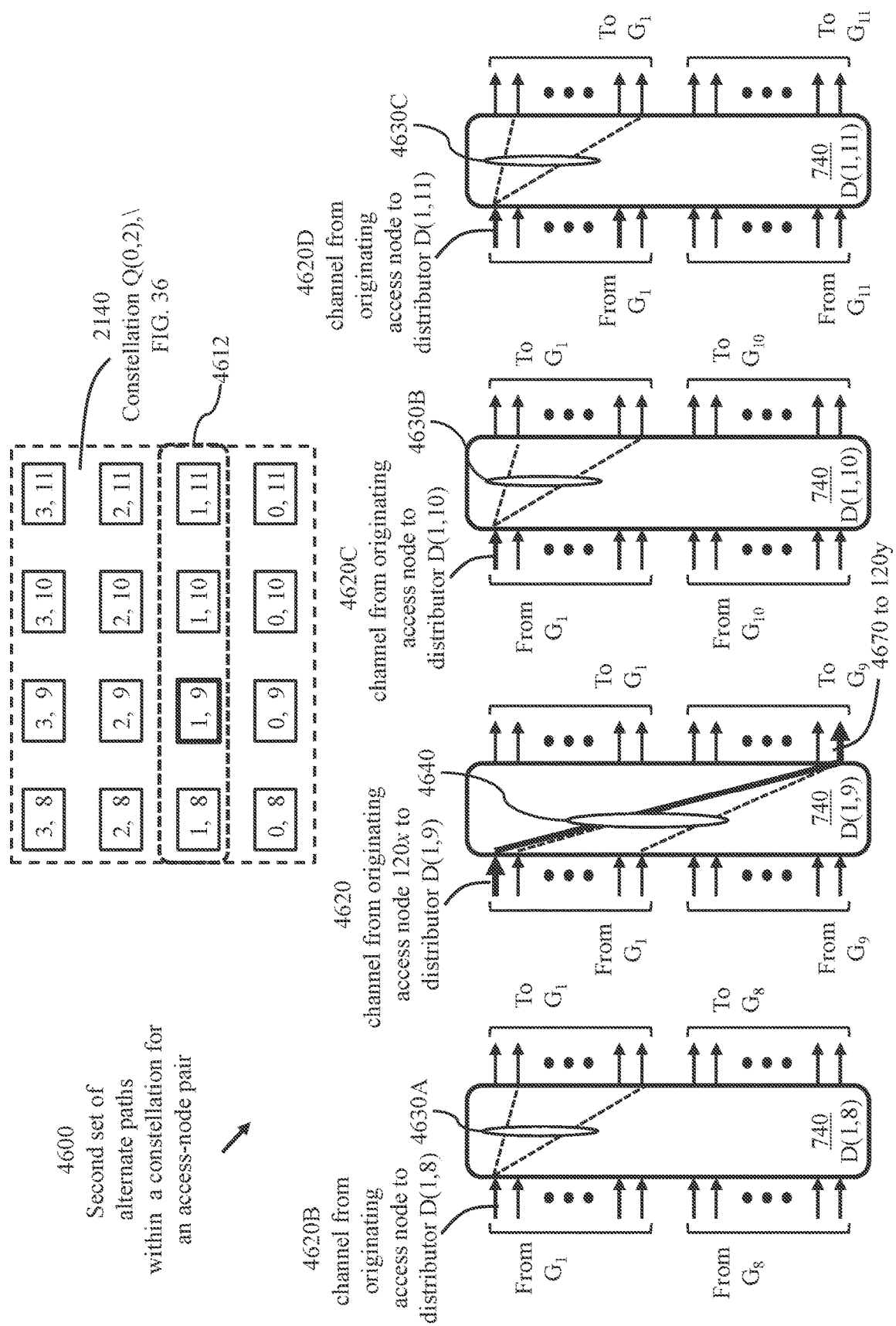
FIG. 46 illustrates another set of alternate paths within the inter-band constellation for the specific pair of access nodes, in accordance with an embodiment of the present invention.
Figure 47:
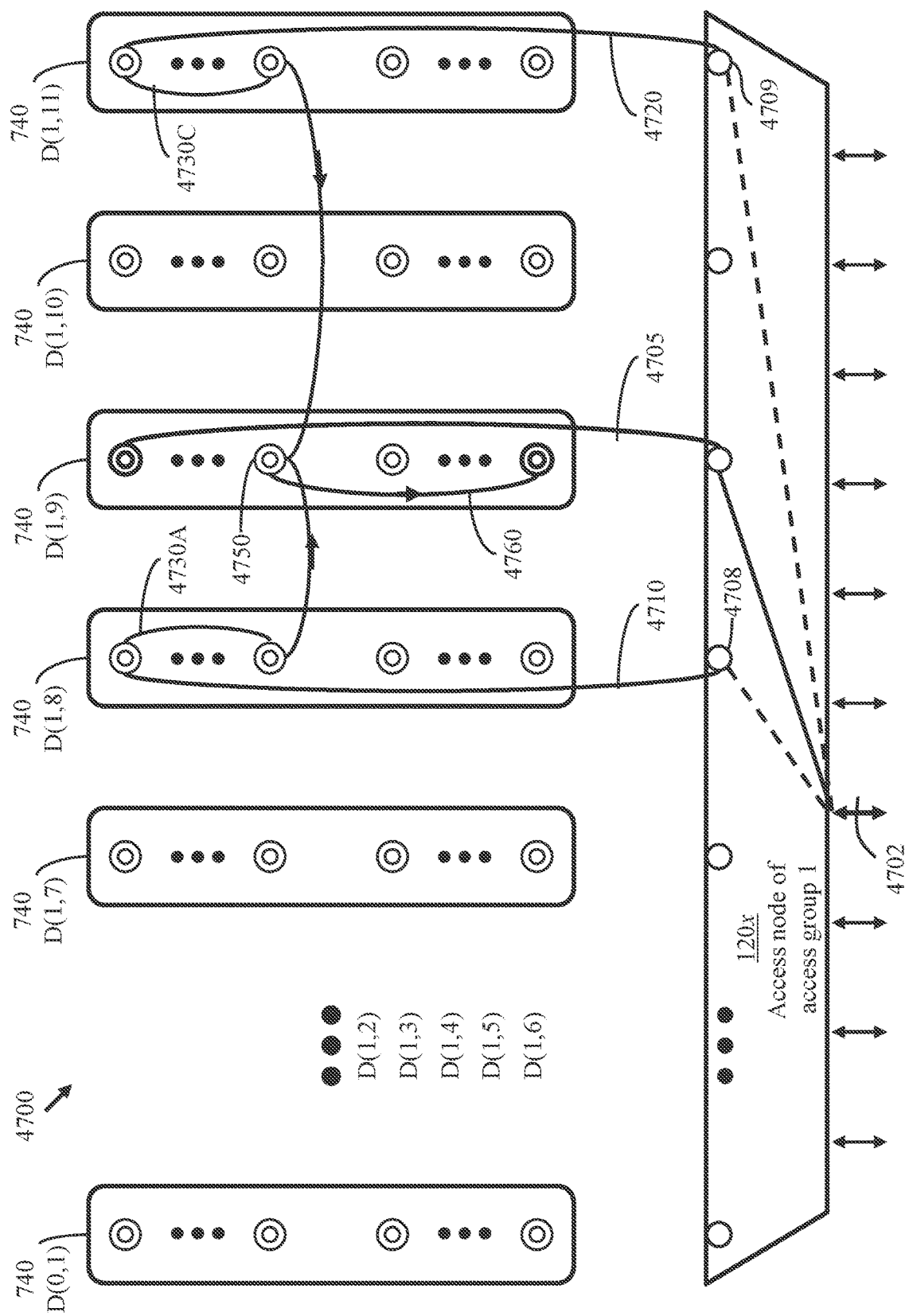
FIG. 47 details two paths of the set of alternate paths of FIG. 46.
Figure 48:
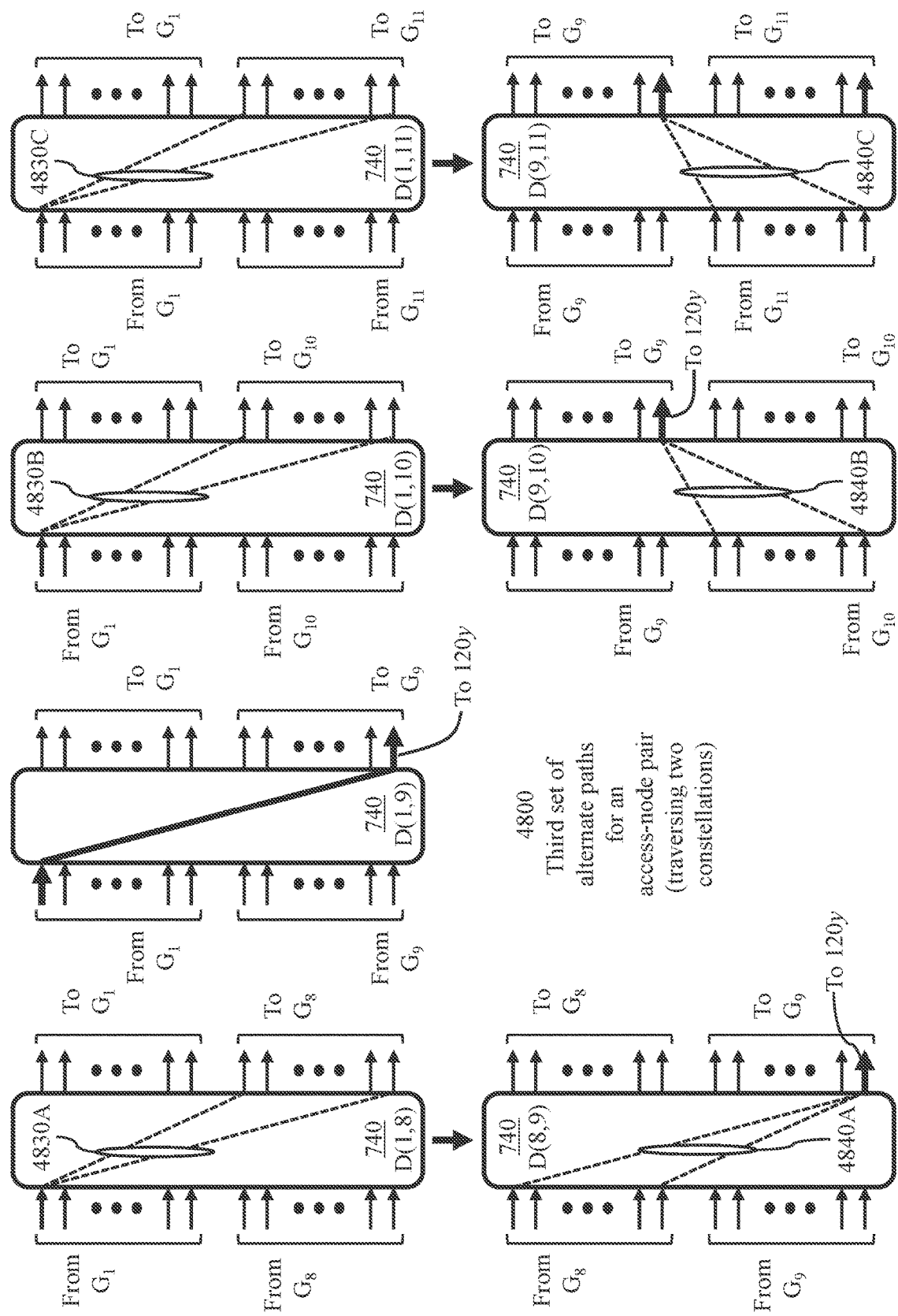
FIG. 48 illustrates a set of alternate paths traversing two constellations for a specific pair of access nodes.
Figure 49:
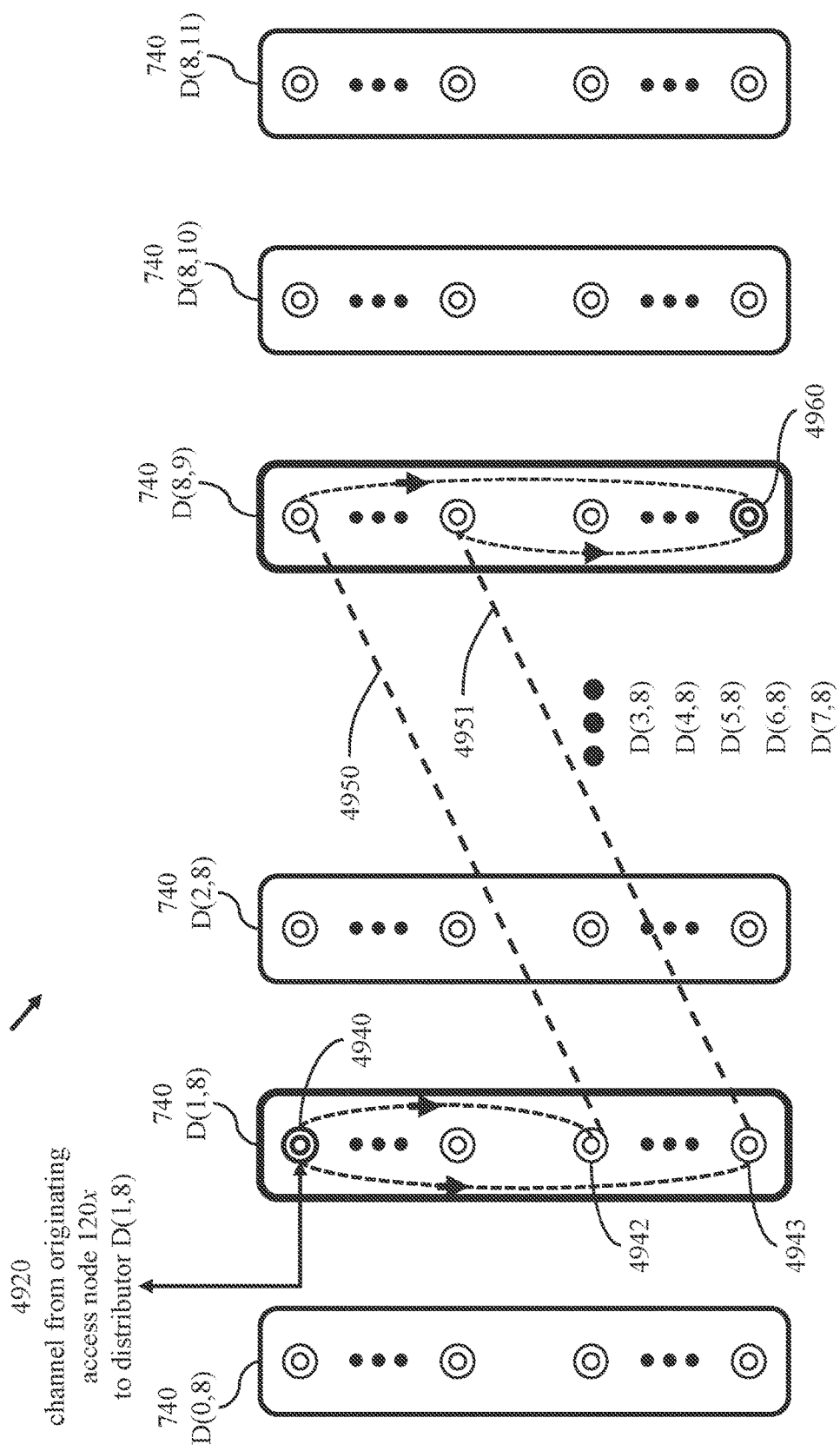
FIG. 49 details two paths traversing a first distributor pair of the set of alternate paths of FIG. 48.
Figure 50:
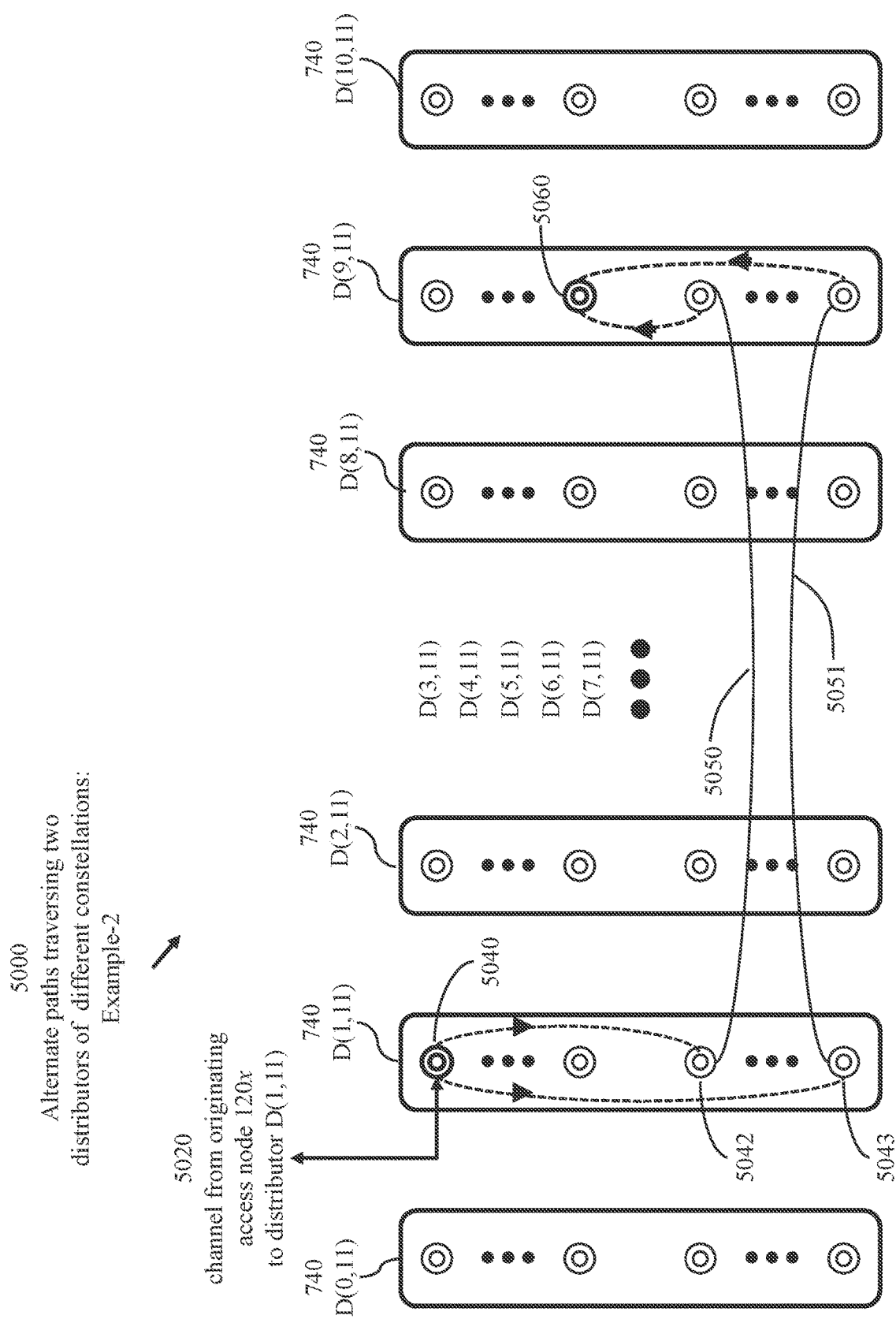
FIG. 50 details two paths traversing a second distributor pair of the set of alternate paths of FIG. 48.

With spatial data-traffic-rate imbalance, a proportion of data traffic for an access-node pair may be transferred through an alternate path traversing two distributors which may belong to one constellation or two constellations. FIG. 44 and FIG. 45 illustrate a case of alternate paths through a first subset of distributors of constellation Q(0,2). FIG. 46 and FIG. 47 illustrate a case of alternate paths through a second subset of distributors of constellation Q(0,2). FIG. 48, FIG. 49 and FIG. 50 illustrate a case of alternate paths through constellations Q(0,2) and Q(2,2).

Path 4430 connecting access node 120x to access node 120y through distributor D(1,9) may be unavailable due to:
(i) the channel 4470 to access node 120y being fully occupied with data from other access nodes of access group $G_1$ or access group $G_9$;
(ii) the channel 4420 from access node 120x being fully occupied with data directed to other access nodes of access-group $G_1$ or access-group $G_9$;
(iii) the flow rate from access-node 120x to access-node 120y exceeding the capacity of a single spectral channel (of 20 Gb/s, for example); or
(iv) internal temporal vacancy mismatch of the incoming channel 4420 from access-node 120x and outgoing channel 4470 to access-node 120y.

For case (i), access node 120x has paths to all access nodes 120 connecting to distributor D(1,9). Each access node 120 of access group 420(9) has a path to each of ($\mu-1$) distributors D(0,9), D(1,9), D(2,9), D(3,9), D(4,9), D(5,9), D(6,9), D(7,9), D(8,9), D(9,10), and D(9,11), as illustrated in FIG. 36, of which the subset 4412 of distributors D(0,9), D(1,9), D(2,9), and D(3,9) belongs to constellation Q(0,2). Thus, access node 120x of access group 420(1) may establish any of multiple compound paths to access node 120y through distributors D(0,9), D(1,9), D(2,9), and D(3,9) of constellation Q(0,2), or through any of distributors D(4,9), D(5,9), D(6,9), D(7,9), D(8,9), D(9,10), and D(9,11) of constellations Q(1,2) and Q(2,2).

Paths 4435 through D(1,9) connect access node 120x of access group $G_1$ to ports connecting to access group $G_9$. Any of internal paths 4440A through distributor D(0,9) connects an access node 120 of access group $G_9$ to a port having a channel 4480A to access node 120y of access group $G_9$.

Any of internal paths 4440B through distributor D(2,9) connects an access node 120 of access group $G_9$ to a port having a channel 4480B to access node 120y of access group $G_9$. Any of internal paths 4440C through distributor D(3,9) connects an access node 120 of access group $G_9$ to a port having a channel 4480C to access node 120y of access group $G_9$.

FIG. 45 illustrates alternat-paths details 4500. A path 4430 through D(1,9) connects access node 120x of access group $G_1$ to access node 120y of access group $G_9$. A dual port 4510 of distributor D(1,9) connects to channel 4420 from originating access node 120x. A dual port 4570 of distributor D(1,9) connects to dual channel 4480 to a dual port 4552 of destination access node 120y. A dual channel 4595 connects destination access node 120y to a destination device.

Any of the distributors of FIG. 45, other than distributor D(1,9) may be used to complete a compound path from originating access-node 120x of access group $G_1$ to destination access node 120y of access-group $G_9$. A compound path traversing distributor D(1,9) and distributor D(3,9) to destination access node 120y is illustrated. A path 4435 through D(1,9) connects access node 120x of access group $G_1$ to an intermediate dual port 4520 of distributor D(1,9). A path 4550 through an intermediate access node connects dual port 4520 to a dual port 4560 of distributor D(3,9). A path 4565 through distributor D(3,9) transfers signals to dual port 4568 which connects to a dual port 4572 of destination access node 120y through channel 4590.

For case (ii), FIG. 46 illustrates alternate paths from access node 120x to access node 120y. Access node 120x of access group 420(1) has paths to each of ($\mu-1$) distributors D(0,1), D(1,2), D(1,3), D(1,4), D(1,5), D(1,6), D(1,7), D(1,8), D(1,9), D(1,10), and D(1,11), as illustrated in FIG. 36 of which the subset 4612 of distributors D(1,8), D(1,9), D(1,10), and D(1,11) belongs to constellation Q(0,2). Thus, access node 120x may establish any of multiple compound paths to access node 120y through distributors D(1,8), D(1,9), D(1,10), and D(1,11) of constellation Q(0,2), or through any of distributors D(0,1), D(1,2), D(1,3), D(1,4), D(1,5), D(1,6), and D(1,7), of constellations Q(0,0) and Q(0,1).

Any of internal paths 4630A through distributor D(1,8) connects originating access node 120x of access group $G_1$ to an access node of access group $G_1$. Likewise, any of internal paths 4630B through distributor D(1,10) connects originating access node 120x to an access node of access group $G_1$. Any of internal paths 4630C through distributor D(1,11) connects originating access node 120x to an access node of access group $G_1$. Any of internal paths 4640 through distributor D(1,9) connects an access node of access group G1 to destination access node 120y of access group G9.

FIG. 47 details two paths 4700 of the set of alternate paths of FIG. 46. Originating access node 120x of access group 420(1) has a path to each of the ($\mu-1$) distributors illustrated in FIG. 47 of which the subset 4612 of distributors D(1,8), D(1,9), D(1,10), and D(1,11) belongs to constellation Q(0,2).

Source access-node 120x connects to a dual port of distributor D(1,8) through dual channel 4710. An internal path 4730A (one of paths 4630A) connects access node 120x to an intermediate port of distributor D(1,8) which connects to a corresponding port 4750 of distributor D(1,9) through an intermediate access node. An internal path 4760 through distributor D(1,9) leads to a port connecting to destination access node 120y.

Likewise, source access-node 120x connects to a dual port of distributor D(1,11) through dual channel 4720. An internal path 4730C (one of paths 4630C) connects access node 120x to an intermediate port of distributor D(1,11) which connects to port 4750 of distributor D(1,9) through an intermediate access node. Internal path 4760 through distributor D(1,9) leads to the port connecting to destination access node 120y.

FIG. 48 illustrates a set 4800 of alternate paths traversing two constellations for the specific pair of access nodes 120x and 120y. Originating access node 120x of access group 420(1) has paths to ($\mu-1$) distributors D(0,1), D(1,2), D(1,3), D(1,4), D(1,5), D(1,6), D(1,7), D(1,8), D(1,9), D(1,10), and D(1,11).

Internal paths 4830A through a distributor D(1,8) connect originating access node 120x to all access nodes 120 of access-group $G_8$. Internal paths 4840A through distributor D(8,9) of intra-band constellation Q(2,2) of FIG. 36 connect all access nodes 120 of access-group $G_8$ to destination access node 120y.

Internal paths 4830B through a distributor D(1,10) connect originating access node 120x to all access nodes 120 of access-group $G_{10}$. Internal paths 4840B through distributor D(9,10) of intra-band constellation Q(2,2) of FIG. 36 connect all access nodes 120 of access-group $G_{10}$ to destination access node 120y.

Internal paths 4830C through a distributor D(1,11) connect originating access node 120x to all access nodes 120 of access-group $G_{11}$. Internal paths 4840C through distributor D(9,11) of intra-band constellation Q(2,2) of FIG. 36 connect all access nodes 120 of access-group $G_{11}$ to destination access node 120y.

Other alternate paths may be established through distributor pairs: {D(0,1), D(0,9)}, {D(1,2), D(2,9)}, {D(1,3), D(3,9)}, (D(1,4), D(4,9), D(1,5), D(5,9), {D(1,6), D(6,9)}, and {D(1,7), D(7,9)}.

FIG. 49 details two paths 4900 traversing a first distributor pair of the set of alternate paths of FIG. 48. The originating access-node 120x connects to dual port 4940 of distributor D(1,8). An internal path may be established through distributor D(1,8) to an intermediate dual port 4942. A path 4950 may then be established through an intermediate access node from dual port 4942 to distributor D(8,9). An internal path through distributor D(8,9) leads to port 4960 which connects to destination access node 120y.

An internal path may be established through distributor D(1,8) to another intermediate dual port 4943. A path 4951 may then be established through an intermediate access node from dual port 4943 to distributor D(8,9). An internal path through distributor D(8,9) leads to port 4960 which connects to destination access node 120y.

FIG. 50 details two paths 5000 traversing a second distributor pair of the set of alternate paths of FIG. 48. The originating access-node 120x connects to dual port 5040 of distributor D(1,11). An internal path may be established through distributor D(1,11) to an intermediate dual port 5042. A path 5050 may then be established through an intermediate access node from dual port 5042 to distributor D(9,11). An internal path through distributor D(9,11) leads to port 5060 which connects to destination access node 120y.

An internal path may be established through distributor D(1,11) to another intermediate dual port 5043. A path 5051 may then be established through an intermediate access node from dual port 5043 to distributor D(9,11). An internal path through distributor D(9,11) leads to port 5060 which connects to destination access node 120y.

Network Growth

The access nodes of the network are arranged into a number p of access groups, $\mu > 1$, where each access group comprises a number of access nodes not exceeding a predetermined upper bound m, m>1, as illustrated in FIG. 4. The number p of access groups is the number of constituent three-stage networks of the overall contiguous network.

The access groups are arranged into a specified number $\Pi$ of access bands, $\Pi > 1$. Preferably, the number p of access groups is selected to be a target number of access groups in preparation for network growth. Preferably, the number m of access nodes per access group is selected to be a target number of access nodes for individual access-group growth. Preferably, each access band is assigned a same number, $\Omega$, of access groups which is then determined as: $\Omega = \lceil \mu/\Pi \rceil$, where $\lceil R \rceil$ is the nearest integer exceeding a real number R. Generally, $\Omega$ may be selected as $\Omega \geq \lceil \mu/\Pi \rceil$.

For example, with $\Pi = 20$, and a target number of access groups of 470, $\Omega = \lceil 470/20 \rceil = 24$. However, the network may be initially provisioned to have 280 access groups, with a mean value of the number of access groups per access band of 14. Thus, during any stage of network growth, an access band assigned up to 24 access groups may have several vacant (place holder) access groups reserved for future expansion with the access band initially comprising less than the predetermined number Q of access groups.

With partially provisioned access bands, generally having unequal numbers of access group, a dual multichannel link to a specific intra-band constellation would carry a number of spectral channels equal to a number of present (provisioned) access groups of the specific intra-band constellation minus one. Each dual multichannel link from an access node belonging to either of two access bands connecting to a specific inter-band constellation would carry a number of spectral channels equal to a number of present access groups of the other access band.

Figure 51:
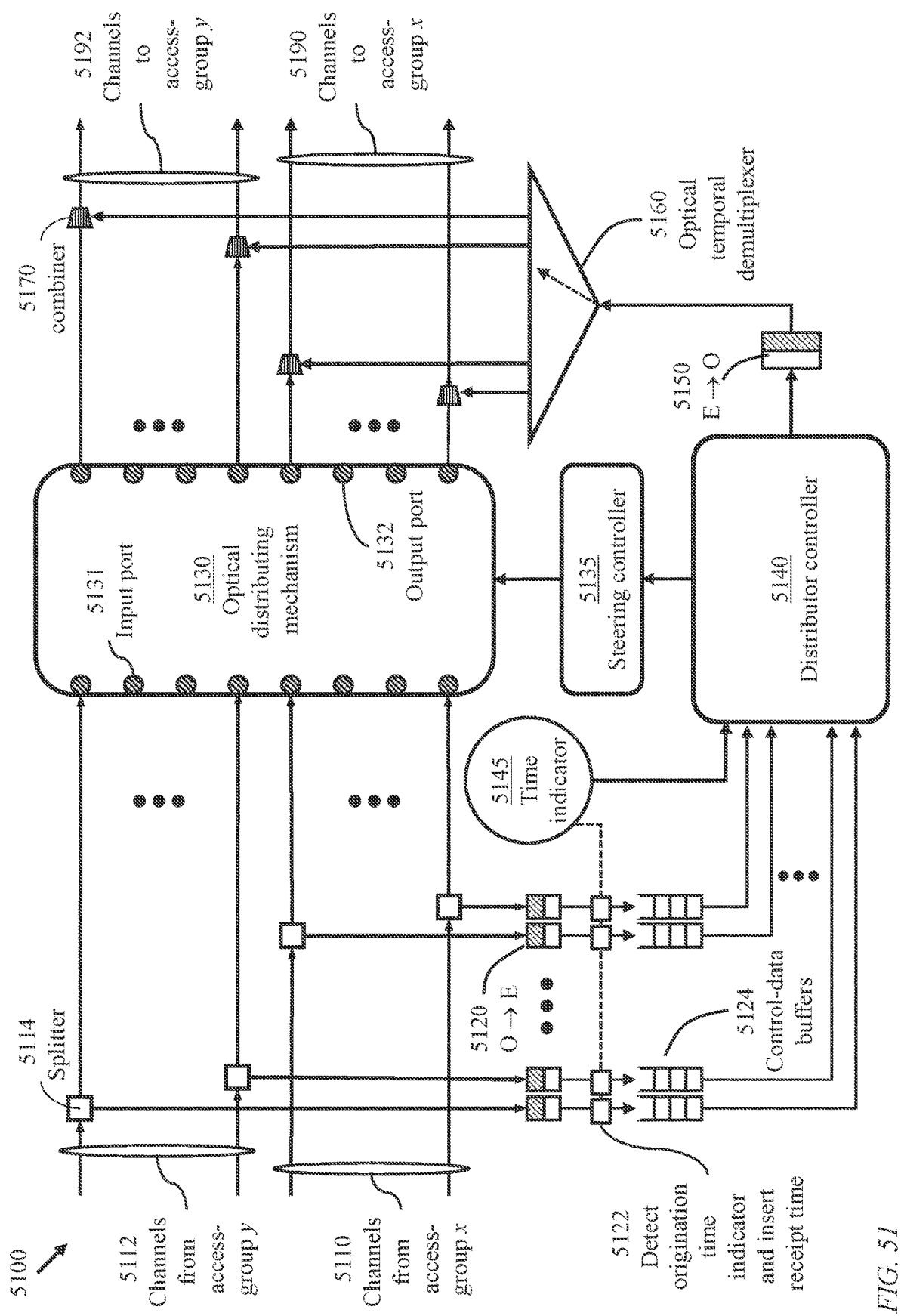
FIG. 51 illustrates a first configuration of an optical distributor, in accordance with an embodiment of the present invention.

For example, for the case of $\mu=12$, $\Pi=3$, and $\Omega=4$ (FIG. 36), if access group 420(5) is reserved for future use, then the access band 1820(1), which is intended to include access groups 420(4), 420(5), 420(6), and 420(7), would currently include only three access groups. Consequently, any access node of access band 1820(0) connects to constellation Q(0,1) through a WDM link carrying only three channels individually connecting to distributors D(x,4), D(x,6), and D(x,7), x being an index of an access group to which the access node belongs. Any access node of access band 1820(2) connects to constellation Q(1,2) through a WDM link carrying three channels individually connecting to distributors D(4,y), D(6,y) and D(7,y), y being an index of an access group to which the access node belongs Distributor Configuration FIG. 51 illustrates a first configuration 5100 of an optical distributor comprising an optical distributing mechanism 5130, a set of input ports 5131, a set of output ports 5132, a local time indicator 5145, a distributor controller 5140, and a steering controller 5135. The Steering controller 5135 directs data from an input port 5131 to an output port 5132 according to instructions from the distributor controller 5140. Distributor controller 5140 comprises at least one hardware processor and memory devices storing software instructions causing the at least one processor to perform control functions including scheduling paths establishment through distributing mechanism 5130 and exchanging control messages with access nodes connecting to the distributing mechanism 5130.

A set 5110 of upstream channels from access nodes of a first access group 420 (FIG. 4) of index x, $0 \leq x < \mu$, connects to a first set of input ports 5131. A set 5112 of upstream channels from access nodes of a second access group 420 of index y, $0 \leq y < \mu$, connects to a second set of input ports 5131. A set 5190 of downstream channels directed to the access nodes of the first access group connects to a first set of output ports 5132. A set 5192 of downstream channels directed to the access nodes of the second access group connects to a second set of output ports 5132.

Alternatively, the set 5112 of upstream channels may emanate from access nodes belonging to different access groups and the set 5192 of downstream channels may be directed to access nodes belonging to different access groups.

Each upstream channel 5110 or 5112 carries an optical signal from a respective access node 120 modulated with content data and control data. The content data is directed to other access nodes and the control data is directed to distributor controller 5140 and may include an indication of time according to a time indicator of the respective access node.

Figure 52:
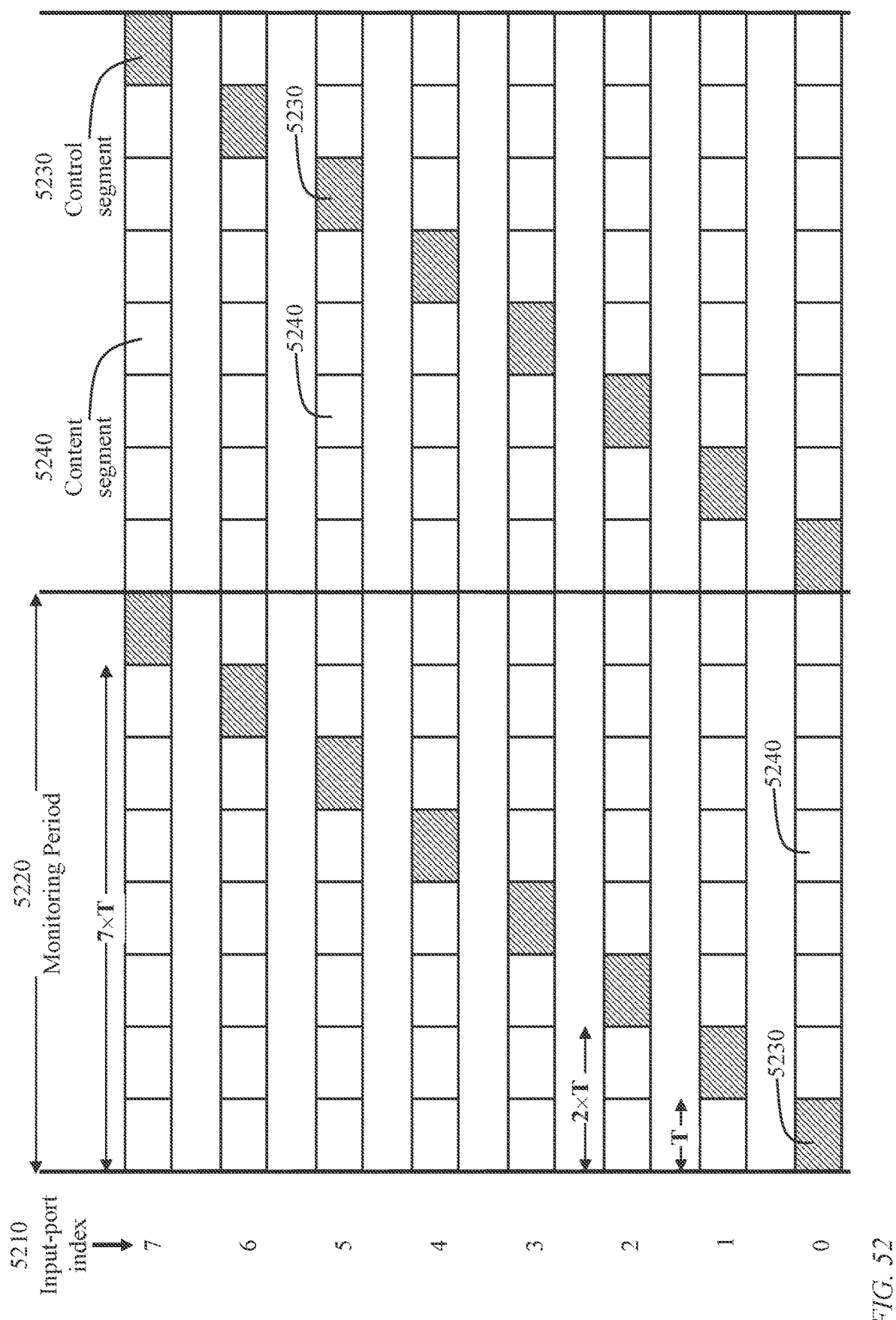
FIG. 52 illustrates an exemplary organization of a cyclic monitoring period into content time slots and at least one control time slot, in accordance with an embodiment of the present invention.

FIG. 52 illustrates an exemplary organization of a monitoring period 5220 into a number of time slots at least equal to the number of dual ports of a distributor connecting to access nodes. The duration, T, of a time slot may be of the order of 0.1 to 1.0 microseconds, for example. The time slots of a monitoring period comprise content time slots and at least one control time slot. Each input port 5131 of the distributor 5100 is allocated at least one control time slot per monitoring period. The illustrated monitoring period 5220 comprises 8 time slots indexed as 0 to 7. Content data segments 5240 are transferred from input ports 5131 to output ports 5132 during scheduled content time slots which change according to data-traffic spatial-temporal variation. A control data segment 5230 is communicated from an input port 5131 to distributor controller 5140 during a respective predetermined control time slot of duration T. For example, control data segments from an input port 5131 of index j (reference 5210) may be transferred to the distributor controller 5140 during a time slot of index j of each monitoring period 5220, 0≤j<8.

The data of a control segment 5230 may include a time indication at an originating access node, flow-rate-allocation requests to specified destination access nodes, and messages from the originating access node to other access nodes. The data of each segment 5230 or 5240 includes an indication of a cyclic segment identifier within a monitoring period 5220.

Figure 53:
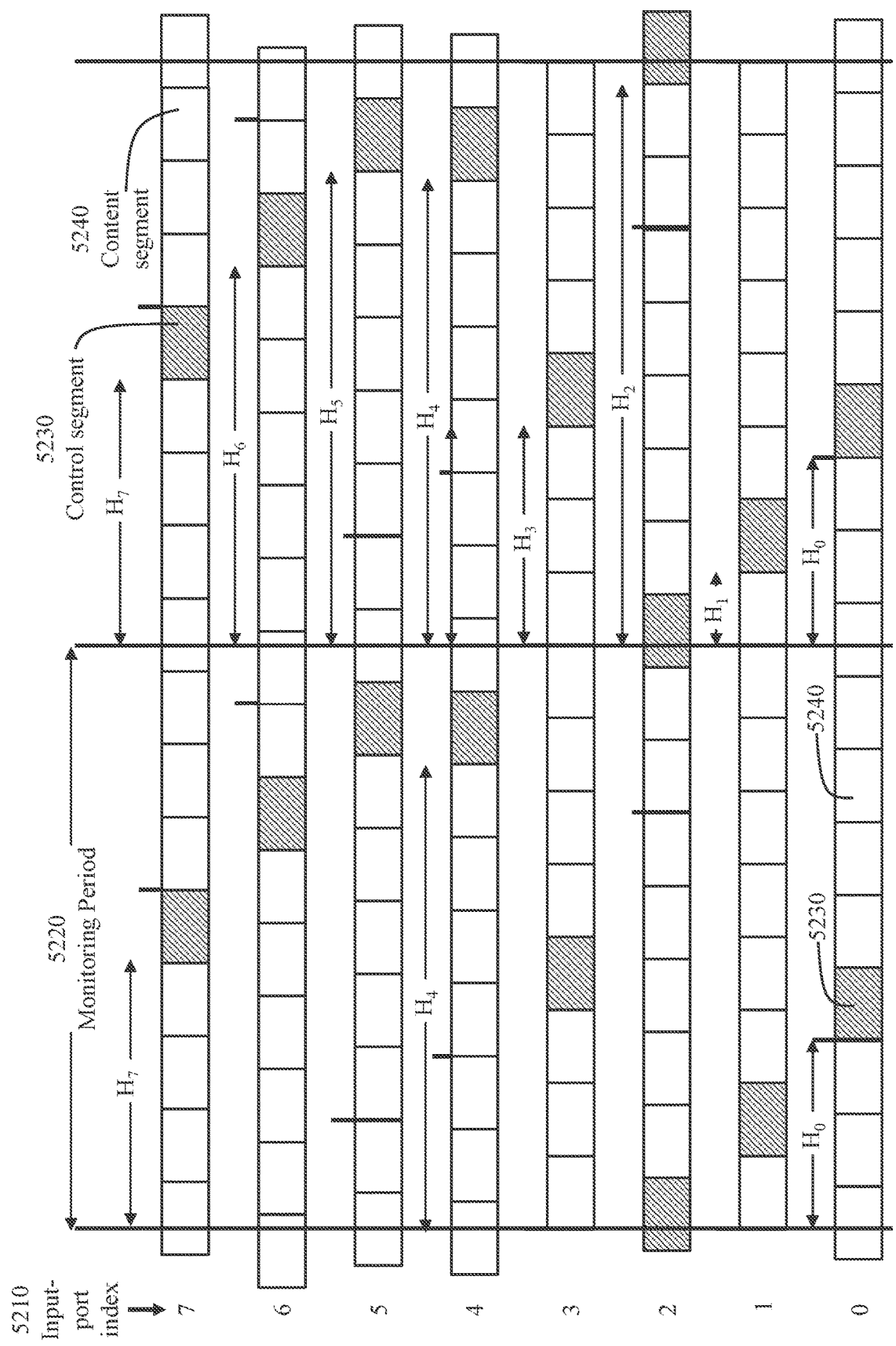
FIG. 53 illustrates a case where control time slots of signals received at input ports of a distributor are not time aligned to respective designated time slots of a reference monitoring period.

FIG. 53 illustrates a case where control time slots of signals received at input ports 5131 of the distributor are not time aligned to respective designated time slots of reference monitoring period 5220. The temporal discrepancy between misaligned arrival times of control segments (such as 5632, FIG. 56) and designated time slots of control segments for signals received at input ports 5131 need be determined and communicated to respective originating access nodes 120 to restore time alignment. In the illustrated example, the arrival instants of time of control segments 5230 detected from signals received at the input ports 5131 are $H_0, H_1, H_2, \ldots, H_7$, while the corresponding designated instants of time are $0, T, 2T, \ldots, 7T$, T being the duration of a time slot of a monitoring period 5220.

Each upstream channel, 5110 or 5112, connects to a respective 1:2 optical splitter 5114 which directs predetermined portions of power of an upstream optical signal to a respective input port 5131 and a respective optical-to-electrical (O-E) converter 5120 of an array of O-E converters. The output electrical signal of each O-E converter is directed to a respective time-alignment unit 5122, of an array of time-alignment units, which detects upstream control data, which may include a time indication at an originating access node, and forms a control data segment including receipt time according to a local time indicator 5145. The control data segments are placed in control-data buffers 5124 to be presented to distributor controller 5140. Preferably, the upstream control data are sent regularly at a predetermined rate. Thus, the control buffers 5124 would be short buffers, each with an expected occupancy of a very small number (two, for example) of control data segments.

The distributor controller 5140 computes schedules for flow-rate allocations and generates downstream control data to be sent, together with downstream content data collected at the output ports 5132, to destination access nodes. An electrical-to-optical converter 5150 produces optical signals carrying the downstream control data. A temporal demultiplexer 5160 cyclically supplies to optical combiners 5170 control segments directed to the destination access nodes. Each optical combiner 5170 receives an optical signal carrying downstream content data from a respective output port 5132 and inserts corresponding downstream control data received through the temporal demultiplexer 5160.

Figure 54:
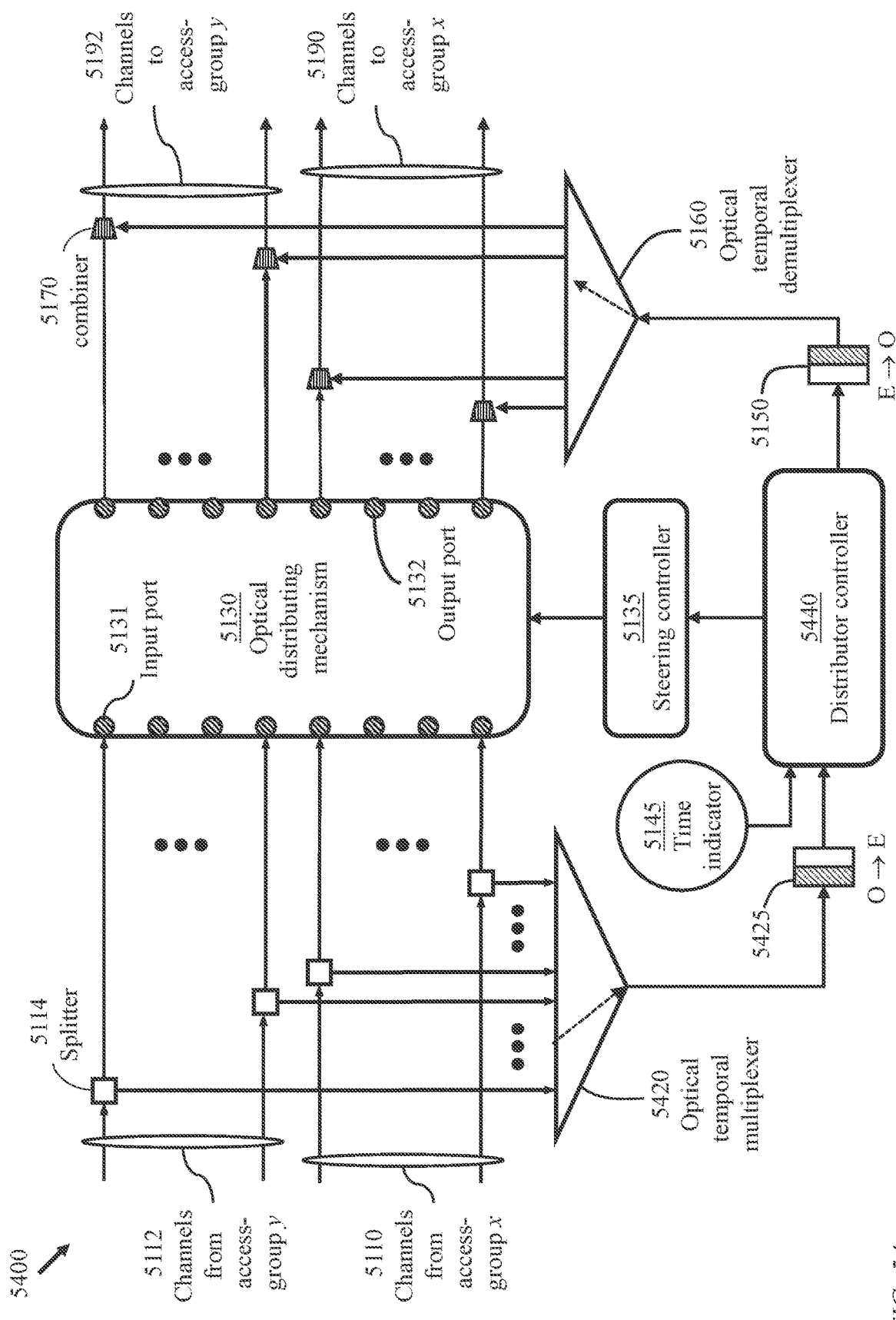
FIG. 54 illustrates a second configuration of an optical distributor, in accordance with an embodiment of the present invention.

FIG. 54 illustrates a second configuration 5400 of an optical distributor. As in the configuration of FIG. 51, configuration 5400 comprises an optical distributing mechanism 5130, a set of input ports 5131, a set of output ports 5132, a local time indicator 5145, a distributor controller 5440, and a steering controller 5135. The Steering controller 5135 directs data from an input port 5131 to an output port 5132 according to instructions from the distributor controller 5440.

Each upstream channel, 5110 or 5112, connects to a respective 1:2 optical splitter 5114 which directs predetermined portions of power of each upstream optical signal to a respective input port 5131 and a temporal multiplexer 5420. The temporal multiplexer 5420 cyclically connects optical splitters 5114, connecting to upstream channels from access nodes, to an optical-to-electrical converter 5425 during designated control time slots within each monitoring period as illustrated in FIG. 52. The optical-to-electrical (O-E) converter 5425 receives optical-signal portions (samples) captured during successive time slots of each monitoring period 5220 and produces corresponding electric signals to be supplied to distributor controller 5440.

If the control time slots of upstream signals received at input ports 5131 of the distributor are time aligned to respective designated time slots of reference monitoring period 5220 as illustrated in FIG. 52, the output of the temporal multiplexer 5420 would be a sequence of control segments 5230 originating from the access nodes. If a control time slot of an upstream signal from a specific access node 120 is not time-aligned to a respective designated control time slot, the captured optical signal portion during the respective designated time slot need be examined to determine the temporal discrepancy and instruct the specific access node to correct transmission time to the distributor accordingly. The data of a control segment 5230 of a received upstream signal may include: a time indication at originating access node, flow-rate-allocation requests to specified destination access nodes, and messages from an originating access node to other access nodes.

Figure 55:
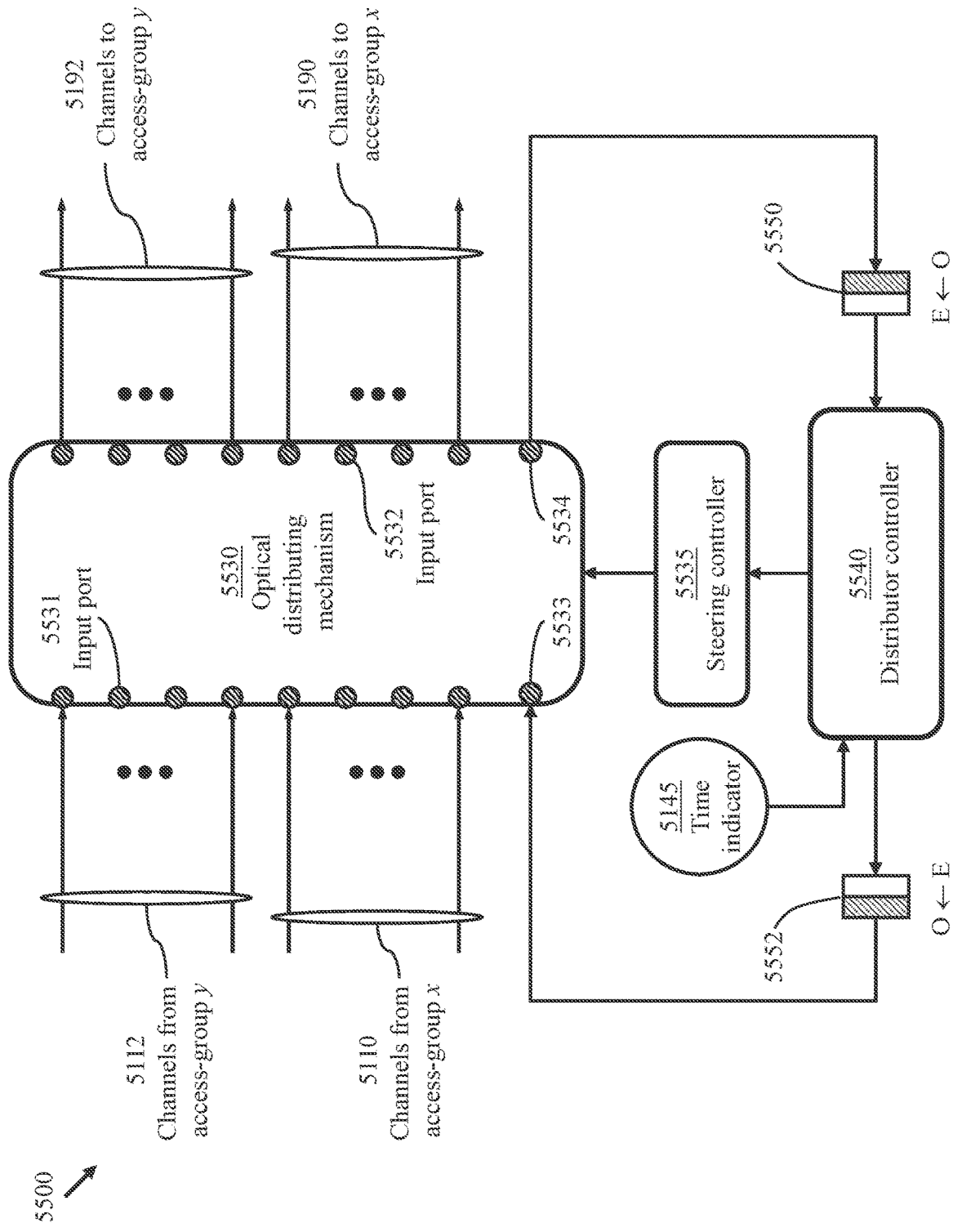
FIG. 55 illustrates a third configuration of an optical distributor, in accordance with an embodiment of the present invention.

FIG. 55 illustrates a third configuration 5500 of an optical distributor. Configuration 5500 comprises a distributor controller 5540, steering controller 5535, a local time indicator 5145, an optical distributing mechanism 5530 which supports input ports 5531, output ports 5532, an input port 5533 connecting to output of distributor controller 5540, and an output port 5534 connecting to input of distributor controller 5540. As in configurations 5100 and 5400, distributor controller 5540 uses local time indicator 5145 for temporal alignment of upstream signals.

Distributor controller 5540 comprises at least one hardware processor and memory devices storing software instructions causing the at least one processor to perform control functions including scheduling paths establishment through distributing mechanism 5530 and exchanging control messages with access nodes connecting to the distributing mechanism 5530.

Steering controller 5535 directs signals from input ports 5531 to output ports 5532 according to instructions from the distributor controller 5540. Additionally, steering controller 5535 cyclically directs upstream control signals from input ports 5531 to output port 5534 which connects to distributor controller 5540 through an optical-to-electrical converter 5550. The distributor controller 5540 sends downstream control signals to input port 5533 through electrical-to-optical converter 5552. Steering controller 5535 cyclically directs downstream control signals from input port 5533 to output ports 5532. Thus, rather than using optical temporal multiplexer 5420 and optical temporal demultiplexer 5160 of the configuration of FIG. 54, the upstream control signals are communicated from input ports 5531 to the distributor controller 5540 and the downstream control signals are communicated from the distributor controller 5540 to the output ports 5532 through the distributing mechanism 5530.

Figure 56:
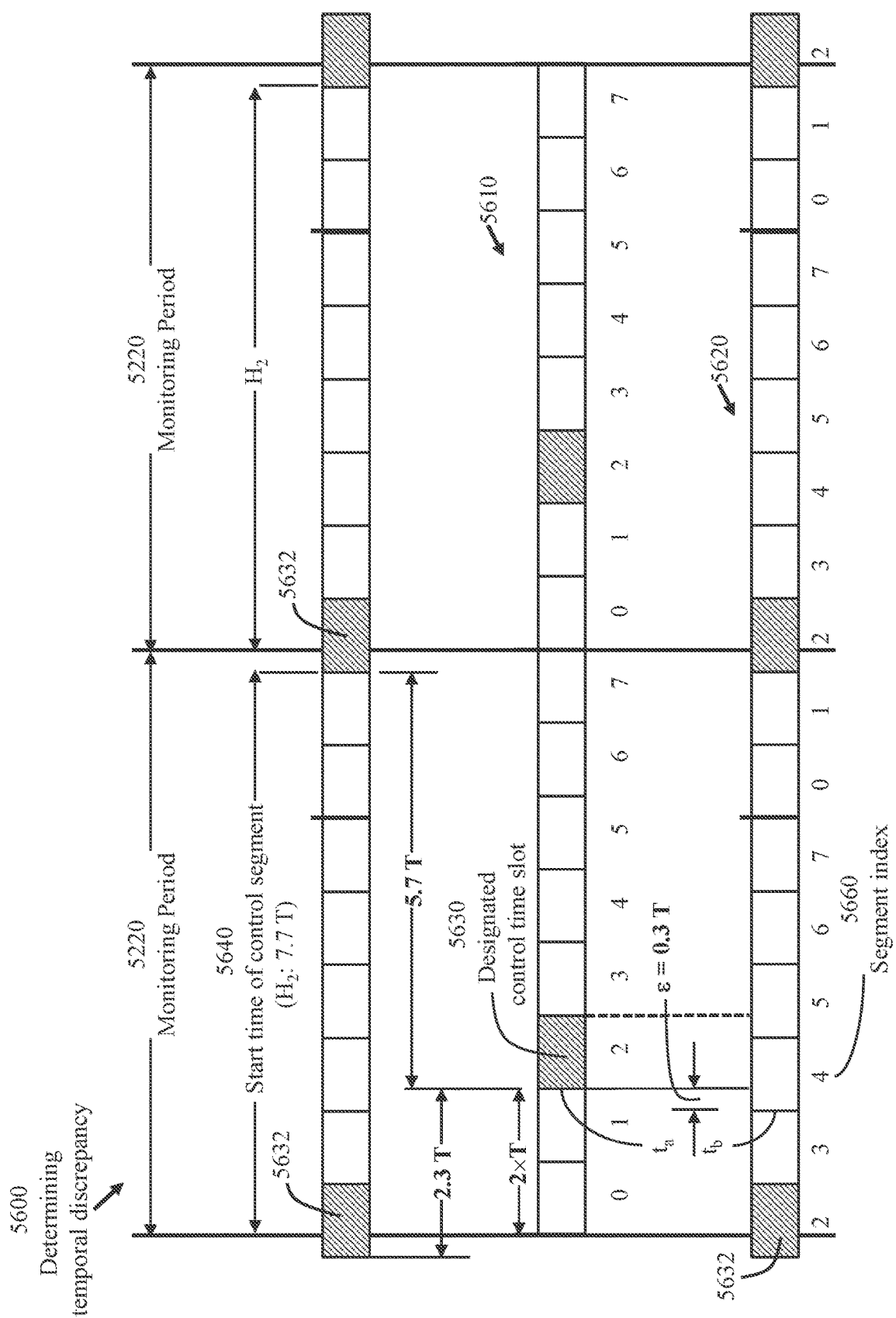
FIG. 56 illustrates temporal misalignment of a signal received at a distributor from a specific access node.

FIG. 56 illustrates an example 5600 of temporal misalignment of a signal 5620 received at a distributor from a specific access node connecting to input port of index 2 of distributing mechanism 5130 or 5530. As illustrated in FIG. 52, the monitoring period 5220 is organized into a number of time slots where during each time slot an access node transmits a control segment 5230 or a content segment 5240. The time slots within a monitoring period are indexed as j, $0 \le j < p$, where the integer p at least equals the total number of input ports connecting to upstream channels from subtending access nodes and input ports connecting to a controller of a distributor; p>4. A cyclic time slot of index j is (arbitrarily) assigned to an input port of index j. Thus, time slot 5630 is designated as a control time slot for a signal stream originating from an access node connecting to an input port of index 2.

In the distributor configuration of FIG. 51, temporal alignment is based on detecting the start time of a control segment within a monitoring period. In the distributor configuration of FIG. 54 and the distributor configuration of FIG. 55, temporal alignment is based on identifying content of an upstream signal during a corresponding designated control time slot.

Referring to FIG. 51, a time-alignment unit 5122 detects the start time 5640 of a control segment within a monitoring period. As illustrated in FIG. 53, the actual start time of a control segment for an input port of index j is denoted $H_j$, $0 \le j < p$. With the start time of a control segment for an input port of index j set to be j×T, T being the duration of a time slot, the temporal discrepancy of a received signal directed to an input port of index j is determined as: $\theta_j = (j \times T - H_j)$.

If the magnitude of θj exceeds a predefined permissible value (0.01×T, for example), an access node originating the signal would be instructed to adjust transmission; adding a delay of:

$$\theta_j \text{ if } \theta_j > 0.0; \text{ or } (p \times T + \theta_j), \text{ otherwise.}$$

In the example of FIG. 56, j=2, p=8, $H_2$=7.7×T. Hence $\theta_2$=−5.7×T, and the requisite added delay at the originating access node is (8×T−5.7×T)=2.3×T.

Referring to FIG. 54, distributor controller 5440 examines a portion of the output signal of optical-to-electrical converter 5425 during each time slot of the monitoring period 5220. In the configuration of FIG. 51, the output signal of each optical-to-electrical converter 5120 is examined to determine the start time of a control segment according to a reading of time indicator 5145. In the configuration of FIG. 54, the distributor controller 5440 examines a portion of the output signal of optical-to-electrical converter 5425 during each reference time slot of the monitoring period to detect:

(a) an index of a segment, which may be a control segment or a content segment; and (b) a displacement of the start time of the segment from the start time of a corresponding reference time slot.

For a reference time slot of index x, $0 \le x < p$, a detected index γ, $0 \le y < p$, and a displacement ε, the temporal discrepancy of a received signal directed to an input port of index j is determined as: θj=(y−x−ε). If the magnitude of θj exceeds the predefined permissible value, an access node originating the signal is instructed to adjust transmission time adding a delay of:

$$\theta_j, \text{ if } \theta_j > 0.0; \text{ or } (p \times T + \theta_j), \text{ otherwise.}$$

In the example of FIG. 56, x=2, y=4, ε=−0.3×T; hence $\theta_j$=2.3×T.

Referring to FIG. 55, distributor controller 5540 examines a portion of the output signal of optical-to-electrical converter 5550 during each reference time slot of the monitoring period to detect an index of a segment and a displacement of the start time of the segment from the start time of a corresponding reference time slot. The temporal discrepancy of a received signal and transmission-time adjustment at an originating access node are determined as described above with reference to FIG. 54.

Figure 57:
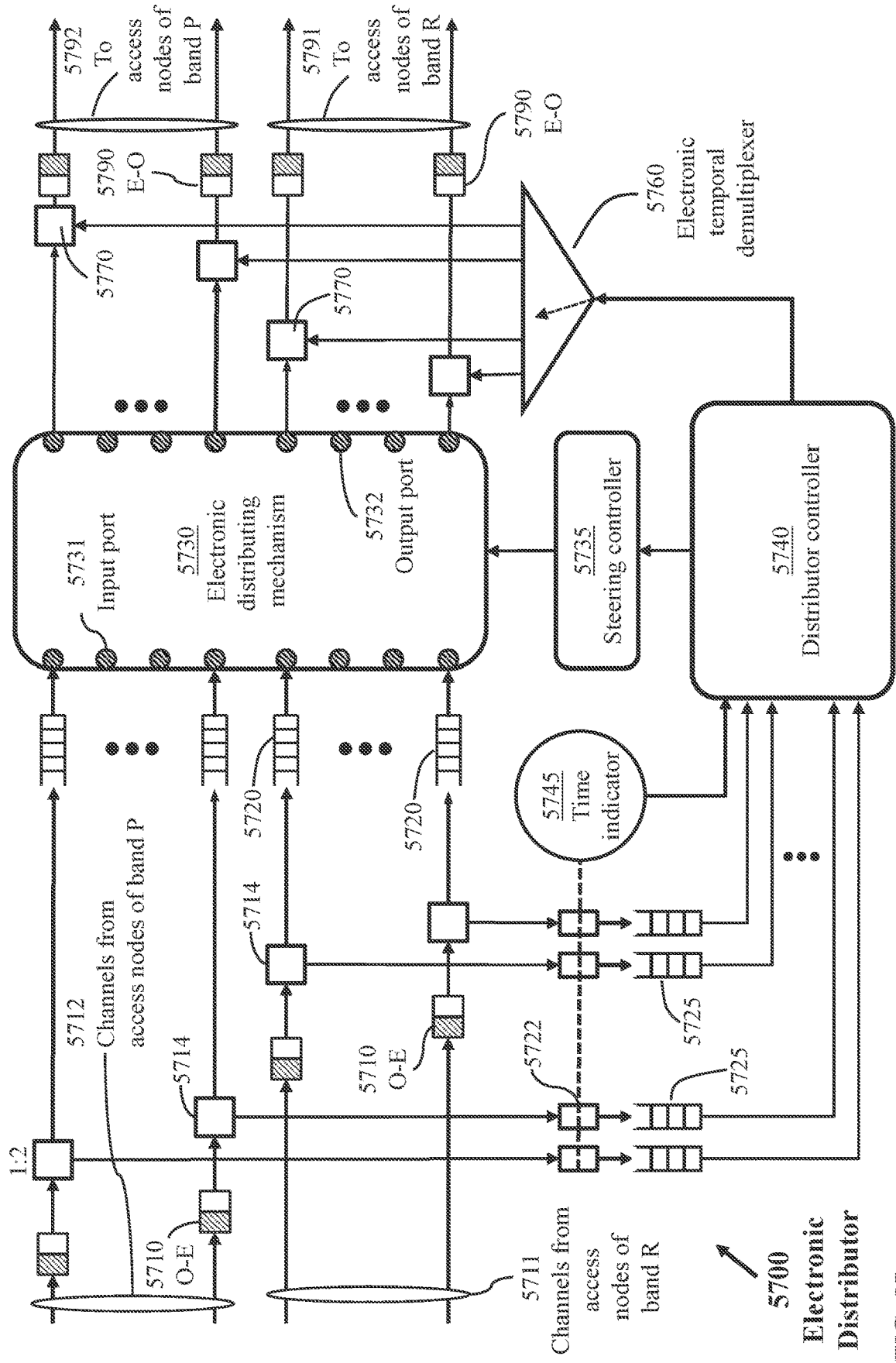
FIG. 57 illustrates a first configuration of an electronic distributor, in accordance with an embodiment of the present invention.

FIG. 57 illustrates a first configuration 5700 of an electronic distributor comprising an electronic distributing mechanism 5730, a set of input ports 5731, a set of output ports 5732, a local time indicator 5745, a distributor controller 5740, and a steering controller 5735. The steering controller 5735 directs data from an input port 5731 to an output port 5732 according to instructions from the distributor controller 5740.

Distributor controller 5740 comprises at least one hardware processor and memory devices storing software instructions causing the at least one processor to perform control functions including scheduling paths establishment through distributing mechanism 5730 and exchanging control messages with access nodes connecting to the distributing mechanism 5730.

A set 5711 of upstream channels from selected access nodes of a first access band connects to a first set of input ports 5731. A set 5712 of upstream channels from selected access nodes of a second access band connects to a second set of input ports 5731. A set 5791 of downstream channels directed to the selected access nodes of the first access band connects to a first set of output ports 5732. A set 5792 of downstream channels directed to the selected access nodes of the second access band connects to a second set of output ports 5732.

Alternatively, the set 5712 of upstream channels may emanate from access nodes belonging to different access groups and the set 5792 of downstream channels may be directed to access nodes belonging to different access groups.

Each upstream channel 5711 or 5712 carries an optical signal from a respective access node 120 modulated with content data and control data. The content data is directed to other access nodes and the control data is directed to distributor controller 5740 and may include an indication of time according to a time indicator of the respective access node.

Content data segments are transferred from input ports 5731 to output ports 5732 during scheduled content time slots which change according to data-traffic spatial-temporal variation. A control data segment 5230 is communicated from an input port 5731 to distributor controller 5740 during a respective predetermined control time slot of duration T (FIG. 52). For example, control data segments from an input port 5731 of index j (reference 5210) are transferred to the distributor controller 5740 during a time slot of index j of each monitoring period 5220, $0 \le j < 8$.

In each of distributor configurations of FIGS. 51, 54, 55, and 57, the data of a control segment 5230 may include a time indication at an originating access node, flow-rate-allocation requests to specified destination access nodes, and messages from the originating access node to other access nodes. The data of a content segment 5240 includes content data (payload data) in addition to an indication of a cyclic segment identifier within a monitoring period 5220.

Each upstream channel, 5711 or 5712, connects to an optical-to-electrical (O-E) converter 5710 to detect a baseband signal from a modulated optical carrier originating from a respective access node, the baseband signal containing both content data and control data. Each output baseband signal from an O-E converter 5710 is directed, through a 1:2 fanout unit 5714, to a buffer 5720 preceding an input port 5731 and to a time-alignment unit 5722 of an array of time-alignment units. Each time-alignment unit 5722 detects upstream control data (which may include a time indication at an originating access node), and forms a control data segment including receipt time according to the local time indicator 5745 collocated with distributor controller 5740. The control data segments are placed in control-data buffers 5725 to be presented to distributor controller 5740. Preferably, the upstream control data are sent regularly at a predetermined rate. Thus, the control buffers 5725 would be short buffers, each with an expected occupancy of a very small number (two, for example) of control data segments.

The distributor controller 5740 computes schedules for flow-rate allocations and generates downstream control data to be sent, together with downstream content data collected at the output ports 5732, to destination access nodes. Downstream control data from the distributor controller 5740 is distributed through an electronic temporal demultiplexer 5760 to individual 2:1 temporal multiplexers 5770. Each temporal multiplexer 5770 receives an electronic signal carrying downstream content data from a respective output port 5732 and inserts corresponding downstream control data received through the temporal demultiplexer 5760. Temporal demultiplexer 5760 cyclically supplies to the temporal multiplexers 5770 control segments directed to the destination access nodes. The output of each 2:1 electronic temporal multiplexer modulates an optical carrier in a respective electrical-to-optical (E-O) converter 5790 of an array of E-O converters coupled to downstream channels 5791 and 5792.

For each access node connecting to the electronic distributor 5700, distributor controller 5740 examines data in a respective control buffer 5725 and compares receipt time, as determined from local time indicator 5745, of each segment, or of at least one segment per monitoring period 5220, with a corresponding scheduled arrival time at the distributor. Where there is no discrepancy, or a discrepancy within a permissible value (one nanosecond, for example) is determined, the electronic distributing mechanism 5730 continues to transfer data received at a corresponding input port 5731 to output ports 5732 according to schedule. If the magnitude of the discrepancy exceeds the permissible value, the distributor controller 5740: instructs the steering controller 5735 to halt data transfer from the corresponding input port 5731; and communicates the value of the discrepancy to a respective access node through a downstream channel 5791 or 5792.

Figure 58:
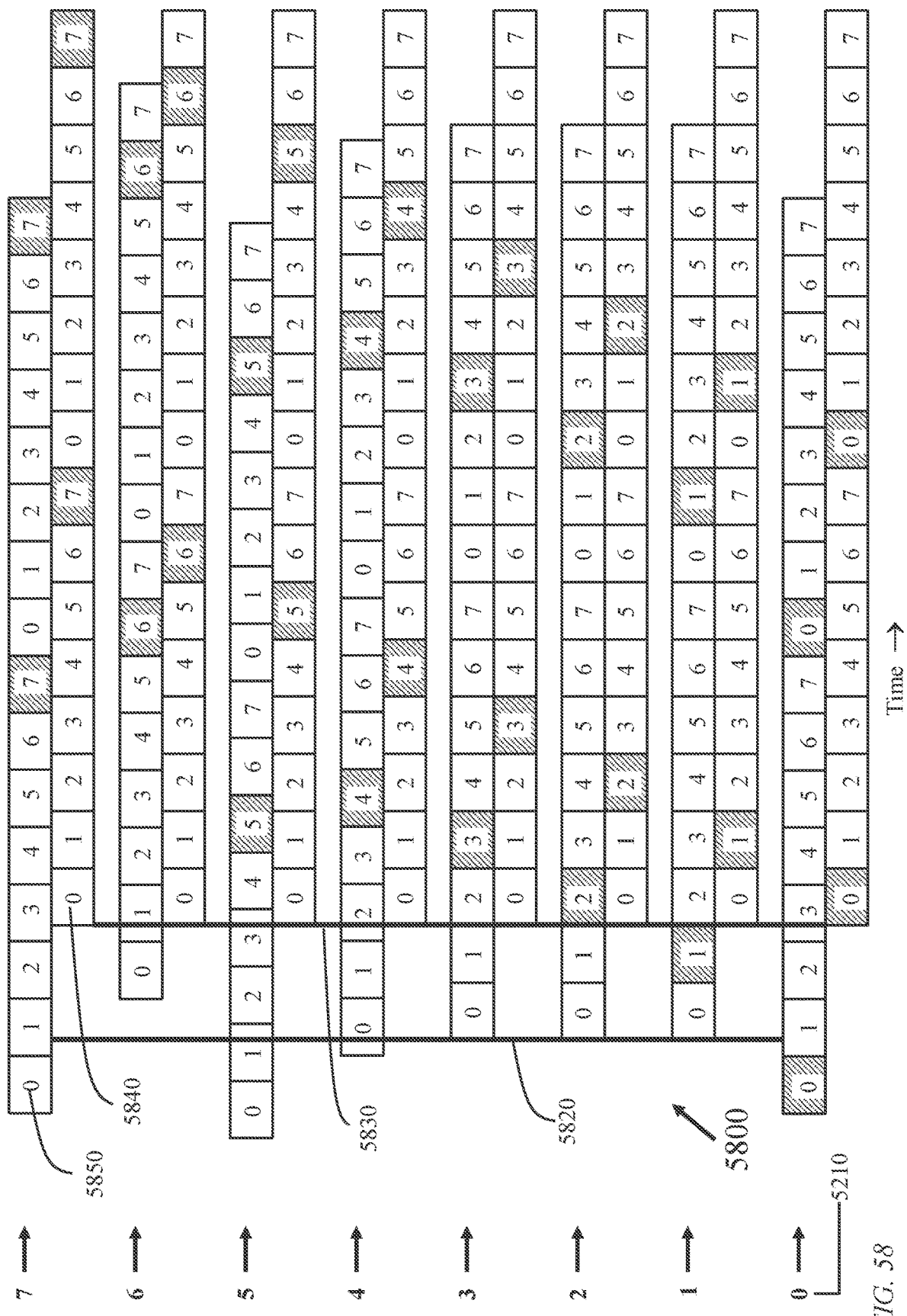
FIG. 58 illustrates an exemplary organization of a cyclic monitoring period for data transmission from access nodes to input buffers 5720 of an electronic distributor 5700 and corresponding cyclic data transfer from the input buffers 5720 to output ports of the electronic distributor, in accordance with an embodiment of the present invention.

FIG. 58 illustrates an exemplary organization 5800 of a cyclic monitoring period for data transmission from access nodes to input buffers 5720 of an electronic distributor 5700 and corresponding cyclic data transfer from the input buffers 5720 to output ports of the electronic distributor A major difference between the optical distributor 5100 and the electronic distributor 5700, apart from the differing distributing mechanisms 5130 and 5730, is the feasibility of using input buffers 5720 preceding input ports 5731 of the electronic distributing mechanism. To compensate for the absence of buffers in optical distributor 5100, a precise time alignment system based on timing-data exchange with subtending access nodes is employed in distributor 5100. A similar time-alignment mechanism may be used in distributor 5700 as described above. With precise time alignment, input buffers 5720 would not be needed as long as data segments from an access node are received at distributor 5700 within a permissible deviation from a respective scheduled time instant. The permissible deviation would be a small fraction of a time slot (a time slot being transfer duration of one data segment).

As described above, distributor controller 5740 computes schedules for flow-rate allocations and generates downstream control data to be sent, together with downstream content data collected at the output ports 5732, to destination access nodes. The access nodes transmit data segments to distributor 5700 according to the schedule. To permit deviation, of up to $\Delta$ time slots, of an arrival time of a data segment from a requisite scheduled arrival time, each input buffer 5720 may be operated as a circular buffer retaining at least $2 \times \Delta$ data segments. For $\Delta=2$, for example, each buffer 5720 would only retain most recent four data segments, regardless of the data-segment type. The distributor control 5740 instructs the steering controller 5735 to transfer a data from an input buffer 5720 to a respective output port 5732 after a deterministic artificial time delay, from a scheduled arrival time, of A time slots, regardless of the actual arrival time. As illustrated in FIG. 58, the difference between a designated start time 5830 of data transfer from input buffers 5720 to output ports 5732 and a designated start time 5820 of cyclic monitoring period 5220 (FIG. 52) is $\Delta$ time slots; $\Delta=2$ in the example of FIG. 58.

As indicated, data transmitted from access nodes, during a monitoring period, through upstream channels directed to input ports 5731 of indices 1, 2, and 3 arrived at scheduled start time 5820. The distributing mechanism 5730 starts to transfer individual data segments to respective output ports 5732 after an artificial delay of $\Delta$ time slots (two time slots in this case). At the instant of time of data-segment transfer through the electronic distributor, each of input buffers 5720(1), 5720(2), and 5720(3) would hold exactly two data segments.

Data transmitted from an access node, during a monitoring period, through upstream channels directed to input port 5731 of index 0 arrived earlier than the scheduled start time 5820. The distributing mechanism 5730 starts to transfer individual data segments to respective output ports 5732 after an artificial delay of A time slots. At the instant of time of data-segment transfer through the electronic distributor, input buffer 5720(0) would hold three data segments, and a fraction of a fourth data segment. With the input buffer 5720(0) configured to hold four data segments, the received data segment corresponding to each transfer time slot would be still available (i.e., not overwritten) in buffer 5720(0). Likewise, data transmitted from access nodes, during a monitoring period, through upstream channels directed to input ports 5731 of indices 5 and 7 arrived earlier than the designated arrival time 5820 but were present in respective input buffers 5720(5) and 5720(7) at respective transfer times to output ports 5732.

Data transmitted from access nodes, during a monitoring period, through upstream channels directed to input port 5731 of indices 4 and 6 arrived after the scheduled start time 5720 but before designated transfer time 5830. The distributing mechanism 5730 starts to transfer individual data segments to respective output ports 5732 after an artificial delay of Δ time slots of the designated arrival time 5820 not the actual arrival time. At the instant of time of data-segment transfer through the electronic distributor, input buffers 5720(4) and 5720(6) would each hold a respective sought data segment.

Figure 59:
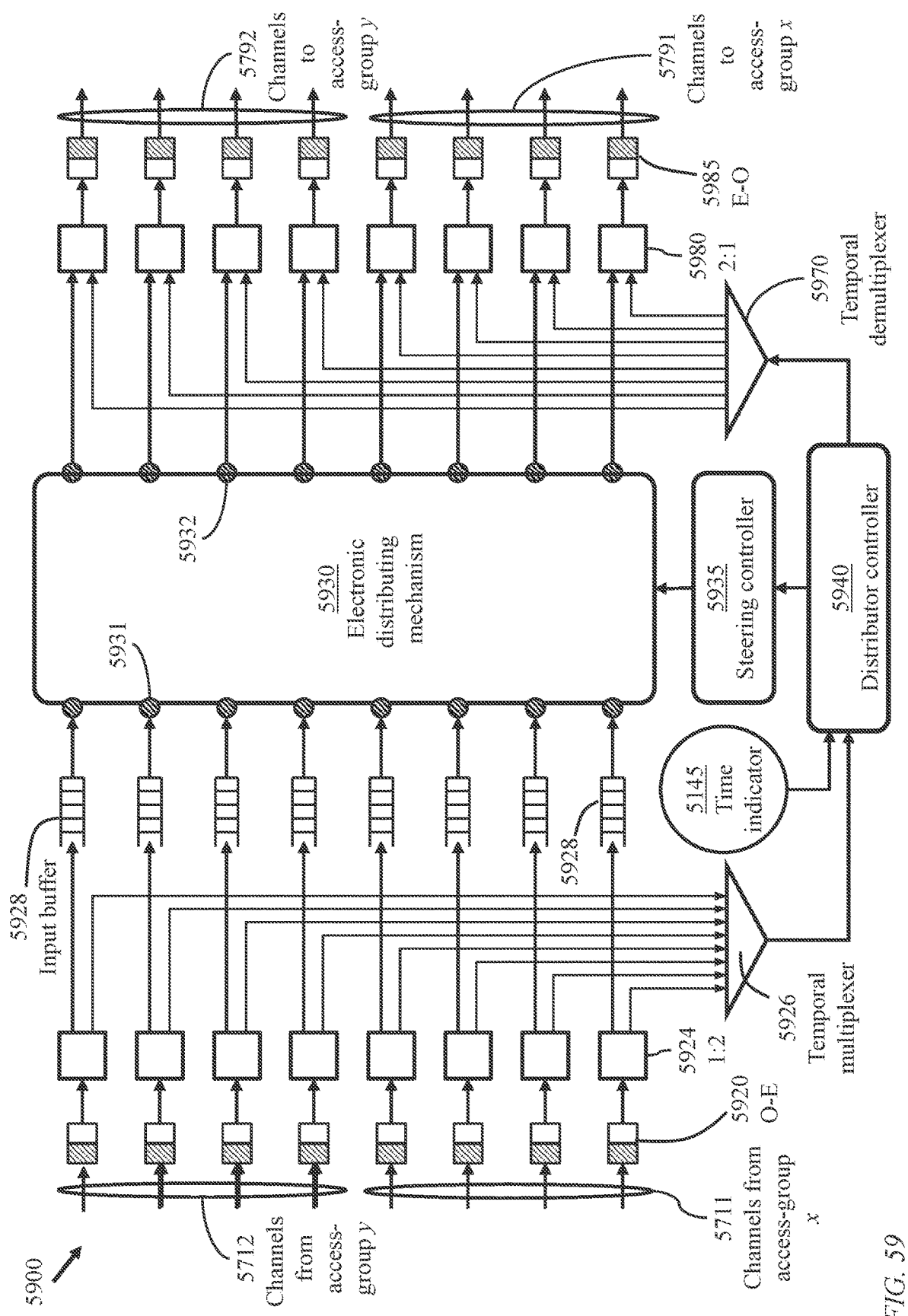
FIG. 59 illustrates a second configuration of an electronic distributor of FIG. 58.

FIG. 59 illustrates a second configuration 5900 of an electronic distributor comprising an electronic distributing mechanism 5930, a set of input ports 5931, a set of output ports 5932, a local time indicator 5145, a steering controller 5935, and a distributor controller 5940. The steering controller 5935 directs data from an input port 5931 to an output port 5932 according to instructions from the distributor controller 5940.

A set 5711 of upstream channels from a first set of access nodes connects to a first set of 1:2 fan-out units 5924. A set 5712 of upstream channels from a second set of access nodes connects to a second set of 1:2 fan-out units 5924. Each 1:2 fan-out unit connects to temporal multiplexer 5926 and an input buffer 5928 of an input port 5931. The temporal multiplexer 5926 cyclically connects output data from the 1:2 fan-out units 5924 to distributor controller 5940 during designated control time slots within each monitoring period 5220.

Each upstream channel 5711 or 5712 carries an optical signal from a respective access node 120 modulated with upstream data organized into periodic monitoring periods 5220 as illustrated in FIG. 52. Each monitoring period 5220 is organized into content time slots and at least one control time slot. The data of a control segment 5230, communicated during a control time slot, may include: a time indication at originating access node, flow-rate-allocation requests to specified destination access nodes, and messages from an originating access node to other access nodes. The data of a content segment 5240 includes content data (payload data) in addition to an indication of a cyclic segment identifier (0 to (p−1)) within a monitoring period 5220.

A set 5791 of downstream channels directed to the first set of access nodes connects to a first set of electrical-to-optical converters 5985. A set 5192 of downstream channels directed to the second set of access nodes connects to a second set of electrical-to-optical converters 5985. Each electrical-to-optical converter 5985 receives output of a 2:1 temporal multiplexer 5980. Each 2:1 temporal multiplexer receives content data from an output port 5932 and control data from distributor controller 5940 through temporal demultiplexer 5970.

The distributor controller 5940 examines a portion of the output signal of temporal multiplexer 5926 during each reference time slot of the monitoring period to detect an index of a segment, which may be a control segment 5230 or a content segment 5240, and a displacement of the start time of the segment from the start time of a corresponding reference time slot as described above with reference to FIG. 54. For a reference time slot of index x, $0 \le x < p$, a detected index y, $0 \le y < p$, and a displacement ε, the temporal discrepancy of a received signal directed to an input port 5931 of index x is determined as: $\theta_j = (y - x - \varepsilon)$. If the magnitude of $\theta_j$ exceeds the predefined permissible value (a small fraction of time-slot duration T), an access node originating the signal is instructed to adjust transmission time; adding a delay of: $\theta_j$, if $\theta_j > 0.0$; or $(p \times T + \theta_j)$, otherwise.

Figure 60:
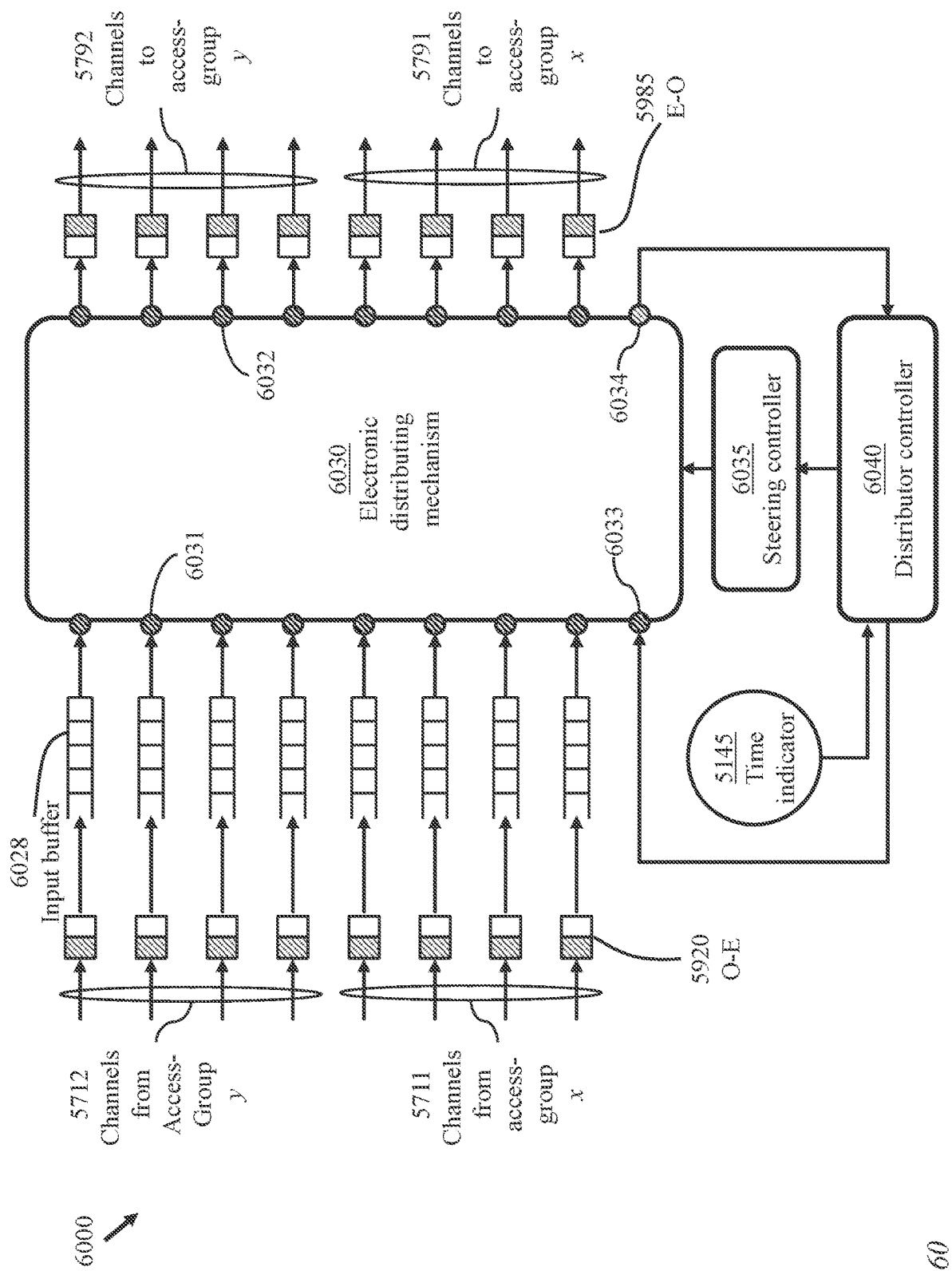
FIG. 60 illustrates a third configuration of an electronic distributor.

FIG. 60 illustrates a third configuration 6000 of an electronic distributor comprising an electronic distributing mechanism 6030, a set of input ports 6031 connecting to upstream channels 5711 and 5712, a set of output ports 6032 connecting to downstream channels 5791 and 5792, an input port 6033 connecting to output of distributor controller 6040, an output port 6034 connecting to input of distributor controller 6040, a steering controller 6035, and a distributor controller 6040. As in configurations 5700 and 5900, a local time indicator 5145 is used for temporal alignment of upstream signals.

The steering controller 6035 directs data from input ports 6031 to output ports 6032 according to instructions from the distributor controller 6040. Additionally, steering controller 6035 cyclically directs upstream control signals from input ports 6031 to output port 6034, which connects to distributor controller 6040, and cyclically directs downstream control signals from input port 6033, which connects to distributor controller 6040, to output ports 6032. Thus, rather than using temporal multiplexer 5926 and temporal demultiplexer 5970 of the configuration of FIG. 59, the upstream control signals are communicated from input ports 6031 to the distributor controller 6040 and the downstream control signals are communicated from the distributor controller 6040 to the output ports 6032 through the distributing mechanism 6030.

Each of distributor controllers 5940 and 6040 comprises a respective set of hardware processors and memory devices storing software instructions causing the respective set of processors to perform control functions including scheduling paths establishment, through a respective distributing mechanism, and exchanging control messages with access nodes connecting to the respective distributing mechanism.

Figure 61:
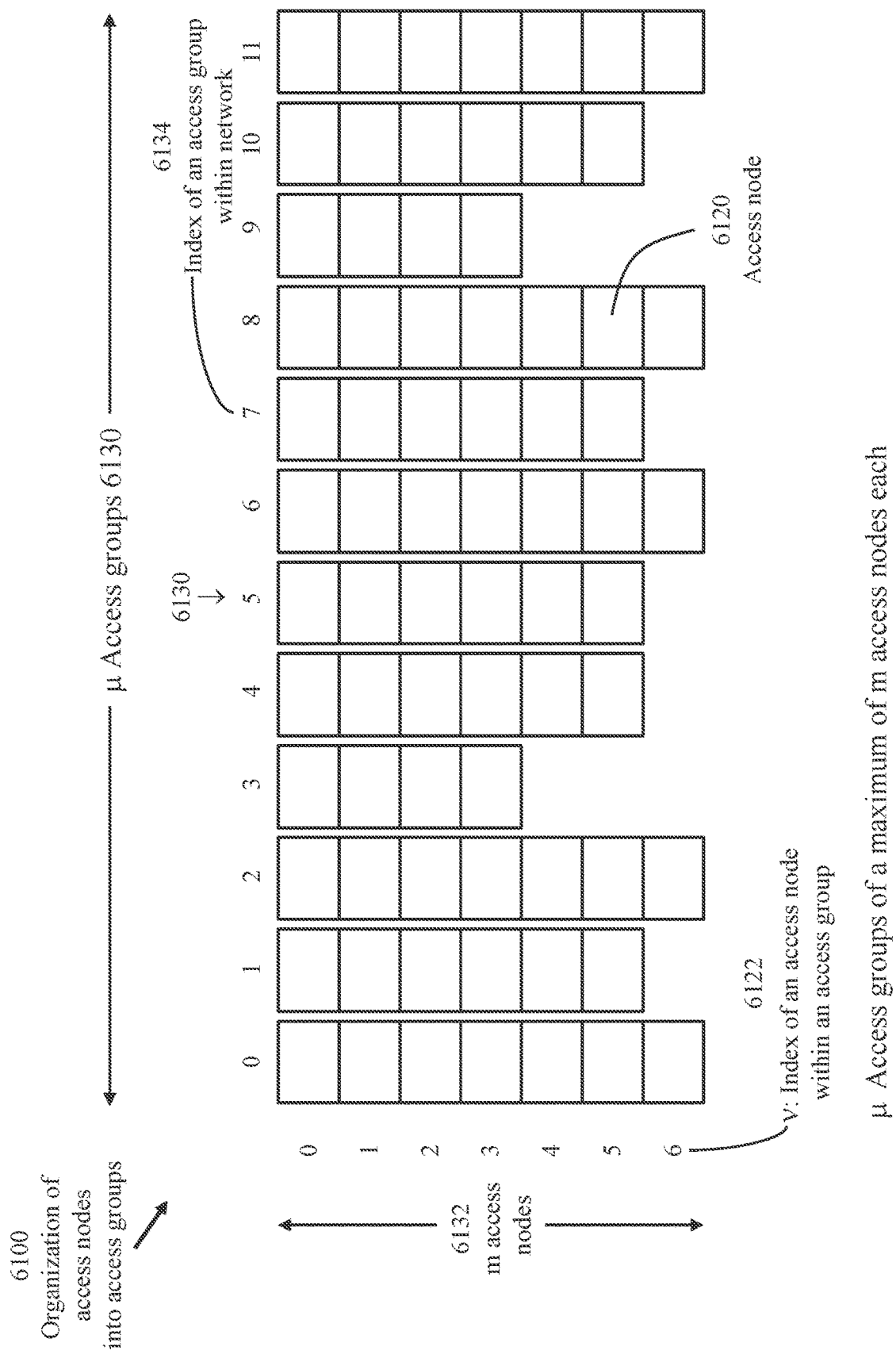
FIG. 61 illustrates organization of access nodes into access groups.

FIG. 61 illustrates organization 6100 of access nodes of a network into a number, μ of access groups 6130, μ>8, with each access group comprising a number of access nodes 6120 not exceeding a predefined maximum number m, referenced as 6132. In the illustrated example, μ=12 and m=7. An access node 6120 is structurally similar to access node 120. The main difference is that access node 120 connects to connectors 140 which interconnect access nodes of a single access group while access node 6120 connects to distributors which interconnect access nodes belonging to two or more access groups. An access node 6120 is identified according to an index ν, $0 \le \nu < m$, referenced as 6122, within a respective access group. An access group may be identified according to an index, referenced as 6134, within a network.

Figure 62:
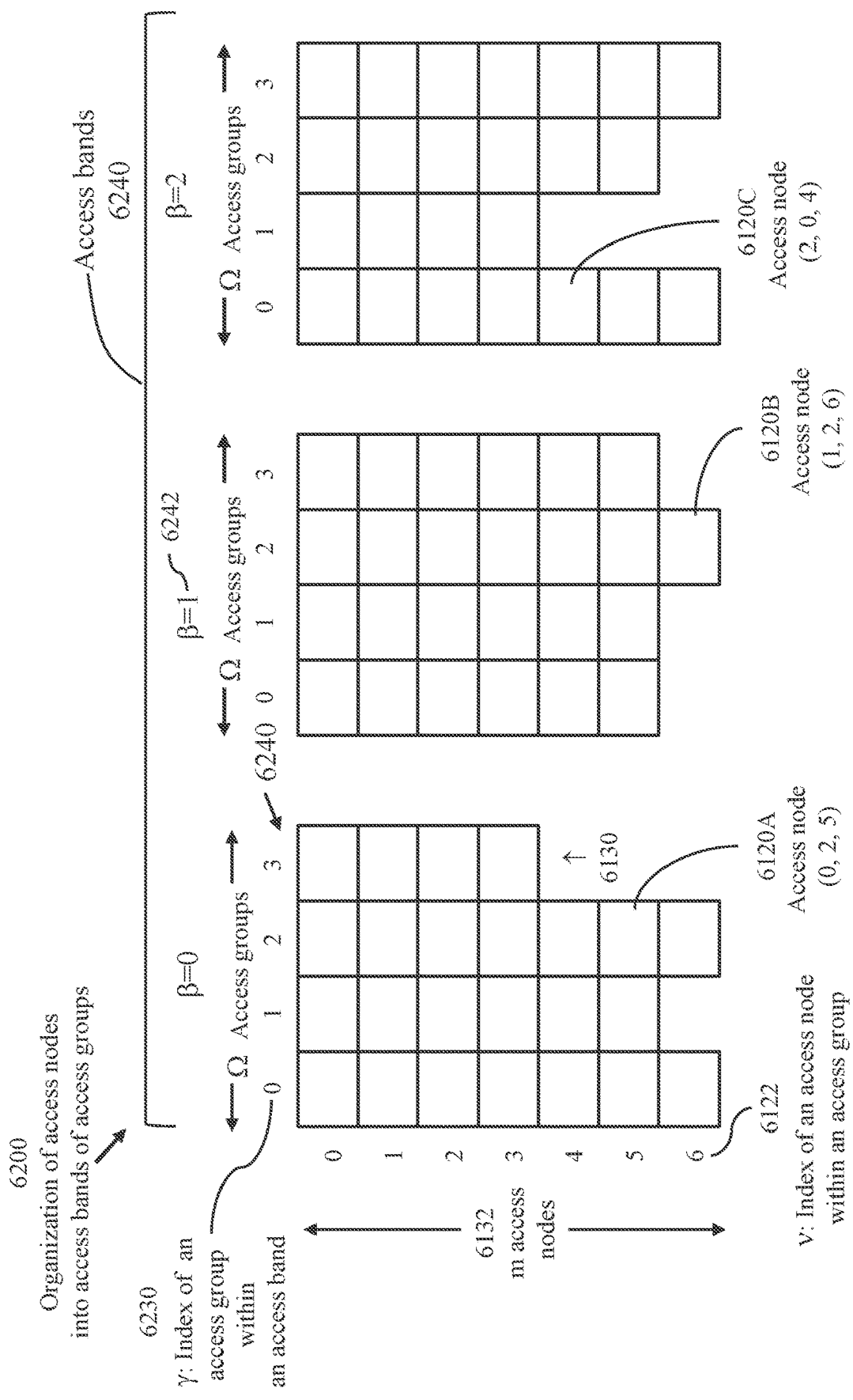
FIG. 62 illustrates further organization of the access groups of FIG. 61 into access bands.

FIG. 62 illustrates further organization 6200 of the access groups 6130 into a number Π, Π>2, of access bands 6240. Each access band 6240 comprises a predefined number Ω, Ω>2, of access groups 6130. The access bands are individually indexed (reference 6242) as 0 to (Π−1), and the access groups within an access band are individually indexed (reference 6230) as 0 to (Ω−1). An access group of index γ, within an access band of index β is identified as {β, γ}, $0 \le \beta < \Pi$, $0 \le y < \Omega$. The access groups of the access band of index 2, for example, are identified as {2,0}, {2,1}, {2,2}, and {2,3}. An access node of index ν within an access group containing M(β, γ) access nodes, $1 < M(\beta, \gamma) \le m$, is identified as (β, γ, ν). As indicated, access nodes 6120A, 6120B, and 6120C are identified as (0,2,5), (1,2,6), and (2,0,4), respectively.

Figure 63:
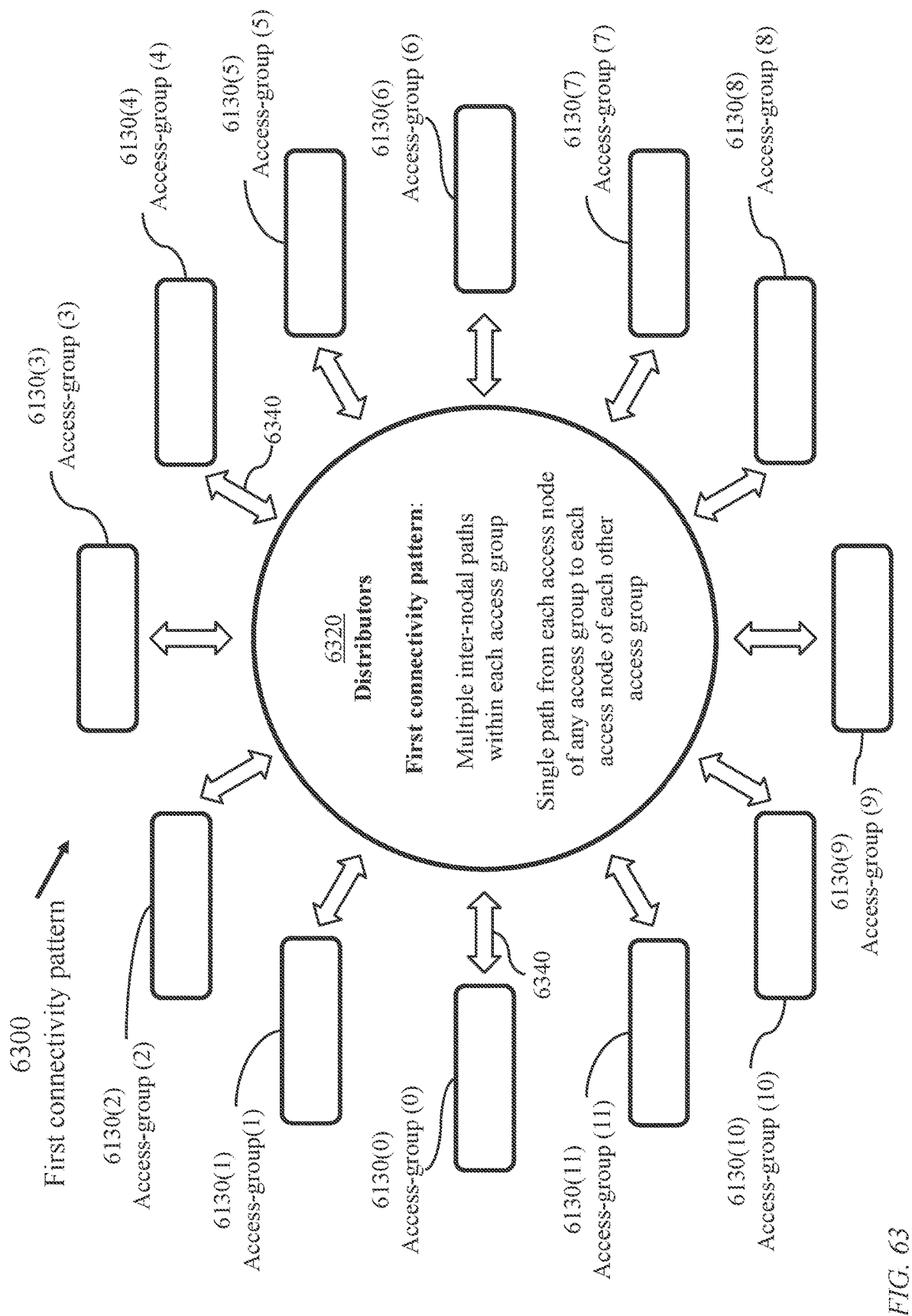
FIG. 63 illustrates a first connectivity pattern of access groups to a plurality of distributors to form a contiguous network based on first-order fusing of Clos star networks, in accordance with an embodiment of the present invention.

FIG. 63 illustrates a first connectivity pattern 6300 of the access groups 6130 to a plurality 6320 of first-order distributors to form a contiguous network based on first-order fusing of Clos star networks (three-stage networks). Each access group 6130 connects to selected distributors of the plurality 6320 of distributors through respective dual multichannel links 6340. Each first-order distributor, such as distributor 740 of FIG. 7, connects to dual channels of two access groups 6130. The two access groups may belong to a same access band within an intra-band constellation, or to different access bands within an inter-band constellation, as described above (FIGS. 25, 35, and 36, for example). The connectivity-pattern example of FIG. 63 corresponds to the access-node organization of FIG. 62.

Figure 64:
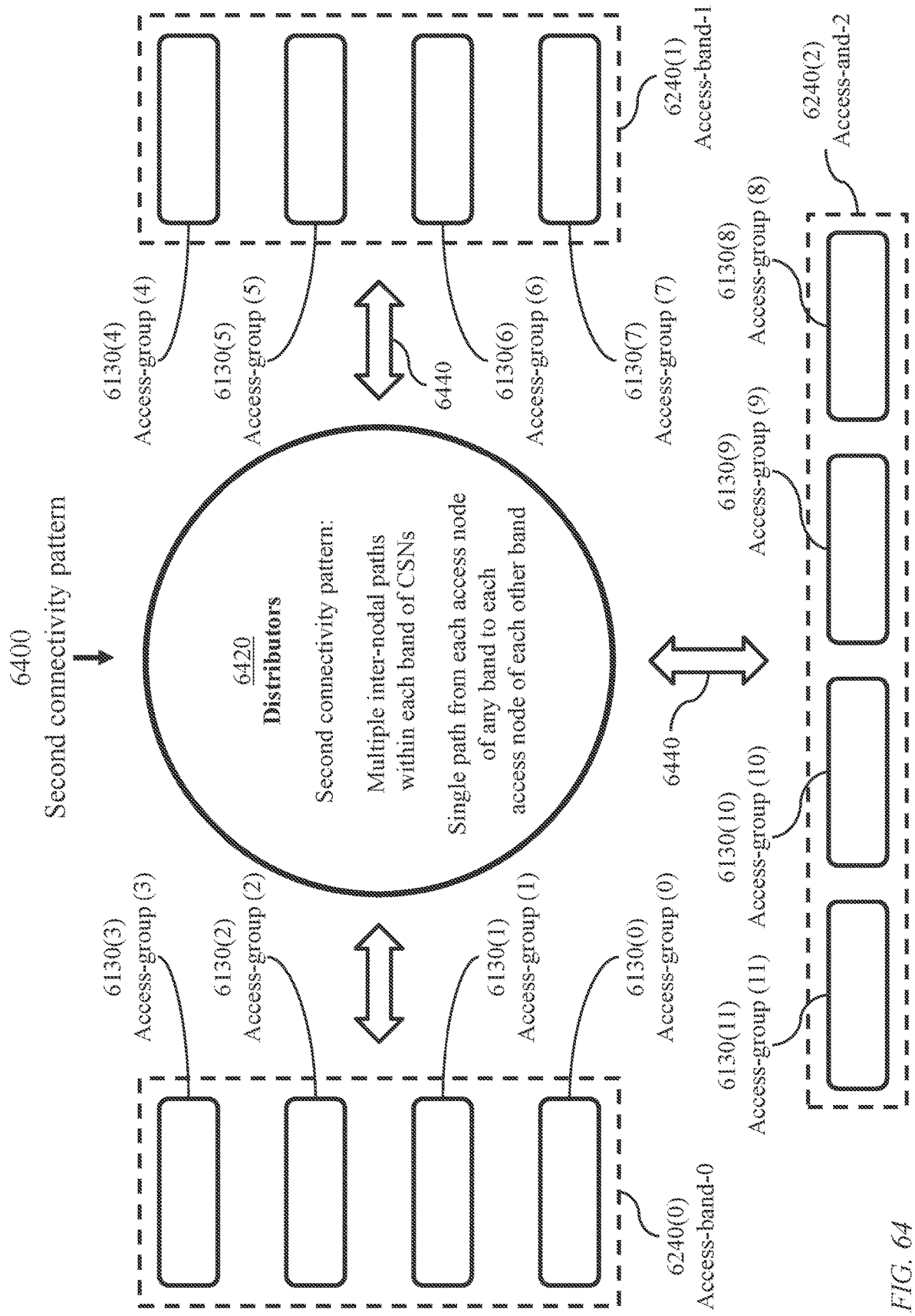
FIG. 64 illustrates a second connectivity pattern of access groups to a plurality of distributors to form a contiguous network based on second-order fusing of Clos star networks, in accordance with an embodiment of the present invention.

FIG. 64 illustrates a second connectivity pattern 6400 of the access groups 6130 to a plurality 6420 of second-order distributors to form a contiguous network based on second-order fusing of Clos star networks. A second-order distributor connects to dual channels of an access group of any access band and dual channels of multiple access groups of any other access band. Each access band 6240 connects to respective selected distributors of the plurality 6420 of distributors through respective dual multichannel links 6440. The only difference between a second-order distributor and a first-order distributor is the respective connectivity patterns to access nodes. The use of second-order distributors eliminates the need for intra-band constellations and, more importantly, enables establishing multiple single-hop paths for each pair of access nodes of different access groups within an access band.

Figure 65:
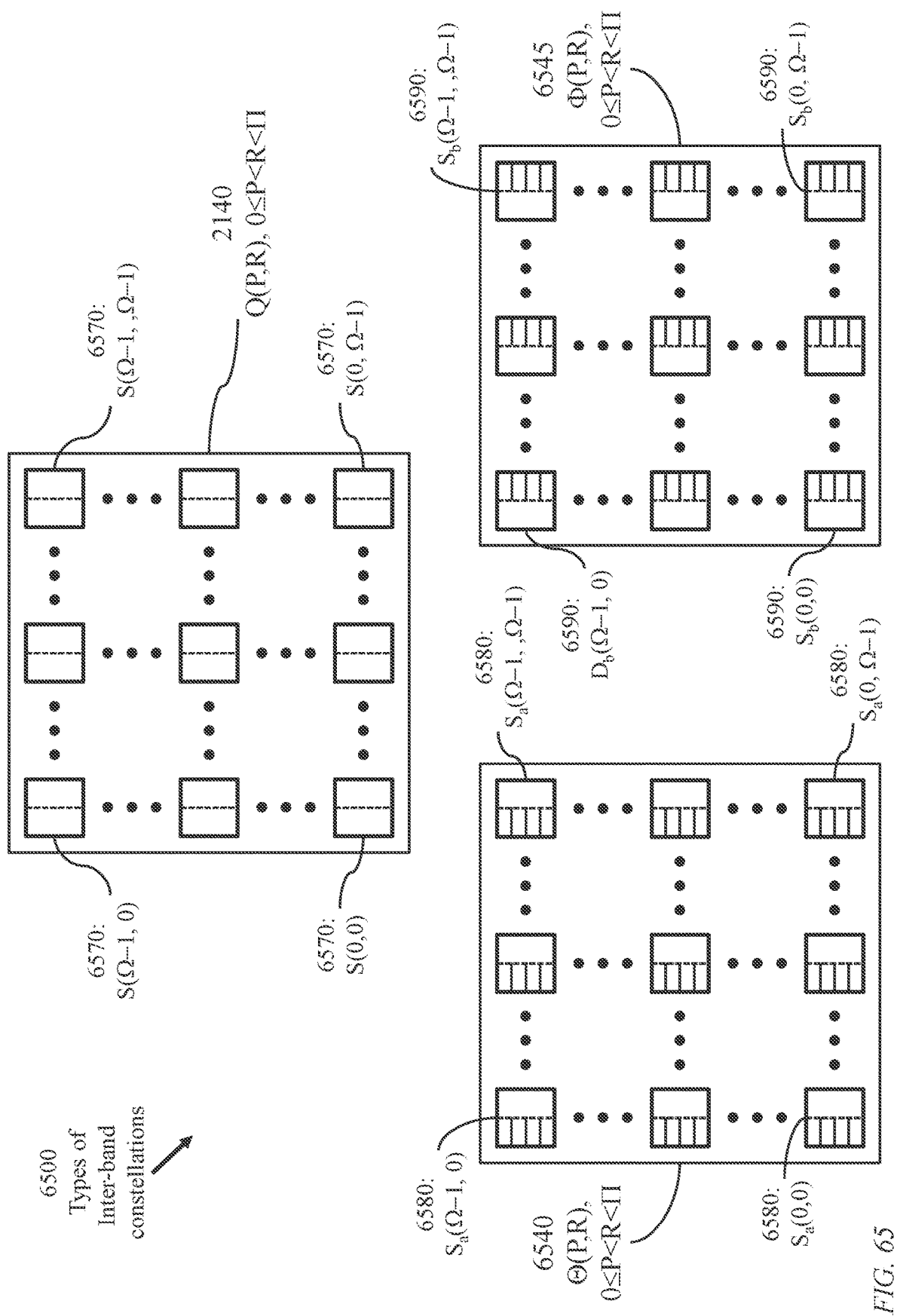
FIG. 65 illustrates forms of constellations of distributors.

FIG. 65 illustrates forms 6500 of constellations of distributors including a first-order inter-band constellation 2140 (FIG. 21), a type-I second-order inter-band constellation 6540, and a type-II second-order inter-band constellation 6545. Each constellation 2140, 6540, or 6545 comprises $\Omega^2$ distributors.

A distributor 6570 connects to dual channels from one access group of an access band P and dual channels of one access group of an access band of index R, 0≤P<R<Π. A distributor 6570 of a constellation 2140 grows to 2×m dual ports connecting to m dual channels emanating from access nodes of an access group 6130 of a first access band 6240 and m dual channels emanating from access nodes of an access group of a second access band 6240. Thus, a distributor 6570 provides:

m dual single-hop paths from each access node of one access group of the first access band to all access nodes of another access group of the second access band (a total of $m^2$ dual single-hop paths);
(m−1) dual single-hop paths from each access node of one access group of the first access band to each other access node of the same access group (a total of (m×(m−1))/2 dual single-hop paths); and
(m−1) dual single-hop paths from each access node of one access group of the second access band to each other access node of the same access group (a total of $m^2$ dual single-hop paths).

Thus, a distributor 6570 provides intra-group dual single-hop paths as well as inter-band dual single-hop paths.

A distributor 6580 connects to dual channels from Ω access groups of an access band P and dual channels of a single access group of an access band of index R, 0≤P<R<Π. A distributor 6580 of a constellation 6540 grows to 2×m dual ports connecting to m dual channels emanating from selected access nodes of Ω access groups 6130 of a first access band 6240 and m dual channels emanating from access nodes of one access group of a second access band 6240. Thus, a distributor 6580 provides:

m dual single-hop paths from each selected access node of the Ω access groups of the first access band to all access nodes of another access group of the second access band;
(m−1) dual single-hop paths from each selected access node of the Ω access groups of the first access band to each other selected access node of the Ω access groups of the first access band; and
(m−1) dual single-hop paths from each access node of one access group of the second access band to each other access node of the same access group.

Thus, a distributor 6580 provides intra-band, inter-group dual single-hop paths as well as inter-band dual single-hop paths.

A distributor 6590 connects to dual channels from Ω access groups of an access band R and dual channels of a single access group of an access band of index P, 0≤P<R<Π. A constellation 6545 uses distributors 6590 and provides similar dual single-hop paths.

Figure 66:
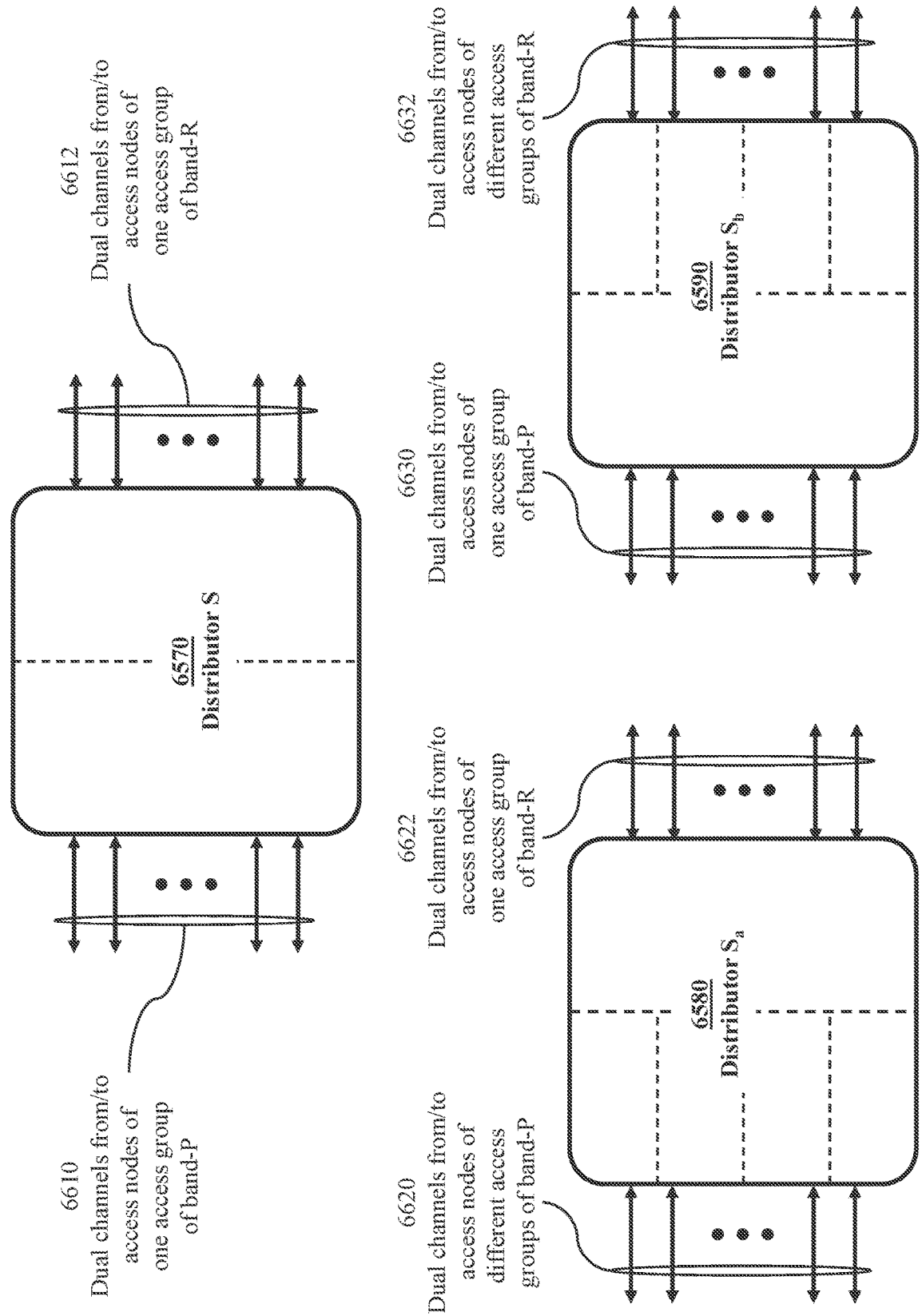
FIG. 66 illustrates a first-order and two second-order inter-band constellations.

FIG. 66 illustrates access-node connectivity to distributors of a first-order constellation 2140, a type-I second-order constellations 6540, and a type-II second-order constellation 6545. For an ordered access-band pair {P, R}, 0≤P<R<Π, a distributor 6570 of a constellation 2140 connects to dual channels 6610 emanating from an access group of access band P and dual channels 6612 emanating from an access group of access band R. A distributor 6580 of a constellation 6540 connects to dual channels 6620 emanating from multiple access groups of access band P and dual channels 6622 emanating from one access group of access band R. A distributor 6590 of a constellation 6545 connects to dual channels 6630 emanating from an access group of access band P and dual channels 6632 emanating from multiple access groups of access band R.

Selecting a number J×Π, 0≤J≤⌊(Π−1)/2⌋, of second-order inter-band constellations, the remaining number, L, of constellations may be configured as first-order inter-band constellations. L is determined as:

$$L = (\Pi \times (\Pi - 1)/2) - J \times \Pi.$$

Hereinafter, each second-order constellation is configured as an inter-band constellation. The division of the second-order constellations into type-I second-order constellations 6540 and type-II second-order constellations 6545 is selected to provide for each access band intra-group single-hop paths so that each access node of an access band has at least one single-hop path to each other access node of the same access band. Several arrangements may be devised to realize this objective. A preferred arrangement is outlined below.

for 1≤k≤⌊((Π−1)/2⌋, select
(Π−k) type-I second-order constellations 6540, denoted Θ(p, p+k), 0≤p<(Π−k), where each distributor connects to selected dual channels from different access groups of access-band p and dual channels of a single access group of access-band (p+k);
and
k type-2 second order constellations 6545 denoted Φ(r, Π+r−k), 0≤r<k, where each distributor connects to dual channels of a single access group of access-band r and selected dual channels from different access groups of access-band (Π+r−k).

Figure 67:
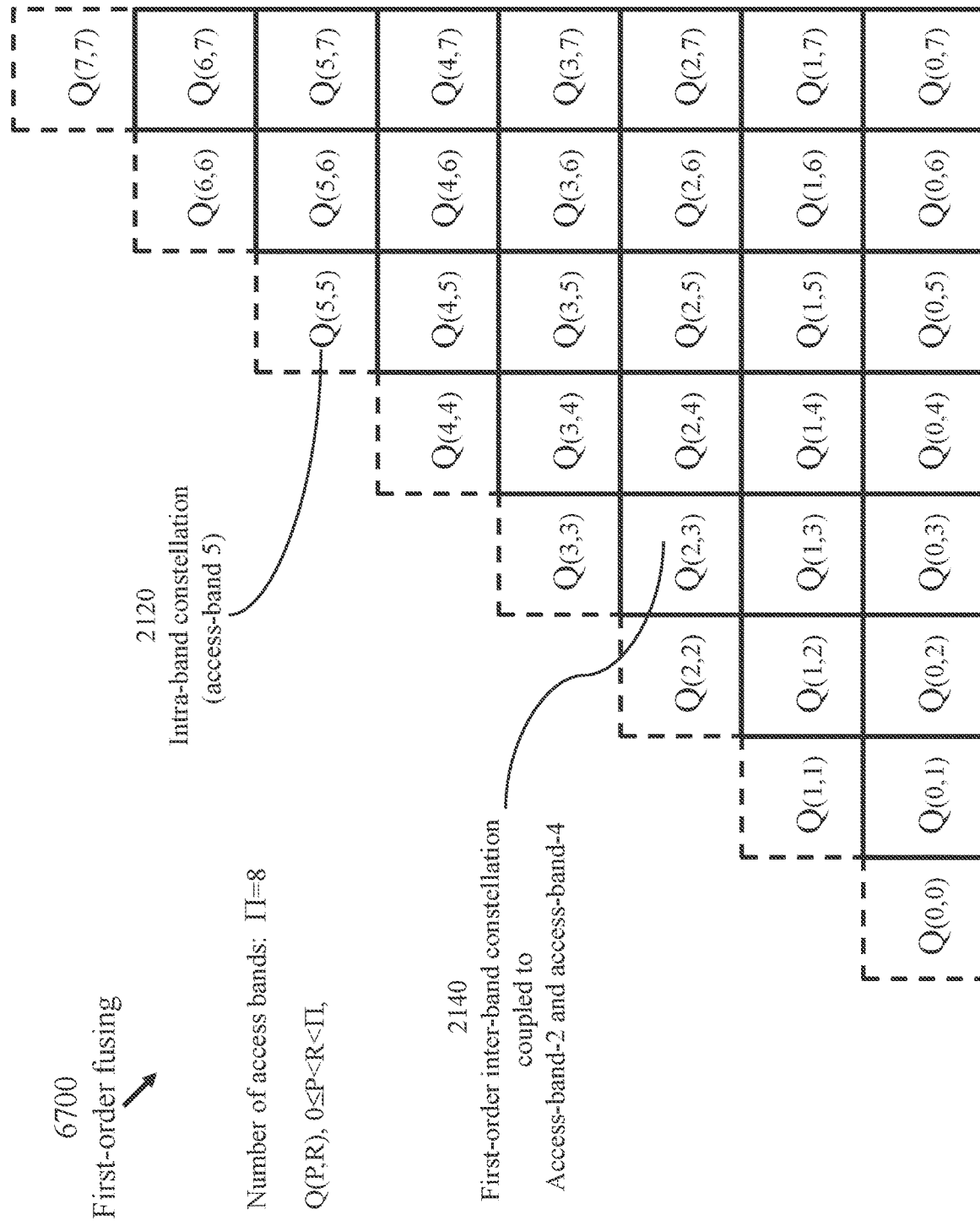
FIG. 67 illustrates an example of organization of a plurality of distributors of a network into first-order inter-band constellations.

FIG. 67 illustrates an example of organization 6700 of a plurality of distributors of a network into H intra-band constellations 2120 and (Π×(Π−1)/2) first-order inter-band constellations 2140 for a case where the access groups are arranged into eight access bands (Π=8). As described above, use of second-order constellations eliminates the need for intra-band constellations.

Formations of Second-Order Constellations

Figure 68:
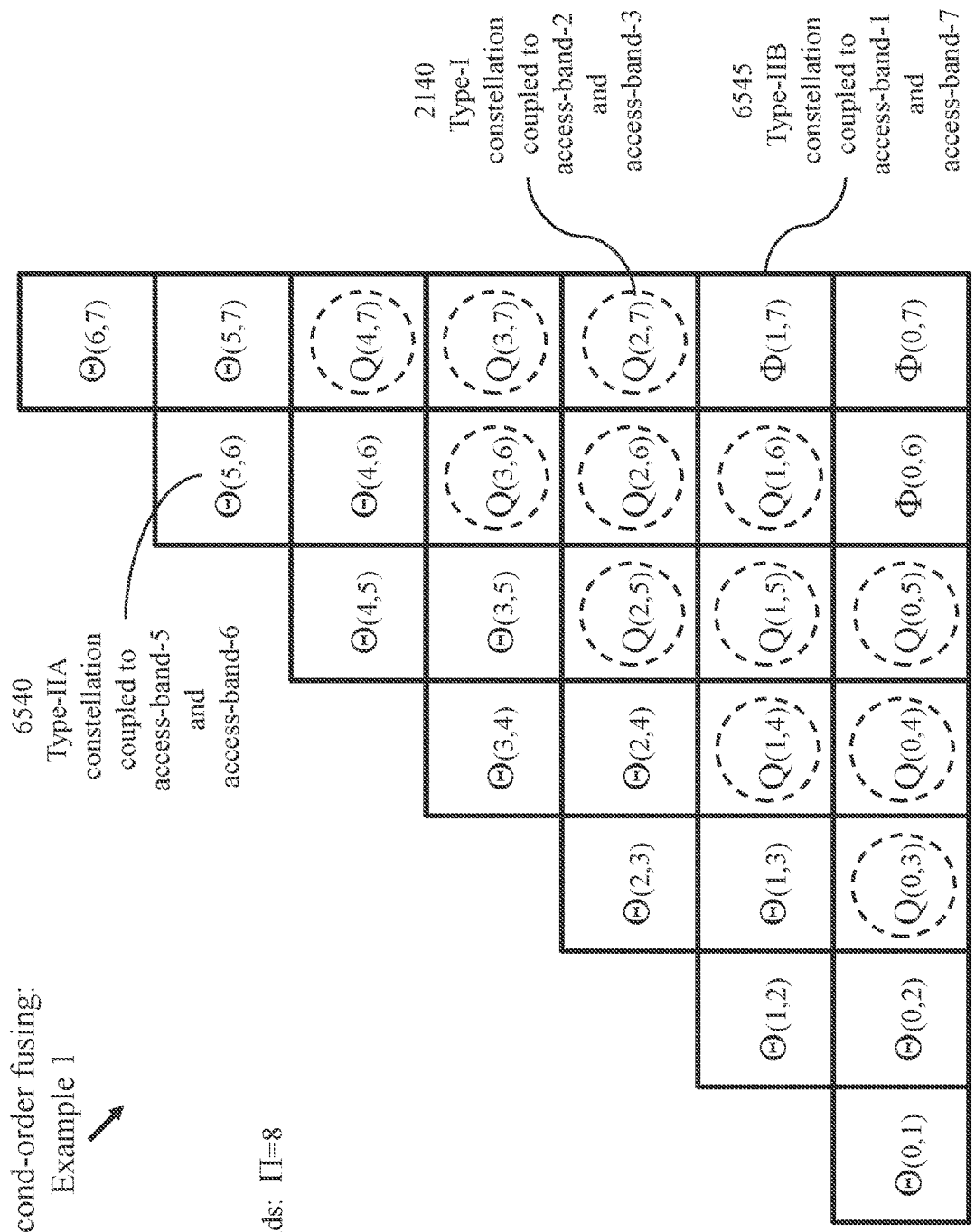
FIG. 68 illustrates an example of organization of a plurality of distributors of a network, of an even number of access bands, into first-order and second-order inter-band constellations.

FIG. 68 illustrates an example of organization 6800 of a plurality of distributors of a network, of an even number of access bands, into first-order inter-band constellations 2140 and second-order inter-band constellations 6540, 6545, eliminating the need for intra-band constellations, for the case where Π equals 8. The total number of constellations is determined as (Π×(Π−1)/2). The maximum number, K, of combined type-I and type-II second-order constellations is determined as:

$$K = \Pi \times \lfloor (\Pi - 1)/2 \rfloor.$$

The remaining constellations may be configured as first-order constellations 2140. Selecting a number J×Π, 0≤J≤⌊(Π−1)/2⌋, of second-order constellations, the remaining number, L, of constellations is:

$$L = (\Pi \times (\Pi - 1)/2) - J \times \Pi.$$

With Π=8, the maximum number of access groups per access band that may connect to second-order constellations is λ=⌊(Π−1)/2⌋=3.

Figure 69:
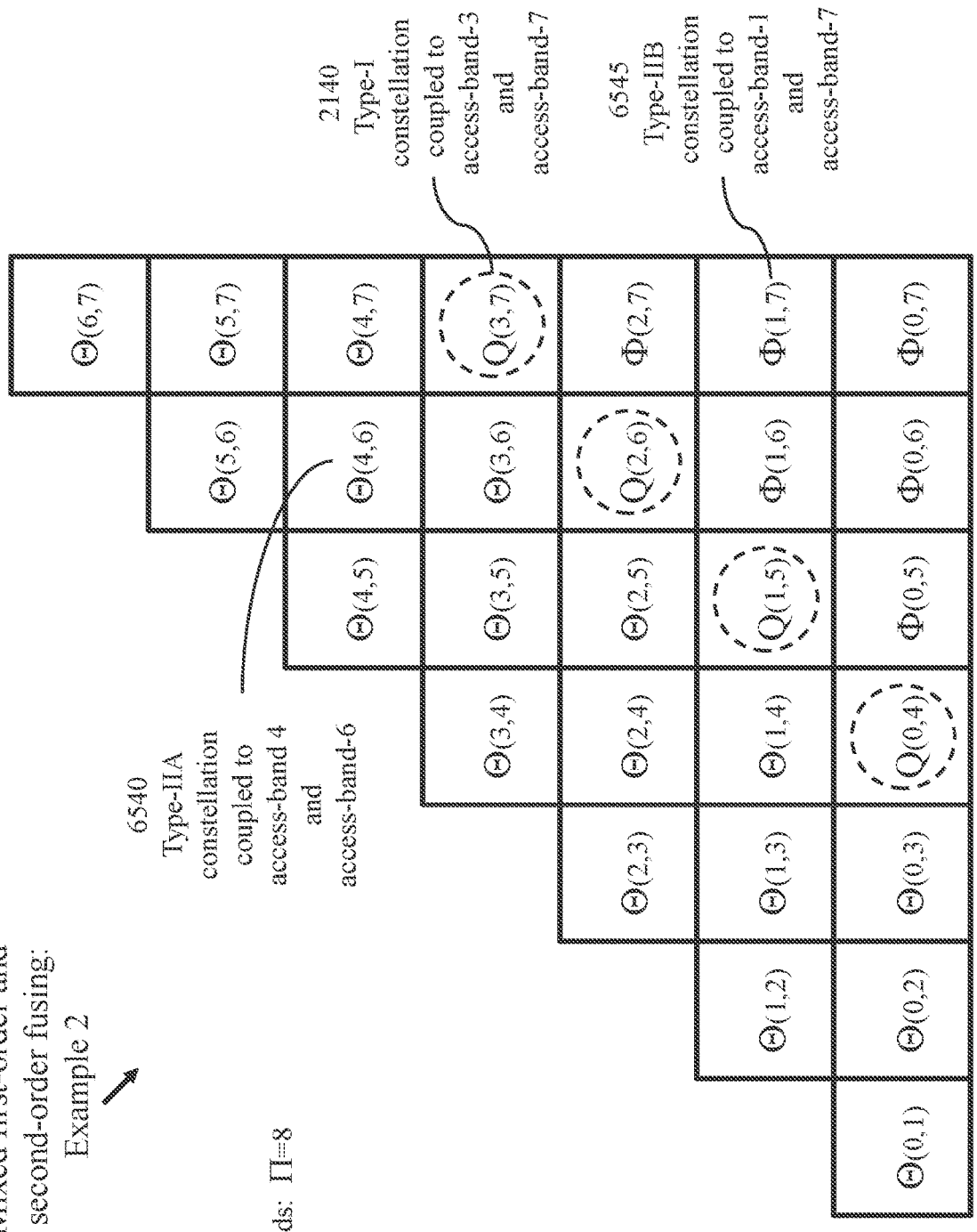
FIG. 69 illustrates an example of organization of a plurality of distributors of a network, of an even number of access bands, into an upper bound of second-order inter-band constellations and a remainder of first-order constellations.

FIG. 69 illustrates an example of organization 6900 of a plurality of distributors of a network, of an even number of access bands, with Π=8, into 3×Π of second-order constellations (J=3), the remaining constellations are configured as first-order constellations 2140 (constellations Q(0,4), Q(1, 5), Q(2,6), and Q(3,7)).

Figure 70:
FIG. 70 illustrates an example of organization of a plurality of distributors of a network, of an odd number of access bands, into second-order inter-band constellations.

FIG. 70 illustrates an example of organization 7000 of a plurality of distributors of a network, of an odd number of access bands, into second-order constellations, for the case where Π=7. The total number of inter-band constellations is (Π×(Π−1)/2)=21. The maximum number, K, of combined type-I and type-II second-order constellations is K=Π×⌊(Π−1)/2⌋=21. Hence, all constellations may be configured as second order constellations.

Figure 71:
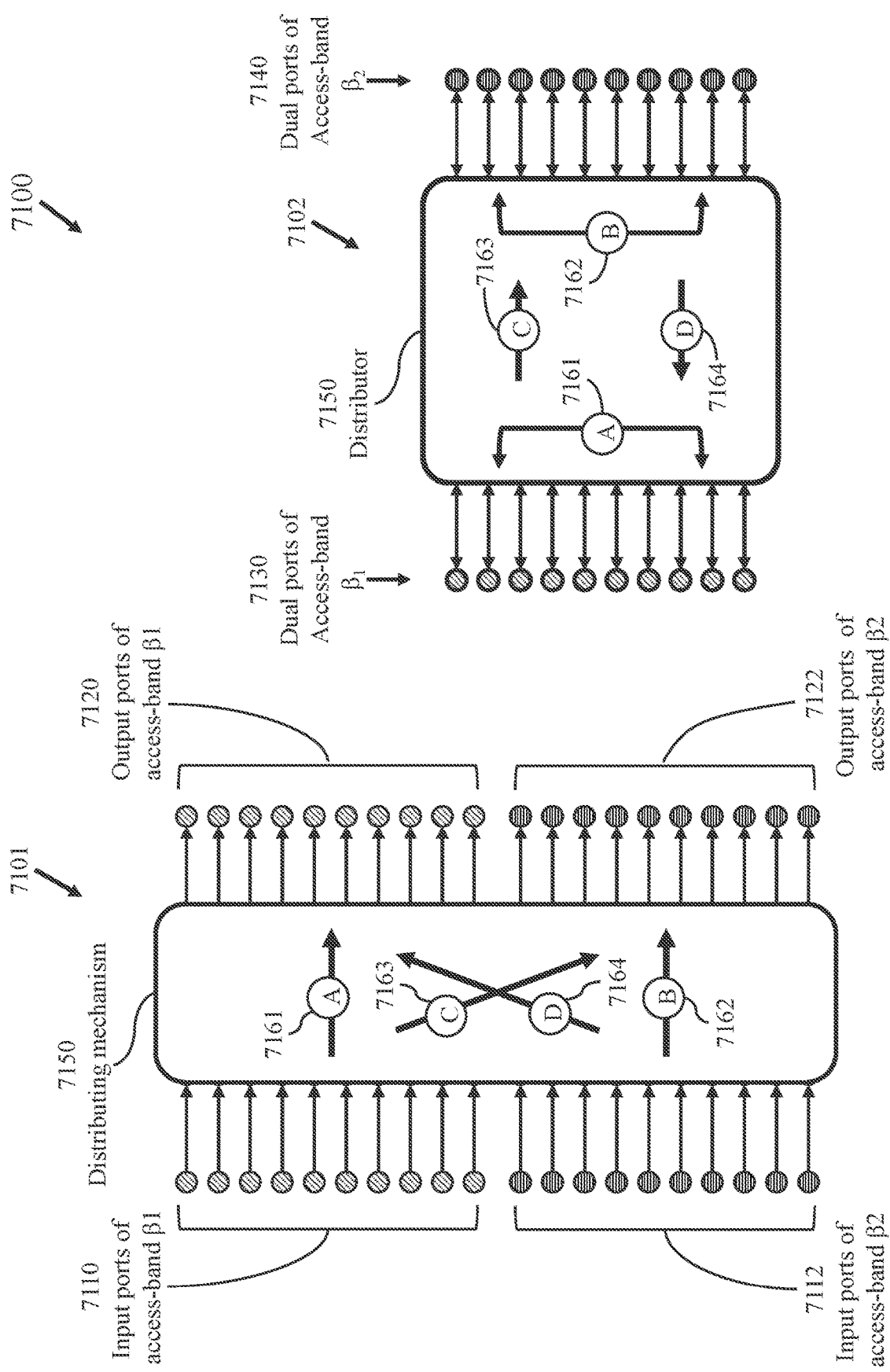
FIG. 71 illustrates a representation of a distributor within a constellation.

FIG. 71 illustrates representations 7100 of a distributor within a constellation connecting access bands $\beta_1$ and $\beta_2$, 0<$\beta_1$<$\beta_2$<Π. A distributor (switch/router) 7150 within a constellation 2140, 6540, or 6545, comprises a distributing mechanism configured to have up to 2×m dual ports communicatively coupled to access nodes of two access bands, in addition to at least one dual port coupled to a distributor controller, m being a design parameter. A dual port comprises an input port and an output port which are preferably integrated.

A first representation, 7101, of a distributor depicts connectivity of the distributing mechanism 7150 to input ports 7110 connecting to selected access nodes of access-band $\beta_1$, input ports 7112 connecting to selected access nodes of access-band $\beta_2$, output ports 7120 connecting to access nodes of the selected access nodes of access-band Pi, and output ports 7122 connecting to the selected access nodes of access-band $\beta_2$.

A second representation, 7102, of a distributor depicts connectivity of the distributing mechanism 7150 to dual ports 7130, connecting to the selected access nodes of access-band $\beta_1$, and dual ports 7140, connecting to the selected access nodes of access-band $\beta_2$. A dual port 7130 comprises an input port 7110 and an output port 7120. A dual port 7140 comprises an input port 7112 and an output port 7122. The second representation is used in subsequent illustrations of constellation connectivity to access nodes.

Internal paths through the distributing mechanism. indicated in representations 7101 and 7102, include:
paths 7161 from input ports 7110 to output ports 7120 (intra-first-band paths); paths 7162 from input ports 7112 to output ports 7122 (intra-second-band paths); paths 7163 from input ports 7110 to output ports 7122 (inter-band paths); and paths 7164 from input ports 7112 to output ports 7120 (inter-band paths).

For a first-order inter-band constellation 2140, $m_1$ dual ports, 1<$m_1$≤m, connect to access nodes of a selected access group, $\gamma_1$, of access-band $\beta_1$ and $m_2$ dual ports, 1<$m_2$≤m, connect to access nodes of a selected access group, $\gamma_2$, of access-band $\beta_2$, $m_1$ and $m_2$ being a number of access nodes of access groups $\gamma_1$ and $\gamma_2$, respectively.

For a type-I second-order inter-band constellation 6540, up to m dual ports, connect to access nodes belonging to multiple access groups of access-band $\beta_1$ and $m_2$ dual ports, 1<$m_2$≤m, connect to access nodes of a selected access group, $\gamma_2$, of access band $\beta_2$.

For a type-2 inter-band constellation 6545, $m_1$ dual ports, 1<$m_1$≤m, connect to access nodes of a selected access group, $\gamma_1$, of access-band $\beta_1$ and up to m dual ports, connect to access nodes belonging to multiple access groups of access band $\beta_2$.

Each constellation connects directly to each access node of a respective pair of access bands through a respective dual multichannel link each dual channel of which connecting to a respective distributor of the constellation. This eliminates the need for cross connectors between the plurality of access nodes and the plurality of distributors (350, FIG. 3).

A dual multichannel link connecting an access node to a constellation is coupled to: a first spectral multiplexer and a first spectral demultiplexer at the access node; and a second spectral demultiplexer and a second spectral multiplexer at the constellation.

The first spectral multiplexer, at the access node, combines Ω upstream channels emanating from electrical-to-optical converters coupled to Ω output ports of the access node into an upstream multichannel link directly routed to the constellation.

The second spectral demultiplexer, at the constellation, separates the Ω upstream channels, with each channel directed to a respective distributor of the constellation (FIG. 33)

The second spectral multiplexer, at the constellation, combines Ω downstream channels emanating from Ω distributors of the constellation into a downstream multichannel link directly routed to the access node.

The first spectral demultiplexer, at the access node, separates the Ω downstream channels, with each downstream channel coupled to a respective optical-to-electrical converter preceding an input port of the access node.

Allocating Access Nodes to Distributors

As described above, the network comprises a plurality of access nodes of identifiers (β,γ,ν), 0≤β<Π, 0≤γ<Ω, 0≤ν<M $(β,γ)$. The network comprises a maximum of $(Π×(Π−1))/2$ inter-band constellations which may comprise a mix of first-order constellations, type-I second-order constellations, and type-2 second-order constellations. As mentioned above, the use of second-order constellations eliminates the need for intra-band constellations.

Allocating Access Nodes to First-Order Constellations: First Connectivity Pattern (FIG. 63)

An access node $(P,γ,ν)$, $0≤P<Π$, $0≤γ<Ω$, $0≤ν<M(β,γ)$ connects to constellation $Q(P,R)$, $0≤P<R<H$ through $Ω$ dual channels, one to each of $Ω$ distributors $S(γ,χ)$, $0≤χ<Ω$.

An access node $(R,γ,ν)$, $0≤γ<Ω$, $0≤ν<M(R,γ)$ connects to constellation $Q(P,R)$ through $Ω$ dual channels, one to each of $Ω$ distributors $S(ρ,γ)$, $0≤ρ<Ω$.

Conversely, a distributor $S(ρ,χ)$, $0≤ρ<Ω$, $0≤χ<Ω$, connects to a dual channel from each of access nodes:

$(P, ρ, ν), 0 ≤ χ < Ω, 0 ≤ ν < M(P, ρ)$ and $(R, χ, ν), 0 ≤ ρ < Ω, 0 ≤ ν < M(R, χ)$.

Figure 72:
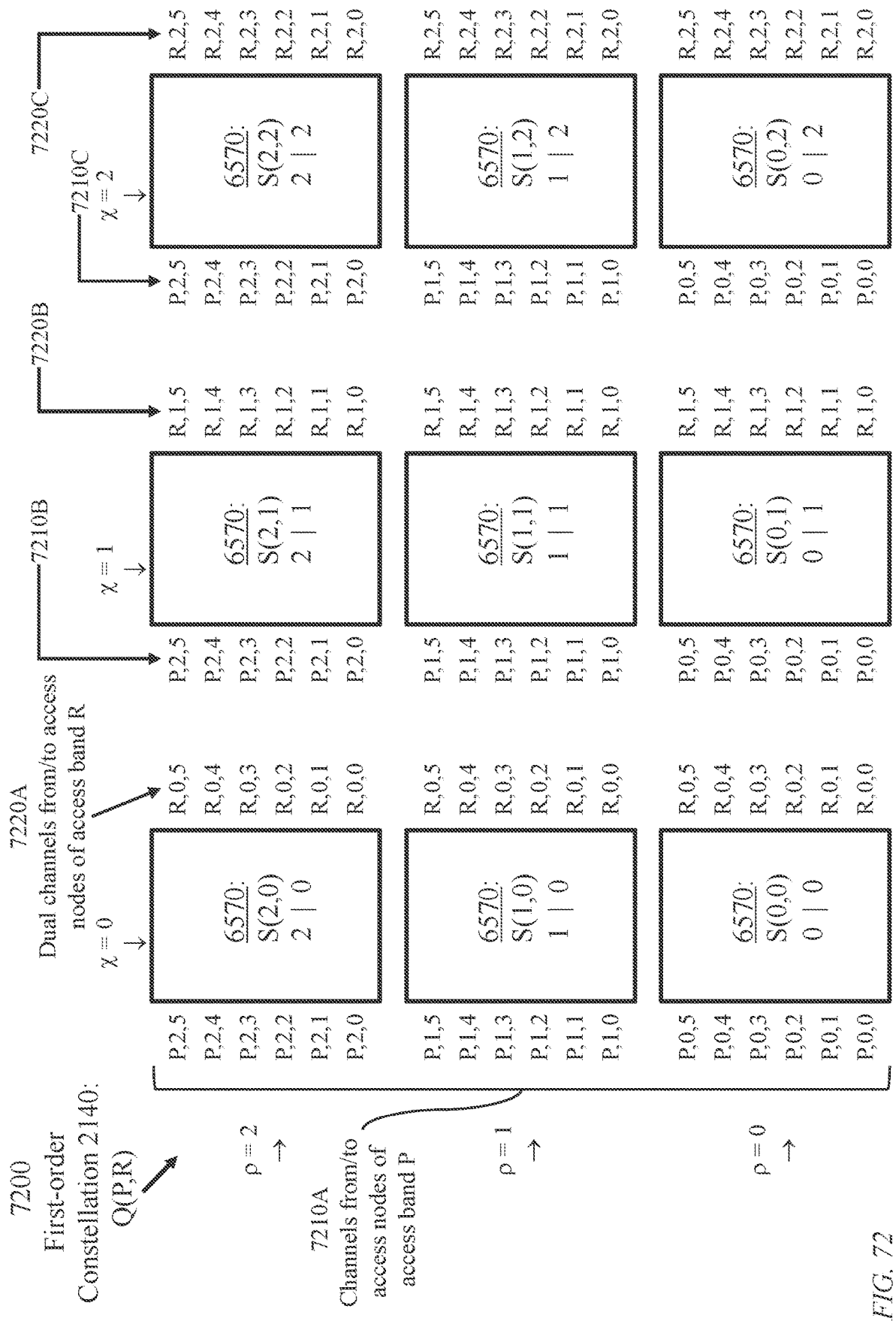
FIG. 72 illustrates connectivity of distributors of an exemplary first-order constellation of three access groups per access band.
Figure 78:
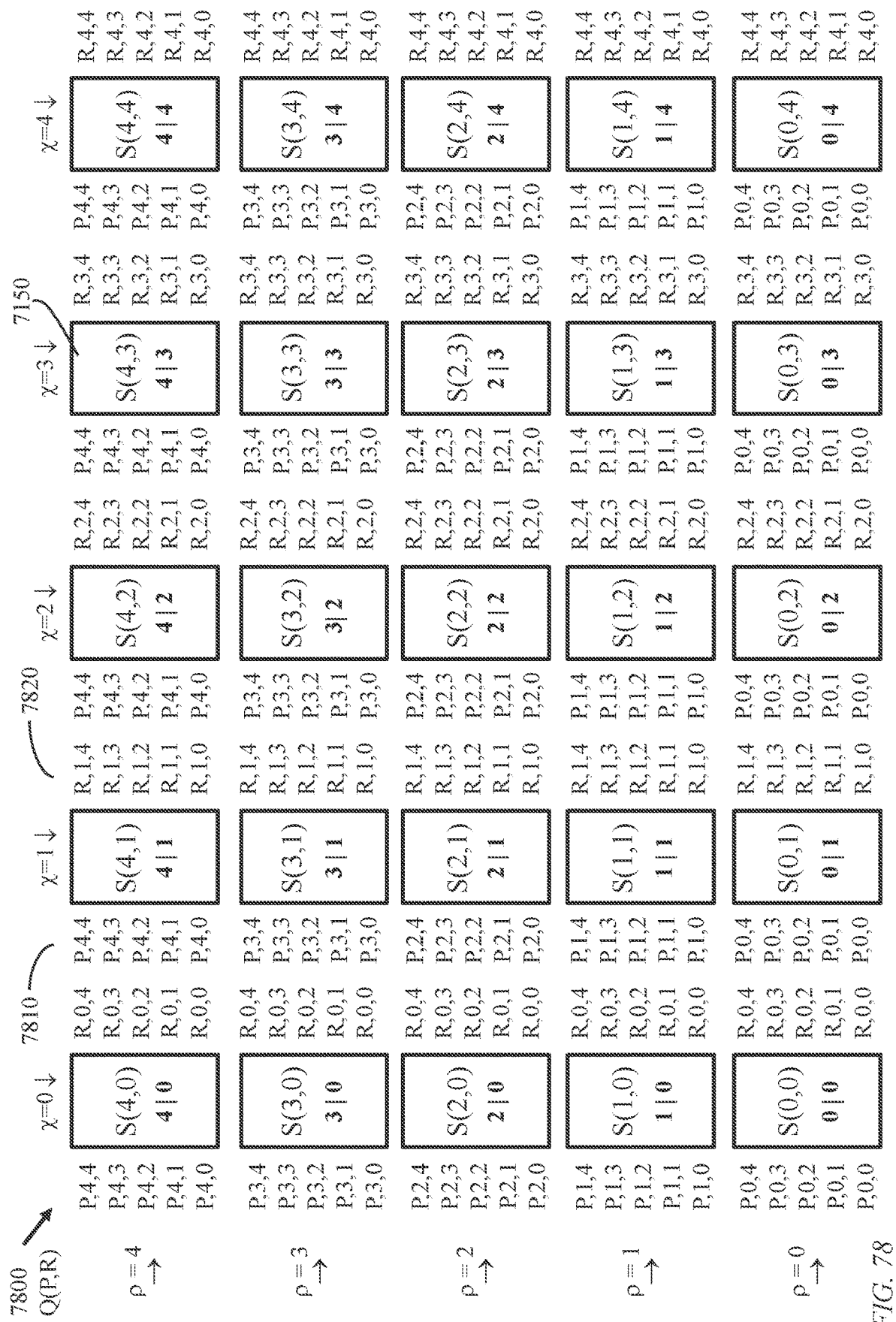
FIG. 78 illustrates connectivity of distributors of an exemplary first-order constellation where each access band comprises five access groups with the access groups having equal numbers of access nodes.

The constellations of FIG. 72 and FIG. 78 are inter-band first-order constellations.

Allocating Access Nodes to Second-Order Constellations Second Connectivity Pattern (FIG. 64)

As described above, with second-order fusing, each pair of access bands connects to a respective constellation, with one band, denoted "joined band", connecting in a first mode and one band, denoted "fusing band", connecting in a second mode.

According to the first mode, each distributor of a constellation connects, through dual channels, to each access node of one access group of the joined band.

According to the second mode, each distributor of the constellation connects, through dual channels, to at least one access node of each access group of the fusing band. The selection of the at least one access node ensures that each access node of the fusing band has a single-hop path (through one distributor) to:

each access node of the joined band; and each access node of each other group of the fusing band.

Several connectivity patterns may be devised to realize this condition. A simple connectivity pattern, applicable when the number, $Ω$, of access groups per band is a prime number is described below.

In a type-I second-order constellation, An access node $(P,γ,ν)$, $0≤γ<Ω$, $0≤ν<M(β,γ)$ connects to constellation $Θ(P, R)$, $0≤P<R<Π$ through $Ω$ dual channels, one to each of $Ω$ distributors:

$S(ρ, χ), ρ = (ν + γ × χ)_{moduloΩ}, 0 ≤ χ < Ω$.

An access node $(R,γ,ν)$, $0≤γ<Ω$, $0≤ν<M(R,γ)$ connects to constellation $Θ(P,R)$ through $Ω$ dual channels, one to each of $Ω$ distributors $S(ρ,γ)$, $0≤ρ<Ω$.

Conversely, distributor $S(ρ,χ)$, $0≤ρ<Ω$, $0≤χ<Ω$, connects to a dual channel from each of access nodes:

$(P, γ, ν), ν = (ρ − γ × χ + J × Ω)_{moduloΩ} < M(P, γ)$, $0 ≤ γ < Ω, 0 ≤ J < ⌈M(P, γ)/Ω⌉$;

and $(R, χ, ν), 0 ≤ ρ < Ω, 0 ≤ ν < M(R, χ)$.

In a type-II second-order constellation, an access node $(P,γ,ν)$, $0≤P<R<Π$, $0≤γ<Ω$, $0≤ν<M(β,γ)$ connects to constellation $Φ(P,R)$ through $Ω$ dual channels, one to each of $Ω$ distributors $S(ρ,γ)$, $0≤ρ<Ω$.

An access node $(R,γ,ν)$, $0≤γ<Ω$, $0≤ν<M(R,γ)$ connects to constellation $Φ(P,R)$ through $Ω$ dual channels, one to each of $Ω$ distributors:

$S(ρ, χ), ρ = (ν + γ × χ)_{moduloΩ}, 0 ≤ χ < Ω$.

Conversely, distributor $S(ρ,χ)$, $0≤ρ<Ω$, $0≤χ<Ω$, connects to a dual channel from each of access nodes:

$(P, χ, ν), 0 ≤ ν < M(P, χ)$, and $(R, γ, ν), ν = (ρ − γ × χ + J × Ω)_{moduloΩ} < M(R, γ)$, $0 ≤ γ < Ω, 0 ≤ J < ⌈M(R, γ)/Ω⌉$.

FIG. 72 illustrates connectivity 7200 of distributors of an exemplary inter-band first-order constellation of three access groups per access band ($Ω$=3), with $M(β,γ)$=6 and $M(R,γ)$=6, for $0≤γ<Ω$. Dual channels 7210A, 7210B, 7210C connect access groups of access band P, $0≤P<(Π−1)$, to distributors $S(0,χ)$, $S(1,χ)$, and $S(2,χ)$, $0≤χ<3$. Dual channels 7220A, 7220B, and 7220C connect access groups of access band R, $0≤P<R<Π$, to distributors $S(ρ,0)$, $S(ρ,1)$, and $S(ρ,2)$, $0≤ρ<3$.

As described above, according to the first connectivity pattern (FIG. 63), a distributor $S(ρ,χ)$, $0≤ρ<Ω$, $0≤χ<Ω$, connects to a dual channel from each of access nodes:

$(P, ρ, ν), 0 ≤ χ < Ω, 0 ≤ ν < M(P, ρ)$ and $(R, χ, ν), 0 ≤ ρ < Ω, 0 ≤ ν < M(R, χ)$.

Thus, distributor $S(2,1)$ connects to dual channels emanating from access nodes:

(P, 2, 0), (P, 2, 1), (P, 2, 2), (P, 2, 3), (P, 2, 4), (P, 2, 5), and (R, 1, 0), (R, 1, 1), (R, 1, 2), (R, 1, 3), (R, 1, 4), (R, 1, 5).

All access nodes (P,2,0), (P,2,1), . . . , (P,2,5) connect to distributors $S(2,0)$, $S(2,1)$, and $S(2,2)$. All access nodes (R,1,0), (R,1,1), . . . , (R,1,5) connect to distributors $S(0,1)$, $S(1,1)$, and $S(2,1)$.

Figure 73:
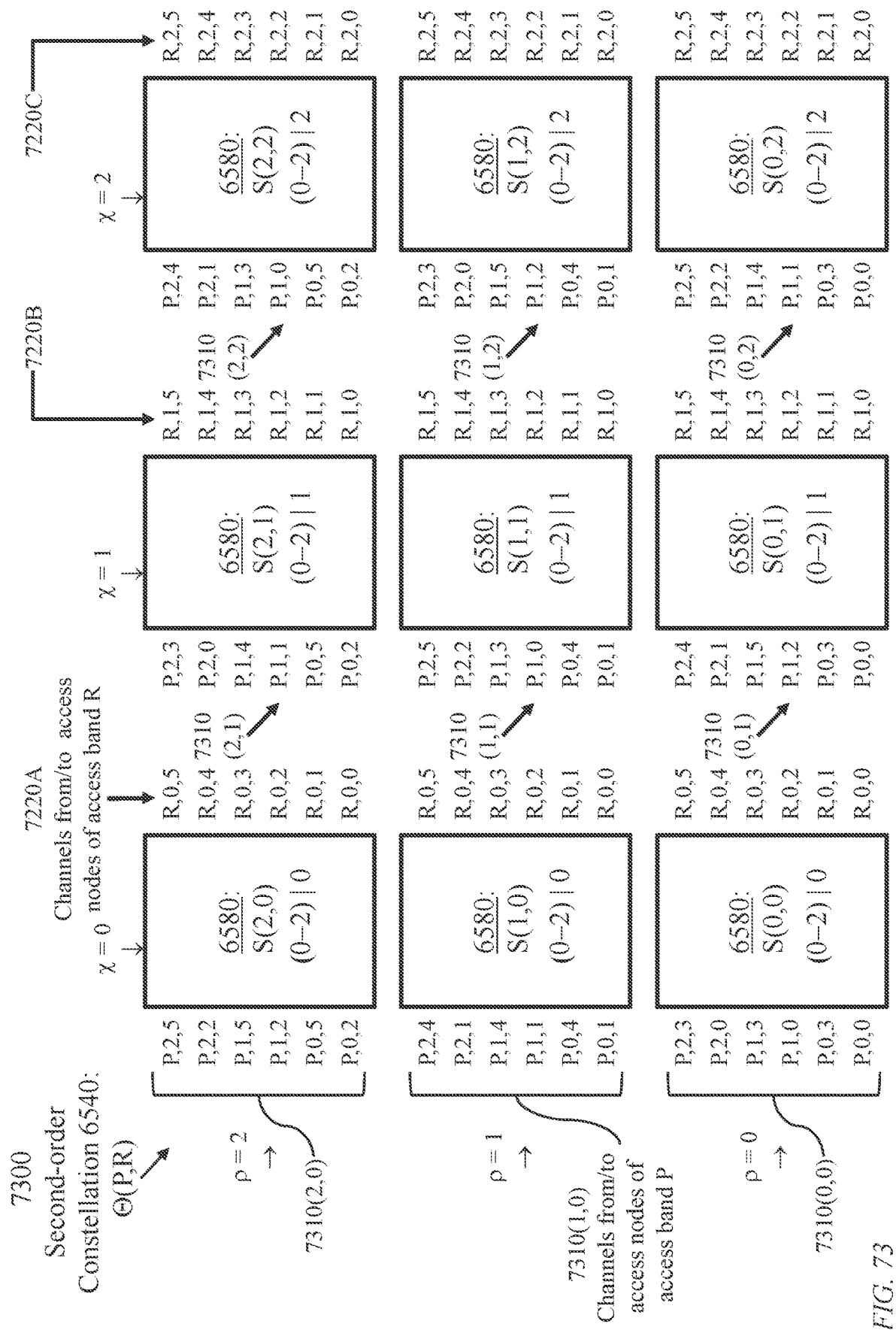
FIG. 73 illustrates a connectivity pattern of distributors of an exemplary type-I second-order constellation of three access groups per access band.

FIG. 73 illustrates connectivity 7300 of distributors of an exemplary type-I second-order constellation of three access groups per access band ($Ω$=3), with $M(P,γ)$=6 and $M(R,γ)$=6, for $0≤γ<Ω$. Dual channels 7310 connect access groups of access-band P to distributors $S(0,χ)$, $S(1,χ)$, and $S(2,χ)$, $0≤χ<3$. Dual channels 7310 from access band P to individual distributors are identified as $7310(ρ,χ)$, for $0≤ρ<Ω$, $0≤χ<Ω$.

Dual channels 7220A from access-group 0 of access-band R, connect to distributors S(0,0), S(1,0), S(2,0). Dual channels 7220B from access-group 1 of access-band R, connect to distributors S(0,1), S(1,1), S(2,1). Dual channels 7220C from access-group 2 of access-band R, connect to distributors S(0,2), S(1,2), S(2,2).

As described above, according to the second connectivity pattern (FIG. 64), a distributor $S(\rho,\chi)$, $0 \leq \rho < \Omega$, $0 \leq \chi < \Omega$, of a type-I second-order constellation, connects to a dual channel from each of access nodes:

$$(P, \gamma, \nu), \nu = (\rho - \gamma \times \chi + J \times \Omega)_{modulo\,\Omega} < M(P, \gamma),$$
$$0 \leq \gamma < \Omega, 0 \leq J < \lceil M(P, \gamma)/\Omega \rceil;$$

and $$(R, \chi, \nu), 0 \leq \rho < \Omega, \ 0 \leq \nu < M(R, \chi).$$

Thus, distributor S(0,0) connects to dual channels emanating from access nodes:
(P, 0, 0), (P, 1, 0), (P, 2, 0), (P, 0, 3), (P, 1, 3), (P, 2, 3), and (R, 0, 0), (R, 0, 1), (R, 0, 2), (R, 0, 3), (R, 0, 4), (R, 0, 5).

Distributor S(2,1) connects to dual channels emanating from access nodes:
(P, 0, 2), (P, 1, 1), (P, 2, 0), (P, 0, 5), (P, 1, 4), (P, 2, 3), and (R, 1, 0), (R, 1, 1), (R, 1, 2), (R, 1, 3), (R, 1, 4), (R, 1, 5).

All access nodes (R,2,0), (R,2,1), . . . , (R,2,5) connect to distributors S(0,2), S(1,2), and S(2,2) as in first-order constellation Q(P,R) of FIG. 72.

Figure 74:
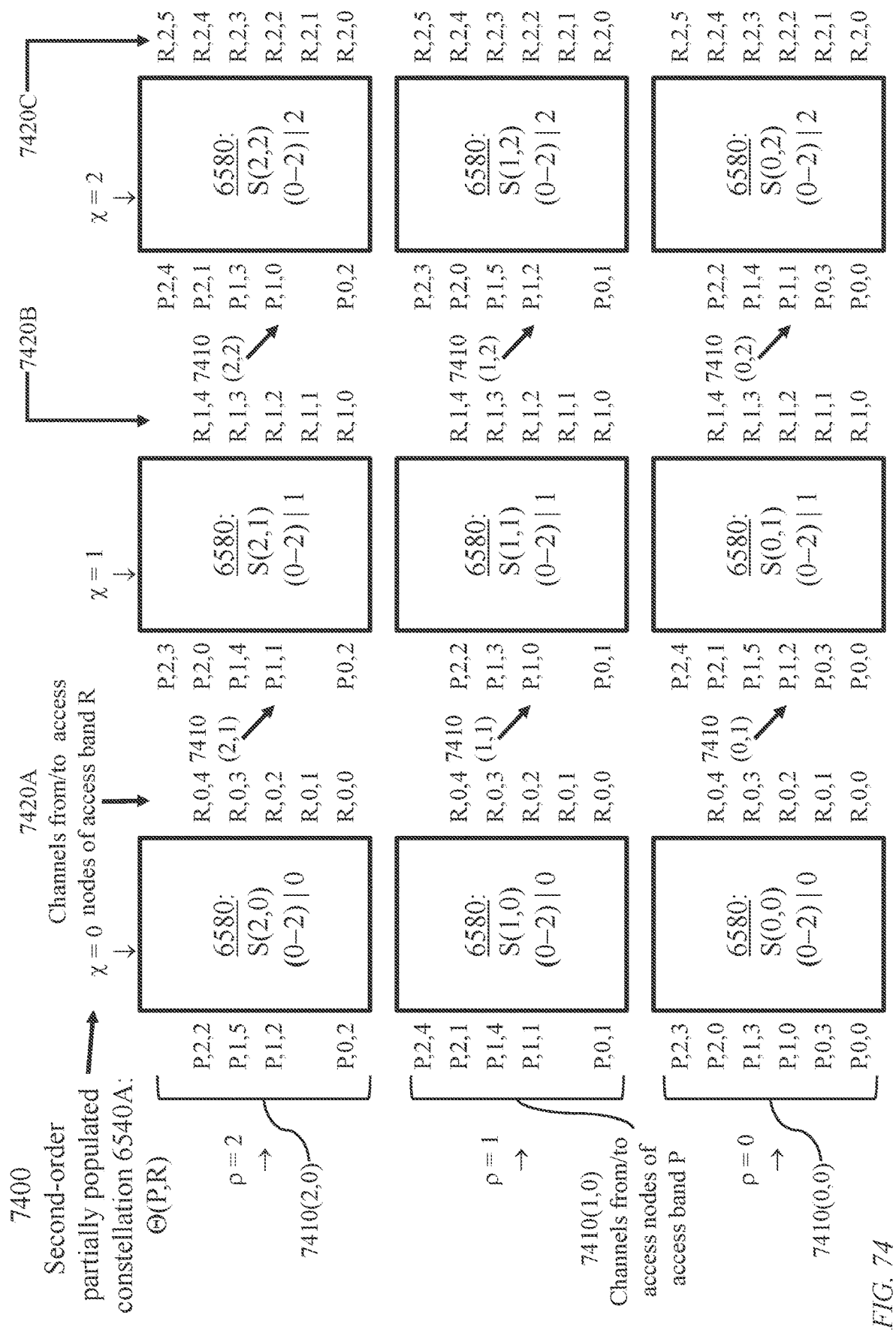
FIG. 74 illustrates a connectivity pattern of distributors of an exemplary partially populated type-I second-order constellation of three access groups per access band.

FIG. 74 illustrates connectivity 7400 of distributors of an exemplary partially populated type-I second-order constellation $\Theta(P, R)$, $0 \leq P < R, \Omega$ of three access groups per access band ($\Omega=3$), with access groups of different numbers of access nodes as indicated in Table-II below where:
M(P,0)=4, M(P,0)=6, M(P,0)=5, M(R,0)=5, M(R,0)=5, and M(R,0)=6.

TABLE II

| Access group | Number of access nodes | |
|---|---|---|
| | Access band P | Access band R |
| 0 | 4 | 5 |
| 1 | 6 | 5 |
| 2 | 5 | 6 |

Thus, distributor S(2,1), for example, connects to dual channels emanating from access nodes:
(P, 0, 2), (P, 1, 1), (P, 1, 4), (P, 2, 0), (P, 2, 3), and (R, 1, 0), (R, 1, 1), (R, 1, 2), (R, 1, 3), (R, 1, 4).

Dual channels 7410 from partially populated access band P to individual distributors are identified as 7410$(\rho,\chi)$, for $0 \leq \rho < \Omega$, $0 \leq \chi < \Omega$. Dual channels 7420A from partially populated access-group 0 of access-band R, connect to distributors S(0,0), S(1,0), S(2,0). Dual channels 7420B from partially populated access-group 1 of access-band R, connect to distributors S(0,1), S(1,1), S(2,1). Dual channels 7420C from fully populated access-group 2 of access-band R, connect to distributors S(0,2), S(1,2), S(2,2).

Figure 75:
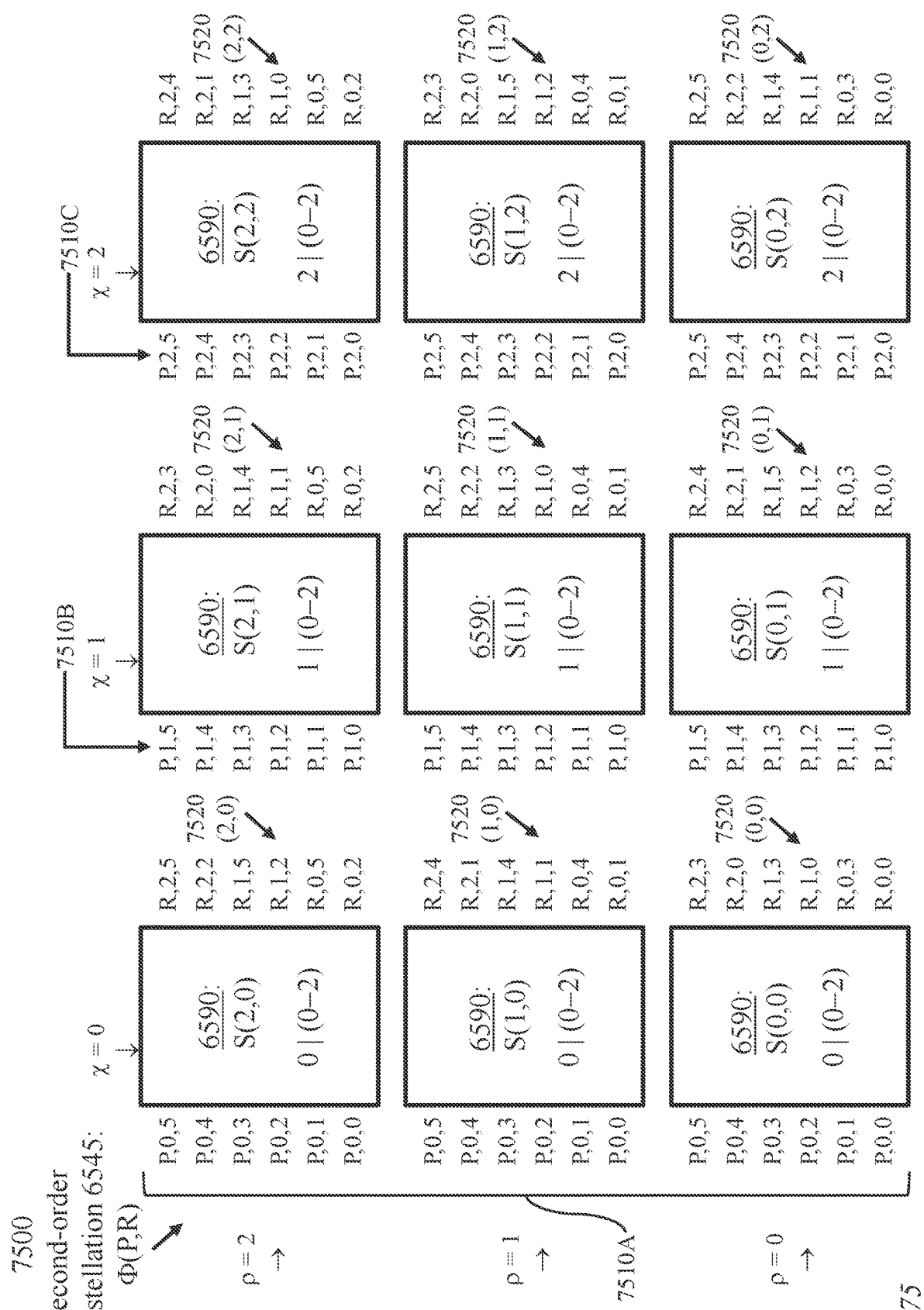
FIG. 75 illustrates a connectivity pattern of distributors of an exemplary type-II second-order constellation of three access groups per access band.

FIG. 75 illustrates connectivity 7500 of distributors of an exemplary type-II second-order constellation of three access groups per access band ($\Omega=3$), with $M(\beta,\gamma)=6$ and $M(R,\gamma)=6$, for $0 \leq \gamma < \Omega$. Dual channels 7510A from access-group 0 of access-band P, connect to distributors S(0,0), S(1,0), S(2,0). Dual channels 7510B from access-group 1 of access-band P, connect to distributors S(0,1), S(1,1), S(2,1). Dual channels 7510C from access-group 2 of access-band P, connect to distributors S(0,2), S(1,2), S(2,2). Dual channels 7520 from access band R to individual distributors are identified as 7520$(\rho,\chi)$, for $0 \leq \rho < \Omega$, $0 \leq \chi < \Omega$.

As described above, according to the second connectivity pattern (FIG. 64), a distributor $S(\rho,\chi)$, $0 \leq \rho < \Omega$, $0 \leq \chi < \Omega$, of a type-II second-order constellation, connects to a dual channel from each of access nodes:

$$(P, \chi, \nu), 0 \leq \rho < \Omega, 0 \leq \nu < M(P, \chi), \text{ and}$$
$$(R, \gamma, \nu), \nu = (\rho - \gamma \times \chi + J \times \Omega)_{modulo\,\Omega} < M(R, \gamma),$$
$$0 \leq \gamma < \Omega, 0 \leq J < \lceil M(R, \gamma)/\Omega \rceil.$$

Thus, distributor S(2,1), for example, connects to dual channels emanating from access nodes:
(P, 1, 0), (P, 1, 1), (P, 1, 2), (P, 1, 3), (P, 1, 4), (P, 1, 5), and (R, 0, 2), (R, 0, 5), (R, 1, 1), (R, 1, 4), (R, 2, 0), (R, 2, 3).

Figure 76:
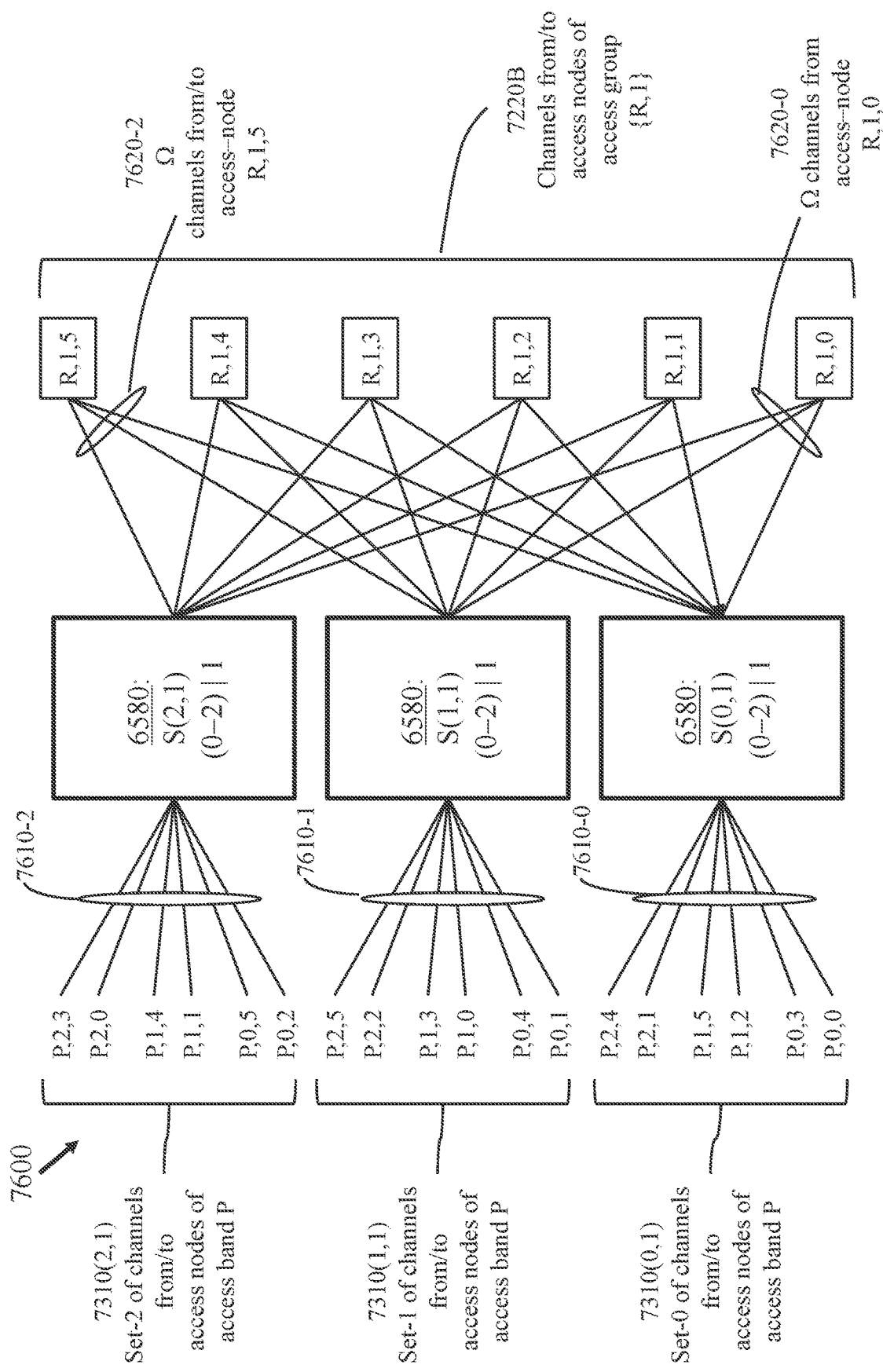
FIG. 76 details connectivity of distributors of a constellation coupled to a specified pair of access bands.

FIG. 76 details connectivity 7600 of distributors of a constellation coupled to a specified pair of access bands. As described above, each access node connects to each of respective Π constellations through a respective dual WDM link comprising $\Omega$ dual channels. A distributor $S(\rho,\chi)$ of constellation $\Theta(P, R)$, $0 \leq P < R < \Pi$, of FIG. 73, connects to a maximum of m dual channels emanating from $\Omega$ access groups of access band P and a number $M(R,\gamma)$ of dual channels emanating from an access group $\gamma$ of access band R, $1 < M(P,R) < m$, $0 \leq y < \Omega$. A maximum of m dual channels 7610 connects $\Omega$ access nodes of different access groups of access band P to a distributor and a maximum of m dual channels 7620 connects each access node of a single access group of access band R to distributors S(0,1), S(1,1), and S(2,1). Dual channels 7620-0 emanate from access node (R,1,0) and dual channels 7620-2 emanate from access node {R, 1, 5}. The access nodes coupled to distributor S(0,1) are: P(0,0), P(0,3), P(1,2), P(1,5), P(2,1), P(2,4), R(1, j), $0 \leq j < \Omega$. Thus, constellation $\Theta(P, R)$ connects each access node of each access group of access band P to:
each access node of each other access group of access band P; and
each access node of access band R.

Figure 77:
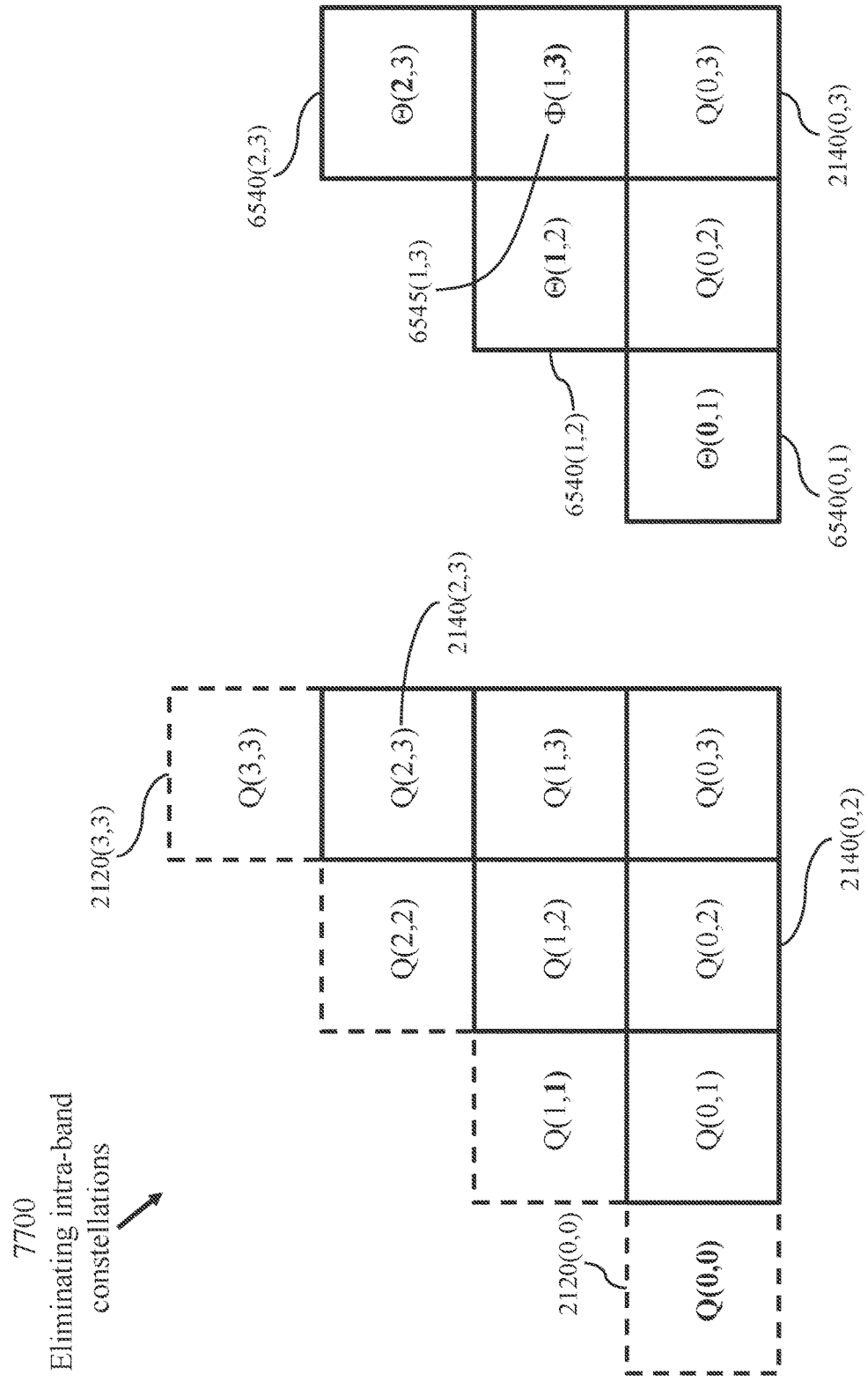
FIG. 77 illustrates a first example of eliminating the need for intra-band constellations using second-order inter-band constellations, in accordance with an embodiment of the present invention.

FIG. 77 illustrates an example 7700 of eliminating the need for intra-band constellations using second-order inter-band constellations for a network of four access bands ($\Pi=4$) each band comprising $\Omega$ access groups. The total number of inter-band constellations, is $(\Pi \times (\Pi-1))/2$. Using H intra-band constellations 2120 (FIG. 21, FIG. 25) and $(\Pi \times (\Pi-1))/2$ first-order inter-band constellations, Q(P,R), $0 \leq R < \Pi$, any access node $(\beta, \gamma, \nu)$ has $(\Omega-1)$ single-hop paths through intra-band constellation $S(\beta,\beta)$, and $(\Pi-1) \times \Omega$ single-hop paths through respective $(\Pi-1)$ inter-band constellations to any other access node of access group $\{\beta, \gamma\}$, to a total of $(\Pi \times \Omega-1)$ single-hop paths. The number of single-hop paths from any access node to any other access node of a different group $\gamma$ is one, regardless of whether the two access nodes belong to a same access band or different access bands.

Within an intra-band constellation 2120, an access node $(\beta,\gamma,\nu)$, $0 \leq \beta < \Pi$, $0 \leq y < \Omega$, $0 \leq \nu < m$, has $(\Omega-1)$ parallel single-hop dual paths to access nodes of other access groups of access-band $\beta$, and $(\Omega-1)$ parallel single-hop dual paths to access nodes of access group $\gamma$. Within an inter-band constellation 2140, an access node $(\beta,\gamma,\nu)$, $0 \leq \beta < \Pi$, $0 \leq \gamma < \Omega$, $0 \leq \nu < m$, has Q parallel single-hop dual paths to access nodes of another access band, and Q parallel single-hop dual paths to access nodes of access group γ but no single-hop paths to access nodes of other access groups of access-band β. Thus, intra-band constellations 2120 are needed for intra-band, inter-group paths.

Within any second-order constellation, 6540 or 6545, any access node (β, γ, ν) has Ω single-hop paths, directed to Ω different access nodes of different access groups of the same access band β. The number of single-hop paths from any access node to any other access node of a different group γ is one, regardless of whether the two access nodes belong to a same access band or different access bands. Thus, a second-order constellation provides intra-band, inter-group paths, eliminating the need for intra-band constellations 2120.

Using a combination of type-I and type-II second-order inter-band constellations (Θ(P,R), and Φ(P,R), 0≤P<R<Π), the maximum number of second order constellations in the network is determined as K=Π×⌊(Π−1)/2⌋. For any access band, the maximum number of intra-band, inter-group paths is λ=⌊(Π−1)/2⌋. The number of single-hop intra-group paths for a directed access-node pair, i.e., the number of single-hop paths from any access node to any other access node of a same access group γ, 0≤γ<Ω, is λ×Ω.

Table-III indicates intra-group paths through the inter-band constellations of FIG. 67 (Π=8).

TABLE-III

| Path type | Intra-group paths | | | | | | | |
|---|---|---|---|---|---|---|---|---|
| Access band | β = 0 | β = 1 | β = 2 | β = 3 | β = 4 | β = 5 | β = 6 | β = 7 |
| Constellation | Q(0, 1) | Q(0, 1) | Q(0, 2) | Q(0, 3) | Q(0, 4) | Q(0, 5) | Q(0, 6) | Q(0, 7) |
|  | Q(0, 2) | Q(1, 2) | Q(1, 2) | Q(1, 3) | Q(1, 4) | Q(1, 5) | Q(1, 6) | Q(1, 7) |
|  | Q(0, 3) | Q(1, 3) | Q(2, 3) | Q(2, 3) | Q(2, 4) | Q(2, 5) | Q(2, 6) | Q(2, 7) |
|  | Q(0, 4) | Q(1, 4) | Q(2, 4) | Q(3, 4) | Q(3, 4) | Q(3, 5) | Q(3, 6) | Q(3, 7) |
|  | Q(0, 5) | Q(1, 5) | Q(2, 5) | Q(3, 5) | Q(4, 5) | Q(4, 5) | Q(4, 6) | Q(4, 7) |
|  | Q(0, 6) | Q(1, 6 | Q(2, 6) | Q(3, 6) | Q(4, 6) | Q(5, 6) | Q(5, 6) | Q(5, 7) |
|  | Q(0, 7) | Q(1, 7) | Q(2, 7) | Q(3, 7) | Q(4, 7) | Q(5, 7) | Q(6, 7) | Q(6, 7) |
| Number of paths§ | 7 × Ω | 7 × Ω | 7 × Ω | 7 × Ω | 7 × Ω | 7 × Ω | 7 × Ω | 7 × Ω |

§A number (Π − 1) × Ω of parallel paths from one access node of an access group of an access band to access nodes (or one access node) of the same access group of the access band For any access-node pair of a same access group, the number of intra-group paths through an intra-band constellation is (Ω−1). Thus, the total number of intra-group dual single-hop paths is (8×Ω−1).

Table-IV and Table-V indicate intra-group single-hop paths through the constellations of FIG. 69 (Π=8). A directed access-node pair of any access group of access band 0 has intra-group paths within the same access group through four constellations Q(0,4), Φ(0,5), Φ(0,6), and Φ(0,7) with each of the four constellations providing Ω parallel intra-group single-hop paths. Thus, the total number of single-hop intra-group paths is 4×Ω. An access-node of any access group of access band 0 has three single-hop paths (λ=3) to any access node of any other access group of the same access band through second-order constellations Θ(0, 1), Θ(0,2), and Θ(0,3). In general, the maximum number, λ, of constellations providing intra-band, inter-group single-hop paths for any access band is determined as λ=⌊(Π−1)/2⌋. The corresponding number of constellations providing intra-group single-hop paths is λ if Π is an odd number or (λ+1) otherwise.

TABLE-IV

| Path type | Intra-group paths | | | | | | | |
|---|---|---|---|---|---|---|---|---|
| Access band | β = 0 | β = 1 | β = 2 | β = 3 | β = 4 | β = 5 | β = 6 | β = 7 |
| Constellation | Q(0, 4) | Θ(0, 1) | Θ(0, 2) | Θ(0, 3) | Q(0, 4) | Q(1, 5) | Q(2, 6) | Q(3, 7) |
|  | Φ(0, 5) | Q(1, 5) | Θ(1, 2) | Θ(1, 3) | Θ(1, 4) | Θ(2, 5) | Θ(3, 6) | Θ(4, 7) |
|  | Φ(0, 6) | Φ(1, 6) | Q(2, 6) | Θ(2, 3) | Θ(2, 4) | Θ(3, 5) | Θ(4, 6) | Θ(5, 7) |
|  | Φ(0, 7) | Φ(1, 7) | Φ(2, 7) | Q(3, 7) | Θ(3, 4) | Θ(4, 5) | Θ(5, 6) | Θ(6, 7) |
| Number of paths* | 4 × Ω | 4 × Ω | 4 × Ω | 4 × Ω | 4 × Ω | 4 × Ω | 4 × Ω | 4 × Ω |

*A number (λ + δ) × Ω of parallel paths from one access node of an access group of an access band to access nodes of the same access group of the access band, λ = ⌊(Π − 1)/2⌋, δ = 0 if Π is an odd number, δ = 1 if Π is an even number

TABLE-V

| Path type | Intra-band, inter-group paths | | | | | | | |
|---|---|---|---|---|---|---|---|---|
| Access band | $\beta = 0$ | $\beta = 1$ | $\beta = 2$ | $\beta = 3$ | $\beta = 4$ | $\beta = 5$ | $\beta = 6$ | $\beta = 7$ |
| Constellation | $\Theta(0, 1)$ | $\Theta(1, 2)$ | $\Theta(2, 3)$ | $\Theta(3, 4)$ | $\Theta(4, 5)$ | $\Phi(0, 5)$ | $\Phi(0, 6)$ | $\Phi(0, 7)$ |
| | $\Theta(0, 2)$ | $\Theta(1, 3)$ | $\Theta(2, 4)$ | $\Theta(3, 5)$ | $\Theta(4, 6)$ | $\Theta(5, 6)$ | $\Phi(1, 6)$ | $\Phi(1, 7)$ |
| | $\Theta(0, 3)$ | $\Theta(1, 4)$ | $\Theta(2, 5)$ | $\Theta(3, 6)$ | $\Theta(4, 7)$ | $\Theta(5, 7)$ | $\Theta(6, 7)$ | $\Phi(2, 7)$ |
| Number of Paths** | 3 | 3 | 3 | 3 | 3 | 3 | 3 | 3 |

**Parallel paths from one access node of an access group of an access band to an access node of another access group of the access band, $\lambda = \lfloor(\Pi - 1)/2\rfloor$ Table-VI and Table-VII indicate intra-group single-hop paths through the constellations of FIG. 70.

TABLE-VI

| Path type | Intra-group paths | | | | | | |
|---|---|---|---|---|---|---|---|
| Access band | $\beta = 0$ | $\beta = 1$ | $\beta = 2$ | $\beta = 3$ | $\beta = 4$ | $\beta = 5$ | $\beta = 6$ |
| Constellation | $\Phi(0, 4)$ | $\Theta(0, 1)$ | $\Theta(0, 2)$ | $\Theta(0, 3)$ | $\Theta(1, 4)$ | $\Theta(2, 5)$ | $\Theta(3, 6)$ |
| | $\Phi(0, 5)$ | $\Phi(1, 5)$ | $\Theta(1, 2)$ | $\Theta(1, 3)$ | $\Theta(2, 4)$ | $\Theta(3, 5)$ | $\Theta(4, 6)$ |
| | $\Phi(0, 6)$ | $\Phi(1, 6)$ | $\Phi(2, 6)$ | $\Theta(2, 3)$ | $\Theta(3, 4)$ | $\Theta(4, 5)$ | $\Theta(5, 6)$ |
| Number of Paths+ | $3 \times \Omega$ | $3 \times \Omega$ | $3 \times \Omega$ | $3 \times \Omega$ | $3 \times \Omega$ | $3 \times \Omega$ | $3 \times \Omega$ |

+A number $\lambda \times \Omega$ of parallel paths from one access node of an access group of an access band to access nodes (or one access node) of the same access group of the access band

TABLE-VII

| Path type | Intra-band inter-group paths | | | | | | |
|---|---|---|---|---|---|---|---|
| Access band | $\beta = 0$ | $\beta = 1$ | $\beta = 2$ | $\beta = 3$ | $\beta = 4$ | $\beta = 5$ | $\beta = 6$ |
| Constellation | $\Theta(0, 1)$ | $\Theta(1, 2)$ | $\Theta(2, 3)$ | $\Theta(3, 4)$ | $\Theta(4, 5)$ | $\Theta(5, 6)$ | $\Phi(0, 6)$ |
| | $\Theta(0, 2)$ | $\Theta(1, 3)$ | $\Theta(2, 4)$ | $\Theta(3, 5)$ | $\Theta(4, 6)$ | $\Phi(0, 5)$ | $\Phi(1, 6)$ |
| | $\Theta(0, 3)$ | $\Theta(1, 4)$ | $\Theta(2, 5)$ | $\Theta(3, 6)$ | $\Phi(0, 4)$ | $\Phi(1, 5)$ | $\Phi(2, 6)$ |
| Number of paths | 3 | 3 | 3 | 3 | 3 | 3 | 3 |

FIG. 78 illustrates a connectivity pattern 7800 of distributors of an exemplary inter-band first-order constellation Q(P,R), $0 \le P < R < \Pi$, of five access groups per access band ($\Omega = 5$). The constellation comprises $\Omega^2$ distributors 7150, denoted $S(\rho,\chi)$, $0 \le \rho < \Omega$, $0 \le \chi < \Omega$, logically arranged into a matrix of $\Omega$ rows and $\Omega$ columns. The number of access nodes per access group may vary between 2 and m. However, in the constellation of FIGS. 78, 79, and 80, the number is selected to be five for each access group to simplify the presentation. A distributor $S(\rho,\chi)$ connects to access nodes of an access group of index $\rho$ of access band P and access nodes of an access group of index x of access band R. Each access node of access band P connects to the constellation through $\Omega$ dual channels. Likewise, each access node of access band R connects to the constellation through $\Omega$ dual channels. With each access group of access-band P or access-band R connecting to respective $\Omega$ distributors, each access node of any access group has $\Omega$ single-hop paths to any access node of the same access group.

As described above, an access node (P,γ,v), $0 \le P < \Pi$, $0 \le \gamma < \Omega$, $0 \le v < M(P,\gamma)$ connects to constellation Q(P,R) through $\Omega$ dual channels, one to each of $\Omega$ distributors $S(\gamma,x)$, $0 \le \chi < \Omega$. An access node (R,γ,v), $0 \le P < R < \Pi$, $0 \le \gamma < \Omega$, $0 \le v < M(R,\gamma)$ connects to constellation Q(P,R) through $\Omega$ dual channels, one to each of $\Omega$ distributors $S(\rho,\gamma)$, $0 \le \rho < \Omega$. For example, access node (P,2,3) connects to distributors S(2,0), S(2,1), S(2,2), S(2,3), and S(2,4) while access node R(2,3) connects to distributors S(0,2), S(1,2), S(2,2), S(3,2), and S(4,2). Thus, each access node of access band P has a single-hop path to each access node of access band R through a respective distributor.

The distributors are labeled, according to their positions in the matrix, as $S(\rho,\chi)$, $0 \le \rho < \Omega$, $0 \le \chi < \Omega$. Each distributor of a row $\rho$ connects to each access node of an access group of a relative index $\rho$ within access-band P. Each distributor of a column $\chi$ connects to each access node of an access group of a relative index $\chi$ within access band R. Thus, each access node of each access group of access band P or access-band R has Q parallel dual single-hop paths to each other access node of a same access group though respective $\Omega$ distributors. For example, access node (P,2,3), of access-group 2 of access-band P, has $\Omega$ dual single-hop paths ($\Omega = 5$) to access node (P,2,0), one through each of distributors S(2,0), S(2,1), S(2,2), S(2,3), and S(2,4). Access node (R,2,3) has $\Omega$ dual single-hop paths to access node (R,2,0), one through each of distributors S(0,2), S(1,2), S(2,2), S(3,2), and S(4,2).

Each access node of access band P has one dual single-hop path to each access node of access-band R. Equivalently, each access node of access band R has one dual single-hop path to each access node of access-band P. For example, access node (P,2,3) may connect to:

any of access nodes (R,0,0), (R,0,1), (R,0,2), (R,0,3), (R,0,4) through distributor S(2,0);

any of access nodes (R,1,0), (R,1,1), (R,1,2), (R,1,3), (R,1,4) through distributor S(2,1);

any of access nodes (R,2,0), (R,2,1), (R,2,2), (R,2,3), (R,2,4) through distributor S(2,2);

any of access nodes (R,3,0), (R,3,1), (R,3,2), (R,3,3), (R,3,4) through distributor S(2,3); and any of access nodes (R,4,0), (R,4,1), (R,4,2), (R,4,3), (R,4,4) through distributor S(2,4).

As described above, each access node connects directly to a constellation through a WDM link of Ω channels. Thus, each access node may connect simultaneously, through Ω different distributors, to Ω other access nodes of a same access group of a same access band or different access groups of another band.

The distributors of each column of the matrix of distributors collectively connect to: each access node of access-band P through a respective dual channel; and each access node of a respective access group of access-band R through a respective set of Ω dual channels. The set 7810 of dual ports of a column of distributors connects to all access nodes of access-band P with each distributor connecting to access node of a same access group. The set 7820 of dual ports of the column of distributors connects to Ω access nodes of a single access group of access band R.

Figure 79:
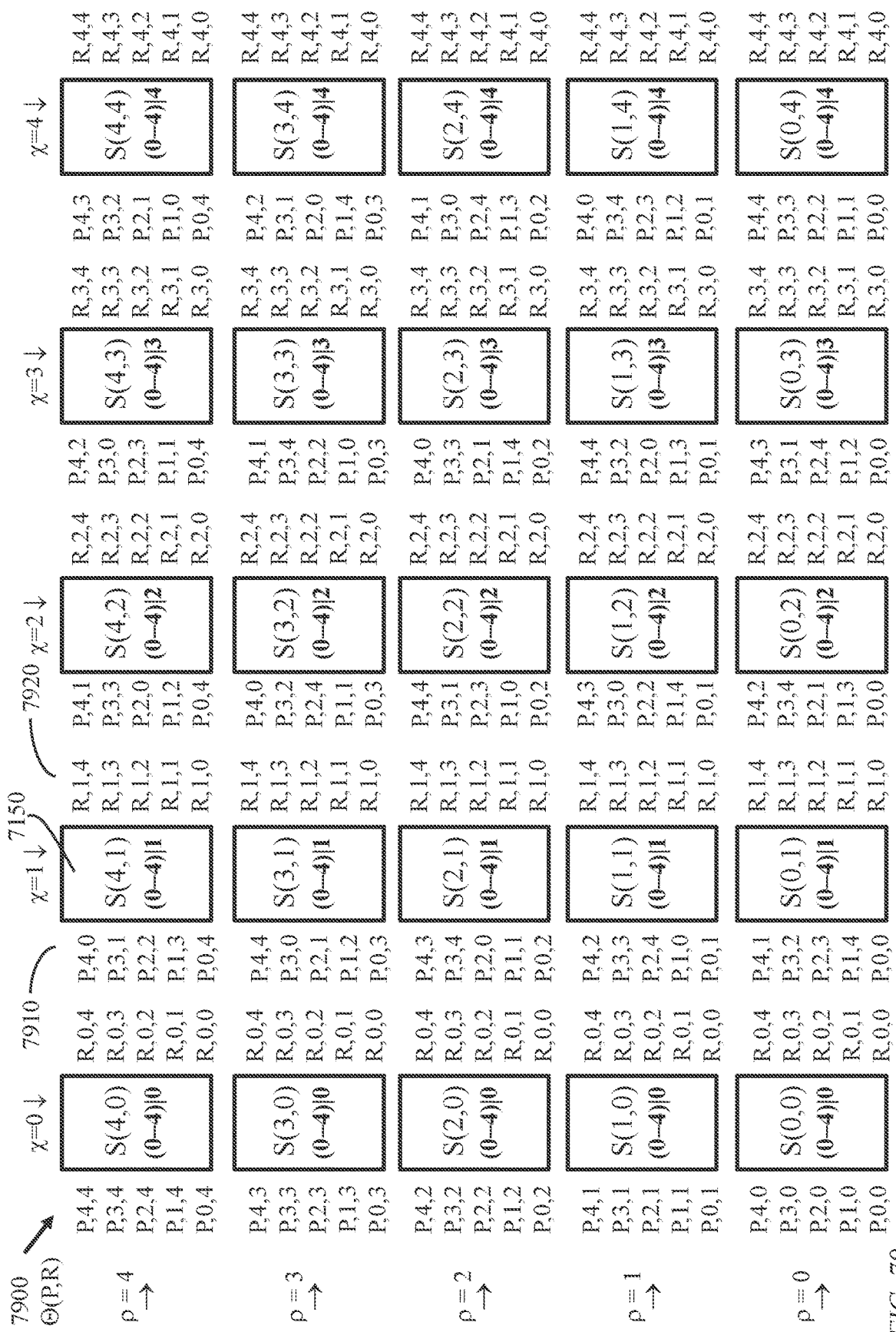
FIG. 79 illustrates connectivity pattern of distributors of an exemplary type-I second-order constellation where each access band comprises five access groups with the access groups having equal numbers of access nodes.

FIG. 79 illustrates a connectivity pattern 7900 of distributors of an exemplary type-I second-order constellation Θ(P, R), 0≤P<R<Π, of five access groups per access band (Ω=5). The constellation comprises $Ω^2$ distributors 7150, denoted S(ρ,χ), 0≤ρ<Ω, 0≤χ<Ω, logically arranged into a matrix of Ω rows and Ω columns. A distributor S(ρ,χ) connects to access nodes of Ω access groups of access band P and access nodes of one access group of index χ of access band R. Each access node of any access group of access band R has Q single-hop paths to any access node of the same access group.

The allocation of the access nodes of access-band P is selected so that each access node (P,γ,ν), 0≤P<R<Π, 0≤γ<Ω, 0≤ν<M(β,γ) connects to constellation Θ(P,R) through Ω dual channels, one to each of Ω distributors. Several allocation patterns may be devised. For example, selecting the number Ω of access groups per access band to be a prime number, the allocation may be determined as:

$$S(\rho, \chi), 0 \le \chi < \Omega, \rho = (\nu + \gamma \times \chi)_{modulo\,\Omega}.$$

An access node (R,γ,ν), 0≤γ<Ω, 0≤ν<M(R,γ) connects to constellation Θ(P,R) through Q dual channels, one to each of Ω distributors S(ρ,γ), 0≤ρ<Ω.

For example, access node (P,2,3) connects to distributors S(3,0), S(0,1), S(2,2), S(4,3), and S(1,4) while access node R(2,3) connects to distributors S(0,2), S(1,2), S(2,2), S(3,2), and S(4,2).

Each access node of each access group of access band P has one dual single-hop path to each other access node of the same access band. For example, access node (P,2,3) may connect to (FIG. 79):
any of access nodes (P,0,3), (P,1,3), (P,3,3), (P,4,3) through distributor S(3,0);
any of access nodes (P,0,0), (P,1,4), (P,3,2), (P,4,1) through distributor S(0,1);
any of access nodes (P,0,2), (P,1,0), (P,3,1), (P,4,4) through distributor S(2,2);
any of access nodes (P,0,4), (P,1,1), (P,3,0), (P,4,2) through distributor S(4,3); and any of access nodes (P,0,1), (P,1,2), (P,3,4), (P,4,0) through distributor S(1,4).

Likewise, each access node of any access group within access band P has a single-hop dual path to each access node of each other access group within access band P.

As in a first-order constellation Q(P,R), each access node of each access group of access band P has one dual single-hop path to each access node of each access group of access-band R. For example, access node (P,2,3) may connect to:
any of access nodes (R,0,0), (R,0,1), (R,0,2), (R,0,3), (R,0,4) through distributor S(3,0);
any of access nodes (R,1,0), (R,1,1), (R,1,2), (R,1,3), (R,1,4) through distributor S(0,1); any of access nodes (R,2,0), (R,2,1), (R,2,2), (R,2,3), (R,2,4) through distributor S(2,2); any of access nodes (R,3,0), (R,3,1), (R,3,2), (R,3,3), (R,3,4) through distributor S(4,3); and
any of access nodes (R,4,0), (R,4,1), (R,4,2), (R,4,3), (R,4,4) through distributor S(1,4).

Equivalently, each access node of access band R has one dual single-hop path to each access node of access-band P.

The distributors of each column of the matrix of distributors collectively connect to: each access node of access-band P through a respective dual channel; and each access node of a respective access group of access-band R through a respective set of Ω dual channels. The set 7910 of dual ports of a column of distributors connects to all access nodes of access-band P with each distributor connecting to access node of different access groups thus providing inter-group connectivity. The set 7920 of dual ports of the column of distributors connects to Ω access nodes of a single access group of access band R.

Figure 80:
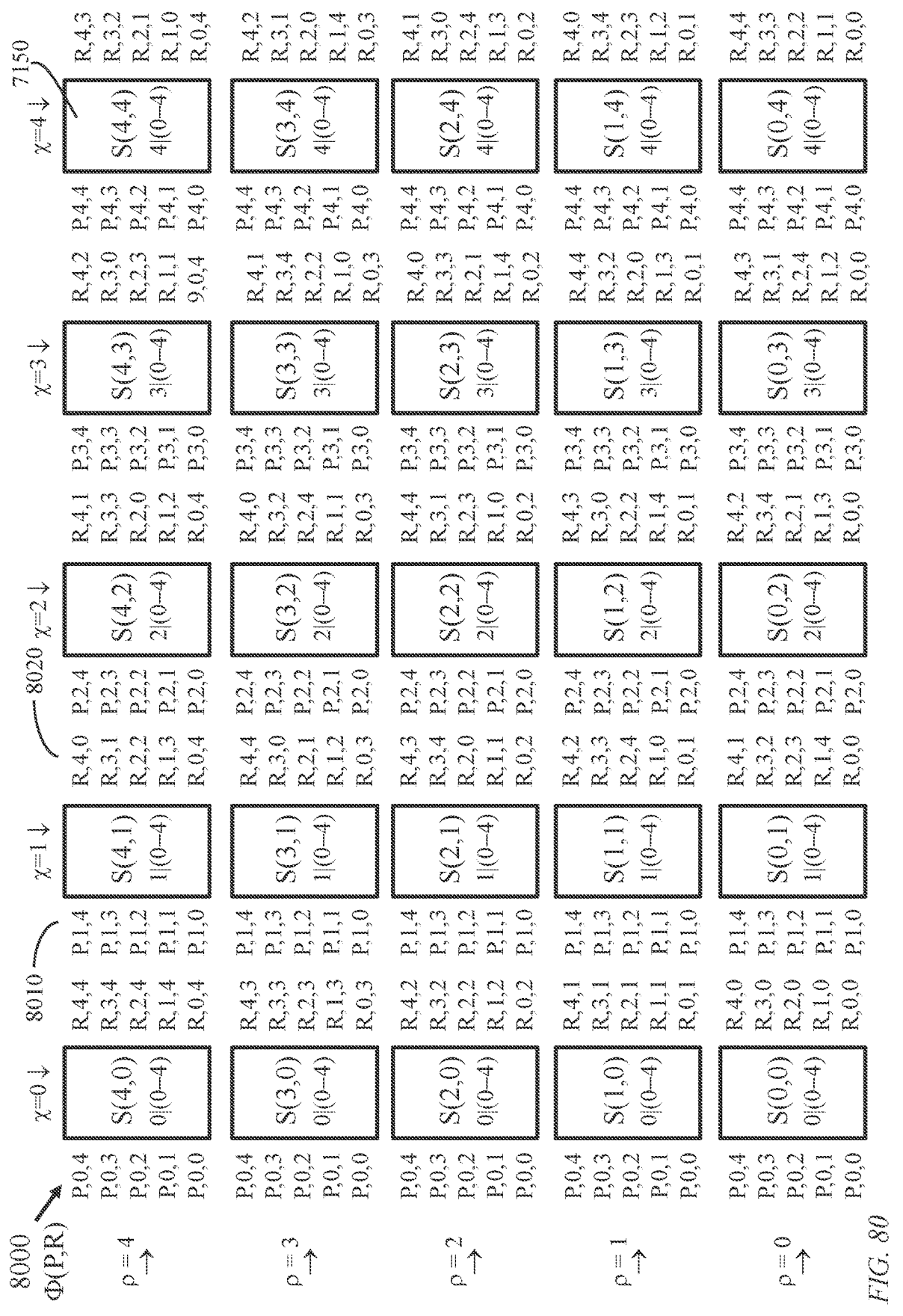

FIG. 80 illustrates a connectivity pattern 8000 of distributors of an exemplary type-II second-order constellation Φ(P,R), 0≤P<R<Π, of five access groups per access band (Ω=5). The constellation comprises $Ω^2$ distributors 7150, denoted S(ρ,χ), 0≤ρ<Ω, 0≤χ<Ω, logically arranged into a matrix of Ω rows and Ω columns. A distributor S(ρ,χ) connects to access nodes of one access group of index χ of access band P and access nodes of Ω access groups of access band R. Each access node of any access group of access band P has Q single-hop paths to any access node of the same access group.

The allocation of the access nodes of access-band R is selected so that each access node (R,γ,ν), 0≤R<Π, 0≤γ<Ω, 0≤ν<M(R,γ) connects to constellation Ω(P,R) through Ω dual channels, one to each of Ω distributors. Several allocation patterns may be devised. For example, selecting the number Q of access groups per access band to be a prime number, the allocation may be determined as:

$$S(\rho, \chi), 0 \le \chi < \Omega, \rho = (\nu + \gamma \times \chi)_{modulo\,\Omega}.$$

An access node (P,γ,ν), 0≤P<R<Π, 0≤γ<Ω, 0≤ν<M(β,γ) connects to constellation Φ(P,R) through Ω dual channels, one to each of Ω distributors S(ρ,y), 0≤ρ<Ω. For example, access node P(2,3) connects to distributors S(0,2), S(1,2), S(2,2), S(3,2), and S(4,2) while access node (R,2,3) connects to distributors S(3,0), S(0,1), S(2,2), S(4,3), and S(1, 4).

The distributors of each column of the matrix of distributors collectively connect to: each access node of a respective access group of access-band P through a respective set of Ω dual channels; and each access node of access-band R through a respective dual channel. The set 8010 of dual ports of the column of distributors connects to Ω access nodes of a single access group of access band P. The set 8020 of dual ports of a column of distributors connects to all access nodes of access-band R with each distributor connecting to access node of different access groups thus providing inter-group connectivity.

Figure 81:
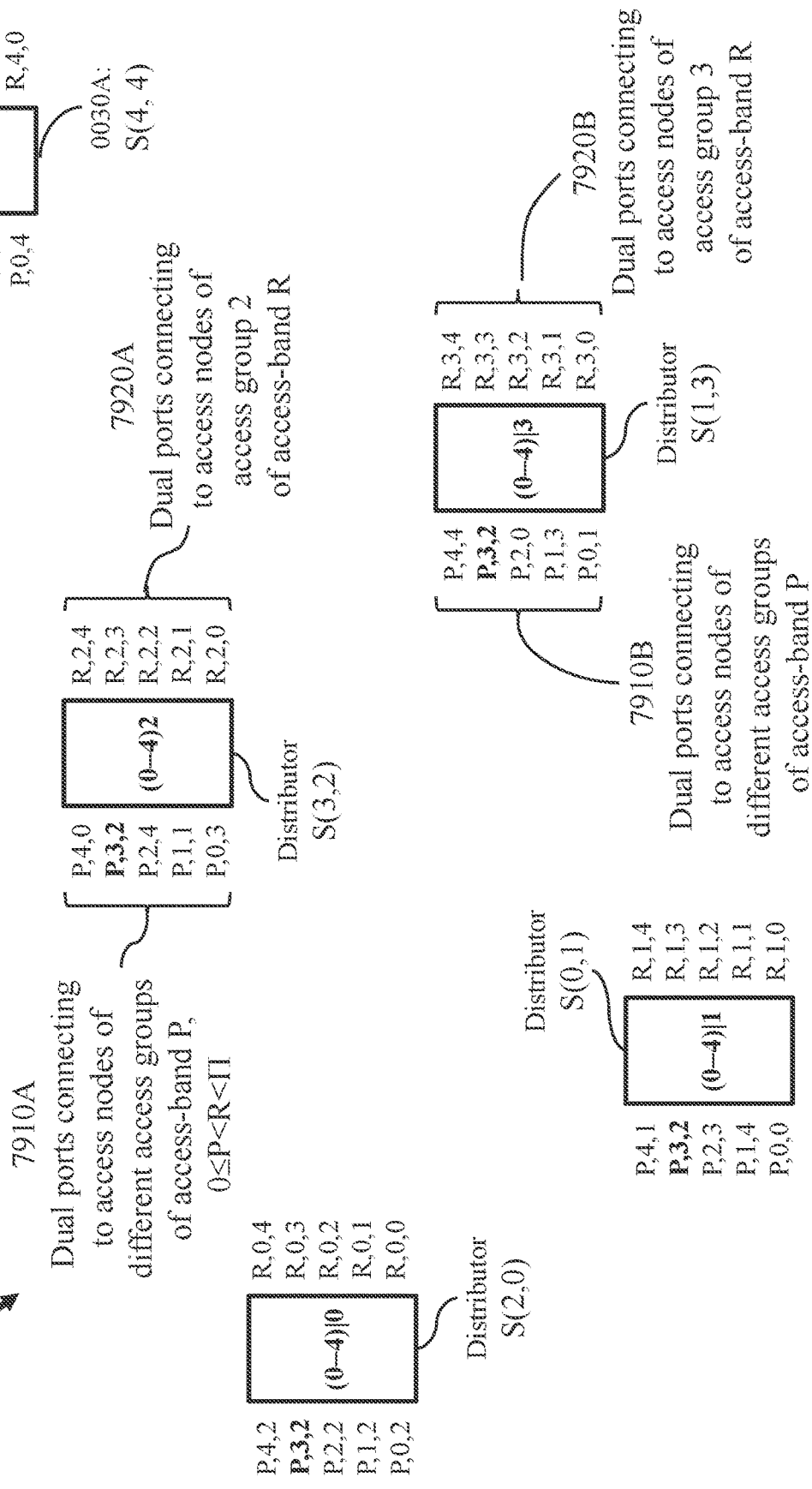
FIG. 81 identifies distributors of the constellation of FIG. 79 to which a specific access node connects to all other access nodes of the same access band.

FIG. 81 illustrates intra-band single-hop paths 8100, from a specific access node to other access nodes of an access band P and to all access nodes of an access band R, within the constellation of FIG. 79. A specific access node (P,3,2) connects to distributors S(2,0), S(0,1), S(3,2), S(1,3), and S(4,4) which provide single-hop paths from access node (P,3,2) to each access node of access band R, and to each access node of access band P excluding access nodes of access-group {P,3} to which access node (P,3,2) belongs. Thus, access node (P,3,2) connects to each of access nodes (R,γ,ν), 0≤γ<Ω, 0≤ν<M(R,γ) and to each of access nodes (P,γ,ν), 0≤γ<Ω, y≠3, 0≤ν<M(β,γ). Dual ports 7910, such as 7910A and 7910B, of a distributor connects to access nodes of different access groups of access-band P. Dual ports 7920, such as 7920A and 7920B, of a distributor connects to access nodes of a respective access group of access-band R.

FIG. 82 indicates, in a tabular form 8200, access nodes to which specific access node (P,3,2) connects through respective single-hop paths within the constellation Θ(P,R) of FIG. 79. Set 8220 of access nodes belongs to access-band P and set 8225 of access nodes belongs to access-band R. Access node (P,3,2) connects to the constellation through a WDM link comprising Q individual dual channels (of 40 Gb/s capacity each, for example). The Ω dual channels (Ω=5 in the example of FIG. 79) are individually connected to dual ports of a set of distributors 8210: S(2,0), S(0,1), S(3,2), S(1,3), and S(4,4).

Distributor S(2,0) connects access node (P,3,2) to access nodes (P,0,2), (P,1,2), (P,2,2), and (P,4,2) of access-band P, and to access nodes (R,0,0), (R,0,1), (R,0,2), (R,0,3), and R(0,4) of access-band R. Distributor S(3,2) connects access node (P,3,2) to access nodes (P,0,3), (P,1,1), (P,2,4), and (P,4,0) of access-band P, and to access nodes (R,2,0), (R,2,1), (R,2,2), (R,2,3), and R(2,4) of access-band R. As indicated in FIG. 82 access node (P,3,2) of access-group 3 of access-band P has a dual single-hop path to each access node of each other access group of access band P, and a dual single-hop path to each access node of access-band R, through type-I second-order constellation Θ(P,R).

Figure 83:
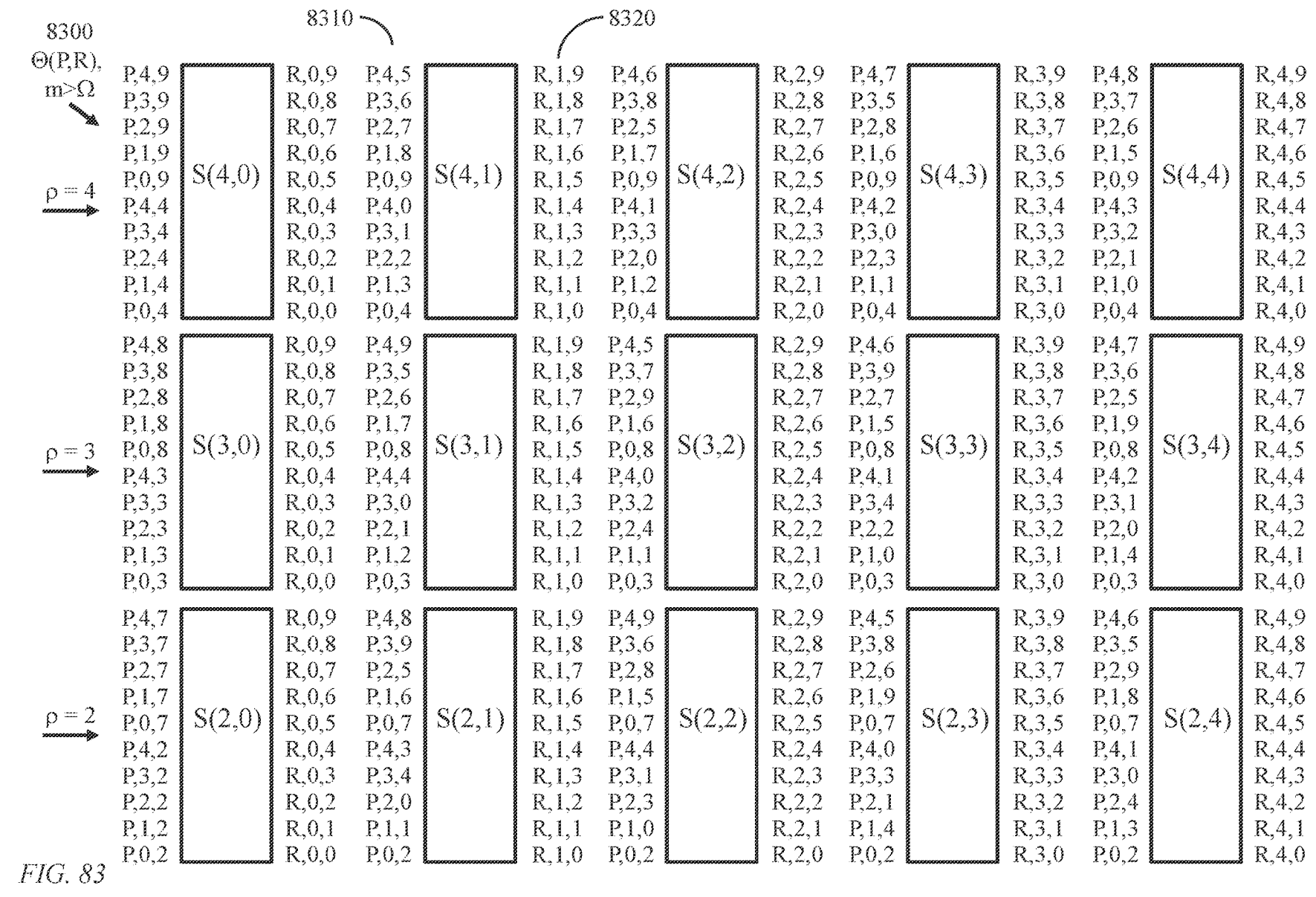

FIG. 83 illustrates connectivity pattern 8300 of distributors of an exemplary fully populated type-I second-order constellation where each access band comprises five access groups with each access group having ten access nodes. Connectivity pattern 8600 may be used as a generic allocation table for a growing network.

Figure 84:
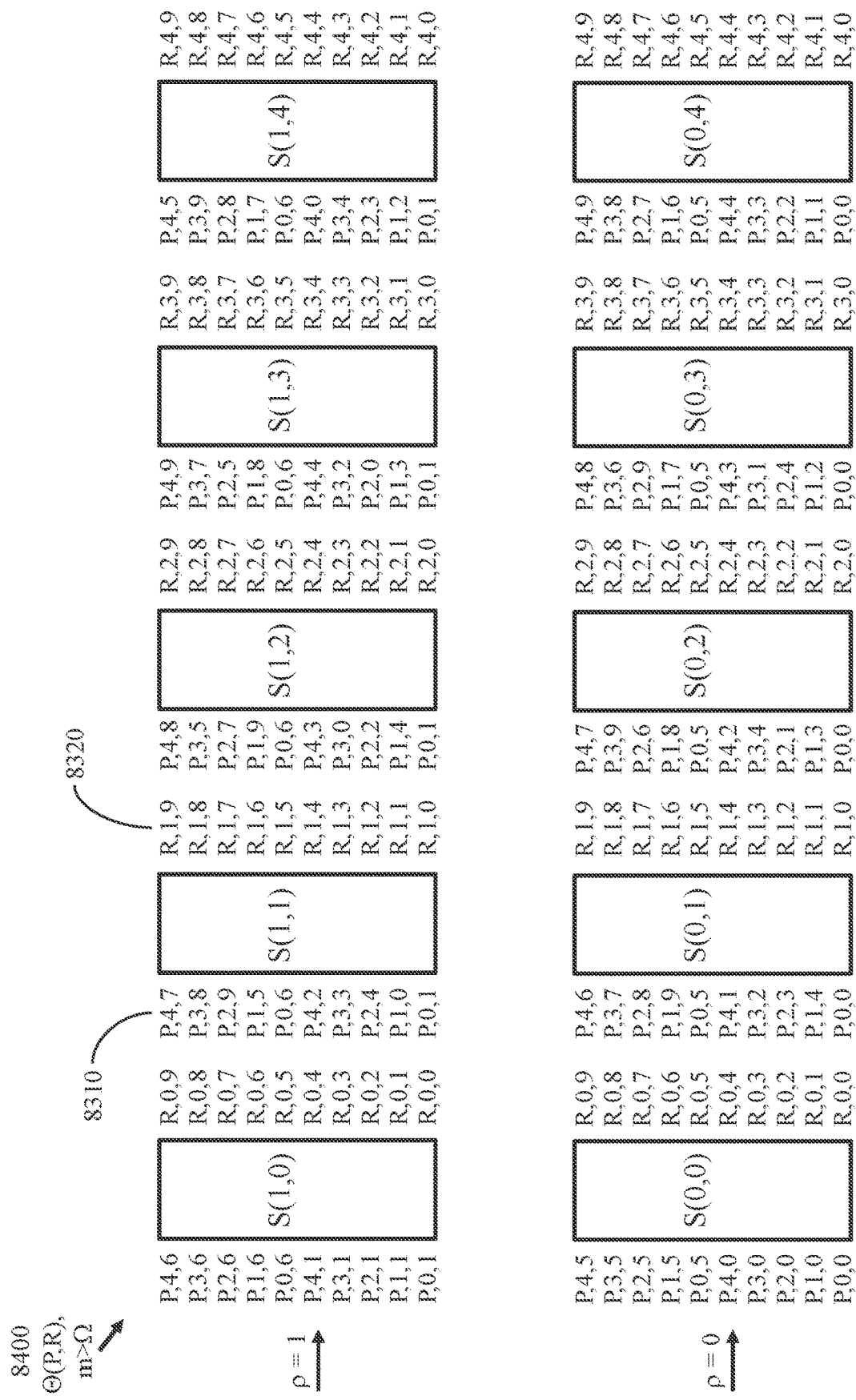
FIG. 84 is a continuation of FIG. 83.

FIG. 84 is a continuation of FIG. 83.

An access node, of index ν within an access-group y belonging to an access band β, 0≤β<(Π−1), with the access band connecting, in the second mode, as a fusing band to a constellation, is allocated to Ω distributors S(ρ,χ):

$$\rho = (\nu + \gamma \times \chi)_{modulo\,\Omega}, 0 \le \chi < \Omega, 0 \le \nu < m, 0 \le \gamma < \Omega.$$

An access node, of index ν within an access-group y belonging to an access band β, 0<β<Π, with the access band connecting, in the first mode, as a joined band to a constellation, is allocated to Ω distributors S(ρ,χ): 0≤ρ<Ω, 0≤ν<m.

For example, for Ω=5 and m=10, access node (P, 3, 9) γ=3, ν=9, of a band P connecting to a constellation Θ(P,R) as a fusing band, has Ω dual channels to the constellation, one to each of distributors S(4,0), (2,1), (0,2), (3,3), and (1,4). Access node (P, 2, 7), γ=2, ν=7, of band P connects to distributors S(2,0), (4,1), (1,2), (3,3), and (0,4) of the constellation as indicated in Table-VIII below.

TABLE-VIII

| Access node ↓ | χ → | | 0 | 1 | 2 | 3 | 4 |
|---|---|---|---|---|---|---|---|
| P(3, 9) | ρ = (9 + 3 × χ)$_{modulo\,\Omega}$ | →4 | 2 | 0 | 3 | 1 |
| P(2, 7) | ρ = (7 + 2 × χ)$_{modulo\,\Omega}$ | →2 | 4 | 1 | 3 | 0 |

For Ω=5, m=10, access nodes (P, 3, ν), γ=3, 0≤ν<m, of a band R connecting to a constellation Θ(P,R) as a joined band, has Ω dual channels to the constellation, one to each of distributors S(0,3), (1,3), (2,3), (3,3), and (4,3). Access nodes (P, 2, ν), γ=2, 0≤ν<m, of band R connect to distributors S(0,2), (1,2), (2,2), (3,2), and (4,2) of the constellation.

Conversely, access nodes connecting to distributor S(ρ,χ), 0≤ρ<Ω, 0≤χ<Ω, coupled to bands P and R are determined as:

$(P, \gamma, \nu): \nu = (\rho - \gamma \times \chi + J \times \Omega)_{modulo\,\Omega} < m,$ $0 \le J < \lceil m/\Omega \rceil, 0 \le \gamma < \Omega;$ and $(R, \gamma, \nu): 0 \le \nu < m, \gamma = \chi;$ With five access groups per band and a maximum of ten access nodes per access group (Ω=5, m=10, 0≤J<2), a distributor S(ρ,χ), ρ=3, χ=2, is allocated to access nodes (P,γ, ν):

(P,0,3), (P,0,8), (P,1,1), (P,1,6), (P,2,4), (P,2,9), (P,3,2), (P,3,7), (P,4,0), (P,4,5)

For band R, each distributor of column 2, i.e., S(ρ,2), 0≤ρ<Ω, connects to access nodes (R,2,ν), 0≤ν<m.

Figure 85:
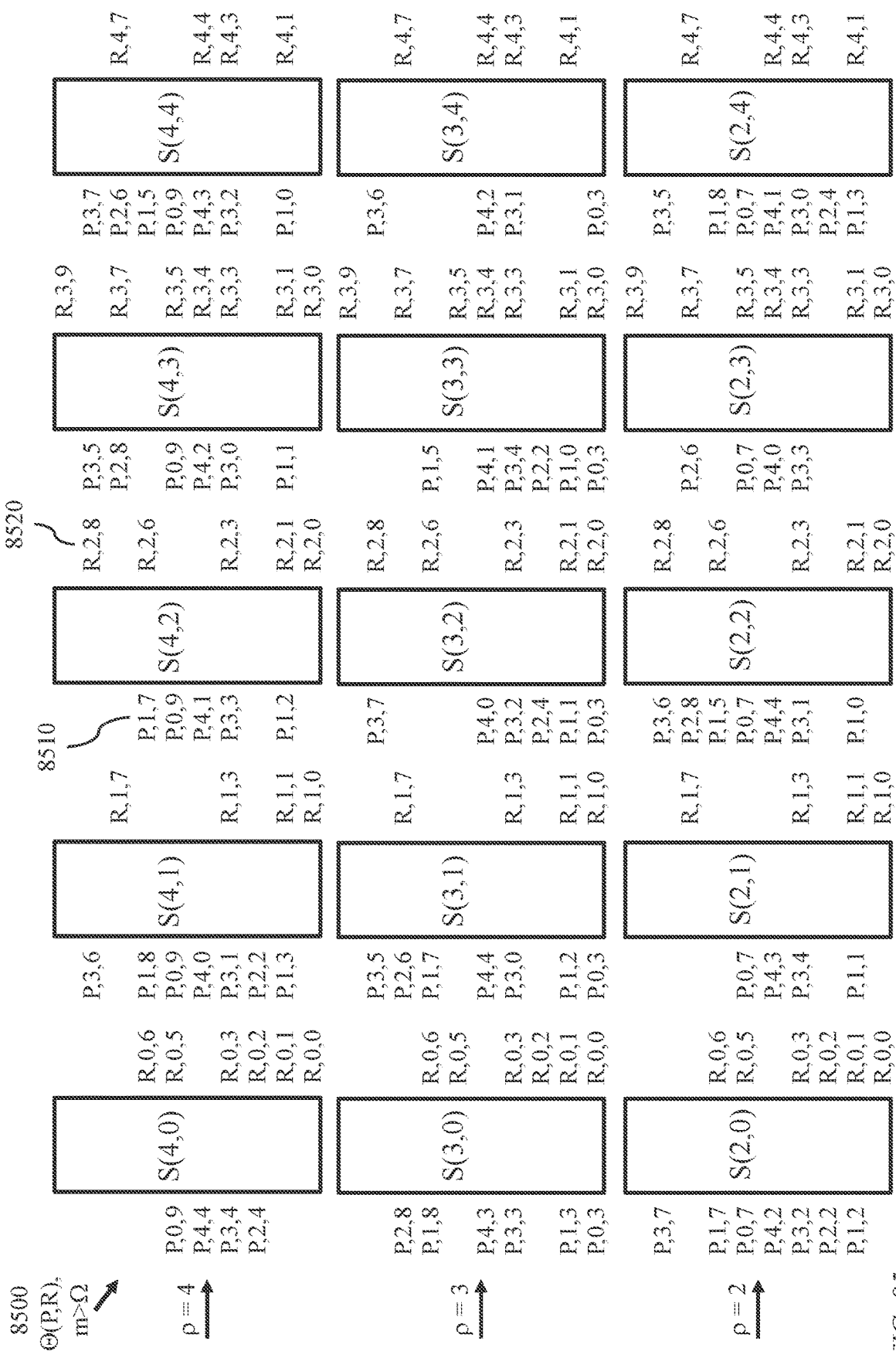
FIG. 85 illustrates connectivity of a partially populated type-I second-order constellation derived from the connectivity pattern of FIG. 83.

FIG. 85 illustrates connectivity 8500 of a partially populated type-I second-order constellation Θ(P,R) derived from allocation table for the case of FIG. 83 and FIG. 84.

Figure 86:
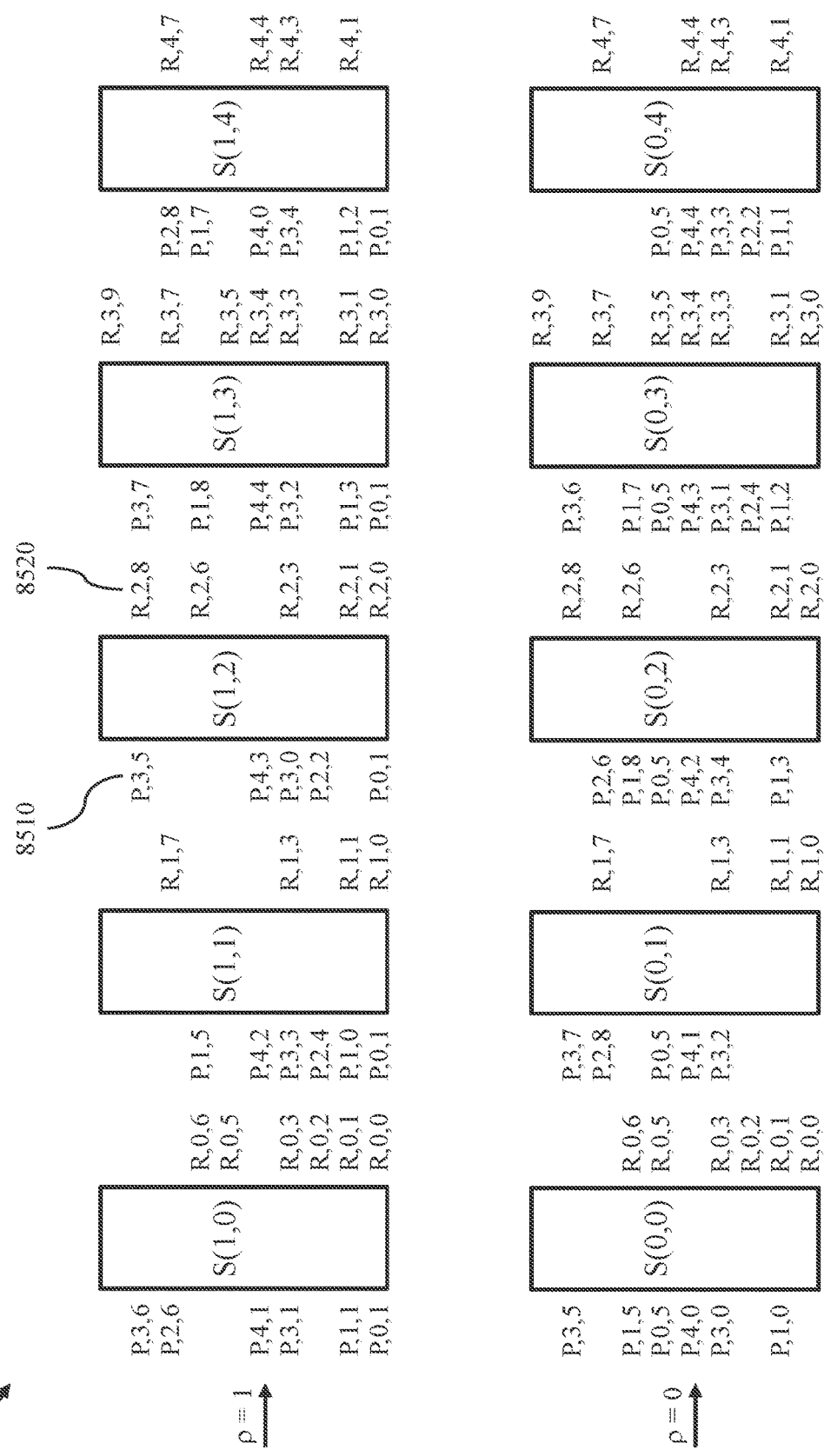
FIG. 86 is a continuation of FIG. 85.

FIG. 86 is a continuation of FIG. 85.

Constellation Θ(P,R) connects to access bands P and R, each comprising five access groups (Ω=5), with each access group having a respective number of access nodes not exceeding the predetermined upper bound m as indicated in Table-IX below. Table-X lists currently connected access nodes and Table-XI lists identifiers of "placeholder" access nodes for subsequent network growth.

TABLE-IX

| Band | Access group index γ | 0 | 1 | 2 | 3 | 4 |
|---|---|---|---|---|---|---|
| P | Group size M(P, γ) | 5 | 7 | 4 | 8 | 5 |
| R | Group size M(R, γ) | 6 | 4 | 5 | 7 | 4 |

TABLE-X

Connected access nodes selected from the allocation table of FIG. 83 and FIG. 84

| Access group of access-band P | | | | | Access group of access-band R | | | | |
|---|---|---|---|---|---|---|---|---|---|
| 0 | 1 | 2 | 3 | 4 | 0 | 1 | 2 | 3 | 4 |
| P, 0, 1 | P, 1, 0 | P, 2, 2 | P, 3, 0 | P, 4, 0 | R, 0, 0 | R, 1, 0 | R, 2, 0 | R, 3, 0 | R, 4, 1 |
| P, 0, 3 | P, 1, 1 | P, 2, 4 | P, 3, 1 | P, 4, 1 | R, 0, 1 | R, 1, 1 | R, 2, 1 | R, 3, 1 | R, 4, 3 |
| P, 0, 5 | P, 1, 2 | P, 2, 6 | P, 3, 2 | P, 4, 2 | R, 0, 2 | R, 1, 3 | R, 2, 3 | R, 3, 3 | R, 4, 4 |
| P, 0, 7 | P, 1, 3 | P, 2, 8 | P, 3, 3 | P, 4, 3 | R, 0, 3 | R, 1, 7 | R, 2, 6 | R, 3, 4 | R, 4, 7 |
| P, 0, 9 | P, 1, 5 | | P, 3, 4 | P, 4, 4 | R, 0, 5 | | R, 2, 8 | R, 3, 5 | |
| | P, 1, 7 | | P, 3, 5 | | R, 0, 6 | | | R, 3, 7 | |
| | P, 1, 8 | | P, 3, 6 | | | | | R, 3, 9 | |
| | | | P, 3, 7 | | | | | | |

TABLE-XI

Remaining allocable access nodes

| Access group of access-band P | | | | | Access group of access-band R | | | | |
|---|---|---|---|---|---|---|---|---|---|
| 0 | 1 | 2 | 3 | 4 | 0 | 1 | 2 | 3 | 4 |
| P, 0, 0 | P, 1, 4 | P, 2, 0 | P, 3, 8 | P, 4, 5 | R, 0, 4 | R, 1, 2 | R, 2, 2 | R, 3, 2 | R, 4, 0 |
| P, 0, 2 | P, 1, 6 | P, 2, 1 | P, 3, 9 | P, 4, 6 | R, 0, 7 | R, 1, 4 | R, 2, 4 | R, 3, 6 | R, 4, 2 |
| P, 0, 4 | P, 1, 9 | P, 2, 3 | | P, 4, 7 | R, 0, 8 | R, 1, 5 | R, 2, 5 | R, 3, 8 | R, 4, 5 |
| P, 0, 6 | | P, 2, 5 | | P, 4, 8 | R, 0, 9 | R, 1, 6 | R, 2, 7 | | R, 4, 6 |
| P, 0, 8 | | P, 2, 7 | | P, 4, 9 | | R, 1, 8 | R, 2, 9 | | R, 4, 8 |
| | | P, 2, 9 | | | | R, 1, 9 | | | R, 4, 9 |

Combined Distributed and Global Central Control

One access group may be selected to host a global controller, which may connect to distributors as one of the access nodes of the access group, thus having at least one single-hop path to each access node of the entire network. This significantly facilitates both distributed control and global central control where a control signal from any access node to any other access node traverses only one distributor and a control signal from the global controller to any access node, and vice versa, traverses only one distributor. The network may employ two or more geographically distributed global controllers, which may operate cooperatively, for increased reliability and expeditious global control.

The global controller may employ multiple hardware processors, multiple memory devices storing processor-executable instructions causing the hardware processors to perform exchange of control data with access processors of the plurality of access nodes of the entire network, and multiple memory devices storing data relevant to overall network connectivity and states of network components.

Placeholder Network-Growth Approach

Figure 87:
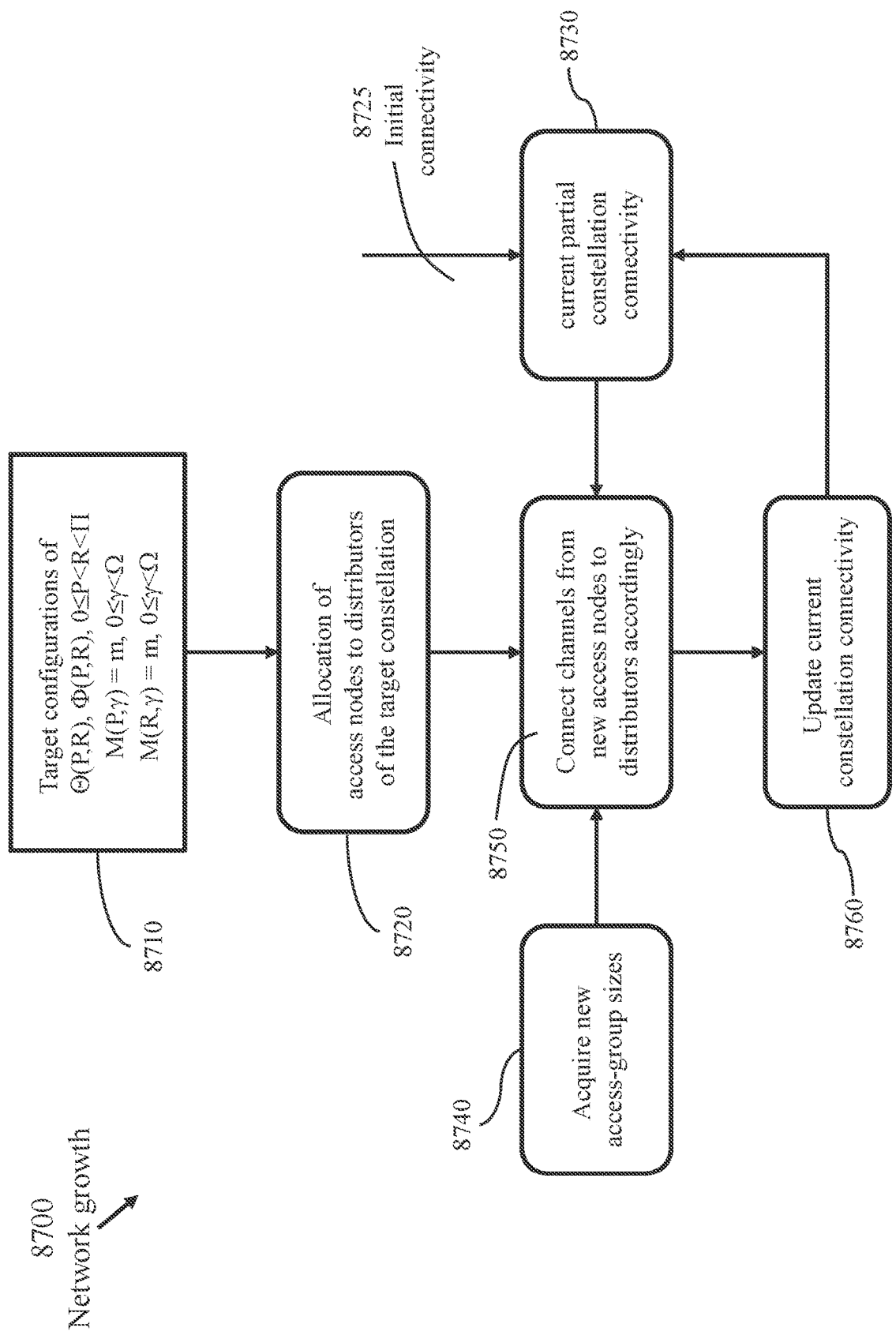
FIG. 87 illustrates a method of realizing gradual connectivity extension of a constellation, in accordance with an embodiment of the present invention.

FIG. 87 illustrates a method 8700 of realizing gradual connectivity extension of a constellation. The method is preferably implemented at a global controller. To start, a target network size is set in a network-planning phase, in terms of a total number, p, of access groups, and a maximum number, m, of access nodes per access group. The number p is determined according to the dimension of an access node. The access nodes employ electronic switching/routing mechanisms which can, with the present state of the art, expand gracefully from a low value of 64, for example, to several thousands. The number, m, is determined according to the dimension upper bound of a distributor. Each distributor of a constellation is coupled to a dual channel from each of at most m access nodes of a fusing band (an access band connected to the constellation according to the second mode) and a dual channel from each of at most m access nodes of a joined band (an access band connected to the constellation according to the first mode). With the present state of the art, the target value of m would be of the order of 64 for optical distributors (FIGS. 51, 54, and 55). Employing electronic distributors (FIGS. 57, 59, and 60), the target value of m may vary between 64 to 2000, for example. Selecting p and m as 1000 and 64, respectively, for a network employing optical distributors, the target number of access nodes would be 64,000. Selecting p and m as 1000 and 256, respectively, for a network employing electronic distributors, the target number of access nodes would be 256,000. The use of optical distributors eliminates the need for optical-to-electrical conversion at input ports of distributors and electric-to-optical conversion at output ports of distributors. The use of electronic distributors has the advantage of higher scalability in addition to less stringent time-alignment due to availability of (short) buffers at input ports of distributors as illustrated in FIG. 57 and FIG. 58.

Process 8710 defines a target (fully-populated) constellation configuration. Process 8720 creates a generic connectivity table as an allocation pattern to distributors of the target constellation, as illustrated in FIG. 83 and FIG. 84. Process 8730 accesses a memory device storing data organized into a data structure defining current constellation connectivity to access nodes. The data structure is initially set (reference 8725) to indicate "no allocation of any access node" to the distributors. Process 8740 acquires (from a network planner) requisite new access-group sizes (number of access nodes for each access group of the two access bands coupled to the constellation). Process 8750 determines connections from new access nodes to distributors based on the generic connectivity table produced in process 8720, the current constellation connectivity acquired in process 8730, and requisite new access-group sizes acquired in process 8740. Process 8760 updates the data defining current constellation connectivity according to result of process 8750 and stores an updated current connectivity data in said memory device.

A generic allocation table is created for each of the network's $(\Pi\times(\Pi-1))/2$ constellations interconnecting pairs of access bands. Each first-order or second-order constellation has $\Omega^2$ distributors with each distributor configured to grow gracefully to support 2×m dual ports, m being a predefined upper bound of the number of access nodes per access group. A fully populated access band comprises $\Omega\times m$ access nodes. Each access node connects to a constellation through $\Omega$ dual channels. A generic table for a constellation coupling access bands P and R, $0 \le P < R < \Pi$, assigns $\Omega$ dual channels of each access node of fully populated access bands P and R to respective distributors. In the exemplary constellation of FIG. 83 and FIG. 84, $\Omega=5$, and m is selected to equal $2\times\Omega$.

A network of global coverage, employing optical distributors (FIGS. 51, 54, and 55) may support 17 access bands, with each access band comprising 31 access groups, with fully-populated access groups of 62 access nodes each ($\Pi=17$, $\Omega=31$, $m=2\times\Omega$), to a total of 17×31×62 (that is 32674) access nodes. A network of global coverage, employing electronic distributors (FIGS. 57, 59, and 60) may support 17 access bands, with each access band comprising 31 access groups, with fully-populated access groups of 248 access nodes each ($\Pi=17$, $\Omega=31$, $m=8\times\Omega$), to a total of 17×31×248 (that is 130696) access nodes.

A generic allocation table for each constellation indicates connectivity of each access node of respective fully-populated access groups. The access-node identifiers, $(\beta\gamma\nu)$, $0\le\beta<\Pi, 0\le\gamma<\Omega, 0\le\nu<m$, of the allocation table may serve as "placeholders", marked as "available" for future access nodes. Initially, the access groups may be partially populated. For example, for a network employing optical distributors, the access groups may contain different numbers of access nodes varying between 20 and 40, below the target level of 62 access nodes. For an access group comprising 25 access nodes of the target 62 access nodes, any 25 of the 62 placeholders may be assigned and the remaining 37 placeholders are marked as "available". For the access band connecting to a constellation according to the first mode, each distributor of the constellation connects to an entire access group. For the access band connecting according to the second mode, the access nodes of any access group connect to Q different distributors resulting in occupancy variance, within the target occupancy level, among the distributors. It may be desirable to reduce the distributors' occupancy variance as the network grows to the target level. This may be realized with judicial selection of access-node identifiers, from available placeholders, of the desired number of access nodes.

Figure 88:
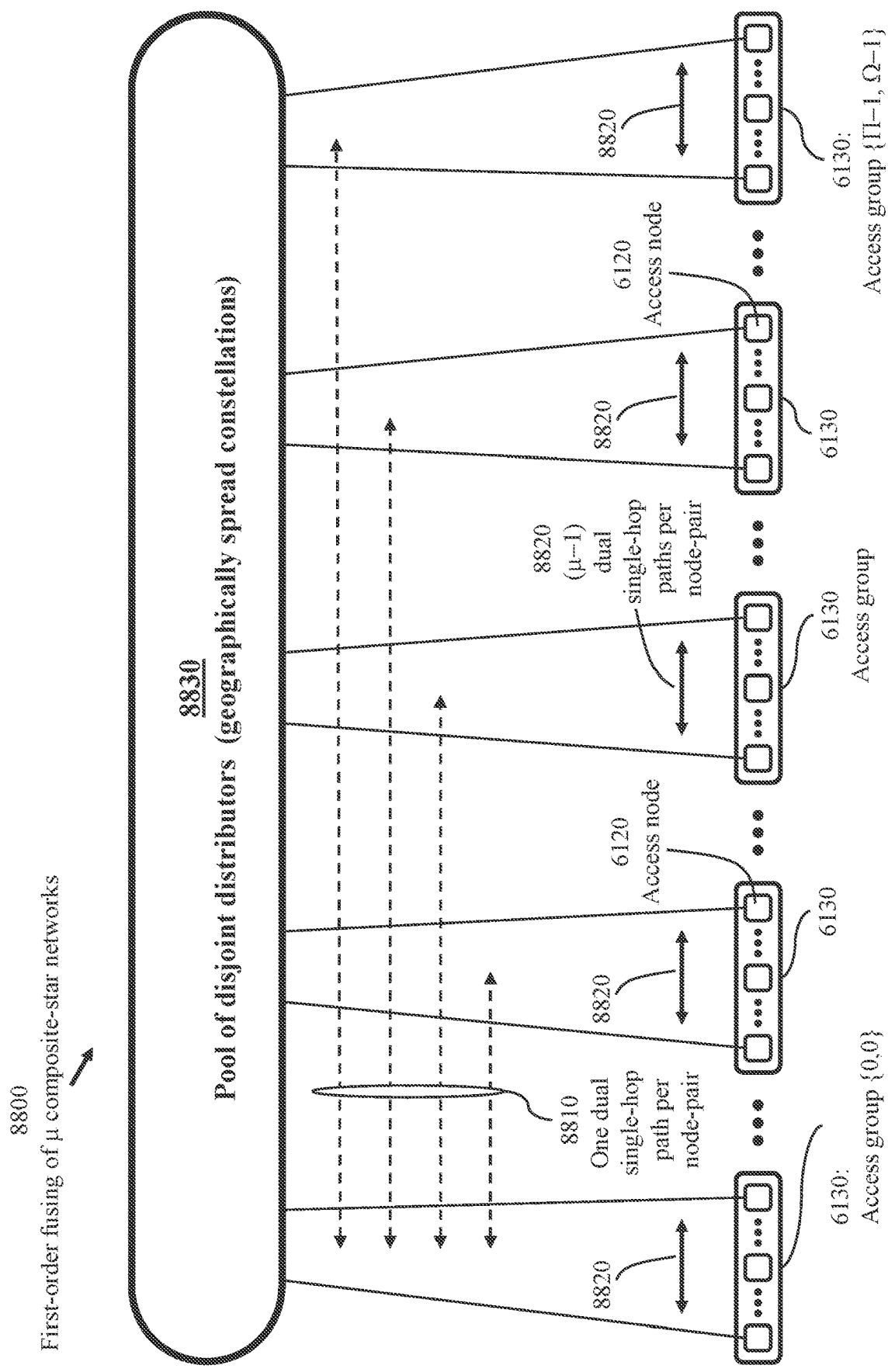
FIG. 88 is an overview of a contiguous network based on first-order fusing of a large number of Clos star networks, in accordance with an embodiment of the present invention.

FIG. 88 is an overview 8800 of a contiguous network based on first-order fusing of a large number of Clos star networks. The access nodes of the network are arranged into a number p of access groups, each group containing at most a predefined number, m, of access nodes. The access nodes are interconnected through a pool 8830 of disjoint distributors (none of the distributors is directly connected to another distributor). Thus, the network supports at most $\mu\times m$ access nodes. The envisaged network would comprise a number of access groups of the order of 1000 ($\mu\approx1000$) with each access group having approximately 64 access nodes ($m\approx64$), to a total number of access nodes of the order of 64000. It is noted that while the access nodes are logically arranged into access groups and access bands as illustrated in FIG. 62 for routing and control purposes, the access nodes are naturally geographically distributed. As described above, the access groups are logically arranged into a number H of access bands, each access band containing a predefined number Q of access groups.

In one network configuration (FIG. 67), the pool 8830 of distributors is organized into H intra-band constellations and $(\Pi\times(\Pi-1))/2$ first-order constellations each interconnecting a respective pair of access bands where each distributor of a first-order constellation interconnects a respective pair of access groups belonging to different bands. The resulting network provides a dual single-hop path 8810 for each pair of access nodes that belong to different access groups but provides a large number, $(\mu-1)$, of single-hop paths, 8820, for each pair of access nodes that belong to a same access group.

In an alternate network configuration, the pool of distributors is arranged into $(\Pi\times(\Pi-1))/2$ second-order inter-band constellations, each interconnecting a respective pair of access bands where each distributor of a second-order constellation interconnects one access group of one of two access bands to selected access nodes from all of $\Omega$ access groups of the other access band. This arrangement eliminates the need for intra-band constellations.

Figure 89:
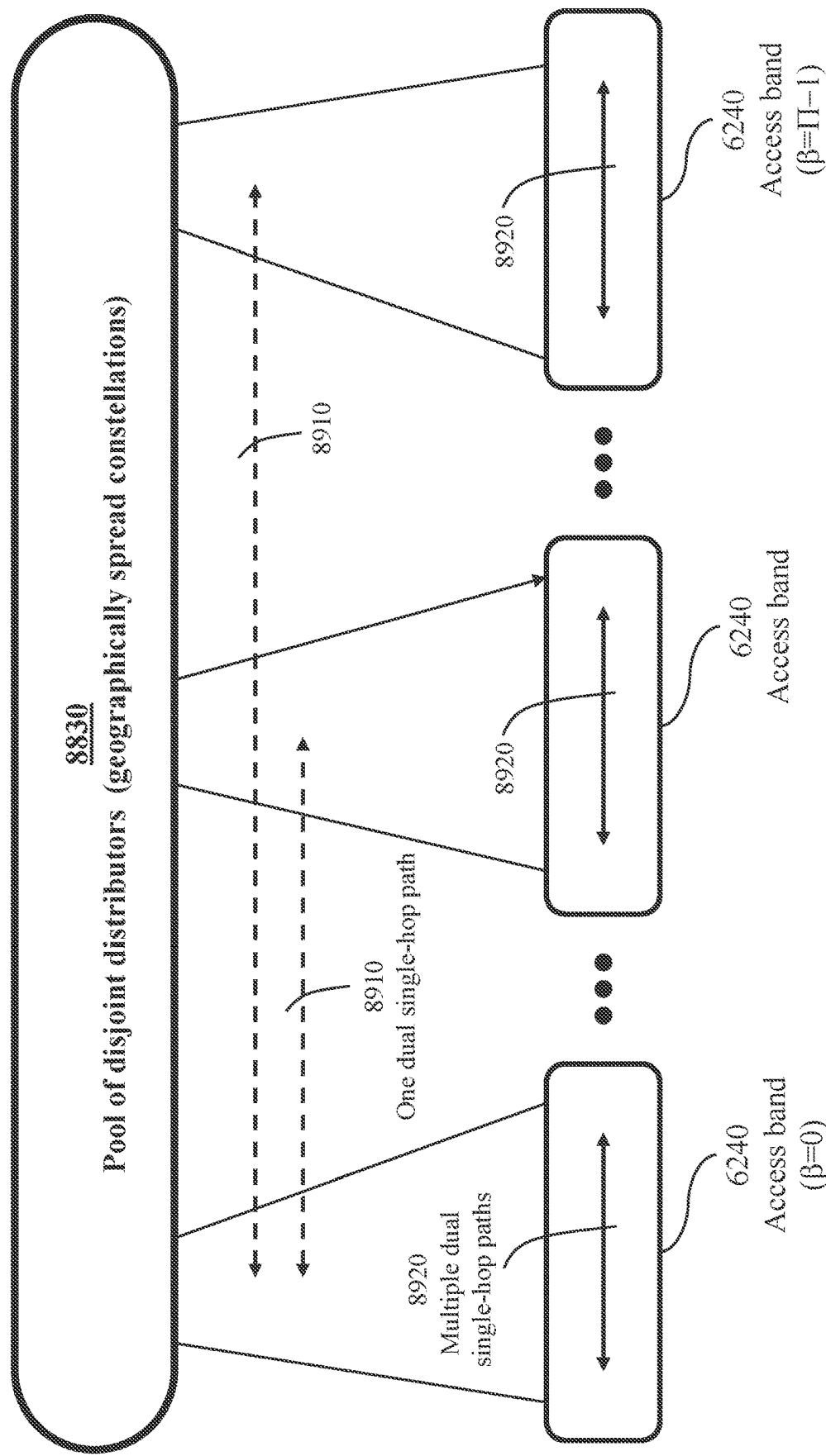
FIG. 89 illustrates inter-band connectivity within a contiguous network based on second-order fusing of a large number of Clos star networks, in accordance with an embodiment of the present invention.

FIG. 89 illustrates inter-band connectivity 8900 within a contiguous network based on second-order fusing (also referenced as "deep fusing") of a large number of Clos star networks.

Each access node of any access band in configuration of FIG. 89 has one single-hop path 8910 to each access node of each other access band. The configuration of FIG. 89 provides multiple dual single-hop paths 8920 for any pair of access nodes within an access band as detailed in FIG. 90.

The total number, $\mu$, of access groups equals $\Pi\times Q$. For a wide-coverage network, $\Pi\gg1$ and $\Omega\gg1$. The discipline, described above, of allocating access groups to distributors ensures that each access node has:

a number, $\Omega\times\lfloor(\Pi-1)/2\rfloor$, which is approximately equal to half the number $\mu$ of access groups, of parallel single-hop paths to each other access node of a same access group;

a number, $\lfloor(\Pi-1)/2\rfloor$, which is approximately equal to half the number $\Pi$ of access bands, of parallel single-hop paths to each access node of a different group within a same band; and one single-hop path to each other access node of a different access band.

Figure 90:
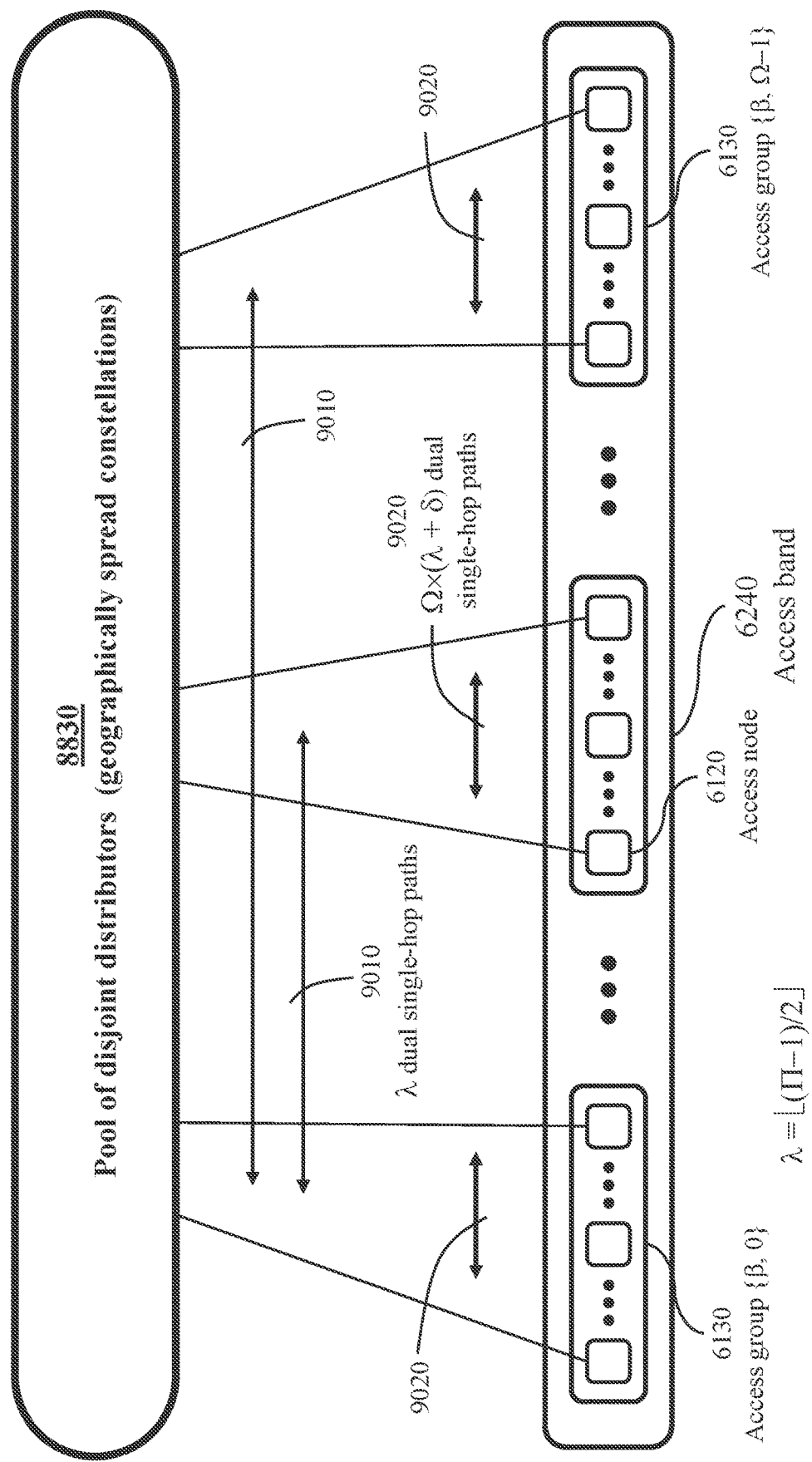
FIG. 90 illustrates intra-band connectivity within a contiguous network based on second-order fusing of a large number of Clos star networks, in accordance with an embodiment of the present invention.

FIG. 90 illustrates intra-band connectivity 9000 within the contiguous network of FIG. 89 which is based on second-order fusing of a large number of Clos star networks. The maximum number, $\lambda$, of inter-group paths 9010, for any pair of access nodes belonging to different access groups within an access band, is determined as $\lambda=\lfloor(\Pi-1)/2\rfloor$. With $\Pi=31$, for example, each pair of access nodes of different access groups of a same access band would connect through up to 15 dual single-hop paths. The minimum number of intra-group single-hop paths 9020 is then $(\lambda+\delta)$, where $\delta=1$ if $\Pi$ is an even number or $\delta=0$, otherwise. In order to provide at least two independent single-hop paths from each access node of each access group of an access band to each other access node of each other access group of the same band, the number $\Pi$ of access bands should exceed four.

Selecting $\Pi$ and $\Omega$ to be 17 and 31, respectively, the total number of access groups is $\Pi\times\Omega=527$. The maximum number, $\lambda$, of independent parallel paths from any access node to any other access node of a same access band but a different access group is 8. The minimum number of independent parallel paths from any access node to another access node of a same access group is 248. Each access node has one single-hop path to each access node of a different access band. Employing optical distributors (FIGS. 51, 54, 55), the maximum number m of access nodes per access group may be limited to 64, for example. With a mean number of access nodes per access group of 40, the total number of access nodes would be approximately 21,000. Employing electronic distributors (FIGS. 57, 59, 60), the maximum number m of access nodes per access group may be set to 256, for example. With a mean number of access nodes per access group of 160, the total number of access nodes would be approximately 84,000.

If the data flow rates for access-node pairs are spatially balanced, providing one (switched) single-hop path for each access-node pair would be sufficient to avoid noticeable overflow. However, with typical spatial traffic imbalance, more than one single-hop path would be need. In the example above, it is plausible that the availability of eight (switched) independent parallel single-hop paths for access-node pairs of different access groups within an access band result in insignificant overflow. The availability of 248 independent parallel single-hop paths for access-node pairs of a same access group renders the probability of overflow infinitesimally small.

Thus, the bulk of the data traffic for access-node pairs within an access band may be transferred over single-hop paths. With 31 access groups per access band ($\Omega=31$) and a mean number of access nodes per access band of 40 for the case of using optical distributors, an access band comprises 1240 access nodes and traffic exchange among the 1240 access nodes occurs over single-hop paths. With 31 access groups per access band and a mean number of access nodes per access band of 160 for the case of using electronic distributors, an access band comprises 4960 access nodes and traffic exchange among the 4960 access nodes occurs over single-hop paths.

The individual $\Pi$ access bands may belong to different enterprises or other administrative entities, with relatively high rate of data exchange among the access nodes of a same access band and limited data exchange between access bands. Although each band has a same number Q of access groups, the number of access nodes per access group may vary significantly below the predefined maximum number m. Thus, the numbers of access nodes of the access bands may differ significantly.

In the case where all designated single-hop paths from a source access node to a destination access node are fully occupied, the data traffic may be routed over a single-hop path to any intermediate access node, other than the destination access node, then routed from the intermediate access node to the destination access node. Since each access node in the entire network has a single-hop path to each other access node, the number of candidate intermediate access nodes is the total number of access nodes (21000 or 84000 in the example above) minus one. However, given the large number of independent parallel single-hop paths for any access-node pair within an access group, it is preferable that an intermediate node, where needed, be selected from among access nodes of the access group of the source access nodes or from among the access nodes of the access group of the destination access node.

The invention has been described with reference to particular example embodiments. The described embodiments are intended to be illustrative and not restrictive. Further modifications may be made within the purview of the appended claims, without departing from the scope of the invention in its broader aspect.

The invention claimed is:

1. A contiguous network comprising:
 a plurality of distributors arranged into a plurality of constellations; and
 a plurality of access nodes arranged into a plurality of groups, each group comprising a respective number of access nodes, said plurality of groups arranged into a first number of bands, each band comprising a second number of groups, each said first number and said second number exceeding one;
 each pair of bands connecting to a respective constellation, wherein:
  one band, denoted joined band, connects in a first mode where each distributor of the respective constellation connects to all access nodes of a respective group of the joined band;
  one band, denoted fusing band, connects in a second mode where each pair of access nodes of different groups of the fusing band has a dual single-hop path through a respective distributor;
  each access node of said fusing band has a single-hop path to each access node of said joined band; and
  said each band connects to at least one constellation in said first mode and connects to at least one other constellation in said second mode;
 thereby, each access node of said each band has multiple dual single-hop paths to each other access node within said each band and a dual single-hop path to each access node of each other band.

2. The contiguous network of claim 1 wherein said respective constellation connects directly to each access node of said each pair of bands through a respective dual multichannel link each dual channel of which connecting to a respective distributor of said respective constellation; thereby the need for cross connectors between said plurality of access nodes and said plurality of distributors is eliminated.

3. The contiguous network of claim 2 wherein said respective dual multichannel link is coupled to:
 a first spectral multiplexer and a first spectral demultiplexer at said each access node of said each pair of bands; and
 a second spectral demultiplexer and a second spectral multiplexer at said respective constellation.

4. The contiguous network of claim 3 wherein:
 said first spectral multiplexer combines $\Omega$ upstream channels emanating from electrical-to-optical converters coupled to $\Omega$ output ports of said each access node of said each pair of bands into an upstream multichannel link directly routed to said respective constellation, $\Omega$ being said second number;
 said second spectral demultiplexer separates said $\Omega$ upstream channels, each upstream channel directed to a respective distributor of said respective constellation;
 said second spectral multiplexer combines $\Omega$ downstream channels emanating from $\Omega$ distributors of said respective constellation into a downstream multichannel link directly routed to said each access node of said each pair of bands; and
 said first spectral demultiplexer separates said $\Omega$ downstream channels, each downstream channel coupled to a respective optical-to-electrical converter coupled to an input port of said each access node of said each pair of bands.

5. The contiguous network of claim 1 wherein, within said fusing band of said each pair of bands, an access node of index ν within a group of index γ connects to said respective constellation, through Ω dual channels, one to each of Ω distributors:

$$S(\rho, \chi), \rho = (\nu + \gamma \times \chi)_{modulo\,\Omega}, 0 \le \chi < \Omega,$$
$$0 \le \nu < M(\beta, \gamma), 0 \le \gamma < \Omega, 0 \le \beta < \Pi;$$

wherein bands of said first number of bands, groups within each band, and access nodes within each group are indexed sequentially in steps of one, starting with zero, each access node being identified according to an access-node index, a group index, and a band index;
Π being said first number, Π>4, Ω being said second number, selected as a prime number, Ω>2, and M(β,γ) denoting a number of access nodes within a group of index γ of a band of index β, each said constellation comprising $\Omega^2$ distributors arranged into a matrix of Ω rows and Ω columns, with individual distributors denoted S(ρ,χ), 0≤ρ<Ω, 0≤χ<Ω.

6. The contiguous network of claim 1 wherein, within said joined band of said each pair of bands, an access node of index ν within a group of index γ connects to said respective constellation through Ω dual channels, one to each of Ω distributors:

$$S(\rho, \gamma), 0 \le \rho < \Omega, 0 \le \nu < M(\beta, \gamma),$$

wherein bands of said first number of bands, groups within each band, and access nodes within each group are indexed sequentially in steps of one, starting with zero, each access node being identified according to an access-node index, a group index, and a band index;
Π being said first number, Π>4, Ω being said second number, selected as a prime number, Ω>2, and M(β,γ) denoting a number of access nodes within a group of index γ of a band of index β, each said constellation comprising $\Omega^2$ distributors arranged into a matrix of Ω rows and Ω columns, with individual distributors denoted S(ρ,χ), 0≤ρ<Ω, 0≤χ<Ω.

7. The contiguous network of claim 1 wherein a distributor S(ρ,χ), 0≤ρ<Ω, 0≤χ<Ω, of said respective constellation connects, through respective dual channels, to each of access nodes identified as:

$$(\beta, \gamma, \nu): \nu = (\rho - \gamma \times \chi + J \times \Omega)_{modulo\,\Omega} < M(\beta, \gamma),$$
$$0 \le J < \lceil M(\beta, \gamma)/\Omega \rceil, 0 \le \gamma < \Omega, \beta = P;$$

and $$(\beta, \gamma, \nu): 0 \le \nu < M(\beta, \gamma), \gamma = \chi, \beta = R;$$

β, γ, and ν denoting a band index, a group index, and an access-node index, respectively,
wherein bands of said first number of bands, groups within each band, and access nodes within each group are indexed sequentially in steps of one, starting with zero, each access node being identified according to an access-node index, a group index, and a band index;
P and R being indices of said respective pair of bands, 0≤P<R<Π, with a band of index P connecting in said second mode;
Π being said first number, Π>4, Ω being said second number, selected as a prime number, Ω>2, and M(β,γ) denoting a number of access nodes within a group of index γ of a band of index β, each said constellation comprising $\Omega^2$ distributors arranged into a matrix of Ω rows and Ω columns, with individual distributors denoted S(ρ,χ), 0≤ρ<Ω, 0≤χ<Ω.

8. The contiguous network of claim 1 wherein a distributor S(ρ,χ), 0≤ρ<Ω, 0≤χ<Ω, of said respective constellation connects, through respective dual channels, to each of access nodes identified as:

$$(\beta, \gamma, \nu): 0 \le \nu < M(\beta, \gamma), \gamma = \chi, \beta = P;$$

and $$(\beta, \gamma, \nu): \nu = (\rho - \gamma \times \chi + J \times \Omega)_{modulo\,\Omega} < M(\beta, \gamma),$$
$$0 \le J < \lceil M(\beta, \gamma)/\Omega \rceil, 0 \le \gamma < \Omega, \beta = R;$$

β, γ, and ν denoting a band index, a group index, and an access-node index, respectively, P and R being indices of said each pair of bands, 0≤P<R<Π, Π denoting a number of bands of said first number of bands, Π>4, Ω, selected as a prime number, denoting a number of groups within each band of said first number of bands, Ω>2, and M(β,γ) denoting a number of access nodes within a group of index γ of a band of index β, each said constellation comprising $\Omega^2$ distributors arranged into a matrix of Ω rows and Ω columns, with individual distributors denoted S(ρ,χ), 0≤ρ<Ω, 0≤χ<Ω,
wherein bands of said first number of bands, groups within each band, and access nodes within each group are indexed sequentially in steps of one, starting with zero, each access node being identified according to an access-node index, a group index, and a band index.

9. The contiguous network of claim 1 wherein at least one distributor of said plurality of distributors comprises:
an optical distributing mechanism having a plurality of input ports and a plurality of output ports;
a distributor controller;
a time indicator;
a plurality of optical splitters each connecting an upstream optical signal from an access node to:
   a respective input port; and
   an optical-to-electrical converter to detect a baseband signal;
a plurality of time-alignment units each for:
   detecting a cyclic identifier of each data segment of a respective baseband signal; and
   communicating the cyclic identifier and a corresponding time indication, according to the time indicator, to the distributor controller to determine discrepancy between said corresponding time indication and a scheduled arrival time of said each data segment; and
a plurality of optical combiners each for inserting, during a respective control time slot, a value of said discrepancy into a respective downstream signal directed from a respective output port to a respective access node for adjusting transmission time to said at least one distributor accordingly.

10. The contiguous network of claim 1 wherein at least one distributor of said plurality of distributors comprises:
an electronic distributing mechanism having a plurality of input ports and a plurality of output ports;
a distributor controller;

a time indicator;
a plurality of optical-to-electrical converters for detecting baseband signals from upstream optical signals received from access nodes;
a plurality of fanout units each connecting a baseband signal to:
   an input buffer preceding a respective input port; and
   a time-alignment unit for:
      detecting a cyclic identifier of each data segment of a respective baseband signal; and
      communicating the cyclic identifier and a corresponding time indication, according to the time indicator, to the distributor controller to determine discrepancy between said corresponding time indication and a scheduled arrival time of said each data segment; and
a plurality of 2:1 temporal multiplexers each for inserting, during a respective control time slot, a value of said discrepancy into a respective downstream signal directed from a respective output port to a respective access node for adjusting transmission time to said at least one distributor accordingly.

11. The contiguous network of claim 1 further comprising a central processor executing instructions to:
   set said respective number of access nodes to equal a predetermined target number, said plurality of access nodes being a corresponding target of a total number of access nodes;
   generate a connectivity table as an allocation pattern of each access node of said plurality of access nodes to respective distributors of said plurality of distributors;
   access a memory device storing data organized into a data structure defining current connectivity of access nodes to respective distributors, said current connectivity being initialized as no connectivity;
   assign new access-node identifiers to new access nodes from among said plurality of access nodes;
   determine connections from said new access nodes to respective distributors based on:
      said connectivity table;
      said current connectivity; and
      said new access-node identifiers;
   and
   update said current connectivity of access nodes to respective distributors and store result in said memory device.

12. A method of forming a contiguous network comprising:
   arranging a plurality of access nodes into a plurality of groups, each group comprising a respective number of access nodes;
   arranging said plurality of groups into a first number of bands, each band comprising a second number of groups, each said first number and said second number exceeding one;
   arranging a plurality of distributors into a plurality of constellations of collocated distributors;
   connecting each pair of bands to a respective constellation, subject to:
      one band, denoted joined band, connecting in a first mode where each distributor of the respective constellation connects to all access nodes of a respective group of the joined band;
      one band, denoted fusing band, connecting in a second mode where each pair of access nodes of different groups of the fusing band has a dual single-hop path through a respective distributor;
      each access node of said fusing band having a single-hop path to each access node of said joined band; and
      said each band connecting to at least one constellation in said first mode and connecting to at least one other constellation in said second mode;
   thereby, each access node of said each band has:
      multiple parallel single-hop paths to each other access node of said each band; and
      one single-hop path to each other access node of each other band, where each said single-hop path traverses only one distributor.

13. The method of claim 12 further comprising connecting said respective constellation directly to each access node of said each pair of bands through a respective dual multi-channel link each dual channel of which connecting to a respective distributor of said respective constellation, thereby eliminating the need for cross connectors between access nodes and distributors.

14. The method of claim 12 further comprising said each distributor exchanging timing data with each access node connecting to said each distributor to time-align said each access node connecting to said each distributor to said each distributor.

15. The method of claim 12 further comprising connecting said each band in said second mode to a number, $\lambda$, of constellations determined as $\lambda = \lfloor (\Pi-1)/2 \rfloor$, $\Pi$ denoting the first number, $\Pi > 4$.

16. The method of claim 12 further comprising connecting said each band in said second mode to a number, k, of constellations so that for $1 \leq k \leq \lfloor (\Pi-1)/2 \rfloor$:
   a pair of bands {p and (p+k)}, $0 \leq p < (\Pi-k)$, connects to a respective constellation with band p being connected in said second mode;
   and
   a pair of bands (r, $\Pi+r-k$), $0 \leq r < k$, connects to a respective constellation with band r being connected in said first mode;
   $\Pi$ denoting said first number, $\Pi > 4$, said first number of bands being indexed sequentially between 0 and ($\Pi-1$).

17. The method of claim 12 wherein an access node of index $\nu$ within a group of index $\gamma$, of a band of index $\beta$ connecting to a constellation in said second mode, connects, through $\Omega$ dual channels, to each of $\Omega$ distributors:

$$S(\rho, \chi), \rho = (\nu + \gamma \times \chi)_{modulo\,\Omega}, 0 \leq \chi < \Omega,$$
$$0 \leq \nu < M(\beta, \gamma), 0 \leq \gamma < \Omega, 0 \leq \beta < \prod;$$

wherein bands of said first number of bands, groups within each band, and access nodes within each group are indexed sequentially in steps of one, starting with zero, each access node being identified according to an access-node index, a group index, and a band index,
$\Pi$ being said first number, $\Pi > 4$, $\Omega$ being said second number, selected as a prime number, $\Omega > 2$, and $M(\beta,\gamma)$ denoting a number of access nodes within a group of index $\gamma$ of a band of index $\beta$, each said constellation comprising $\Omega^2$ distributors arranged into a matrix of $\Omega$ rows and $\Omega$ columns, with individual distributors denoted $S(\rho,\chi)$, $0 \leq \rho < \Omega$, $0 \leq \chi < \Omega$.

18. The method of claim 12 wherein an access node of index $\nu$ within a group of index $\gamma$, of a band of index $\beta$ connecting to a constellation as a joined band, connects, through $\Omega$ dual channels, to each of $\Omega$ distributors:

$S(\rho, \gamma), 0 \leq \rho < \Omega, 0 \leq \nu < M(\beta, \gamma)$, wherein bands of said first number of bands, groups within each band, and access nodes within each group are indexed sequentially in steps of one, starting with zero, each access node being identified according to an access-node index, a group index, and a band index, $\Pi$ being said first number, $\Pi>4$, $\Omega$ being said second number, selected as a prime number, $\Omega>2$, and $M(\beta,\gamma)$ denoting a number of access nodes within a group of index $\gamma$ of a band of index $\beta$, each said constellation comprising $\Omega^2$ distributors arranged into a matrix of $\Omega$ rows and $\Omega$ columns, with individual distributors denoted $S(\rho,\chi)$, $0 \leq \rho < \Omega$, $0 \leq \chi < \Omega$.

19. The method of claim 12 further comprising:

selecting said respective number of access nodes to equal a predetermined target number, said plurality of access nodes being a corresponding target of a total number of access nodes;

generating, based on said connecting each pair of bands, a connectivity table for the respective constellation as an allocation pattern of each access node of said plurality of access nodes to respective distributors of said plurality of distributors;

accessing a memory device storing data organized into a data structure defining current connectivity of access nodes to respective distributors, said current connectivity being initialized as no connectivity;

assigning new access-node identifiers to new access nodes from among said plurality of access nodes;

determining connections from said new access nodes to respective distributors based on:
said connectivity table;
said current connectivity; and
said new access-node identifiers;
and
updating said current connectivity of access nodes to respective distributors and storing result in said memory device.

20. The method of claim 12 further comprising establishing a path from any access node of any group of any band to a destination access node of any other band as:

a single-hop path from said any access node to an intermediate access node of said any group; and a single-hop path from said intermediate access node to said destination access node.

* * * * *